United States Patent
Vlahoplus et al.

(10) Patent No.: US 7,130,825 B2
(45) Date of Patent: Oct. 31, 2006

(54) ELECTRONIC OWNERSHIP CONTROL SYSTEM AND METHOD

(76) Inventors: John C. Vlahoplus, 308 E. 70th St., Apt. 7D, New York, NY (US) 10021; Richard M. Feustel, Jr., 20 Cullen Ave, Islip, NY (US) 11751

( * ) Notice: Subject to any disclaimer, the term of this patent is extended or adjusted under 35 U.S.C. 154(b) by 488 days.

(21) Appl. No.: 09/795,510

(22) Filed: Feb. 23, 2001

(65) Prior Publication Data

US 2002/0029183 A1    Mar. 7, 2002

Related U.S. Application Data

(60) Provisional application No. 60/184,867, filed on Feb. 25, 2000.

(51) Int. Cl.
*G06F 17/60* (2006.01)

(52) U.S. Cl. .......................... 705/37; 705/35

(58) Field of Classification Search ............... 705/35, 705/37, 26; 713/176
See application file for complete search history.

(56) References Cited

U.S. PATENT DOCUMENTS

| | | | |
|---|---|---|---|
| 5,063,507 A | 11/1991 | Lindsey et al. | 364/408 |
| 5,101,353 A | 3/1992 | Lupien et al. | 364/408 |
| 5,285,383 A | 2/1994 | Lindsey et al. | 364/408 |
| 5,497,317 A * | 3/1996 | Hawkins et al. | 705/37 |
| 5,500,793 A | 3/1996 | Deming, Jr. et al. | 364/401 |
| 5,664,115 A | 9/1997 | Fraser | 705/37 |
| 5,715,402 A | 2/1998 | Popolo | 395/237 |
| 5,724,524 A | 3/1998 | Hunt et al. | 395/237 |
| 5,758,327 A * | 5/1998 | Gardner et al. | 705/26 |
| 5,758,328 A | 5/1998 | Giovannoli | 705/26 |
| 5,794,212 A | 8/1998 | Mistr, Jr. | 705/26 |
| 5,794,219 A | 8/1998 | Brown | 705/37 |
| 5,797,127 A | 8/1998 | Walker et al. | 705/5 |
| 5,835,716 A | 11/1998 | Hunt et al. | 395/200.43 |
| 5,926,793 A | 7/1999 | de Rafael et al. | 705/5 |
| 5,940,806 A | 8/1999 | Danial | 705/26 |
| 6,134,536 A * | 10/2000 | Shepherd | 705/37 |
| 6,185,683 B1 * | 2/2001 | Ginter et al. | 713/176 |
| 6,192,347 B1 * | 2/2001 | Graff | 705/36 |
| 6,237,096 B1 * | 5/2001 | Bisbee et al. | 713/178 |
| 6,370,578 B1 * | 4/2002 | Revashetti et al. | 709/224 |
| 6,377,936 B1 * | 4/2002 | Henrick et al. | 705/14 |
| 6,510,418 B1 * | 1/2003 | Case et al. | 705/26 |
| 6,601,044 B1 * | 7/2003 | Wallman | 705/36 |
| 2001/0034681 A1 * | 10/2001 | Abbott et al. | 705/35 |
| 2002/0032626 A1 * | 3/2002 | DeWolf et al. | 705/35 |

FOREIGN PATENT DOCUMENTS

WO    WO 00/11570    3/2000

OTHER PUBLICATIONS

Dictionary of Finance and Investment Terms; Fifth edition; John Downes editor; 1988, p. 235 and p. 327.*
Dictionary of Business Terms; Third edition; Jack P. Friedman Editor; 1987-2000, p. 285.*

* cited by examiner

*Primary Examiner*—Alain L. Bashore
(74) *Attorney, Agent, or Firm*—Fish & Neave IP Group of Ropes & Gray LLP

(57) ABSTRACT

Electronic ownership control systems and methods. Fractional interests in commodities are controlled, transfers initiated or executed, and management of commodities is provided.

126 Claims, 110 Drawing Sheets

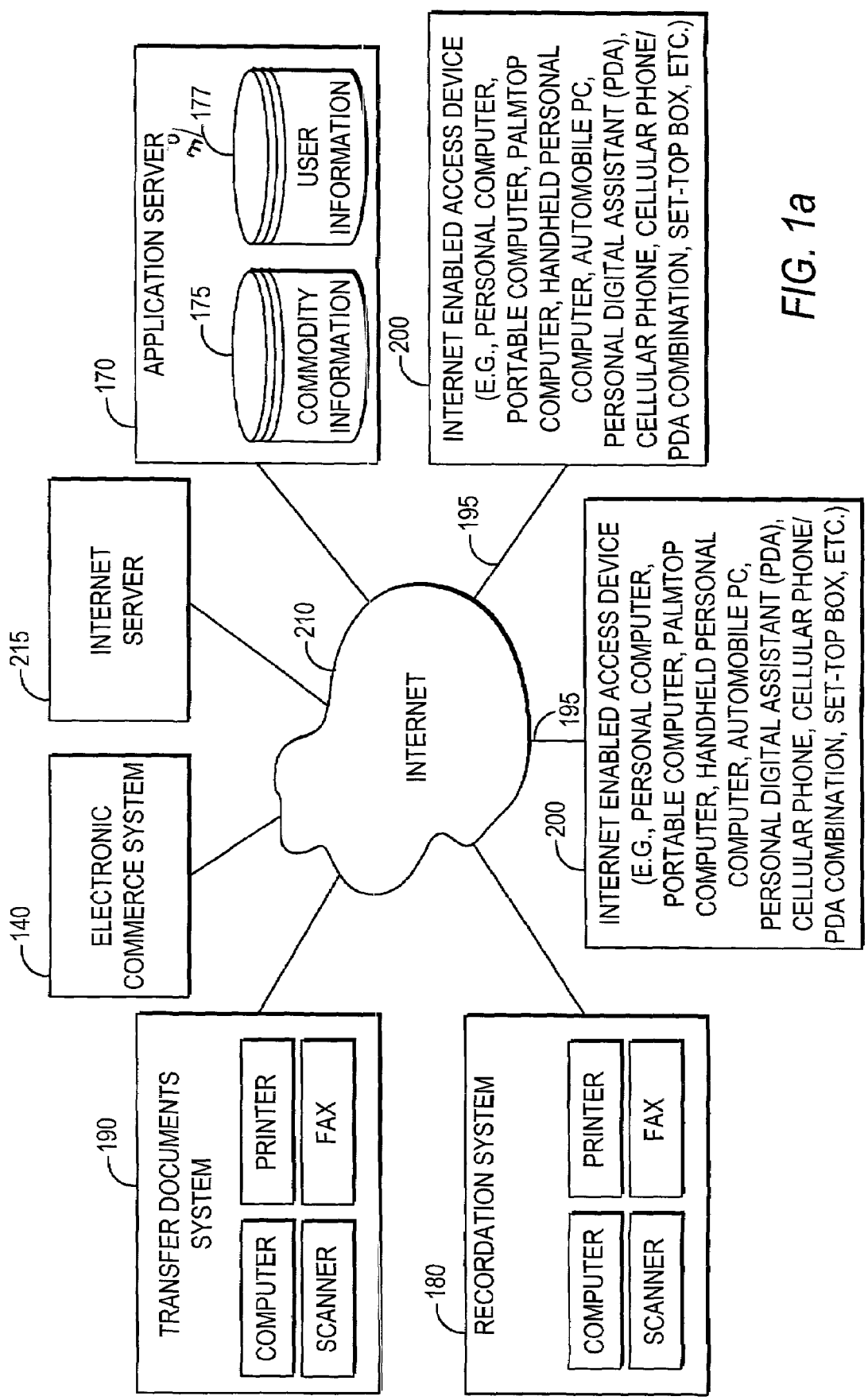

1501

TEOCS

- USER INFORMATION — 82
- ASSOCIATED PARTIES — 84
- COMMODITIES — 86
- PURCHASE — 88
- SELL — 90
- TRADE — 92
- MAINTENANCE/OTHER — 94
- MESSAGES — 96

ADVERTISEMENT — 50

YOUR USER INFORMATION

| | |
|---|---|
| LAST NAME: | MILLER |
| FIRST NAME, MI: | MICHAEL   J |
| STREET ADDRESS: | 35 NORTH AVENUE |
| CITY, STATE: | NEW YORK   NY |
| ZIP CODE: | 10020 |
| TELEPHONE NUMBER: | 212 632-1823 |
| BUSINESS ADDRESS: | ACME CO. 123 FRONT STREET NEW YORK, NY 10020 |
| E-MAIL ADDRESS: | MILLER@SYSTEM.COM |
| SOCIAL SECURITY NUMBER: | 123-45-6789 |
| BANK: | |
|    CHECKING ACCOUNT | 011511326121 |
|    SAVINGS ACCOUNT | 01151132615 |

[ EDIT ]  [ OK ]

ADVERTISEMENT — 50

TEOCS

USER INFORMATION ─82
ASSOCIATED PARTIES ─84
COMMODITIES ─86
PURCHASE ─88
SELL ─90
TRADE ─92
MAINTENANCE/OTHER ─94
MESSAGES ─96

ADVERTISEMENT ─50

REAL ESTATE BROKER
TOM JONES

| | |
|---|---|
| ADDRESS: | 354 EAST ST. |
| CITY, STATE: | NEW YORK    NY |
| ZIP: | 10020 |
| PHONE: | 212-356-8287 |
| FAX: | 212-356-8298 |
| E-MAIL: | JONES@CENTURY21.COM |
| RELATED DOCS | BROKER AGREEMENT |

EDIT   OK

ADVERTISEMENT ─50

TEOCS

ADVERTISEMENT — 50

USER INFORMATION — 82
ASSOCIATED PARTIES — 84
COMMODITIES — 86
PURCHASE — 88
SELL — 90
TRADE — 92
MAINTENANCE/OTHER — 94
MESSAGES — 96

MORTGAGE BROKER
JOHN ROBERTS

| | |
|---|---|
| ADDRESS: | 345 NORTH AVE. |
| CITY, STATE: | NEW YORK    NY |
| ZIP: | 10020 |
| PHONE: | 212-687-4348 |
| FAX: | 212-687-4350 |
| E-MAIL: | ROBERTS@CHASE.COM |
| RELATED DOCS | PRE-APPROVAL LETTER |

[ EDIT ]  [ OK ]

ADVERTISEMENT — 50

TEOCS

- USER INFORMATION — 82
- ASSOCIATED PARTIES — 84
- COMMODITIES — 86
- PURCHASE — 88
- SELL — 90
- TRADE — 92
- MAINTENANCE/OTHER — 94
- MESSAGES — 96

ADVERTISEMENT — 50

COMMODITIES
REAL ESTATE/VACATION: DEEDED WEEK

| | |
|---|---|
| NAME | CALIFORNIA PARTNERS |
| CITY | SAN FRANCISCO |
| STATE | CA |
| WEEK | 8/1/00 TO 8/7/00 |
| NETWORK | PREMIERE PROPERTIES ▼ |
| PRICE PAID | $8,000 |
| DRAG-ALONG | [X] YES [ ] NO |
| TAG-ALONG | [X] YES [ ] NO |

CO-OWNERS — 2570   ADDITIONAL DOCS — 2575

[OK]

ADVERTISEMENT — 50

TEOCS

ADVERTISEMENT
~50

SELL　　　　　　　YOU HAVE A BID FOR — 4210
DAKOTA　　　　　THIS PROPERTY

USER INFORMATION — 82
ASSOCIATED PARTIES — 84
COMMODITIES — 86
PURCHASE — 88
SELL — 90
TRADE — 92
MAINTENANCE/OTHER — 94
MESSAGES — 96

TYPE:　　　　　REAL PROPERTY/
　　　　　　　　RESIDENTIAL
ADDRESS:　　　123 DIRT ROAD
　　　　　　　　BACKWOODS, DAKOTA
　　　　　　　　33737
SIZE:　　　　　500 ACRES
AMT. PAID:　　$75,000
CURRENT VALUE: $150,000
OWNERSHIP:
　CO-OWNED:　　YES
　DRAG-ALONG:　YES
　TAG-ALONG:　 NO
ASK:
　○ MARKET  ● OTHER  $12,000  USER ▼
AUCTION — 4212　　　　OK — 4205　　SPLIT

ADVERTISEMENT — 50

TEOCS

- USER INFORMATION — 82
- ASSOCIATED PARTIES — 84
- COMMODITIES — 86
- PURCHASE — 88
- SELL — 90
- TRADE — 92
- MAINTENANCE/OTHER — 94
- MESSAGES — 96

ADVERTISEMENT — 50

SELL
LIPA

| | |
|---|---|
| TYPE: | UTILITIES/ELECTRICAL |
| AMOUT PAID: | $50,000 |
| MWATTS/DAY: | 15 |
| CURRENT PRICE: | $75,000 |
| OWNERSHIP: | |
| CO-OWNED: | YES |
| DRAG-ALONG: | YES |
| TAG-ALONG: | NO |

ASK: ● MARKET   ○ OTHER $ [   ]
OUTPUT [   ] MWATTS/DAY USER [ ▼ ]

AUCTION   SPLIT          — 4305
4310                      [ OK ]

ADVERTISEMENT — 50

TEOCS

ADVERTISEMENT — 50

SELL
CALIFORNIA
PARTNERS

USER INFORMATION — 82
ASSOCIATED PARTIES — 84
COMMODITIES — 86
PURCHASE — 88
SELL — 90
TRADE — 92
MAINTENANCE/OTHER — 94
MESSAGES — 96

| | |
|---|---|
| TYPE: | PROPERTY/VACATION |
| AMT. PAID: | $8,000 |
| CURRENT VALUE: | $12,000 |
| OWNERSHIP: | |
| CO-OWNED: | YES |
| DRAG-ALONG: | YES |
| TAG-ALONG: | NO |
| WEEK: | 8/1 TO 8/7 |

○ MARKET  ● OTHER  [$12,000]  USER [▼]

AUCTION — 4410      OK — 4405      SPLIT

ADVERTISEMENT — 50

*FIG. 44a*

ELECTRONIC OWNERSHIP CONTROL SYSTEM AND METHOD

This application claims the benefit of U.S. provisional patent application Ser. No. 60/184,867, filed Feb. 25, 2000.

BACKGROUND OF THE INVENTION

This invention relates to electronic trading systems. More particularly, this invention relates to fractional ownership control systems and methods that provide for the electronic control of fractional ownership interests in personal property, real property and other legal interests.

Fractional property ownership is common in our society. People and corporations may co-own almost any type of personal or real property in a variety of arrangements. Each co-owner may, for example, have an undivided interest in personal or real property with the right to use the entire property at any time. This is sometimes referred to as a "tenancy in common." Condominiums and co-operative ownership (sometimes referred to as "co-ops") are additional examples of types of real property fractional ownership arrangements.

In some arrangements, co-owners may have the right to use property only during specified periods of time. Co-owners of a computer system, for example, may own a time period during which their jobs are processed. Co-owners of real property, for example, may each have an undivided interest in an entire property, but only have the right to use the property during a specified period of time. In some time-based arrangements, co-owners may own real property only during particular time periods, such as a week, during which the owners actually own and may use the property. These are sometimes referred to as "deeded weeks," and are used typically in time-share vacation ownership arrangements. In other vacation ownership arrangements, co-owners have points that they can use to obtain particular weeks of use at particular properties. Co-owners in this type of arrangement may have only a right to use the property, and not a direct ownership interest in the property. In still other vacation ownership arrangements, people own weeks of use in a network of properties, rather than any direct ownership interest in a particular property.

Fractional ownership can decrease the value and liquidity of real and personal property. Would-be purchasers must deal with each owner in order to obtain the entire interest in the property. This may increase transaction costs for the purchase, especially when co-owners are geographically diverse parties. In arrangements where people own weeks of use in a network of properties, rather than any direct ownership interest in a particular property, the value of the sum of the parts may be significantly less than the value of the whole. A purchaser of each co-owners' interest would only obtain each co-owner's right to use the property. If property were purchased from the real owner (i.e., the network), the purchaser would have to take the property subject to all of the co-owners' (i.e., users') rights.

One approach for increasing the liquidity of co-owned real property has been to provide each co-owner with drag-along rights. Drag-along rights include the right of a co-owner to require other co-owners to sell their interests in a commodity at fair market value when the co-owner wishes to sell his or her own fractional interest in the commodity. Drag-along rights may increase the liquidity of a commodity because they may ensure that a single co-owner can compel the sale of, and a purchaser can purchase, the entire interest in a commodity.

Even the use of drag-along rights, when coupled with a small number of co-owners, may not provide for the optimal value and liquidity of real property if the rights cannot be managed and transferred in an efficient manner. Each owner may, for example, need to execute necessary transfer documents (e.g., contracts of sale, deeds, etc.), and each owner may need to be compensated for his or her interest in the property. The difficulty in transferring property subject to drag-along rights may be exacerbated if co-owners are geographically disparate.

It would be desirable, therefore, to provide an electronic ownership control system that separates the ownership of commodities from the management of the commodities by putting owners into direct ownership of commodities that have traditionally been right-to-use types of commodities, or that have traditionally been owned by a single party who sells the output of a commodity.

It would also be desirable to provide an electronic ownership control system that allows geographically disparate potential co-owners to coordinate their interests and jointly acquire commodities.

It would also be desirable to provide an electronic ownership control system that provides for the electronic transfer of ownership in fractionally-owned commodities.

It would also be desirable to provide an electronic ownership control system that provides for the transfer of ownership in fractionally-owned commodities that are co-owned subject to drag-along rights.

It would also be desirable to provide an electronic ownership control system that provides for notifying co-owners of a potential sale of another co-owner's interest in a co-owned commodity.

It would also be desirable to provide an electronic ownership control system that provides for notifying co-owners of a potential sale of a co-owned commodity in which the other co-owners have drag-along rights.

It would also be desirable to provide an electronic transfer ownership system that provides for allowing co-owners of a commodity to purchase the interest of a selling co-owner when the selling co-owner attempts to sell his interest in the property.

It would also be desirable to provide an electronic ownership control system that provides for notifying co-owners of an opportunity to sell their interests in a co-owned property when a co-owner attempts to sell his or her interest in the property (sometimes referred to herein as "tag-along" rights).

It would also be desirable to provide an electronic ownership control system that provides non-user co-owners with opportunities to exercise drag-along or tag-along rights.

SUMMARY OF THE INVENTION

It is an object of some embodiments of the present invention to provide an electronic ownership control system that separates the ownership of underlying commodities from the management of the commodities by putting owners into direct ownership of underlying commodities that have traditionally been right-to-use types of commodities, or that have traditionally been owned by a single party who sells the output of a commodity.

It is an object of some embodiments of the present invention to provide an electronic ownership control system that allows geographically disparate potential owners to coordinate their interests and jointly acquire commodities.

It is an object of some embodiments of the present invention to provide an electronic ownership control system that provides for the electronic transfer of ownership in fractionally-owned commodities.

It is an object of some embodiments of the present invention to provide an electronic ownership control system that provides for the transfer of ownership in fractionally-owned commodities that are co-owned subject to drag-along rights.

It is an object of some embodiments of the present invention to provide an electronic ownership control system that provides for notifying co-owners of a potential sale of another co-owner's interest in a co-owned commodity.

It is an object of some embodiments of the present invention to provide an electronic ownership control system that provides for notifying co-owners of a potential sale of a co-owned commodity in which the other co-owners have drag-along rights.

It is an object of some embodiments of the present invention to provide an electronic transfer ownership system that provides for allowing co-owners of a commodity to purchase the interest of a selling co-owner when the selling co-owner attempts to sell his interest in the property.

It is an object of some embodiments of the present invention to provide an electronic ownership control system that provides for notifying co-owners of an opportunity to sell their interest in a co-owned property as provided for by tag-along rights.

It is an object of some embodiments of the present invention to provide an electronic ownership control system that provides non-user co-owners with opportunities to exercise drag-along, tag-along, first refusal, first offer, or veto rights.

Various features and embodiments of the present invention are described in Vlahoplus et al. U.S. provisional patent application Ser. No. 60/184,867, filed Feb. 25, 2000, which is hereby incorporated by reference herein in its entirety.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 1a and 1b show illustrative on-line and client/server arrangements for an electronic fractional ownership control system, in accordance with the present invention;

FIG. 16b shows an illustrative information page that the system may provide in response to a user indicating a desire to view or edit user information, in accordance with the present invention;

FIG. 21 shows an illustrative real estate broker information page, in accordance with the present invention;

FIG. 22b shows an illustrative mortgage broker information page, in accordance with the present invention;

FIG. 25c shows an illustrative commodities information page for a commodity of the type indicated in FIG. 25a, in accordance with the present invention;

FIGS. 42a and 42b show illustrative pages that the system may provide to a user with an opportunity to sell co-owned residential property with drag-along rights, in accordance with the present invention;

FIGS. 43a and 43b show illustrative pages that the system may provide to a user with an opportunity to sell and auction commodities of type utilities/electrical, in accordance with the present invention;

FIGS. 44a and 44b show illustrative pages that the system may provide to a user with an opportunity to sell and auction deeded-week vacation property, in accordance with the present invention;

DETAILED DESCRIPTION OF ILLUSTRATIVE EMBODIMENTS

Figure 1B:
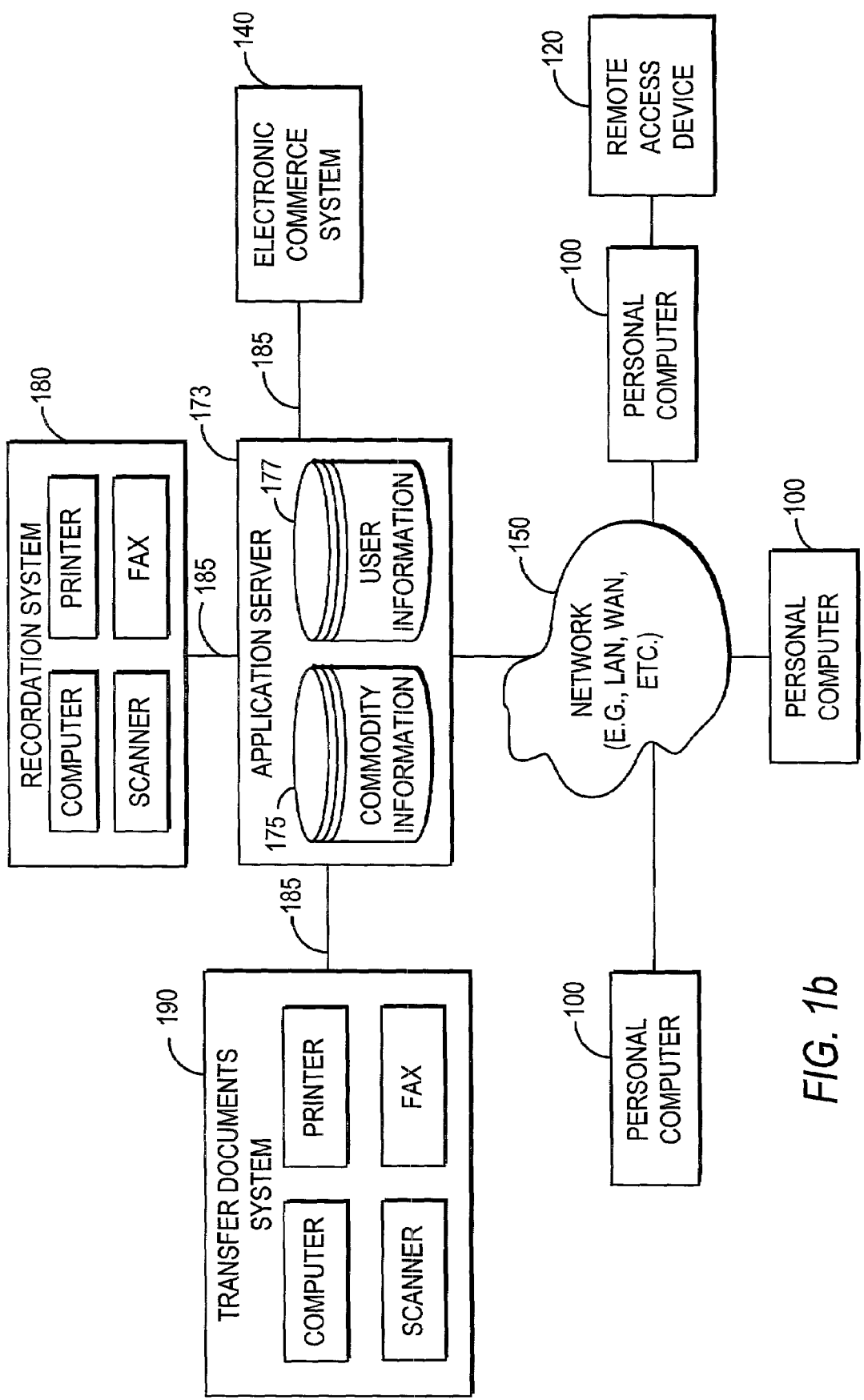

In accordance with this invention, there is provided an electronic fractional ownership control system. The fractional ownership control system of the present invention provides users with opportunities to purchase, sell, trade or manage commodities that are fractionally owned by a number of co-owners. In this way, the system may allow users to fractionally own commodities while the system provides for the maintenance, purchase, sale, and trade of fractionally-owned commodities. As used herein, "commodity" and "commodities" are intended to include any personal property, whether tangible or intangible, real property, or a combination thereof, in which users of the system may have an ownership interest. These terms are also intended to include any legal interest or right that may transferred. Commodities may be, for example, aircraft, spacecraft, real property (residential, vacation, industrial and commercial), bonds, bills, notes, stocks, derivatives, marine rights, utility output (e.g., electricity, gas, water, etc.), distribution capacities (e.g., ground, air, and water shipping, pipelines, electrical grids, airport landing slots, etc.), computer hardware or processing capacity (e.g., servers, mainframes, etc.), computer software, natural resources and related items (e.g., oil, gas, timber, oil wells, radio frequency spectrum rights, etc.), produced resources (e.g., grain, coffee, grapes, etc.), intellectual property (e.g., patents, copyrights, trademarks, etc.), or any other type of real or personal property. Commodities may also include legal rights or interests, such as rights to use, make or sell products or services. For example, a commodity may be a software license. A "lot" or "block" of aggregated units may also be referred to herein as a commodity. The units may each be individually owned or, alternatively, each owner may have an undivided interest in the lot or block. For example, one or more users may each own a unit of stock. The owners' units may be aggregated into a lot or block of stocks. The lot of stocks in this example is a commodity, with each owner having an ownership interest in his or her own unit of stock and therefore a fractional ownership interest in the block. As another example, a block commodity may be a group software license that is owned by a number of co-owners. Each owner may have the right to use a copy of the software under one license.

As used herein, fractional ownership interests may be fractional interests in a singular commodity, an interest in one or more units that are aggregated by the system into a lot or block commodity, or an undivided interest in a lot or block of units. Fractional ownership interests may include, for example, undivided or divided interests in personal property, condominium ownership, cooperative ownership, deeded time periods (e.g., deeded-weeks of ownership in real property such as some time shares), or any other suitable interest. Purchasers of commodities may purchase the entire interest in a commodity, or a fractional interest in a commodity.

Fractional ownership interests may include the right to exclusively use a commodity for a period of time. In some fractional ownership arrangements, the exclusive right to use a commodity (e.g., real property, distribution capacity, computer processing capacity, etc.), may be temporally constrained. Co-owners may, for example, have the right to use a commodity only during a fixed time period (hereinafter sometimes referred to as a "fixed period arrangement"). In another arrangement, co-owners may have the right to use a commodity for a fixed amount of time (e.g., one week), but the time period during which the fixed amount of time occurs may change (hereinafter sometimes referred to as a "floating right arrangement"). In still another exclusive use arrangement, co-owners may have a total amount of points that they may exchange for the use of one or more commodities during one or more time periods (hereinafter sometimes referred to as a "point system arrangement"). Users may also share commodities concurrently (i.e., common use). Any other suitable concurrent or exclusive use arrangement may be used.

The system may provide users with opportunities to purchase, sell, trade and manage commodities and fractional interests in commodities. The system may determine, or users may indicate, the type of commodity the users wish to purchase, sell, trade or manage. The system may provide display screens or web pages with interface elements, information, and features that are specialized to the type of commodity. The specialization of display screens or web pages based on commodity type may allow a system provider to provide a single system that provides geographically disparate owners of different types of commodities with opportunities to purchase, sell, trade and manage their commodities. This may broaden the user base of the system as compared to a system that merely trades a single type of commodity, and may provide the system provider with increased income opportunities. The system provider may, for example, receive increased income from users should the provider decide to charge a per-user or per-transaction fee. The increased user base may also make the system more attractive to advertisers, resulting in increased advertisement revenue.

The system may also provide for the increased liquidity of fractionally-owned commodities by providing for the purchase, trade, or sale of fractionally-owned commodities among users who own the commodities subject to drag-along or tag-along rights of other co-owners. As used herein, drag-along rights include the right of a co-owner to require other co-owners to sell their interests in a commodity at fair market value when the original co-owner wishes to sell his or her own fractional interest in the commodity. As used herein, tag-along rights include the right of a co-owner to require another co-owner to sell the original co-owner's interest along with the other co-owner's interest, when the other co-owner sells his or her interest. Co-owners who are dragged-along or who tag-along may be compensated for their interest at the fair market value or at such other price terms as defined in the co-ownership agreement. Drag-along and tag-along rights may be continuous, periodic, continuous after a period or otherwise. For example, each co-owner might have the right at any time to cause a sale of all interests in a commodity (i.e., continuous rights). Alternatively, the owner might have the right to force a sale only once every five years (i.e., periodic rights), or any time after five years have passed (i.e., rights that are continuous after a period).

Drag-along and tag-along rights may increase the liquidity of a commodity because they may ensure that a single co-owner can sell, and a purchaser can purchase, the entire interest in a commodity. The ability to sell or purchase an entire commodity may be desirable when, for example, the entire ownership interest in a commodity is more valuable than the sum of the values of the individual ownership interests. Drag-along and tag-along rights may also ensure a purchaser that an entire commodity can be purchased without the danger of one or more co-owners refusing to sell. This may make fractional ownership more attractive to owners than it would be in the absence of such rights. In some embodiments, co-owners may have veto, first refusal, or first offer rights.

The system may provide users with opportunities to purchase, sell, or trade specific unique or fungible commodities (e.g., a specific property, stock, natural resource from a particular provider, a particular unit in a condominium, a particular time share property for a particular week, etc.). The system may also provide users with opportunities to purchase, sell, or trade classes of commodities (e.g., ten thousand barrels of oil from any provider, one hundred tons of shipping capacity from any distributor, any two-bedroom condominium in a particular price range within a specific radius of a particular attraction, any deeded-week of ownership in a facility for a particular week, etc.). The system may also provide users with opportunities to rent fractional interests in commodities (e.g., deeded weeks, processing capacity, etc.). The system may, for example, provide users with opportunities to access information on commodities. The system may provide users with opportunities to immediately purchase available commodities at a posted sale price, or may provide users with opportunities to make offers for available commodities when a posted sale price is undesirable. The system may also provide users with opportunities to make offers for commodities that are not yet for sale.

The system may provide users with opportunities to set the price at which they buy or sell commodities. The system may provide buyers and sellers with opportunities to, for example, specify bid prices or ask prices for commodities. The bid and ask prices may be binding or non-binding. The system may also provide buyers and sellers with opportunities to set limit orders and market orders. Users may set limit orders to indicate the highest and lowest prices that the users wish to purchase or sell commodities for. Users may set market orders to indicate that they desire to purchase commodities at the next available market price. The system may provide pricing feedback to users using any suitable approach. The system may, for example, provide pricing feedback in real-time, near real-time, or delayed by a predefined amount of time (e.g., delayed fifteen minutes).

The system may, for example, provide a user with an opportunity to request the sale of a commodity that the user wholly or fractionally owns, at a price specified by the user. When the system receives a sale request for a fractionally-owned commodity, it may notify the other co-owners of the seller's request using any suitable approach. The system may, for example, notify the other co-owners when the system receives the sale request. In an alternative approach, the system may notify the other co-owners when a purchase request is matched (i.e., directly, by aggregation, by auction, etc.), with the sale request. Any other suitable approach may be used.

The system may notify other co-owners of the sale request, the seller's liquidity rights (if any), the co-owners' options, or any suitable combination thereof. When, for example, a co-owner has periodic drag-along rights, the system may notify the co-owner whether the sale request is in accordance with those rights. The system may, for example, notify the other co-owners of their tag-along rights, if any. When co-owners do not have drag-along or tag-along rights, the seller may only sell his or her fractional interest in the commodity.

The system may also provide each co-owner with an opportunity to purchase the commodity, or aggregate a number of purchase requests of co-owners who wish to purchase the commodity. The system may provide co-owners with purchase opportunities prior to providing third parties with opportunities to purchase the commodity or the seller's fractional interest in the commodity. If no single co-owner or group of co-owners wishes to purchase the commodity, the system may: (1) attempt to match the seller's request with a pending purchase request and initiate transfer of ownership of a commodity or (2) initiate the transfer of ownership of a commodity to the originator of an already matched request. The system may attempt to match purchase and sale requests using any suitable approach. The system may attempt to match orders when, for example, orders are placed, at a predefined time each day, periodically, after a predefined number of orders have been placed, or with any other suitable frequency. A combination of these approaches may also be used.

Orders may be matched directly when, for example, the system finds a purchase request that matches a sale request in commodity type and price. Matches may also be made directly when, for example, a user selects a specific commodity that has already been offered for sale. The system may notify the buying and selling users, provide the users with opportunities to approve the transfer, and initiate the transfer of ownership of the commodity. When purchase and sale requests match with respect to commodity type but not price, the system may, for example, notify the buying and selling users and provide them with an opportunity to modify their requests. When the system finds trade requests that match in commodity types, the system may notify the trading users and initiate transfer of ownership of the commodities.

The system may also match purchase and sales requests by aggregating buyers, sellers, or both. The system may aggregate enough sales requests, for example, to fill one purchase request. The system may, for example, aggregate each of a number of units into a block commodity. The owners of each unit may retain their exclusive ownership over each unit, or the system may convert each user's interest in each unit into a fractional ownership in the block, and initiate the transfer of the entire block as one commodity to a buyer. In another approach, the system may initiate the transfer of ownership in each individual commodity from each seller to the buyer. If a seller of an individual commodity is a co-owner with drag-along rights, the system may initiate the transfer of the ownership rights of all of the co-owners to the buyer, or provide the co-owners with an opportunity to purchase the commodity. The system may aggregate purchase and sale requests on a by-time basis (i.e., on a first-come-first-serve basis).

The system may aggregate enough purchase requests to fulfill one or more sales requests. The system may, for example, transfer ownership in a single commodity to each purchaser of the aggregated order. When the commodity for sale is wholly owned, the system may initiate the transfer of ownership from the single seller of the commodity to each purchaser, giving each purchaser an equal fractional interest in the commodity. When the commodity for sale is owned fractionally by multiple co-owners without drag-along rights, the system may initiate the transfer of ownership from the seller of the commodity to each purchaser, giving each purchaser an equal fractional interest in the commodity. If the selling co-owner has drag-along rights, the system may initiate the transfer of ownership of all of the co-owners. If desired, the system may provide each buyer with drag-along rights, tag-along rights, or both, to attempt to maximize the liquidity of the sold commodity.

The system may also match orders by providing users with opportunities to initiate or participate in auctions for commodities. The system may provide a buyer with an opportunity to initiate an auction by, for example, allowing a buyer to indicate a price that the buyer is willing to pay for a particular type of fungible commodity or class of commodities (e.g., the buyer may indicate that he or she is willing to pay $100.00 for grain). Sellers may respond by bidding an amount of the requested commodity at the indicated price (e.g., 50 bushels for $100.00). The system may initiate the transfer of a commodity from a seller to the buyer when, for example, the seller offers the most amount of the commodity at the indicated price (e.g., 125 bushels for $100.00).

The system may also provide sellers with opportunities to auction commodities using any suitable approach. Seller based auctions may include, for example, English and Dutch style auctions, or any other suitable auction. In English style auctions, the system may start with a minimum bid and provide buyers with opportunities to bid higher and higher amounts until the highest bid is reached. In Dutch style auctions, the system may start with an asking price. As users purchase one or more commodities or units in a block commodity, the system may keep lowering the asking price until all of the available commodities or units are sold.

The system may notify co-owners that a selling co-owner has offered his or her fractional interest in a commodity for auction, and may allow the other co-owners to purchase the interest before allowing third parties to bid, or after the system has received the highest bid. The system may initiate a subauction, private to the co-owners, that allows only the co-owners to bid. Non-user co-owners (i.e., co-owners who are not registered users of the system) may participate, for example, by mail, telephone, fax, or computer (e.g., via e-mail). In another suitable approach, the system may allow other users to observe the bidding of the co-owners. When one or more co-owners do not purchase the selling co-owner's interest, the system may allow one or more third parties to purchase the interest. When the selling co-owner has drag-along rights, the system may allow third parties to bid for and purchase the fractional interests of all of the co-owners.

After matching purchase and sale orders between one or more co-owners and third parties directly, by aggregation, by auction, or using any other suitable approach, the system may drag the interests of the non-participating co-owners of the commodity into the transfer along with the selling co-owner's interest, pursuant to drag-along rights of the seller. The drag-along rights of the selling co-owner may have been originally part of the co-owner's original acquisition of the commodity or may have been agreed to by the co-owners as part of acquiring the commodity using the fractional ownership system. The system may automatically notify the non-participating co-owners of a potential sale and may provide the non-participating co-owners with an opportunity to purchase the entire commodity. If the other co-owners do not purchase the commodity, the selling co-owner is required to provide the fair market value of the commodity to the non-participating co-owners.

The system may generate necessary printed or electronic transfer documents (e.g., contracts of sale, co-ownership agreements, deeds, etc.), and provide the transfer documents to the sellers or buyers for physical or electronic execution. When a broker or attorney is required or needed for the transfer, such as for transfers of real property, the system may select a broker or attorney and generate any necessary retainer agreements. When the transfer documents and, if used, broker or attorney agreements have been executed by one side, that side may provide the documents to the other side using, for example, regular or electronic mail. When the documents have been signed by all parties, the system may provide for the electronic transfer of funds from a buyer or buyers to a seller or sellers. The system may remunerate non-participating co-owners for their interests first. The system may also provide for the electronic payment of brokers' and attorneys' fees. Once the necessary transfer documents have been executed and, in the case of a sale or renting, the necessary funds transferred, the system may record the transfer. The system may, for example, report the transfer with third parties such as governmental entities or title searchers for recordation.

The system may also provide users with opportunities to trade commodities. Users of the system may wish to trade, for example, temporal uses of co-owned property. The system may, for example, provide users with opportunities to enter trade requests for commodities the users own wholly or fractionally. The system may provide a user with, for example, an opportunity to specify the commodity or class of commodities that the user is trading, and to identify the particular commodity or class of commodities that the user wishes to trade for. The system may notify co-owners of the trading co-owner that the trading co-owner has indicated a desire to trade his or her interest in the commodity. The system may provide co-owners of a trading co-owner with opportunities to trade for or purchase the trading co-owner's interest in the commodity. This may be provided before providing trade or purchase opportunities to third parties if desired. The system may aggregate trade orders to effect trades if necessary.

The system may also perform maintenance actions. The system may, for example, provide co-owners with automatic notices of information of joint interest (e.g., maintenance schedule changes, maintenance fee changes, changes in conditions of membership in an ownership network, changes in liquidity, etc.). The system may, for example, provide co-owners with opportunities to schedule their uses of a commodity. The system may provide users with opportunities to place orders for renting other owners' commodities or other co-owners' shares in commodities (e.g., temporal use rights). Any other suitable maintenance action may be provided.

The system may be connected, via a suitable communications link, to another fractional ownership system, or to other types of ownership control systems (e.g., electronic time-share networks, utility producers, airlines, charter services, etc.). The interconnection of systems may allow for each system to contribute their commodities to other networks of commodities. Users may transfer their commodities between competing networks in attempts to maximize the value of participating in a particular network. This mobility of users between networks may tend to prompt networks to compete more because dissatisfied users could move commodities rather than having to sell their commodities at low prices to someone else tied to a single network.

Various features of the present invention may be illustrated by the following examples. A user who is a non-co-owner of a commodity may initiates a request to purchase a commodity, such as a 30 minute per week time share unit. A co-owner whose ownership is subject to an agreement with a right of first refusal and tag along rights may submit a matching asking price. The system may automatically notify other co-owners. If no-one is interested in buying the single 30 minute interest, so no one exercises the right of first refusal. However, five other co-owners, for example, exercise their tag along right by notifying the system. The system then notifies the buyer, who electronically notifies the system that he is willing to buy all six units. The system then sends out another notice to the co-owners. A second co-owner, who benefits from economies of scale, now is interested in the sale because he can use 3 hours of time more efficiently than just 30 minutes. Therefore, he exercises the right of first refusal electronically. The system notifies other co-owners, who acquiesce. The system awards the 6 units to the second co-owner at the price per unit previously agreed to by the bidder and the first co-owner. The system may generate all transfer documents, registers them, etc., and may transfer the purchase price electronically.

As another example, a user sells a share of Berkshire Hathaway in an auction in equal shares to 10 co-purchasers, including Jones, through the system. The system registers the share in the name of a custodian for the benefit of the 10 co-owners. Later, another user sells another share of Berkshire Hathaway through the system, and Jones purchases 90% of that share in the transaction. The system may detect that registering the second share as being 90% owned by Jones will leave him owning 100% of a single share, but split as fractional ownership of two different shares. Therefore, the system may automatically register the second share as fully owned by Jones, and may transfer ownership of his 10% interest in the first share to the users who had purchased the 10% interest in the second share.

As another example, fifty-one users each own a one week time share in a condominium in Florida, under an agreement in which the 52nd week is used for routine maintenance. A natural disaster damages the unit, requiring an additional week of maintenance. The system may automatically notify the co-owners of the needs. The system then determines who loses the week's use: one method would be to choose by lottery; another would be to have owners post how much they would be willing to take as payment for giving up their week the system may solicit bids for the work if performed in those weeks (e.g., it may cost more to do the work during the winter than during the summer), choose the lowest combined price (cost of the week and cost of the work), and automatically schedule the cheapest combined week, notify the owners, pro rate the cost among the owners, add the cost to the next maintenance bill, and pay the proceeds electronically to the owner whose week was chosen.

As another example, a school teacher user posts a request to purchase a summer time share in an apartment in Manhattan, planning to spend the months off from teaching. No other users are interested in selling just such an interest. Later, another user who is a professor gets a job in Manhattan and posts a request to purchase an interest in an apartment for the fall through the spring. The system may automatically post the requests separately and together. A potential seller sees that together the two requests add up to a full year's interest in an apartment, and accepts the two requests. The system may close the purchase and sale with all of the documentation.

As still another example, an owner submits a request to sell all of her interest in an apartment, but notes that she is willing to sell as little as 75% of the interests in three month increments. Later, a user submits a request to buy an interest in the fall in an apartment meeting the general criteria of the seller's place. Later, another user submits a request to buy such an interest for the spring. Later, another user submits a request to buy such an interest for the winter. The system may automatically match the three buy requests with the minimum sales request, and executes the sale of the 9 months' interests.

As still another example, Smith owns 5% of a share of Berkshire Hathaway, while Jones and Blake respectively own 1% and 5% of a second share. Both shares are subject to drag along rights. Smith and Jones notify the system that they plan to exercise their drag along rights, and the system matches a buyer who is willing to purchase one or two full shares (but no fractional shares). The system may sell both shares, notify co-owners, and electronically transfer the shares and the proceeds. Alternatively, in order to minimize the number of co-owners inconvenienced by an unwanted drag along, the system may first exchange Blake's and Smith's interests so that both sellers (Smith and Jones) own their interests in the second share. Then the system would sell only the second share, notify co-owners, and electronically transfer the share and the proceeds.

The fractional ownership system of the present invention may be implemented using, for example, a client/server based approach or, preferably, using an on-line approach. If desired, a combination of these approaches may be used. Illustrative on-line and client-server based arrangements for the fractional ownership system are shown in FIGS. 1a and 1b, respectively. In the illustrative on-line arrangement of FIG. 1a, Internet enabled access devices 200 may be connected via links 195 to Internet 210. Internet enabled access devices 200 may include any device or combination of devices suitable for providing Internet access to a user of the time tracking system. Internet enabled access devices may include, for example, any suitable personal computer (PC), portable computer (e.g., a notebook computer), palmtop computer, handheld personal computer (H/PC), automobile PC, personal digital assistant (PDA), Internet-enabled cellular phone, combined cellular phone and PDA, set-top box (e.g., a Web TV enabled set-top box), or other device suitable for providing Internet access.

Internet server 215 may be any server suitable for providing on-line access to the fractional ownership system (e.g., a web server). Internet server 215 may, for example, provide one or more pages to Internet enabled access devices 200 using one or more suitable protocols (e.g., the HyperText Transfer Protocol (HTTP) and Transmission Control Protocol/Internet Protocol (TCP/IP)). The pages may be defined using, for example, any suitable markup language (e.g., HyperText Markup Language (HTML), Dynamic HyperText Markup Language (DHTML), Extensible Markup Language (XML), etc.). The pages may include scripts, computer code, or subsets of computer code, that define mini-programs (e.g., Perl scripts, Java applets, etc.).

Links 195 may include any transmission medium suitable for providing Internet access to Internet enabled access devices 200. Links 195 may include, for example, a dial-up telephone line, a computer network or Internet link, an infrared link, a radio frequency link, a satellite link, a digital subscriber line link (e.g., a DSL link), any other suitable transmission link or suitable combination of such links. Different links 195 may be of different types depending on, for example, the particular type of Internet access device 200.

Any protocol or protocol stack suitable for supporting communications between Internet enabled access devices 200 and Internet server 215 over links 195 based on the particular device 200 and link 195 may be used. For example, Ethernet, Token Ring, Fiber Distributed Data Interface (FDDI), Circuit-Switched Cellular (CSC), Cellular Digital Packet Data (CDPD), RAM mobile data, Global System for Mobile communications (GSM), time division multiple access (TDMA), code division multiple access (CDMA), serial line Internet protocol (SLIP), point to point protocol (PPP), Transmission Control Protocol/Internet Protocol (TCP/IP), Sequenced Packet Exchange and Internetwork Packet Exchange (SPX/FPX) protocols, or any other suitable protocol or combination of protocols may be used.

Application server 170 may run any suitable database engine, such as, for example, Microsoft SQL Server, Oracle 8i, or some other suitable database engine. Application server 170 may maintain a database or databases, suitable to the database engine used, of information regarding users of the system and other third parties, commodities traded, and other aspects of the system, any suitable combination of which may sometimes be referred to herein as "system information." As shown in FIG. 1a, application server 170 may maintain commodity information database 175 and user information database 177. Databases 175 and 177 have been shown as two separate databases. In practice, they may be a singe database or they may each include multiple databases.

Commodity information database 175 may include information regarding commodities traded by the system. Commodity information may be stored using any suitable database design (e.g., flat, relational, object oriented, etc.). Commodity information may include, for example, commodity identifiers, descriptions, units, owners, pending purchase, sale or trade requests, any other suitable information, or any suitable combination thereof. If desired, the system may associate users with various commodities by providing links between database 175 and database 177.

User information database 177 may include information stored in a suitable database design (e.g., flat, relational, object oriented, etc.), regarding users of the system. User information database 177 may include, for example, user names, telephone numbers, addresses, company information, social security numbers, bank account information, credit card account information, any other information suitable to the system for performing system functions, or any suitable combination thereof. User information database 177 may also include information on additional parties, such as brokers and attorneys, that the system may select before initiating transfers. The system may provide users with opportunities to choose additional parties if desired.

Internet server 215 may retrieve system information from or provide system information to application server 170 using any suitable approach. Internet server 215 may, for example, have one or more common gateway interface (CGI) scripts for reading information submitted to Internet server 215 from application server 170 or from Internet enabled access devices 200. One or more processes on Internet server 215 may, for example, generate SQL requests based on the information and provide the requests to application server 170. In another suitable approach, Internet server 215 may invoke remote procedures that reside on application server 170 using one or more remote procedure calls. Application server 170 may execute, for example, SQL statements for such invoked remote procedures. In still another suitable approach, objects executed by Internet server 215 may communicate with objects executed by application server 170 using, for example, an object request broker (ORB). This may involve using, for example, Microsoft's Distributed Component Object Model (DCOM) approach. Any other suitable scheme may be used. FIG. 1a shows Internet server 215 and application server 170 as separate servers. In practice, all or part of the functionality of the two servers may be combined into a single server.

Application server 170 and Internet enabled access devices 200 may be connected to electronic commerce system 140, recordation system 180, and transfer documents system 190 via Internet 210. Alternatively application server 170 may be connected to these systems via a local area network, wide area network, or other link or combination of links (not shown). FIG. 1a shows these systems as being separate from application server 170. In practice the functions of application server 170 and one or more of these systems may be integrated into a single system.

Electronic commerce system 140 may include one or more computers that provide for the electronic debit of funds from user bank or credit card accounts, and may also allow for the electronic deposit of funds to user bank and credit card accounts. Electronic commerce may be accomplished using any suitable approach such as, for example, financial EDI (FEDI), electronic funds transfer (EFT), the Secured Electronic Transaction protocol (SET), the Joint Electronic Payments Initiative (JEPI), or any other suitable approach. In practice, the protocol stack used by the fractional ownership system may include secure protocols suitable to the chosen system implementation, such as, for example, secure HTTP (S-HTTP), secure mime (S/MIME), secure sockets layer (SSL), or any other suitable protocol or protocols.

Transfer documents system 190 may include one or more computers and other devices (e.g., printers, scanners, faxes, etc.) suitable for generating transfer documents and providing for the exchange of such documents. As used herein, transfer documents may include any document, physical or electronic, suitable for effecting a transfer of a commodity between one or more users the system. This may include, for example, physical or electronic offers for sale, sales contracts, options, deeds and other documents of title, broker agreements, attorney retainer agreements, or any other suitable document. Electronic versions of these agreements may be maintained by transfer documents system as suitable files (e.g., PDF files). In one suitable approach, the system may associate various transfer documents with users, brokers or attorneys using a suitable database. When a particular user, broker, or attorney is involved in a transfer, the system may retrieve the electronically stored documents and provide them in printed form or electronically to the parties involved in the transfer.

In one approach, for example, transfer documents system 190 may, after receiving an order to transfer ownership in a commodity from one or more co-owners to another one or more potential co-owners, generate a printed contract of sale and send the contract to, for example, the buyer or buyers for execution. The buyers may sign the contract and send the contract to the seller or sellers for execution. The seller or sellers may sign the contract and send it back to the provider of transfer documents system 190. In practice, the provider of transfer documents system 190 may not be the provider of application server 170. The provider of transfer documents system 190 may scan in the document and electronically store it. After the transfer is complete, transfer documents system 190 may physically or electronically provide the transfer documents to recordation system 180.

As a second example, transfer documents system 190 may provide electronic documents to the buyers and sellers. Buyers and sellers may, for example, access one or more web pages or other electronic documents that provide the buyers and sellers with opportunities to electronically transfer rights in one or more commodities. These web pages may be provided, for example, using a secure protocol such as S-HTTP, SSL, or some other suitable protocol or combination of protocols. Users may electronically sign the web pages using suitable digital signature technology. In an alternative approach, electronic documents may be exchanged as, for example, encrypted files (e.g., using Pretty Good Privacy (PGP)), encrypted e-mails (e.g., using S-MIME), or using any other suitable approach. After a transfer is complete, transfer documents system 190 may physically (e.g., by printing out and mailing) or electronically provide the transfer documents to recordation system 180.

Recordation system 180 may include one or more computers and other devices (e.g., printers, scanners, faxes, etc.) suitable for recording the transfer of title for certain commodities for which recordation of title is required or permitted, such as, for example, for real property, intellectual property (e.g., patents, copyrights, trademarks, etc.) or other types of commodities. Recordation system 180 may be a system at a private entity that maintains databases of title information (e.g., the system provider, a real estate title searcher, etc.), at a governmental office that is responsible for recording chain of title for the commodities (e.g., town clerks' offices, the assignment division of the United States Patent and Trademark Office, etc.), at some other entity, or a combination thereof (in which case there may be multiple recordation systems 180). Application server 170 may, in addition to or instead of recordation system 180, record current owners of commodities or chains of titles by, for example, providing suitable fields in records within commodity information database 175, or links between records within commodity information database 175 and user information database 177.

FIG. 1*b* shows another illustrative arrangement for the fractional ownership system of the present invention. In the client/server arrangement of FIG. 1*b*, personal computers 100 are interconnected via network 150 to application server 173. Network 150 may be any suitable local area network (LAN), wide area network (WAN), or other suitable network. Personal computers, and their interconnection via networks, are well known. If desired, one or more personal computers 100 may be accessed by remote access device 120 to provide remote access to users to the system. Remote access device 120 may be any suitable device, such as a personal computer, personal digital assistant, cellular phone, or other device with remote access capabilities.

Application server 173 may run any suitable database engine, such as, for example, Microsoft SQL Server, Oracle 8*i*, or any other suitable database engine. Application server 173 may maintain commodity information database 175 and user information database 177. Client applications running on personal computers 100 may allow users to enter user and commodity information, trade fractional ownership interests in commodities, and access other system features. The clients may, for example, pass SQL requests as messages to server 173. In another suitable approach, the client applications may invoke remote procedures that reside on server 173 using one or more remote procedure calls. Server 173 may execute SQL statements for such invoked remote procedures. In still another suitable approach, client objects executed by the client applications may communicate with server objects executed by server 173 using, for example, an object request broker (ORB). This may involve using, for example, Microsoft's Distributed Component Object Model (DCOM) approach. Any other suitable client/server based communications scheme may be used.

Electronic commerce system 140, recordation system 180, and transfer documents system 190 may be connected to application server 173 via links 185. Links 185 may be any link suitable for providing communications between application server 173 and electronic commerce system 140, recordation system 180, and transfer documents system 190. Links 185 may be, for example, computer network links, Internet links, telephone links, wireless links, or any other suitable link. In an alternative approach, electronic commerce system 140, recordation system 180, and transfer documents system 190 may be connected to network 150 via links suitable to the chosen network. The functions of application server 173 and one or more of electronic commerce system 140, recordation system 180, and transfer documents system 190 may be combined into a single system if desired.

Figure 2:
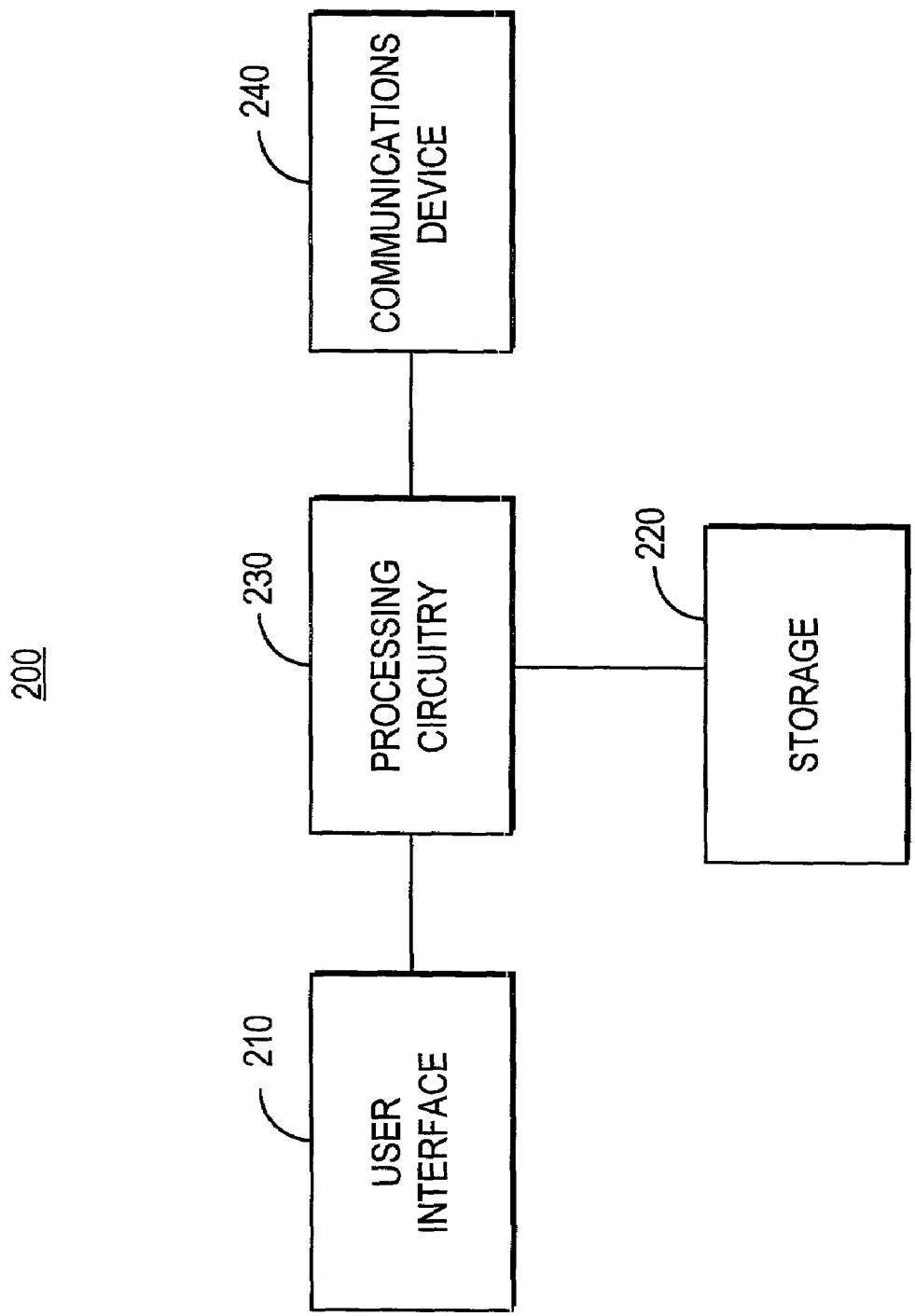
FIG. 2 shows an illustrative arrangement for the Internet enabled access devices of FIG. 1a, in accordance with the present invention.

FIG. 2 shows an illustrative, generalized arrangement for the Internet enabled access devices 200 of FIG. 1*a*. Internet enabled access devices 200 may have, for example, user interface 210, storage 220, processing circuitry 230, and communications device 240. User interface 210 may be any suitable input device, output device, or combination thereof. User interface 210 may include, for example, a pointing device, keyboard, touch-pad, touch screen, pen stylus, voice recognition system, mouse, trackball, cathode ray tube (CRT) monitor, liquid crystal display (LCD), voice synthesis processor and speaker, or any other suitable user input or output device. Processing circuitry 230 may include any suitable processor, such an Intel Pentium® microprocessor, and other suitable circuitry (e.g., input/output (I/O) circuitry, direct memory access (DMA) circuitry, etc.). Storage 220 may be any suitable memory, storage device, or combination thereof, such as RAM, ROM, flash memory, a hard disk drive, etc. Communications device 240 may be any device suitable for supporting communications over links 195. Communications device 240 may include, for example, a modem (e.g., any suitable analog or digital standard, cable, or cellular modem), network interface card (e.g., an Ethernet card, token ring card, etc.), wireless transceiver (e.g., an infrared, radio, or other suitable analog or digital transceiver), or other suitable communications device.

Figure 3:
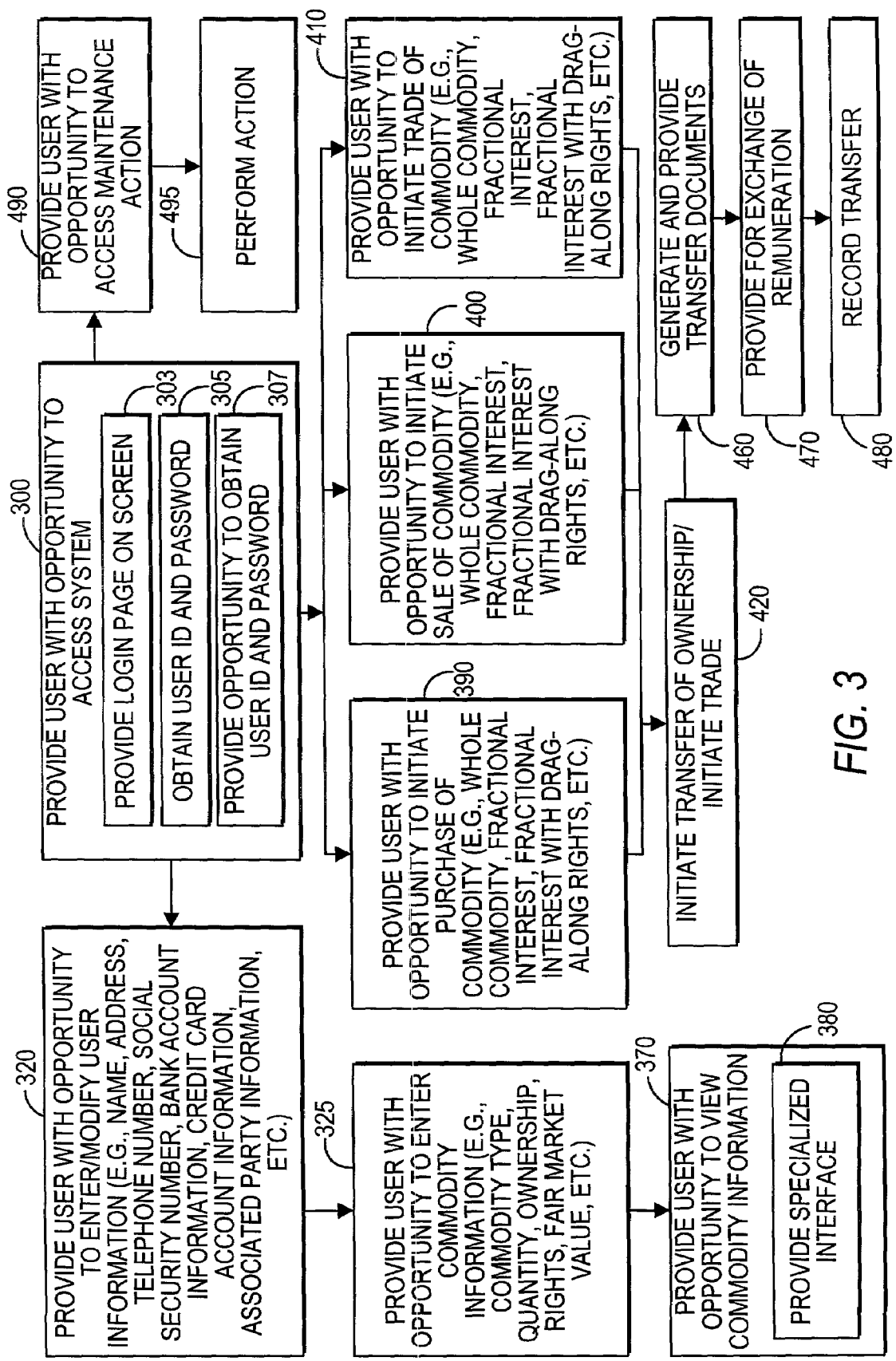
FIG. 3 shows a generalized flowchart of steps involved in operating the electronic fractional ownership control system, in accordance with the present invention.

FIG. 3 is a flowchart of an overview of illustrative steps involved in providing users with access to various features of the fractional ownership control system of the present invention. FIGS. 4–13 show illustrative flowcharts of steps involved in providing more specific aspects of the invention. The steps shown in FIGS. 3–13 may be performed in any suitable order, based on, for example, the features provided by the system and its implementation. If desired, some of the steps may be deleted, and others added.

Some of the steps shown in FIGS. 3–13 involve providing users with opportunities to interact with the system. Such steps may be performed by, for example, a client application that is programmed to generate or download screens suitable to provide such opportunities, by an Internet browser that downloads suitable pages to provide such opportunities, or using any other suitable approach. Other steps may involve additional processing, such as generating requests, matching requests, or other types of processing. In client/server arrangements, such processing may be performed by the client or the server, depending on the chosen system implementation and the degree to which the processing involves querying commodity information database 175 or user information database 177 (FIG. 1*b*). In on-line arrangements, such processing may be performed by Internet enabled access device 200, Internet server 215, or application server 170 (FIG. 1*a*), depending on, for example, the processing and storage capabilities of Internet enabled access device 200, the chosen implementation for the markup language documents used, the degree to which the processing involves querying commodity information database 175 or user information database 177, or other factors. For purpose of clarity, the following discussion will describe the steps shown in FIGS. 3–13 as being performed by "the system," which is intended to include any client/server or on-line arrangement suitable for performing the steps.

As shown in FIG. 3, the system may provide users with opportunities to access the system at step 300. This may involve, for example, providing a user with a login page or screen (step 303), and obtaining a user ID and password from the user (step 305). If the person accessing the system is not a registered user, the system may provide the person with an opportunity to obtain a user ID and password (step 307).

After a user has accessed the system, the system may provide the user with opportunities to access various features of the system. If desired, the system may provide all users with access to all features of the system. Alternatively, the system may provide users with access to one or more subsets of all features, or all of the features, based on the users' rights. User rights may be based on, for example, how much a user has paid to subscribe to the system, how many commodities the user manages, buys, sells, or trades with the system, or any other suitable criteria. The system may, for example, provide new users and existing users with opportunities to enter user information and to modify user information at step 320. User information may include, for example, user names, telephone numbers, addresses, company information, social security numbers, bank account information, credit card account information, and any other information suitable to the system for performing system functions. User information may also include additional parties, such as, for example, brokers and attorneys, that users may associate with their account for various types of transactions (e.g., obtaining financing, transferring real property, etc.).

Figure 4:
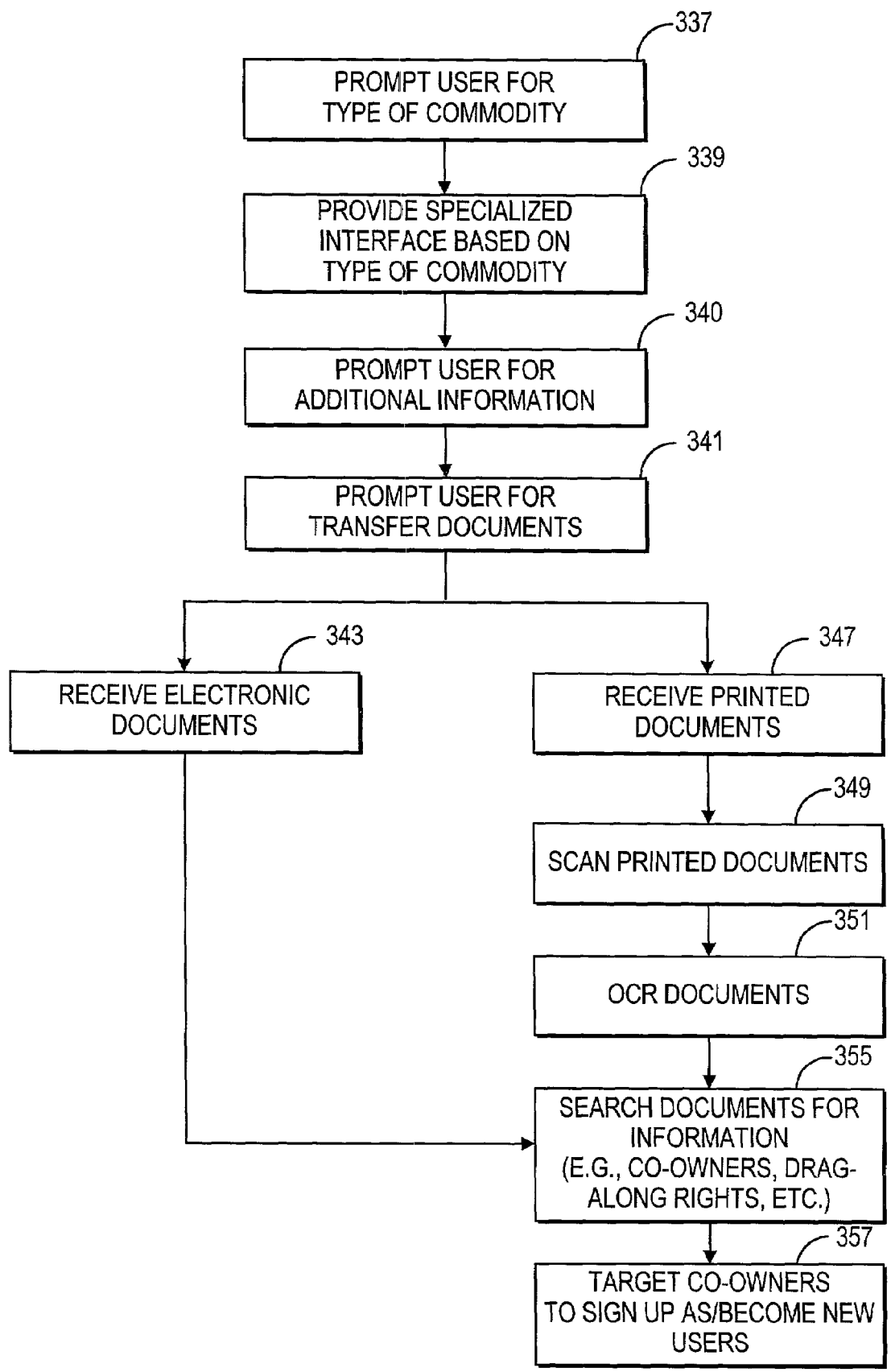
FIG. 4 shows a flowchart of illustrative steps involved in providing users with opportunities to enter commodity information, in accordance with the present invention.

The system may, for example, provide users with opportunities to enter commodity information (step 325). Users may desire to enter commodity information when, for example, users have ownership interests in commodities that the users have obtained without using the system, and wish to manage, sell, or trade using the system. The system may provide users with opportunities to enter, for example, commodity types, descriptions, units, co-owners, and other suitable information. FIG. 4 shows a flowchart of illustrative steps involved in providing users with opportunities to enter commodity information. The system may, for example, prompt a user to enter the type of the commodity for which the user wishes to enter information (step 337). After the user enters the commodity type, the system may provide a specialized interface based on the type of commodity (step 339), and may prompt the user for additional commodity information (step 340).

The system may, for example, prompt users to provide photocopies or electronic copies, of transfer documents used to obtain the commodities (step 341). The system may receive electronic documents at step 343. At step 347, the system may receive paper documents. The system may, for example, scan in paper documents (step 349) and use suitable optical character recognition (OCR) software to obtain an electronically searchable document (step 351). The system may search the documents for information that may be useful to the system at step 355. The system may, for example, search for co-owners' names and other information so that the system may determine whether the co-owners are already users or not. If co-owners are not users, the system may target the co-owners with advertisements for the system in an attempt to register the co-owners (step 357) and allow them to participate in the features of the system. The system may determine, for example, if there are drag-along rights in the commodity. If so, the system may automatically generate a list of co-owners for use when there is a potential transfer in the ownership of the commodity. The system may store electronic documents for chain of title purposes.

Returning to FIG. 3, the system may provide users with opportunities to view commodity information at step 370. This may include, for example, providing a specialized interface based on the commodity for which a user has indicated a desire to view commodity information (step 380). Specialized interfaces may make the system more user friendly and useful to the user because they provide information in a format optimized based on the commodity type for which information is displayed or other factors.

Figure 5:
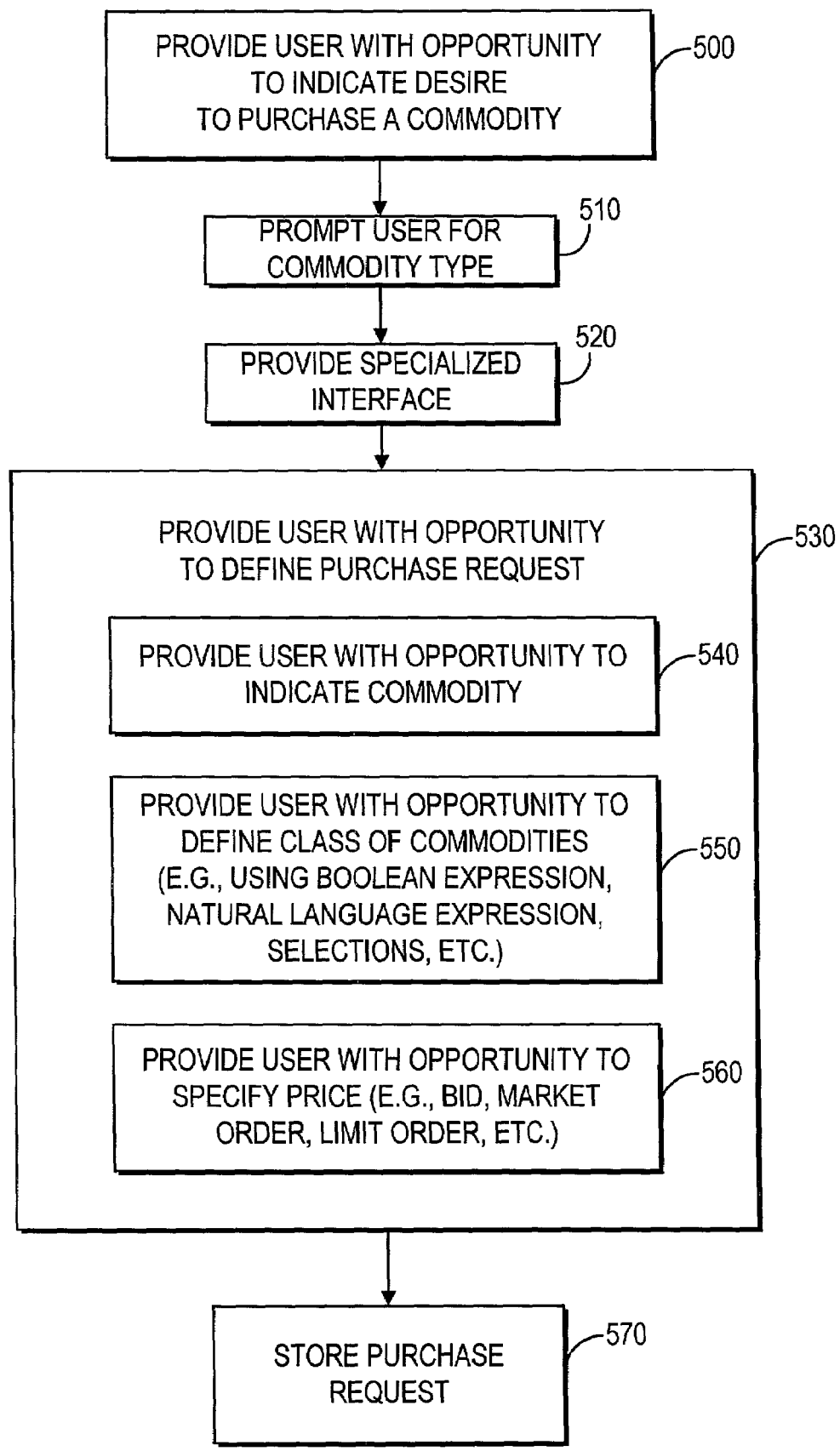
FIGS. 5, 6, and 7 are flowcharts of illustrative steps involved in providing users with opportunities to purchase, sell, and trade commodities, in accordance with the present invention.
Figure 6:
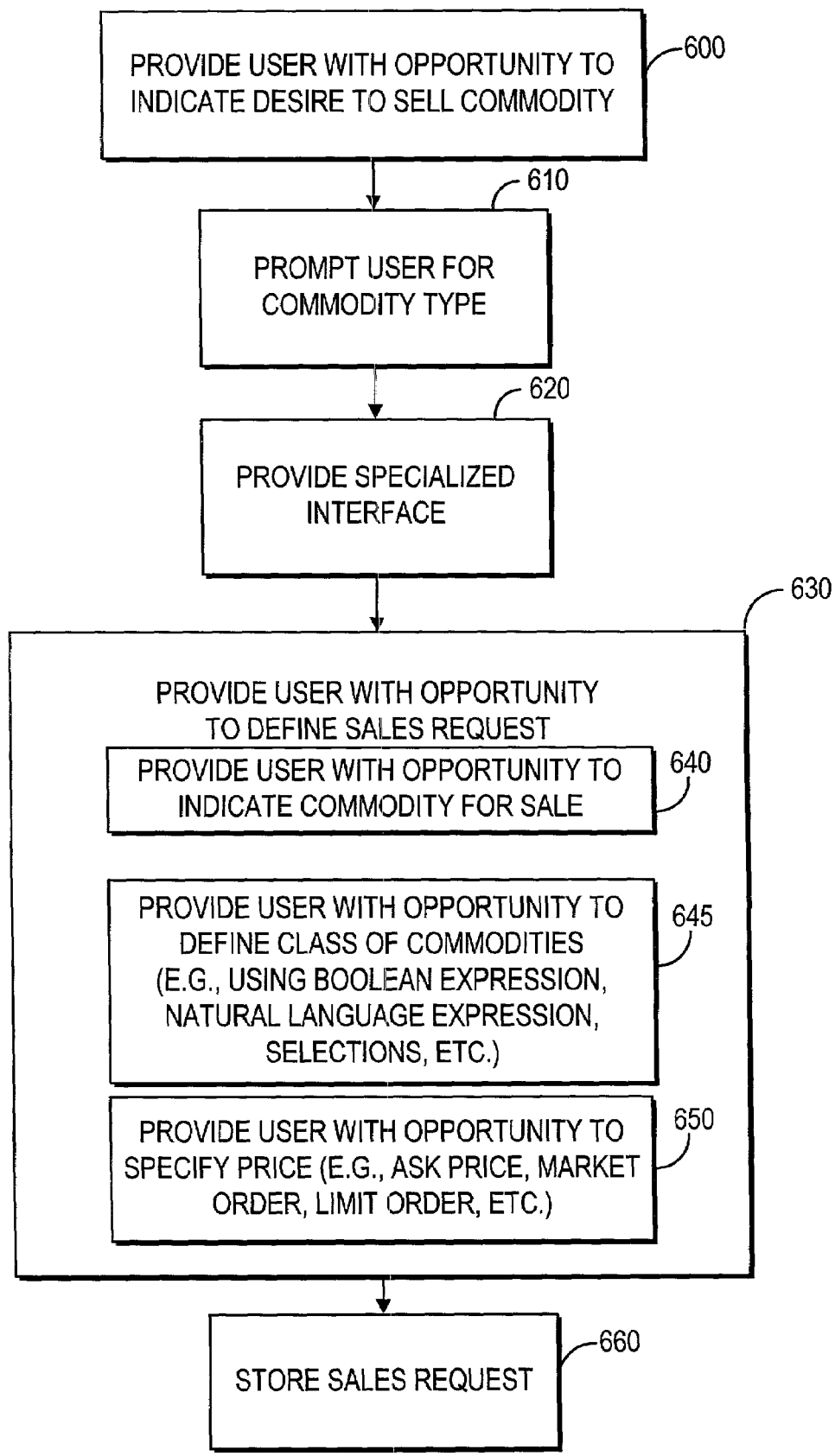
Figure 7:
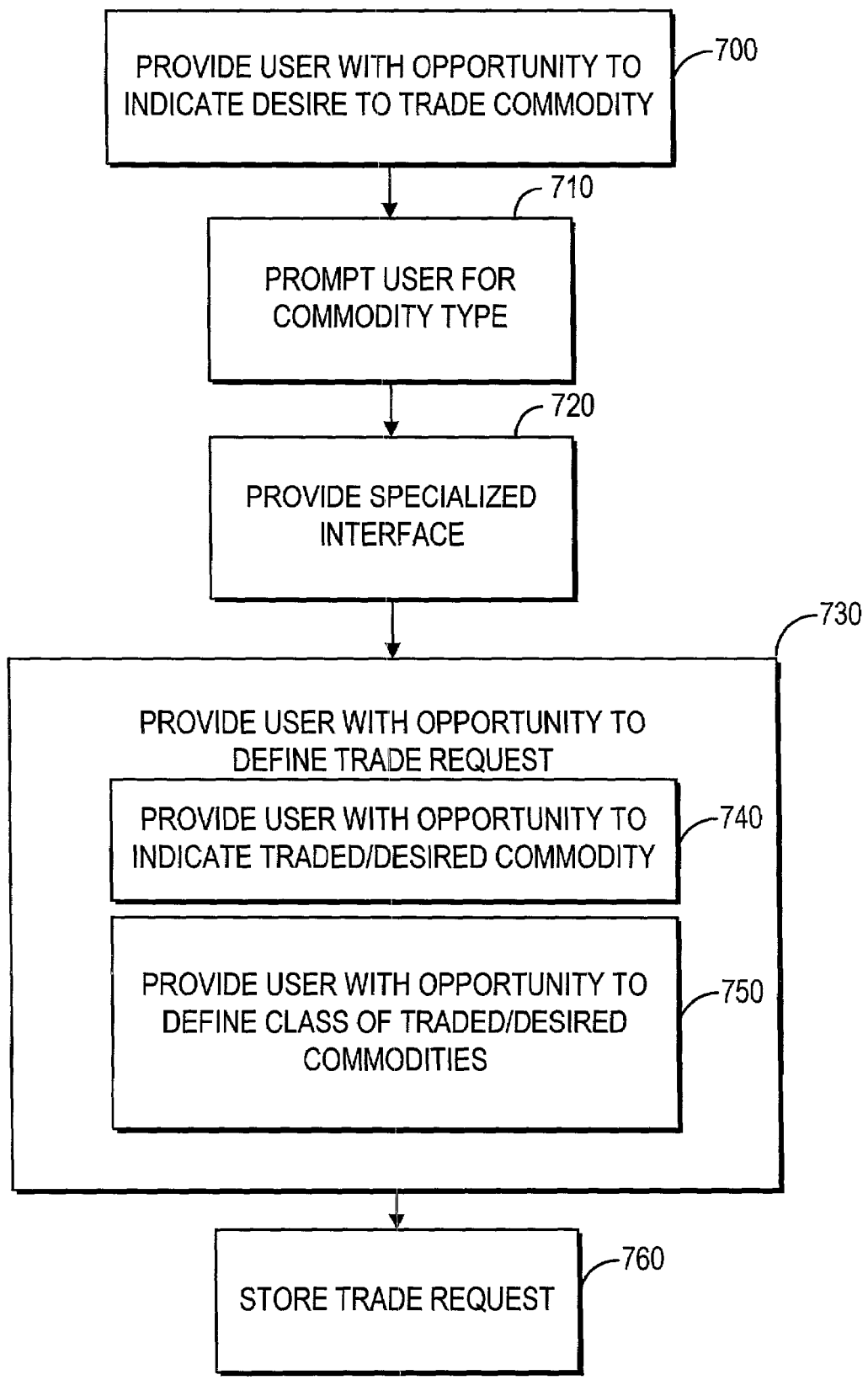

The system may also provide users with opportunities to purchase commodities, sell commodities, and trade commodities, at steps 390, 400, and 410 respectively. FIGS. 5, 6, and 7 are flowcharts of illustrative steps involved in providing users with opportunities to purchase, sell, and trade commodities, respectively. As shown in FIG. 5, the system may provide a user with an opportunity to indicate a desire to purchase a commodity at step 500. The system may provide users with this opportunity and other opportunities shown in FIG. 5, using any suitable user interface. The system may, for example, allow users to select a menu option from a menu, enter text, push a button, select a radio button, link, or other on-screen element, or provide any other suitable user interface. The system may prompt users for a commodity type at step 510. Users may enter commodity types using any suitable interface element. The system may provide a specialized interface based, for example, on the commodity type entered by the user, at step 520.

At step 530, the system may provide users with opportunities to define a purchase request. The system may allow users to define purchase requests using any suitable approach. The system may, for example, provide a user with an opportunity to indicate a particular unique or fungible commodity (e.g., a particular piece of real estate, a particular patent, one or more shares of stock, one or more barrels of oil, etc.) at step 540. The system may, for example, provide one or more drop-down lists, menus, searchable lists, check boxes, radio buttons, text fields, a combination of these elements, or any other suitable interface element or combination of elements, to provide this opportunity.

The system may provide a user with an opportunity to define a purchase request by, for example, defining a class of commodities (step 550). The class of commodities may be of the type provided to the system by the user at step 510. The system may provide the user with an opportunity to define a class of commodities by, for example, selecting a class from a list of classes, defining a boolean or natural language expression, or using any other suitable approach. The system may, for example, provide one or more drop-down lists, menus, searchable lists, check boxes, radio buttons, text fields, a combination of these elements, or any other suitable interface element or combination of elements, to provide this opportunity.

The system may provide a user with an opportunity to specify a price within the purchase request (step 560). The price may be, for example, a bid price, market order, limit order, or any other suitable type of price. The system may, for example, provide one or more drop-down lists, menus, searchable lists, check boxes, radio buttons, text fields, a combination of these elements, or any other suitable interface element or combination of elements, to provide this opportunity.

The system may store purchase requests at step 570. Purchase requests may be stored, for example, in commodity information database 175, user information database 177, in a separate database dedicated to storing purchase requests, using any suitable combination thereof, or using any other suitable approach.

FIG. 6 shows illustrative steps involved in providing users with opportunities to sell commodities (step 400 of FIG. 3). The system may provide a user with an opportunity to indicate a desire to sell one or more commodities at step 600. The system may provide users with this opportunity and other opportunities shown in FIG. 6, using any suitable user interface. The system may, for example, allow users to select a menu option from a menu, enter text, push a button, select a radio button, link, or other on-screen element, or provide any other suitable user interface element.

The system may prompt the user for a commodity type at step 610. This may be performed by providing one or more drop-down lists, menus, searchable lists, check boxes, radio buttons, text fields, a combination of these elements, or any other suitable interface element or combination of elements. In response to a user indicating a commodity type, the system may provide a specialized interface based on, for example, the type of the commodity (step 620).

The system may provide a user with an opportunity to define one or more sales requests at step 630. This may include, for example, providing a user with an opportunity to indicate one or more commodities that the user wishes to sell (step 640). The system may display the commodities that the user owns using any suitable approach. The system may, for example, display all of the commodities the user owns, sorted in any suitable order (e.g., alphabetically, by type, by purchase date, or any other suitable order), and allow the user to select or otherwise indicate a commodity or commodities that the user wishes to sell. The commodities displayed may be only those commodities of the type indicate by the user at step 610 if desired. The system may provide users with opportunities to define classes of commodities using boolean or natural language expressions.

Step 630 may also include providing a user with an opportunity to specify a price at which the user wishes to sell a commodity or commodities (step 640). The price may be, for example, an ask price, market order, limit order, or any other suitable type of price. The system may, for example, provide one or more drop-down lists, menus, searchable lists, check boxes, radio buttons, text fields, a combination of these elements, or any other suitable interface element or combination of elements, to provide this opportunity. The system may store sales requests that indicate commodities that users wish to sell, their quantities, prices, or any other suitable commodity information (step 650). Sale requests may be stored, for example, in commodity information database 175, user information database 177, in a separate database dedicated to storing purchase requests, any suitable combination thereof, or using any other suitable approach.

FIG. 7 shows illustrative steps involved in providing users with opportunities to trade commodities (step 410 of FIG. 3). The system may provide users with opportunities to indicate a desire to trade one or more commodities at step 700. The system may provide users with this opportunity and other opportunities shown in FIG. 7, using any suitable user interface. The system may, for example, allow users to select a menu option from a menu, enter text, click a button, select a radio button, link, or other on-screen element, or provide any other suitable user interface. The system may prompt users for a commodity type at step 710. Users may enter commodity types using any suitable interface element. The system may provide a specialized interface based, for example, on the commodity type entered by the user, at step 720. In practice, it may be desirable to omit steps 710 and 720 when, for example, the user wishes to trade one type of commodity for a different type of commodity.

At step 730, the system may provide users with opportunities to define trade requests. The system may allow users to define trade requests using any suitable approach. Users define trade requests by, for example, indicating a commodity or commodities that the user fractionally or wholly owns and that a user wishes to trade (i.e., traded commodities). The user may also indicate a commodity or commodities that the user wishes to trade for (i.e., desired commodities). The system may, for example, provide a user with an opportunity to indicate a particular unique or fungible commodity (e.g., a particular piece of real estate, a particular patent, one or more shares of stock, one or more barrels of oil, etc.) that the user owns or desires at step 740. The system may, for example, provide one or more drop-down lists, menus, searchable lists, check boxes, radio buttons, text fields, a combination of these elements, or any other suitable interface element or combination of elements to provide this opportunity.

The system may provide a user with an opportunity to define a trade request by, for example, defining classes of to-be-traded commodities that the user owns, classes of desired commodities that the user wishes to trade for, or both, at step 750. Classes of to-be-traded or desired commodities may be limited to the commodity type provided to the system by the user at step 710. The system may provide the user with an opportunity to define a class of commodities by, for example, selecting a class from a list of classes, defining a boolean or natural language expression, or using any other suitable approach. The system may, for example, provide one or more drop-down lists, menus, searchable lists, check boxes, radio buttons, text fields, a combination of these elements, or any other suitable interface element or combination of elements, to provide this opportunity.

The system may store trade requests that indicate to-be-traded and desired commodities at step 760. Trade requests may be stored, for example, in commodity information database 175, user information database 177, in a separate database dedicated to storing purchase requests, any suitable combination thereof, or using any other suitable approach.

Figure 8:
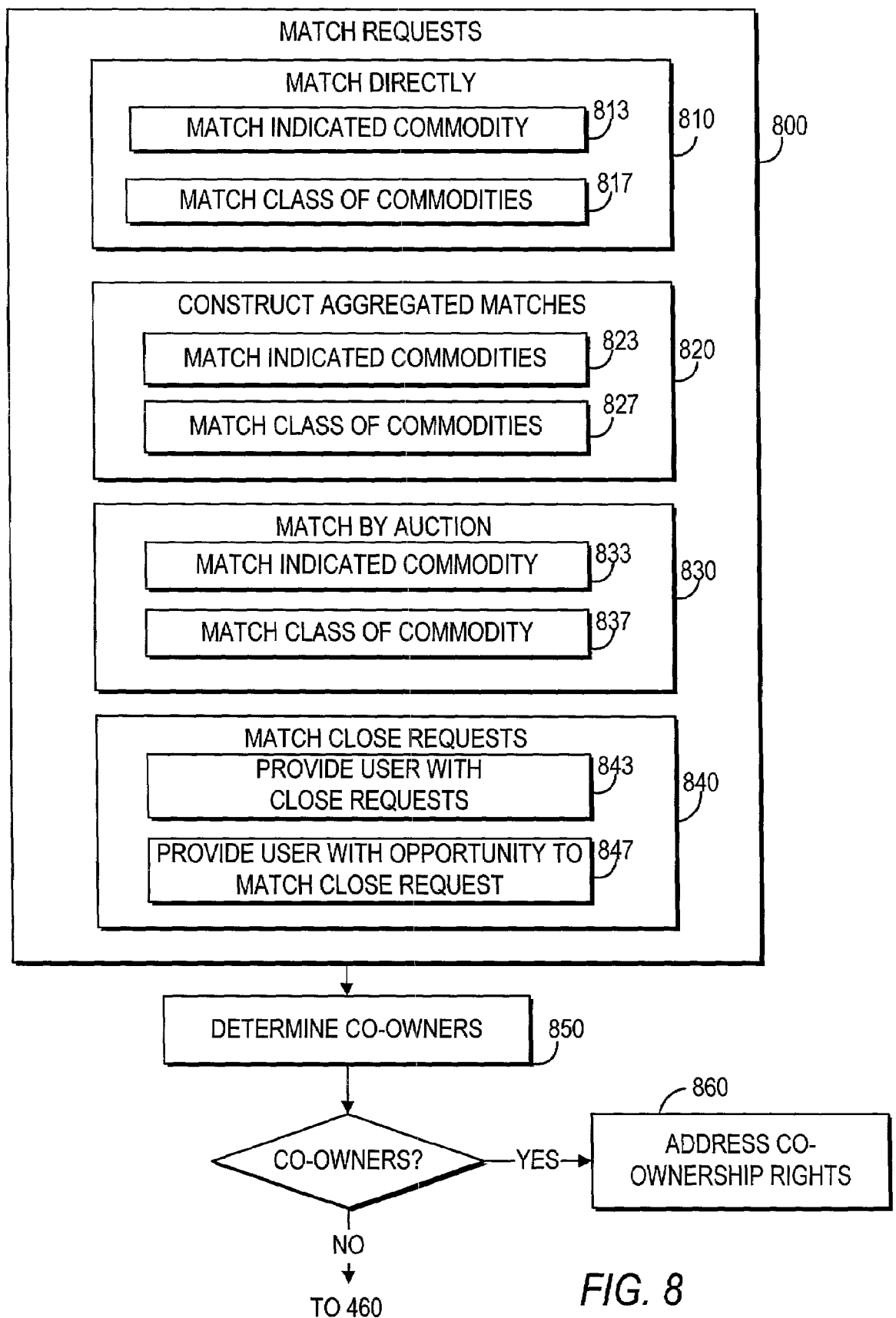
FIG. 8 is a flowchart of illustrative steps involved in initiating the transfer of ownership of commodities, in accordance with the present invention.

The system may initiate the transfer of ownership of commodities, or the trade of commodities (step 420 of FIG. 3). An illustrative flowchart of steps involved in initiating the transfer of ownership in or trade of commodities is shown in FIG. 8. At step 800, the system may attempt to match one or more purchase, sale, or trade requests. The system may search for direct matches (step 810), construct aggregated matches (step 820), match by auction (step 830), or provide users with opportunities to match close requests (step 840).

The system may attempt to match requests directly (step 810) using any suitable approach. The system may attempt to match orders when, for example, orders are placed (i.e., defined by users and stored by the system), at a predefined time each day, periodically, after a predefined number of orders have been placed (i.e., defined by users and stored by the system), or with any other suitable frequency. A combination of these approaches may also be used. Matches may be performed for identified commodities (i.e., commodities identified at steps 540, 640, and 740 of FIGS. 5, 6, and 7, respectively) at step 813, or for classes of commodities (i.e., classes defined at steps 550, 650, and 750 of FIGS. 5, 6, and 7, respectively) at step 817. The system may find matches using any database query method suitable for the database in which the requests are stored (e.g., commodity information database 175, user information database 177, a combination thereof, or any other suitable database). When no direct matches are immediately found, the system may wait a user-defined or system-defined period of time (e.g., thirty days) until attempting to match the request again.

The system may also match requests by aggregating purchase requests, sale requests, or trade requests (step 820). The system may, for example, search a database (e.g., commodity information database 175, user information database 177, a combination thereof, or any other suitable database) for one or more requests for a particular commodity type and quantity (if applicable). The system may then aggregate the found requests to satisfy the original request that prompted the system to perform the search. The system may aggregate enough sales requests, for example, to fill one purchase request. The system may, for example, aggregate each of a number of units into a block commodity. The owners of each unit may retain their exclusive ownership over each unit and match all of the units to a single or aggregated purchase request. In another approach, the system may convert each user's interest in each unit into a fractional ownership in an entire block, and match the block to a single or aggregated purchase request. The system may aggregate requests on a by-time basis (i.e., on a first-come-first-serve basis).

The system may aggregate enough purchase requests to fulfill one or more sales requests. The system may also aggregate both sales requests and purchase requests to transfer ownership in one or more commodities. Matches may be performed for identified commodities (i.e., commodities identified at steps 540, 640, and 740 of FIGS. 5, 6, and 7, respectively) at step 823, or for classes of commodities (i.e., classes defined at steps 550, 650, and 750 of FIGS. 5, 6, and 7, respectively) at step 827. The system may find matches using any database query method suitable for the database in which the requests are stored (e.g., commodity information database 175 of FIGS. 1*a* and 1*b*).

Figure 9:
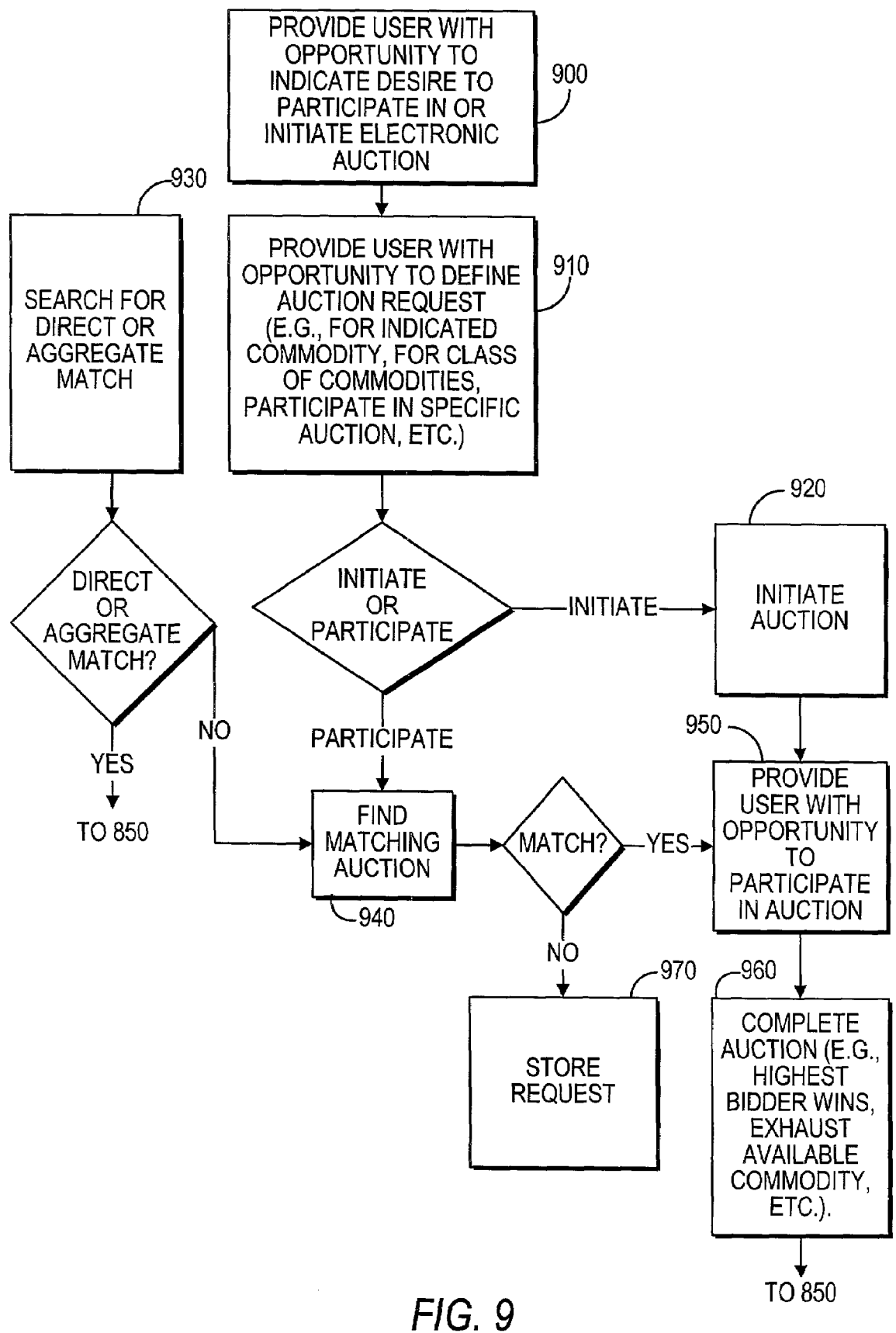
FIG. 9 is a flowchart of illustrative steps involved in providing users with opportunities to participate in or initiate auctions for identified commodities or classes of commodities, in accordance with the present invention.

The system may also match purchase and sales requests by providing users with opportunities to initiate or participate in auctions for commodities (step 830). The system may provide users with opportunities to participate in or initiate auctions for identified commodities (i.e., commodities identified at steps 540, 640, and 740 of FIGS. 5, 6, and 7, respectively) at step 833, or for classes of commodities (i.e., classes defined at steps 550, 650, and 750 of FIGS. 5, 6, and 7, respectively) at step 837. Turning from FIG. 8 to FIG. 9, FIG. 9 shows a flowchart of illustrative steps involved in providing users with opportunities to participate in or initiate auctions for identified commodities or classes of commodities (i.e., steps 833 and 837 of FIG. 8). Some of the steps shown in FIG. 9 may also be performed in connection with, for example, providing users with opportunities to directly participate in or initiate electronic auctions in general, or, to automatically participate in auctions when the system does not find matches for pending purchase or sale requests.

The system may provide a user with an opportunity to indicate a desire to participate in an electronic auction, or to initiate an electronic auction, at step 900. In response to a user indicating a desire to participate in an auction or to initiate an auction, the system may provide the user with an opportunity to define an auction request (step 910). The system may provide the user with an opportunity to, for example, indicate a particular unique or fungible commodity (e.g., a particular piece of real estate, a particular patent, one or more shares of stock, one or more barrels of oil, etc.) that the user owns or desires. The system may, for example, provide one or more drop-down lists, menus, searchable lists, check boxes, radio buttons, text fields, a combination of these elements, or any other suitable interface element or combination of elements to provide this opportunity.

The system may provide a user with an opportunity to define an auction request by, for example, defining classes of commodities that the user owns and wishes to auction, defining classes of desired commodities that the user wishes to auction for, or both. The system may provide the user with an opportunity to define a class of commodities by, for example, selecting a class from a list of classes, defining a boolean or natural language expression, or using any other suitable approach. The system may, for example, provide one or more drop-down lists, menus, searchable lists, check boxes, radio buttons, text fields, a combination of these elements, or any other suitable interface element or combination of elements, to provide this opportunity.

In response to the user having indicated a desire to participate in an auction at step 900, the system may attempt to find a matching auction at step 940. The system may attempt to find a matching auction by, for example, searching a suitable database (e.g., commodity information database 175, user information database 177, a combination thereof, some other database which may be dedicated to storing requests, etc.) for pending or active auctions. If there is a matching auction, the system may provide the user with an opportunity to participate in the auction (e.g., accept bids, make counter offers, make bids) at step 950. If there is no matching auction, the system may store the auction request until there is a matching purchase, sale, or auction request.

In response to a user having indicated a desire to initiate an auction at step 900, the system may initiate an auction at step 920. The system may initiate an auction by, for example, searching a suitable database (e.g., commodity information database 175 or user information database 177, a combination thereof, some other database which may be dedicated to storing requests, etc.) for unmatched purchase or sale requests that match the auction request. The system may provide the user with an opportunity to participate in the auction (e.g., accept bids, make counter offers, make bids) at step 950.

The system may provide a buyer with an opportunity to participate in the auction by, for example, allowing a buyer to indicate a price that the buyer is willing to pay for a particular type of fungible commodity or class of commodities (e.g., the buyer may indicate that he or she is willing to pay $100.00 for grain) (step 950). Sellers may respond by bidding an amount of the requested commodity at the indicated price (e.g., 50 bushels for $100.00). The system may complete the auction (step 960) and initiate the transfer of ownership in a commodity from a seller to the buyer when, for example, the seller offers the most amount of the commodity at the indicated price (e.g., 125 bushels for $100.00).

The system may also provide sellers with opportunities to participate in auctions at step 950. Sellers may auction commodities using any suitable open or closed auction approach. Seller based auctions may include, for example, English and Dutch style auctions, or any other suitable auction. In English style auctions, the system may start with a minimum bid and provide buyers with opportunities to bid higher and higher amounts until the highest bid is reached. In Dutch style auctions, the system may start with an asking price. As users purchase one or more commodities or units in a block commodity, the system may keep lowering the asking price until all of the available commodities or units are sold.

The system may provide users with opportunities to participate in or initiate auctions when, for example, there are no matches for the users' pending purchase or sale requests. The system may, for example, search for direct matches, or aggregate matches, at steps 810 and 820 of FIG. 8, collectively represented in FIG. 9 as step 930. When the system finds no direct or aggregated matches for a particular request, the system may attempt to find a matching auction at step 940. When a matching auction is found, the system may provide the user with an opportunity to participate in the auction at step 950. When a matching auction is not found, the system may store the original purchase or sales request at step 970 until there is a match. In another suitable approach, the system may attempt to continue trying to find a direct or aggregate match for a user-defined or system-defined period of time (e.g., six months) before initiating an auction.

Returning to FIG. 8, the system may also match requests by providing users with opportunity to match close requests. The system may, for example, find one or more requests that approximately match an original request (i.e., the request that prompted the system to perform the searches at steps 810 or 820) in commodity type, quantity, price, or any suitable combination thereof, within a predefined threshold. The predefined threshold may be designated by the system, or the system may provide users with opportunities to enter user preferences or rules (e.g., boolean or natural language expressions) that indicate suitable thresholds for close matches. The system may provide a user with close requests, and provide the user with an opportunity to match the original request to a close request. This opportunity may be provided using any suitable approach. The system may provide the user with an opportunity to select a close request, or indicate a desire to conform an original request to a close request, using push buttons, radio buttons, drop-down menus, text fields, or any other suitable user interface element.

The system may determine whether there are co-owners of a purchased, sold, or traded commodity at step 850. Step 850 may be performed by the system at any suitable time during the initiation of the transfer of ownership of a commodity (i.e., step 420 of FIG. 3). When the system provides a sale, for example, the commodity or class of commodities that is the subject of the sale may be indicated by the user as part of a sales request or similar auction request. The system may determine whether there are any co-owners associated with the commodity before matching the sales request with a purchase request. When the system provides a purchase, the commodity or class of commodities that is the subject of the purchase may not be indicated until the purchase request is matched. Co-owners may not be determined until a match has occurred.

The system may determine whether there are co-owners associated with a commodity using any suitable approach. The system may, for example, reference pointers to owners associated with a commodity (e.g., links to records in user information database 177 of FIGS. 1*a* and 1*b*) from commodity records in commodity information database 175 (FIGS. 1*a* and 1*b*). In another approach, the system may search user information database 177 for owners associated with the commodity (e.g., by links to commodity information database, commodity identifiers, etc.). A combination of these approaches or any other suitable approach may be used. When a commodity is co-owned, or will be co-owned, the system may address the co-owners' rights at step 860. When the commodity is wholly owned before and after the purchase or sale, the system may proceed to perform additional functions related to the transfer of ownership in the commodity (e.g., steps 460–480 of FIG. 3).

Figure 10:
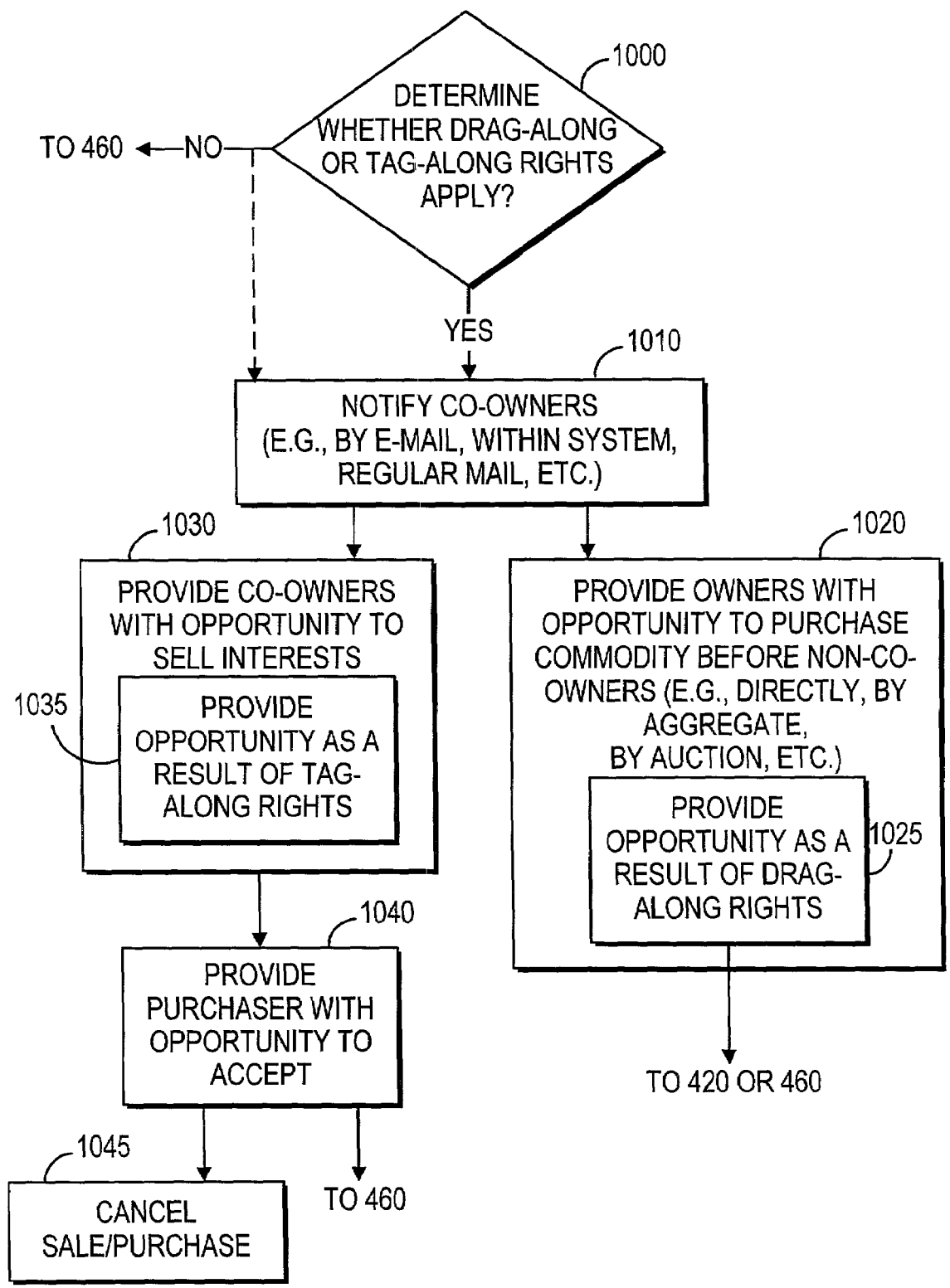
FIG. 10 is a flowchart of illustrative steps involved in addressing co-ownership rights in the contexts of purchases, sales and trades, in accordance with the present invention.

FIG. 10 shows a flowchart of illustrative steps involved in addressing co-ownership rights in the contexts of purchases, sales, and trades. In particular, the system may address drag-along or tag-along rights that have been associated with a commodity that was fractionally owned prior to a purchase, sale, or trade, or that will be fractionally owned after a purchase, sale, or trade. The system may determine whether drag-along or tag-along rights apply to a commodity at step 1000. When drag-along or tag-along rights apply, the system may notify other co-owners of the commodity that is being purchased or sold (step 1010). The system may notify other co-owners when, for example, a purchase or sale request is defined, when a purchase or sale request is matched (i.e., directly, by aggregation, by auction, matched to a trade request, etc.), or at any other suitable time. The system may notify co-owners using any suitable approach. The system may, for example, send user and non-user co-owners e-mails, provide messages from within system display screens or web pages to user owners, provide web pages to non-user co-owners, print out letters that are mailed to the co-owners, or use any other suitable approach to notify user and non-user co-owners. In the illustrative steps of FIG. 10, the system may not notify co-owners of commodities for which there are no associated drag-along or tag-along rights as indicated by the solid line from step 1000 to step 460. If desired, the system may notify such co-owners to provide them with opportunities to participate in a purchase or sale (e.g., by auction), as indicated by the dotted line to step 1010.

The system may notify other co-owners of any suitable commodity or user information such as, for example, sale request information, the seller's liquidity rights (if any), co-owners' rights, or any suitable combination thereof. When, for example, a co-owner has periodic drag-along rights, the system may notify the users of whether the sale request is in accordance with those rights. The system may, if applicable, notify co-owners of their tag-along rights, if any, along with any other suitable information (e.g., purchase request information).

The system may also provide co-owners with an opportunity to purchase the commodity directly by aggregation, by auction, or using any other suitable approach. The system may provide co-owners with purchase opportunities prior to providing third parties with opportunities to purchase the commodity or the seller's interest in the commodity. If no single co-owner or group of co-owners wishes or wish to purchase the commodity, the system may: (1) attempt to match the seller's request with a purchase request if the system notified the other co-owners of a sale prior to a match, or (2) continuing with the transfer of ownership if a match has already occurred.

The system may provide non-user co-owners with opportunities to purchase the commodity using any suitable approach. The system may, for example, allow non-users to participate, and provide information to non-users, via e-mail, an accessible web page, telephone, facsimile, mail, or using any other suitable approach. When non-users participate by mail or fax, a system operator may enter the non-user's bid or lack of a bid into the system.

The system may provide co-owners with opportunities to sell their co-ownership interests at step 1030. This may be as a result of the co-owners having tag-along rights (step 1035). The system may provide non-user co-owners with opportunities to sell their co-ownership interests using any suitable approach. The system may, for example, allow non-users to participate, and provide information to non-users, via e-mail, an accessible web page, telephone, facsimile, mail, or using any other suitable approach. When non-users participate by mail or fax, a system operator may enter the non-user's bid or lack of a bid into the system.

When one or more co-owners indicate a desire to exercise their rights, the system may provide a prospective purchaser (if a match has already occurred) with an opportunity to accept the purchase of those interests at step 1040. When the user refuses to purchase the additional co-ownership interests, the system may cancel the sale or purchase (depending on whether the co-owner issued a sales request or the purchaser issued a purchase request, respectively) at step 1045. If the purchaser indicated a desire to purchase the co-ownership interests, the system may continue the transfer and generate appropriate transfer documents (e.g., step 460 of FIG. 3).

Figure 11:
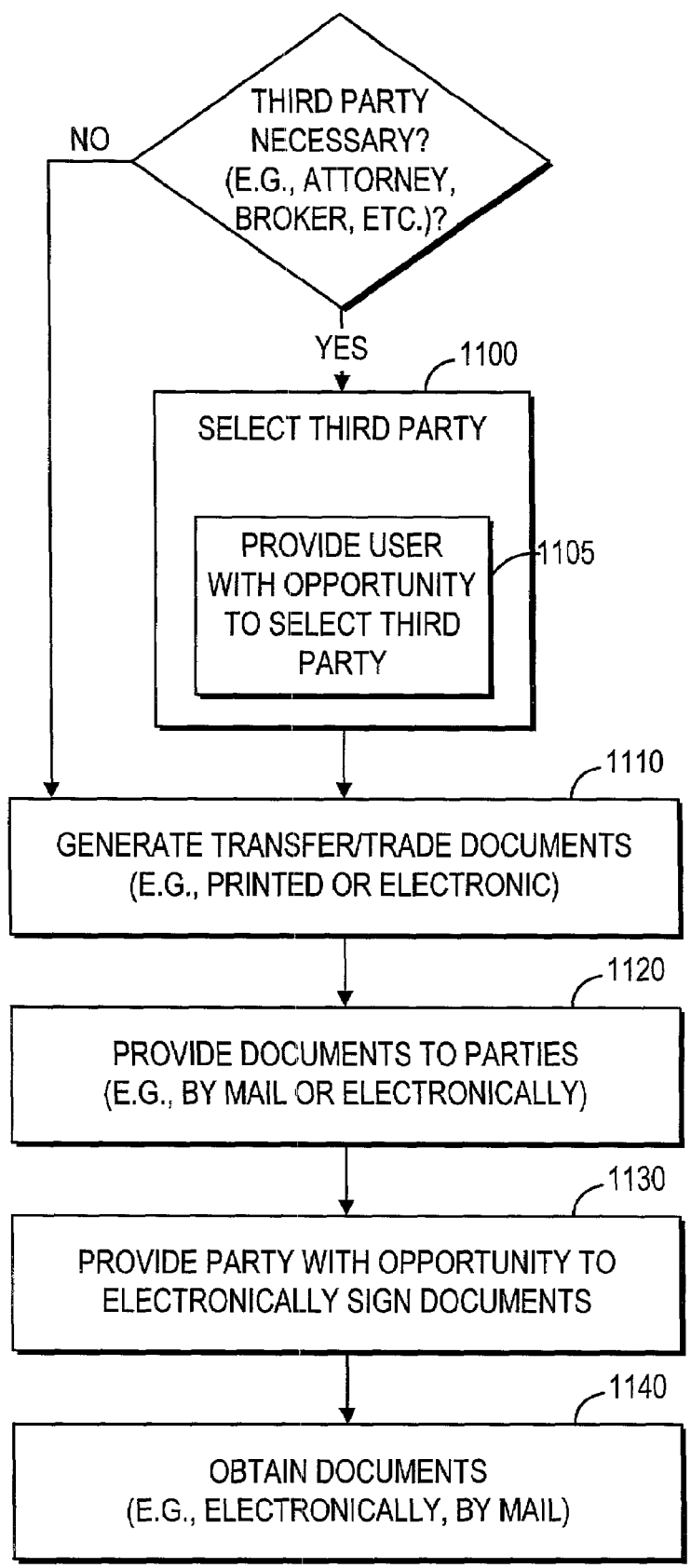
FIG. 11 is a flowchart of illustrative steps involved in generating and providing transfer and other documents, in accordance with the present invention.

Once the system has initiated the transfer of ownership as described herein, the system may generate and provide transfer documents at step 460 of FIG. 3. FIG. 11 is a flowchart of illustrative steps involved in generating and providing transfer and other documents. The system may determine whether a third party, such as a real estate broker, attorney, or mortgage broker, is required for a transfer, such as for transfers of real property. The system may select a third party (step 1100) either automatically, or by providing a user with an opportunity to select the third party (step 1105).

At step 1110, the system may generate any transfer documents and necessary retainer or other agreements. Transfer documents may include, for example, physical or electronic offers for sale, sales contracts, options, deeds and other documents of title, broker agreements, attorney retainer agreements, or any other suitable document. Transfer documents may also include, for example, trade documents and rental agreements that provide the right to use a commodity without transferring title. Electronic versions of these agreements may be maintained by the system as suitable files (e.g., PDF files). In one suitable approach, the system may associate various transfer documents with users, brokers, or attorneys using a suitable database. When a particular user, broker, or attorney is involved in a transfer, the system may retrieve the electronically stored documents and provide them in printed form or electronically to the parties involved in the transfer for signature (step 1120). Users and non-user co-owners may read electronic documents in their electronic format or may print the documents out.

The system may provide documents electronically using any suitable approach. The system may, for example, e-mail documents to users and nonuser co-owners. In another suitable approach, the system may provide parties with e-mails containing links (e.g., hyperlinks) that users may select to launch suitable software (e.g., a web browser) to access the documents. In still another suitable approach, the system may allow users to browse transfer documents while in the system. When documents are provided electronically, the system may provide parties with an opportunity to electronically sign the documents using any suitable electronic signatures technology (step 1130). The system may, for example, provide documents to parties via e-mail so that the users can sign the documents electronically from their access devices or computers. Any other suitable approach or combination of approaches may be used. Users and non-user co-owners may also, for example, print out electronic documents and sign the printout. The system may obtain documents at step 1140. This may include, for example, receiving electronically signed electronic documents. This may also include, for example, receiving physical documents and converting them to an electronic format.

Returning to FIG. 3, the system may provide for the electronic exchange or transfer of remuneration for commodities sold or purchased (step 470). The system may remunerate non-participating co-owners for their interests first. Funds may be transferred between buyers' and sellers' accounts, between an owner and renter's accounts, or between traders' accounts. The system may also provide for the electronic payment of brokers' and attorneys' fees. Electronic commerce may be accomplished using any suitable approach such as, for example, financial EDI (FEDI), electronic funds transfer (EFT), the Secured Electronic Transaction protocol (SET), the Joint Electronic Payments Initiative (JEPI), or any other suitable approach.

The system may record the transfer of title in commodities at step 480. The system, via a suitable communications network, may record the transfer at a private entity who maintains databases of title information (e.g., the system provider, a real estate title searcher, etc.), at a governmental office that is responsible for recording chain of title for the commodities (e.g., town clerks' offices, the assignment division of the United States Patent and Trademark Office, etc.), at some other entity, or a combination thereof. The system may also record the transfer by, for example, providing suitable fields in records within commodity information database 175, or links between records within commodity information database 175 and user information database 177 (FIGS. 1*a* and 1*b*), to indicate the transfer. If the new or previous owner or owners were not users of the system, the system may attempt to target them with advertisements to entice them to become a user.

Figure 12:
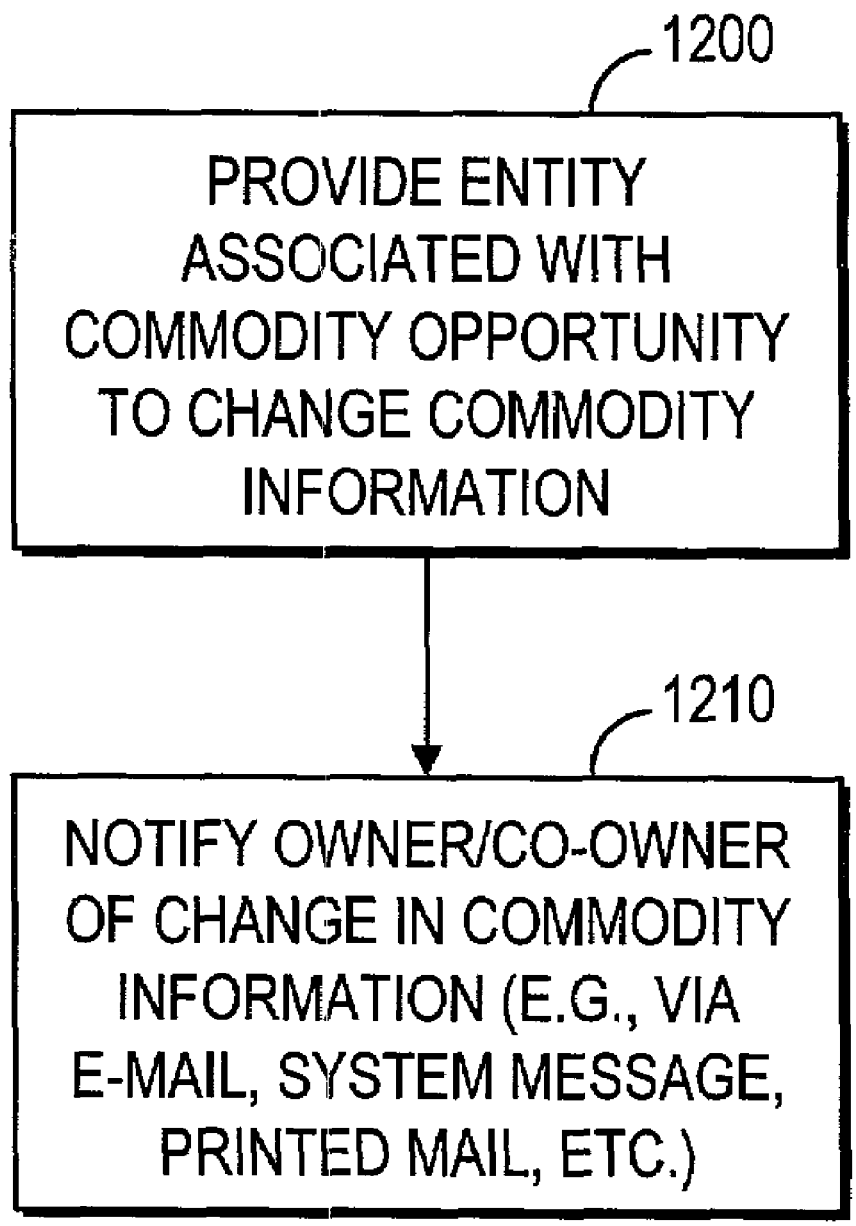
FIG. 12 is a flowchart of illustrative steps involved in providing users with notification of changes in co-ownership information, in accordance with the present invention.

FIG. 12 is a flowchart of illustrative steps involved in providing owners and co-owners with information regarding changes in commodity information. Changes in commodity information may include, for example, changes in maintenance schedules, changes in maintenance fees, changes in conditions of membership in an ownership network, changes in liquidity, or any other information regarding changes in commodity information. An entity associated with a commodity may, for example, determine that these or other changes are necessary or desirable. The entity, such as a management corporation, maintenance corporation, co-owner, or any other interested entity, may be a user of the system. The system may provide such an entity with an opportunity to change commodity information at step 1200. The system may notify the owner or co-owners of a commodity (which may include non-user co-owners) of the change in information using any suitable approach (step 1210). The system may, for example, send owners and co-owners e-mails or regular mail (i.e., by printing out a message that is mailed by the system provided or other entity). The system may also provide messages within display screens or web pages. Any other suitable approach may be used.

Figure 13:
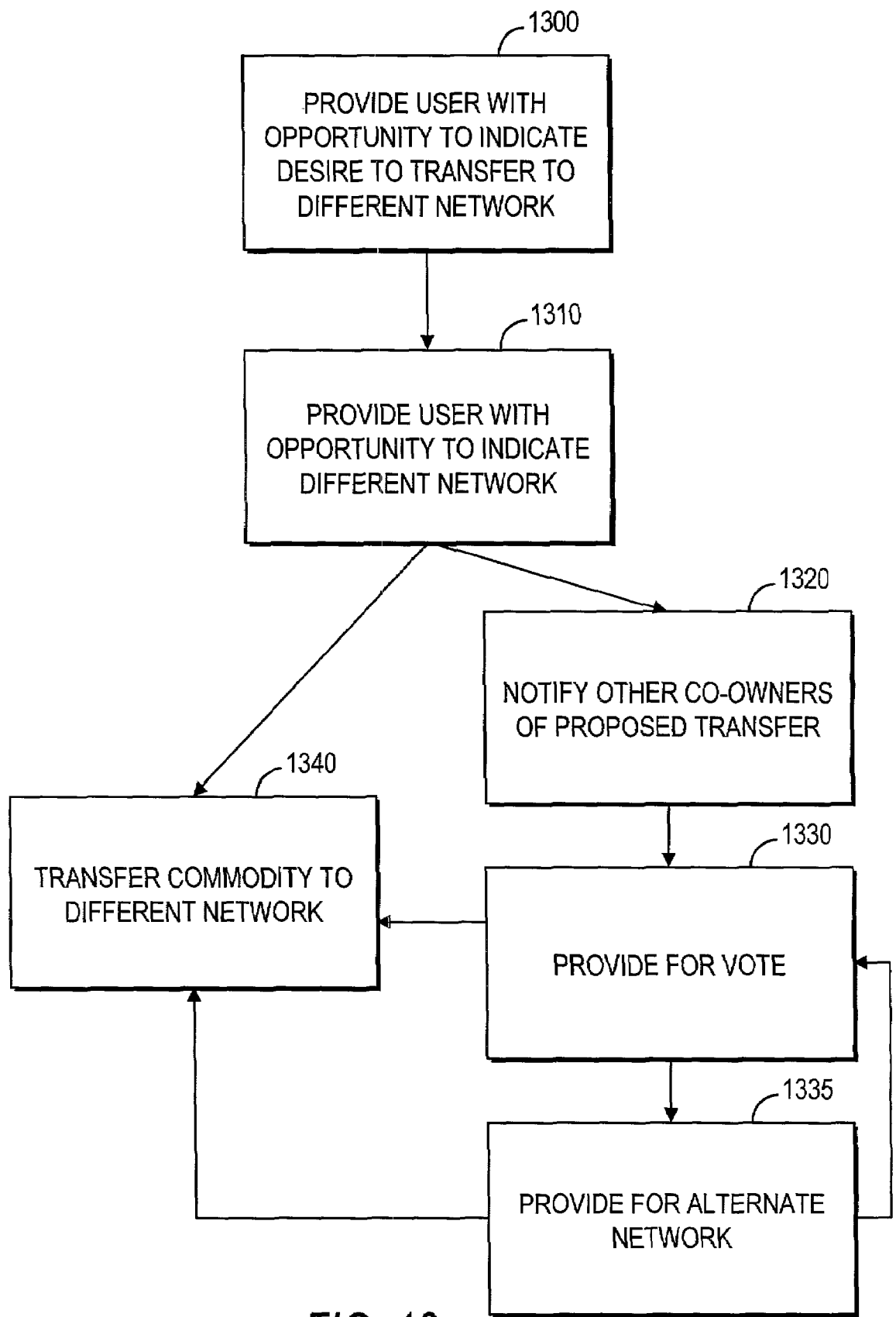
FIG. 13 is a flowchart of illustrative steps involved in providing users with opportunities to transfer commodities among networks, in accordance with the present invention.

FIG. 13 is a flowchart of illustrative steps involved in providing users with opportunities to transfer commodities between networks of commodities. Users may wish to transfer commodities between networks to, for example, obtain lower operational, management, maintenance, or other costs, to increase the liquidity or value of a commodity, or for other reasons. At step 1300, the system may provide a user with an opportunity to indicate a desire to transfer a commodity to a different network. In response to a user indicating such a desire, the system may provide the user with an opportunity to indicate the network to which the user wishes to transfer a commodity. The system may provide this opportunity using, for example, drop-down menus, searchable lists, buttons, radio buttons, text fields, or any other suitable user interface element.

If the commodity is co-owned, the system may notify the other co-owners of the proposed transfer at step 1320. The system may notify the other co-owners by, for example, sending e-mails, regular mails, system messages (if the other co-owners are users), or using any approach suitable for notifying the other co-owners. The system may provide the other co-owners with an opportunity to vote on the transfer at step 1320. User co-owners may vote via the system. Non-user co-owners may vote via e-mail, regular mail, fax, or telephone, any of which may be indicated as available to the non-user co-owners within the notification from the system. If desired, the system may include sufficient hardware and software to provide for automatic voting over the telephone.

When a sufficient number of affirmative votes of the co-owners (e.g., a majority, two-thirds, etc.) is received, the system may transfer the commodity to the indicated network at step 1340. When an insufficient number of affirmative votes are received, the system may provide all of the co-owners with an opportunity to submit an alternate network (e.g., via e-mail, mail, phone, fax, etc.) (step 1335). In practice, steps 1330 and 1335 may be combined. Voting may continue using any suitable approach to determine whether there is a preferred network. The system may, for example, provide for voting in rounds. Each co-owner may be provided with an opportunity to identify an alternate network in the first round. In each subsequent round, the network with the least number of votes is removed from consideration. If the last network to remain does not receive a sufficient amount of affirmative votes, the system notifies all co-owners that voting has terminated and that a transfer will not take place. When a network receives a sufficient number of votes, the system may transfer the commodity to the new network (step 1340).

The system may transfer the commodity to the indicated network, which is also the winning network when a vote has taken place, at step 1340. This may be accomplished using any suitable approach. When the new network is serviced by a system in accordance with the present invention, then the transferring system may transfer user and commodity information associated with the co-owners and the commodity to the receiving system. The transferring system may, if desired, retain a copy of the information. When the new network is not serviced by a system in accordance with the present invention, the transferring system may transfer information in a suitable universal file format (e.g., a comma delimited text file, a tab delimited text file, as SQL records or as an SQL database, as an HTML or other markup language file, etc.) to the receiving system using any suitable approach (e.g., e-mail, the File Transfer Protocol (FTP), etc.). In still another suitable approach, the system may be programmed to provide the user and commodity information in a proprietary format readable by the receiving system.

The features of an electronic ownership control system in accordance with the present invention may be presented to users using any graphical user interface suitable to the chosen client/server or on-line approach used to implement the system. FIGS. 14–49 show an illustrative graphical user interface for an electronic ownership control system in accordance with the present invention. For purposes of clarity, FIGS. 14–49 will be described as illustrative web pages for use in an on-line electronic ownership control system. The interface shown may, in practice, be used as suitable display screens in a client/server based system.

The illustrative web pages shown in FIGS. 14–49 illustrate features of the system as they may be used to provide users with opportunities to manage and transfer ownership in a number of types of commodities. The types of commodities shown in the following figures are only illustrative examples. The features of the system of the present invention may be used to provide users with opportunities to manage and transfer ownership in any other commodity as defined previously herein. Moreover, the user interface elements shown in the figures are only illustrative, and may be replaced with any other user interface elements suitable for the features with which the illustrative interface elements are associated.

Figure 14:
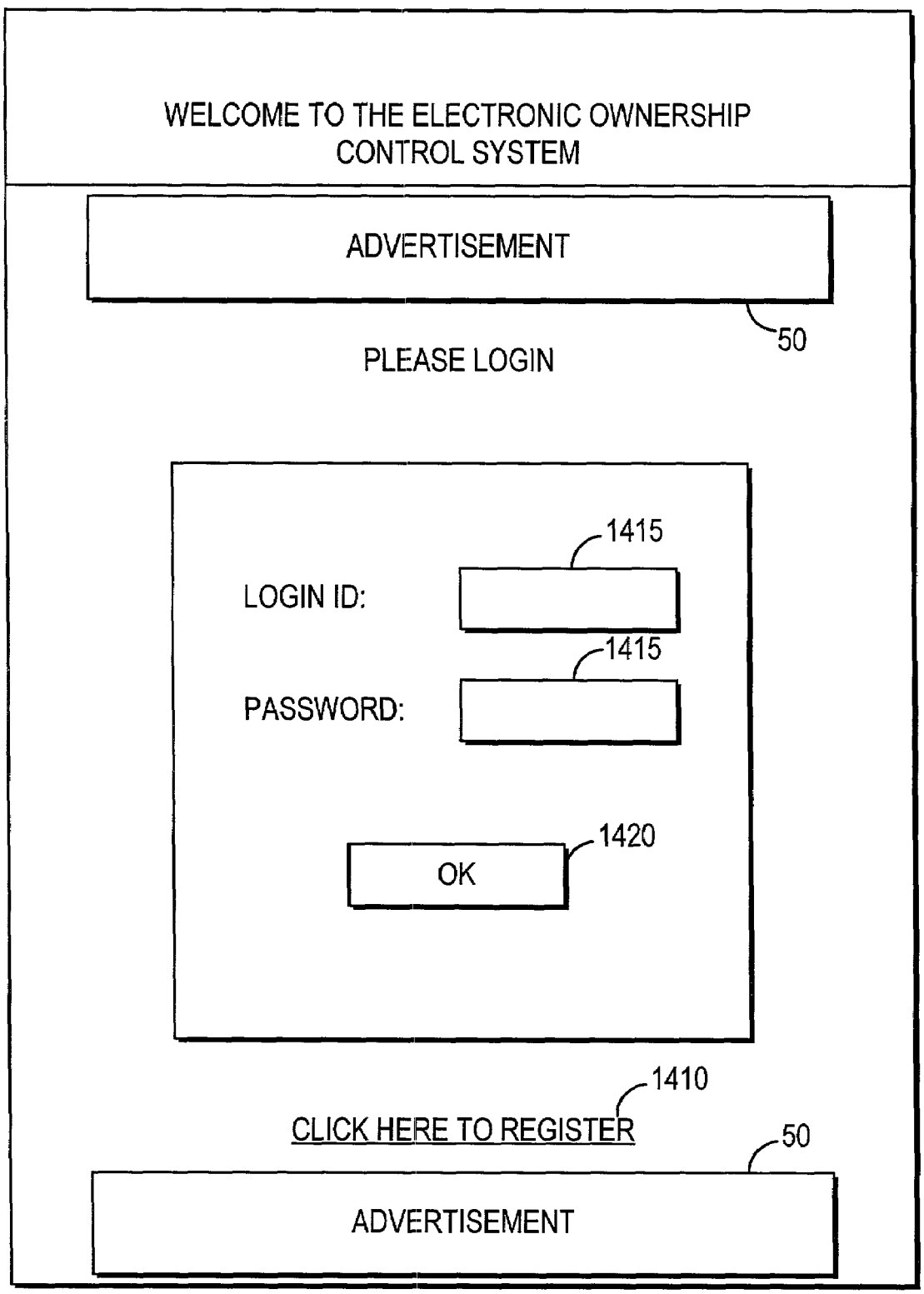
FIG. 14 shows an illustrative login page, in accordance with the present invention.
Figure 15:
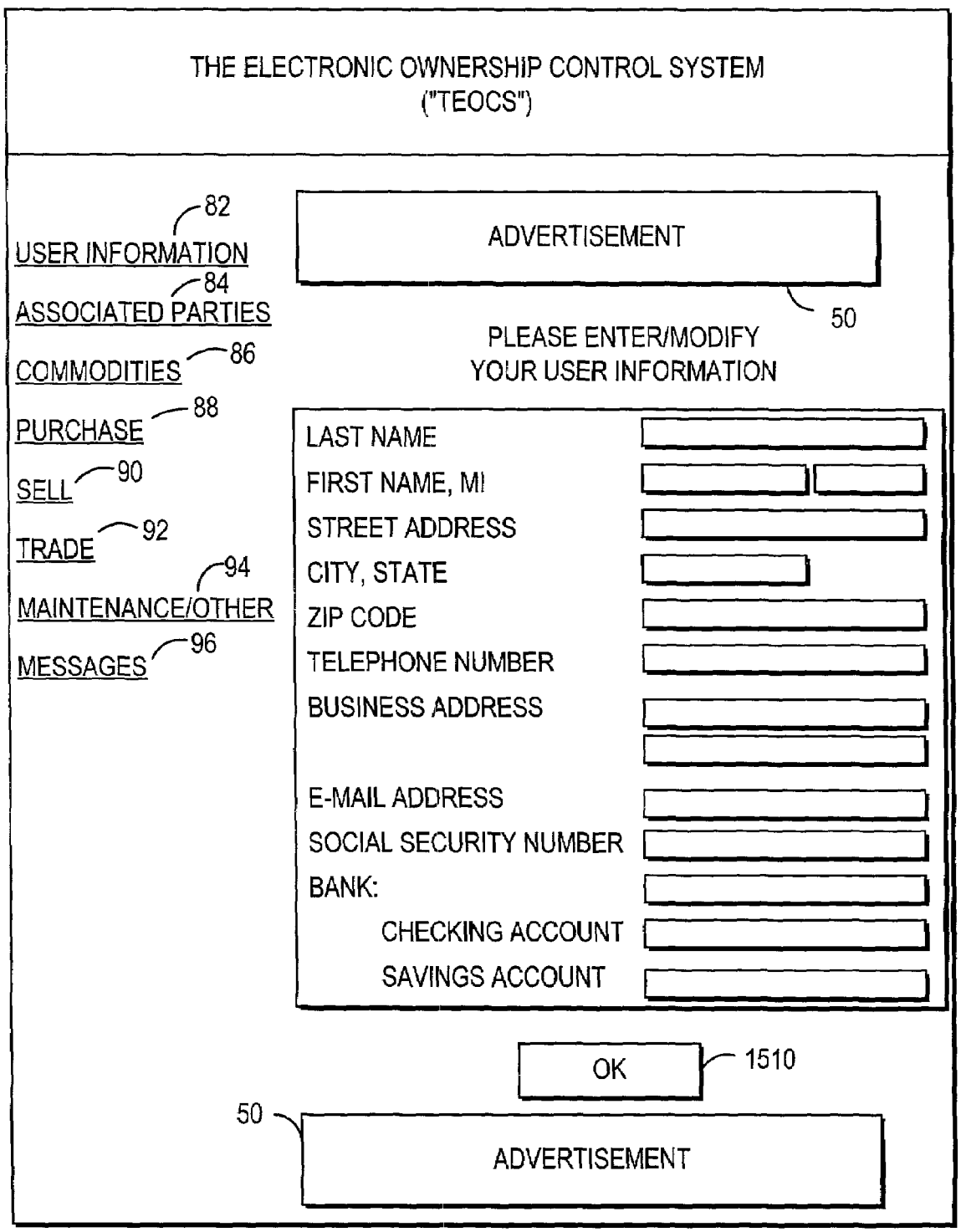
FIG. 15 shows an illustrative user information page that the system may provide to a new user, in accordance with the present invention.

An illustrative login page 1400 in accordance with the present invention is shown in FIG. 14. Login page 1400 and other pages of the system may include, for example, advertisements 50 and links to additional features (e.g., link 1410). Advertisements 50 may be any suitable text, graphic, or video advertisement. FIGS. 14–49 illustrate the use of two advertisements 50 within each page. In practice, pages may include zero, one, two, or more than two advertisements if desired. Advertisements 50 may have associated audio. Pure audio advertisements may be played without displaying visual indicators of their availability if desired. Login page 1400 also includes text boxes 1415 that provide users with opportunities to enter a login ID and a password. Users may indicate they have entered their information by, for example, pressing button 1420. In response, the system may display a portfolio page. An illustrative portfolio page 1500 is shown in FIG. 15 and is discussed below.

Page 1400 may include link 1410 to provide those who are not users an opportunity to register with the system. In response to, for example, the user selecting link 1410, the system may provide a blank user information page, such as illustrative user information page 1500 of FIG. 15. User information page 1500 of FIG. 15 may provide new users an opportunity to input new user information in, for example, a number of text boxes. The system may prompt for, for example, a user's full name, address, telephone number, business address and phone number, e-mail address, social security number, bank account information, credit card account information, or any other suitable information. In response to a new user indicating that all of the necessary information has been entered (e.g., by pressing button 1510), the system may provide the user with an opportunity to enter other related information, such as associated party information and commodity information, or to access other system features. The system may require the new user to re-login into the system before entering this information or accessing additional features. The user may re-login into the system by, for example, issuing suitable navigation commands with a web browser (e.g., pressing a "back button," closing the browser and restarting it, or any other suitable approach). Alternatively, the system may provide a button, link, or other interface element providing the user with an opportunity to re-login into the system.

Figure 16A:
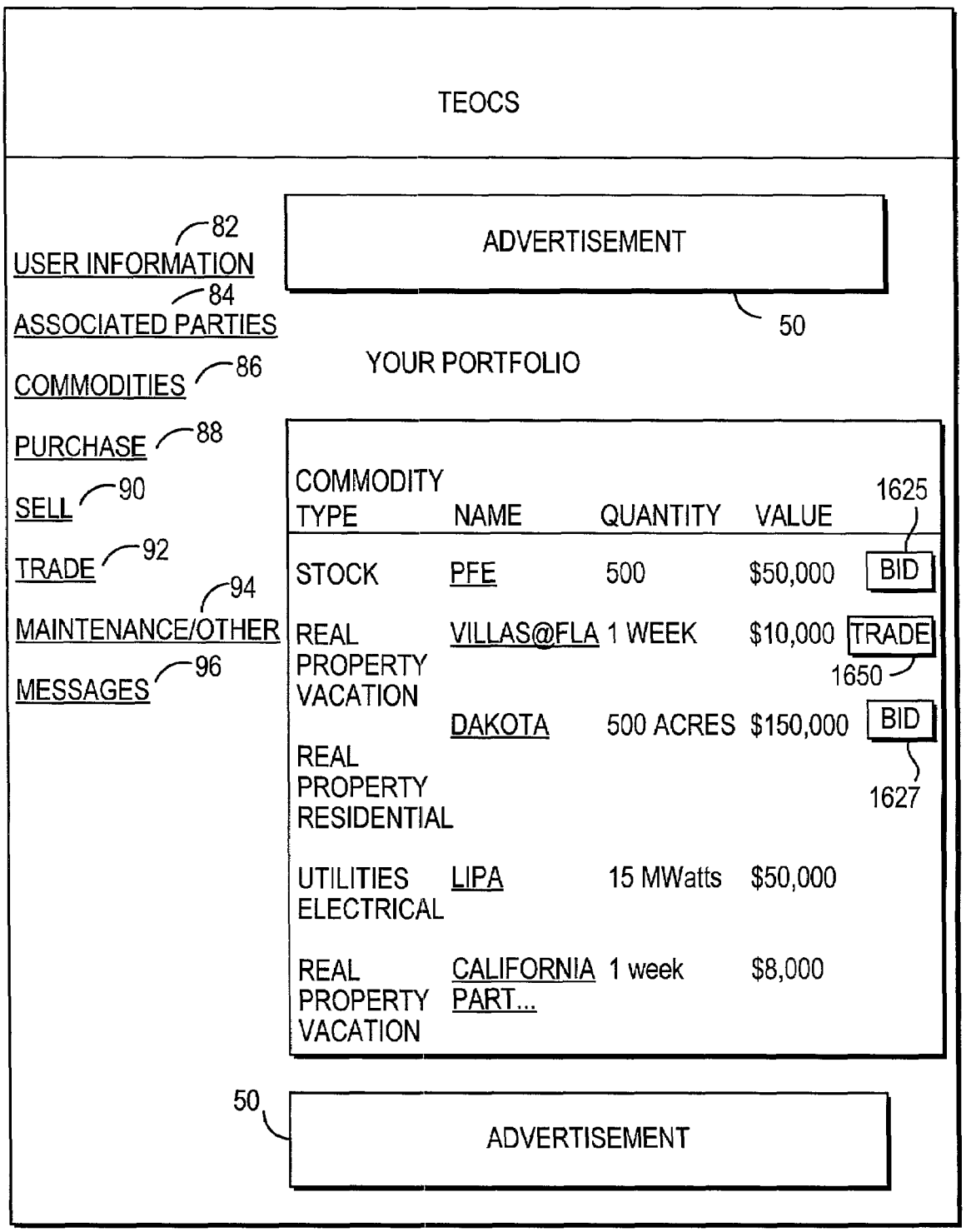
FIG. 16a shows an illustrative portfolio page, in accordance with the present invention.

Turning to FIG. 16*a*, the system may provide portfolio page 1600 in response to a user logging into the system. Portfolio page 1600, and other pages of the system, may include links that provide users with opportunities to access various features of the system. Users may select link 82 to, for example, view or edit user information. Users may select link 84 to, for example, view, enter, or edit information regarding parties associated with the user. Users may select link 86 to, for example, view, enter, or edit commodities information. Users may select links 88, 90, and 92 to purchase, sell, and trade commodities, respectively. Users may select link 94 to access maintenance or other features. Users may select link 96 to view or send messages.

FIG. 16*b* shows an illustrative user information page 1501 that the system may display in response to a user selecting link 82. User information page 1501 of FIG. 16*b* is a completed version of the blank user information page 1500 of FIG. 15, and includes elements for providing a user with an opportunity to edit his or her user information.

Figure 17:
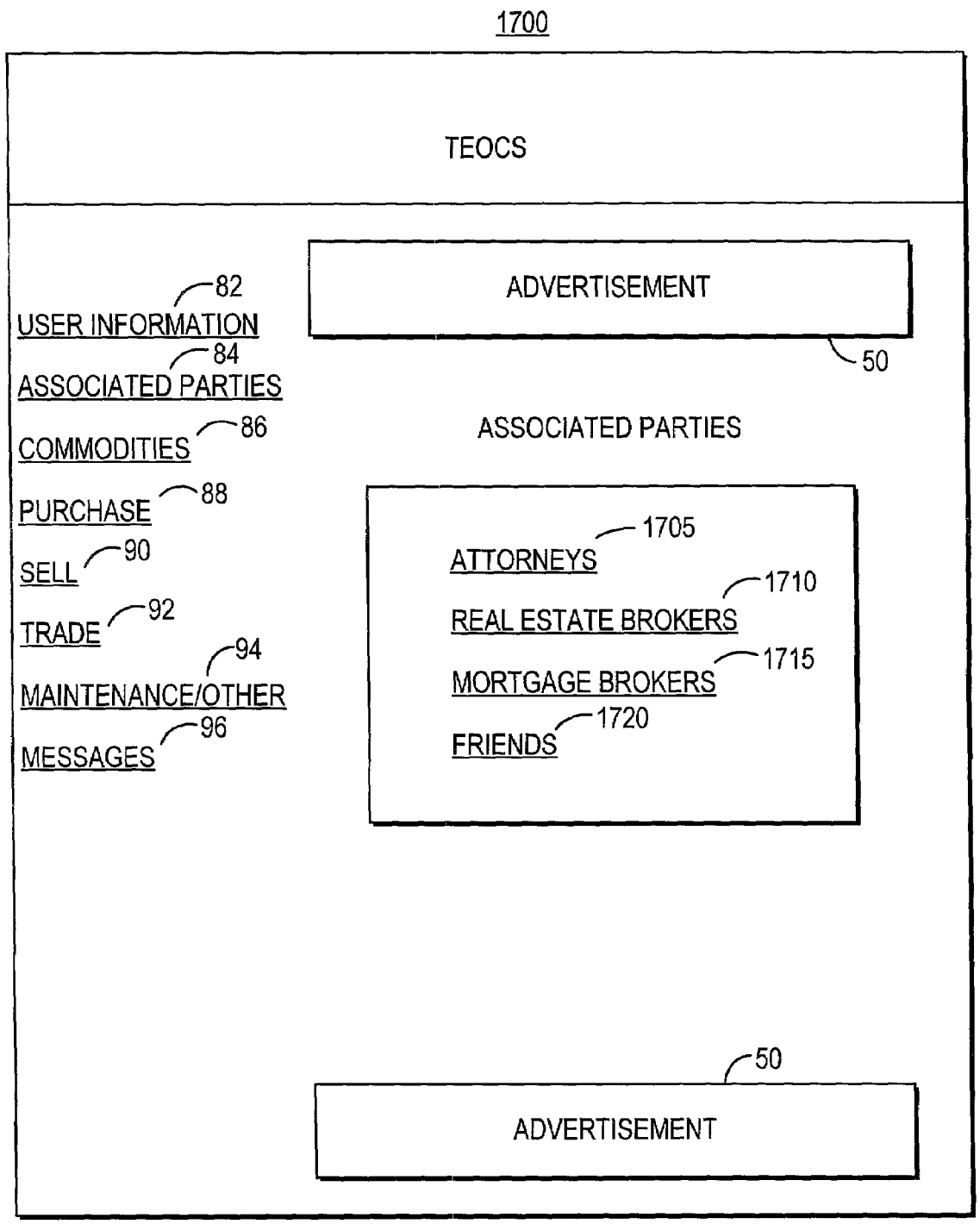
FIG. 17 shows an illustrative associated parties page that the system may provide in response to a user indicating a desire to enter associated party information, in accordance with the present invention.
Figure 18:
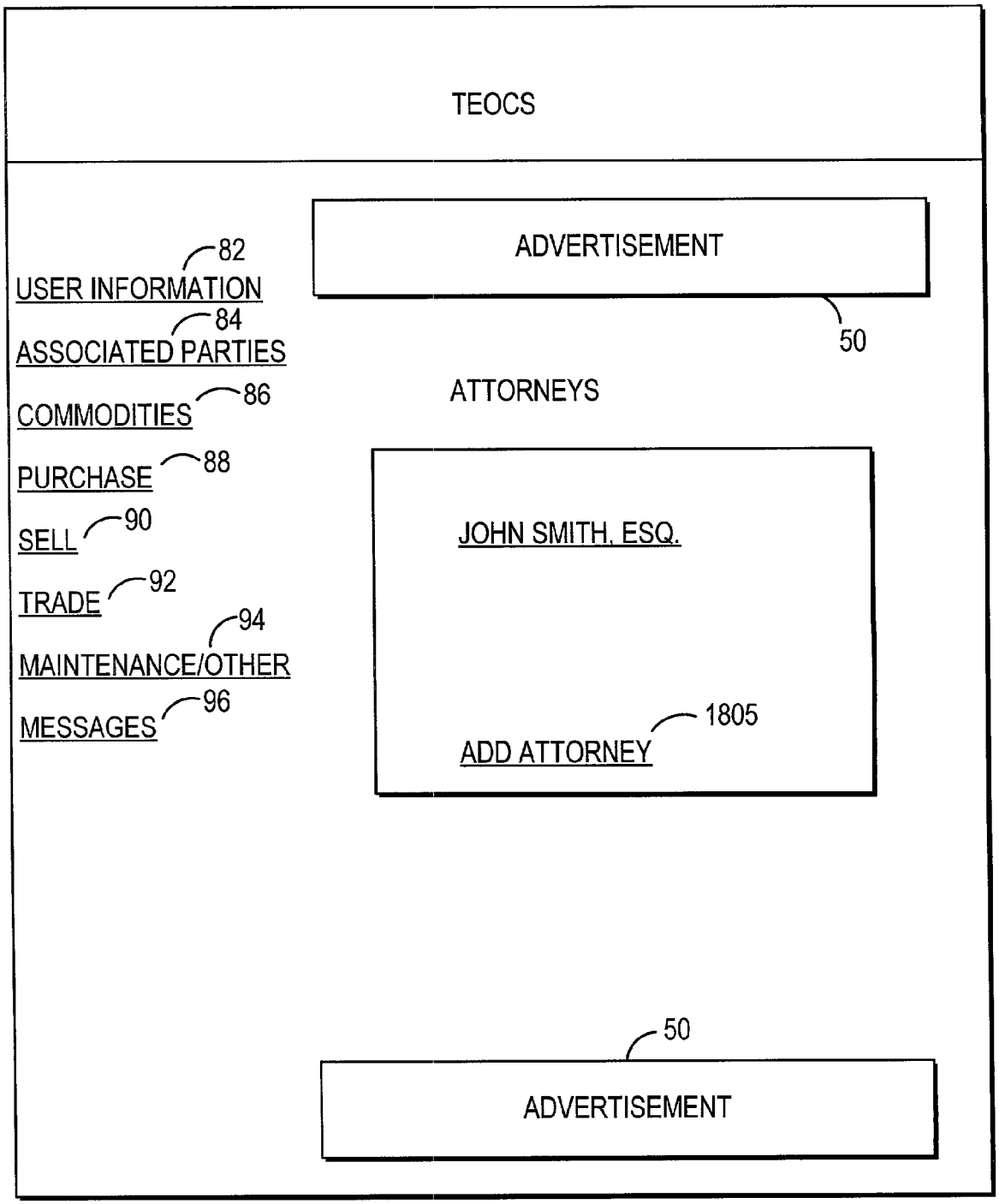
FIG. 18 shows an illustrative attorneys page that the system may provide in response to a user indicating a desire to view, enter, or edit attorney information, in accordance with the present invention.
Figure 19:
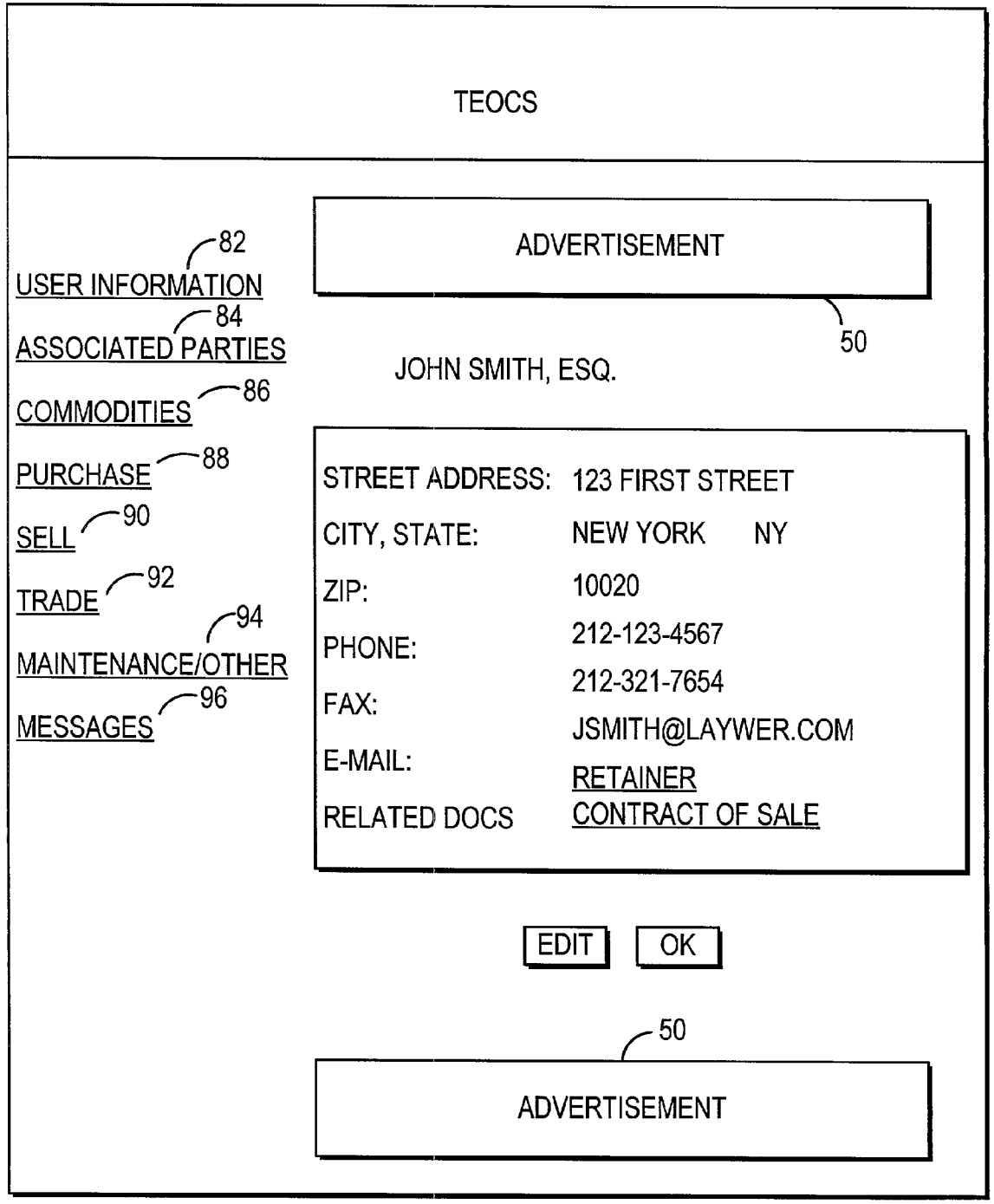
FIG. 19 shows an illustrative attorney information page, in accordance with the present invention.

FIG. 17 shows an illustrative associated parties page 1700 that the system may provide in response to a user indicating a desire to enter associated party information by, for example, selecting associated parties link 84. Associated parties page 1700 may include links or other suitable interface elements that provide users with opportunities to view information regarding attorneys, real estate brokers, mortgage brokers, or friends. Other types of third parties may be associated with users if desired (e.g., stock brokers, engineers, title searchers, or any other party suitable to the types of commodities handled by the system). In response to a user selecting attorneys link 1705 for example, the system may provide the user with an attorneys page that provides the user with opportunities to view, enter or edit information for attorneys associated with the user. An illustrative attorneys page 1800 is shown in FIG. 18. Attorneys page 1800 may include links for each attorney associated with a user.

In the example of FIG. 18, the user has only one associated attorney. In response to the user selecting that attorney (e.g., by selecting the attorney's link), the system may provide an attorney information page, such as illustrative attorney information page 1900 of FIG. 19. Attorney information pages may provide users with opportunities to view and edit attorney information. The system may provide attorney information page 1900 as a blank template to the user in response to the user indicating a desire to add an attorney (e.g., by selecting link 1805 of FIG. 18). Page 1900 may also be changed, for example, to include interface elements suitable for providing users with opportunities to enter information into the fields of the page (e.g., drop-down lists, searchable lists, browse buttons, etc.).

Attorney information page 1900 may also provide users with opportunities to view documents (or add documents) related to an attorney. In the example, of FIG. 19, the shown attorney has two related documents, a retainer agreement and a contract of sale. A user may indicate a desire to view a related document by, for example, selecting the document's link. In response, the system may provide the document for viewing by the user. In practice, the user's web browser may launch a viewer suitable for displaying the document (e.g., a Microsoft Word viewer, an Adobe Acrobat viewer, etc.). The system or the viewer may provide the user with an opportunity to print the related document.

Figure 20:
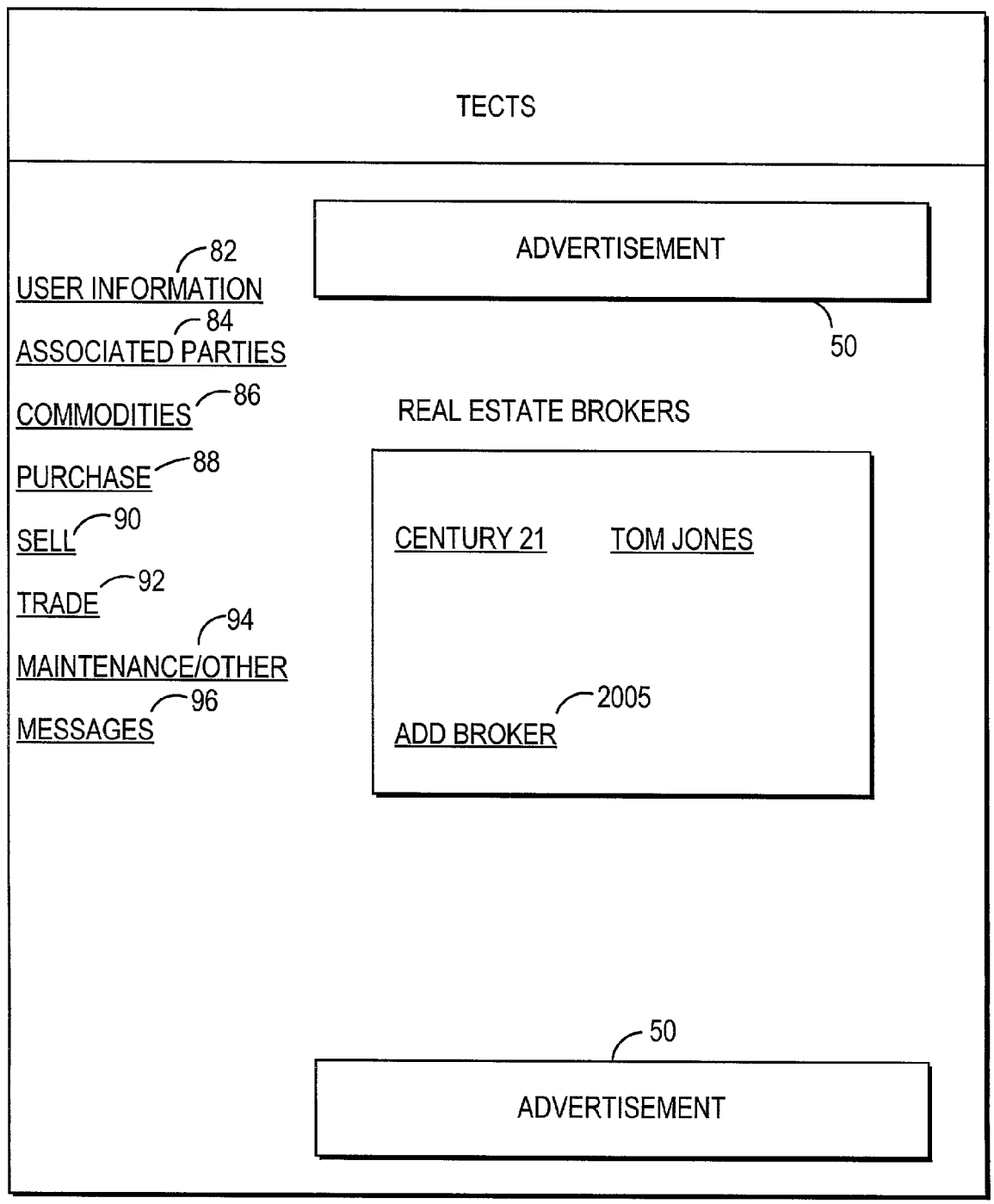
FIG. 20 shows an illustrative real estate brokers page that the system may provide in response to a user indicating a desire to view, enter, or edit real estate broker information, in accordance with the present invention.

Returning to FIG. 17, users may select link 1710 to view, enter, or edit information for real estate brokers associated with the user. In response to a user selecting link 1710, the system may provide a brokers screen. An illustrative brokers screen 2000 is shown in FIG. 20. Brokers screen 2000 may include, for example, a list of brokers associated with the user. In the example, of FIG. 20, there is only one broker associated with the user. In response to the user selecting a broker (e.g., by selecting a link associated with a broker), the system may provide a real estate broker information page. Real estate broker information pages, such as illustrative real estate broker information page 2100 of FIG. 21, may provide the user with an opportunity to view or edit information for a real estate broker. The system may provide real estate broker information page 2100 as a blank template with suitable interface elements to the user in response to the user indicating a desire to add a real estate broker (e.g., by selecting link 2005 of FIG. 20). Real estate broker information page 2100 may also provide users with opportunities to view documents (or add documents) related to a real estate broker. In the example of FIG. 21, the shown real estate broker has one related document, a broker agreement. A user may indicate a desire to view the broker agreement by, for example, selecting the document's link.

Figure 22A:
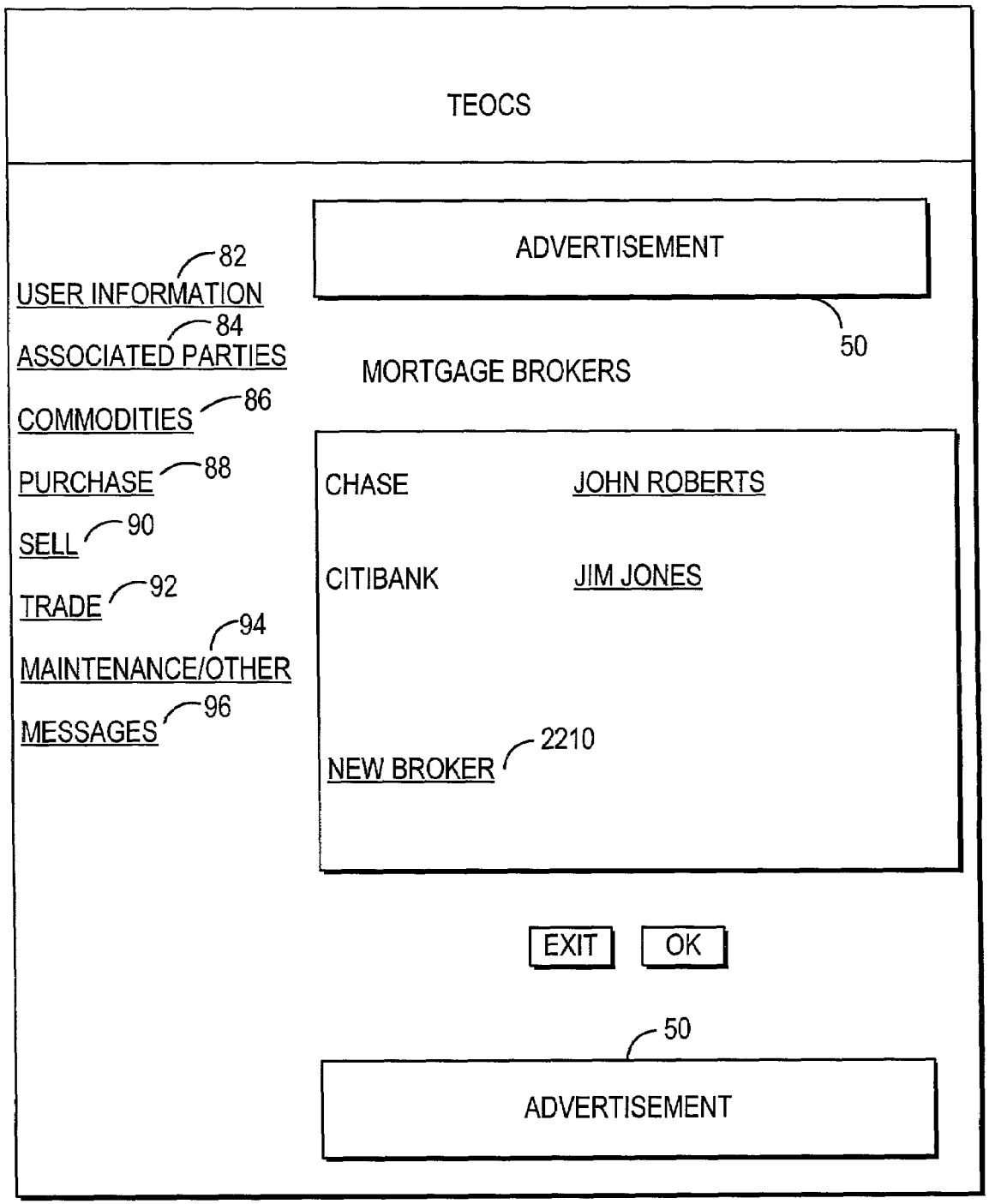
FIG. 22a shows an illustrative mortgage brokers page that the system may provide in response to a user indicating a desire to view, enter, or edit mortgage broker information, in accordance with the present invention.

Returning to FIG. 17, users may select link 1715 to view, enter, or edit information for mortgage brokers associated with the user. In response to a user selecting link 1715, the system may provide a mortgage brokers page. An illustrative mortgage brokers page 2200 is shown in FIG. 22*a*. Mortgage brokers page 2200 may include, for example, a list of mortgage brokers associated with the user that is organized or sorted in any suitable format. In the example of FIG. 22*a*, there are two mortgage brokers associated with the user. In response to the user selecting a mortgage broker (e.g., by selecting a link associated with a broker), the system may provide a mortgage broker information page. Mortgage broker information pages, such as illustrative mortgage broker information page 2250 of FIG. 22*b*, may provide the user with an opportunity to view or edit information for a mortgage broker. The system may provide mortgage broker information page 2250 as a blank template with suitable interface elements to the user in response to the user indicating a desire to add a mortgage broker (e.g., by selecting link 2210 of FIG. 22*a*). Mortgage broker information page 2250 may also provide users with an opportunity to view documents (or add documents) related to a mortgage broker. In the example of FIG. 22*b*, the shown mortgage broker has one related document, a pre-approval letter. A user may indicate a desire to view the pre-approval letter by, for example, selecting the document's link.

Returning to FIG. 17, users may select link 1720 to view, enter, or edit information for friends associated with the user. Friends may be associated with a user for any suitable purpose within the system. Friends may be, for example, user or non-user co-owners of properties. Friends may also be users or non-users of the system that a user may wish to want to involve in splits—opportunities to join the user in a purchase, trade, or ownership of a commodity. A user may wish to split a commodity when, for example, the user cannot or does not desire to purchase or trade for a commodity alone. The system may provide the user with an opportunity to notify friends of the opportunity and ask them if they want to participate in the purchase or trade. A user may also wish to split a commodity when, for example, the user does not need or desire all of a commodity the user owns. The user may wish to provide friends with an opportunity to purchase some of the commodity.

Figure 23A:
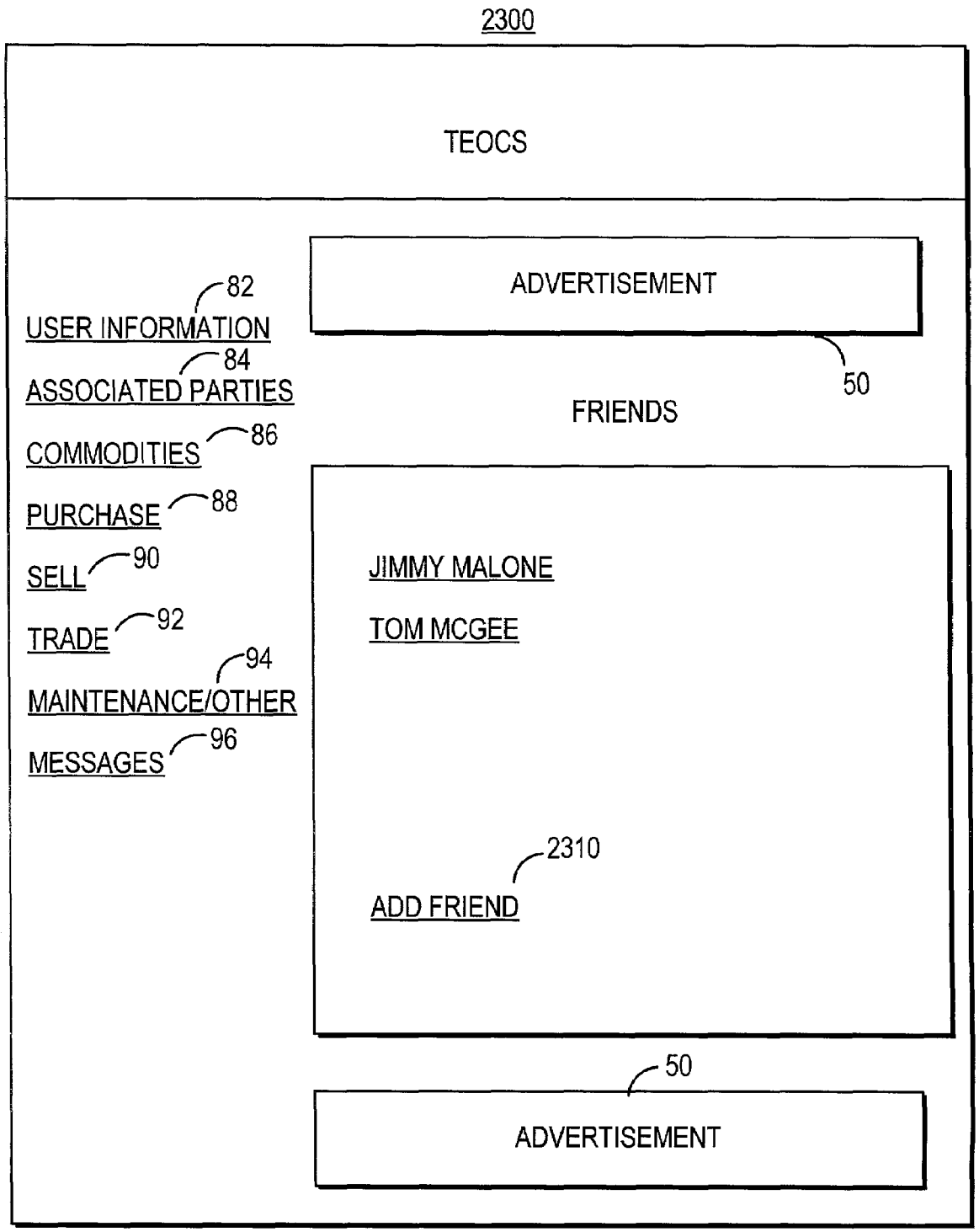
FIG. 23a shows an illustrative friends page that the system may provide in response to a user indicating a desire to view, enter, or edit friends information, in accordance with the present invention.
Figure 23B:
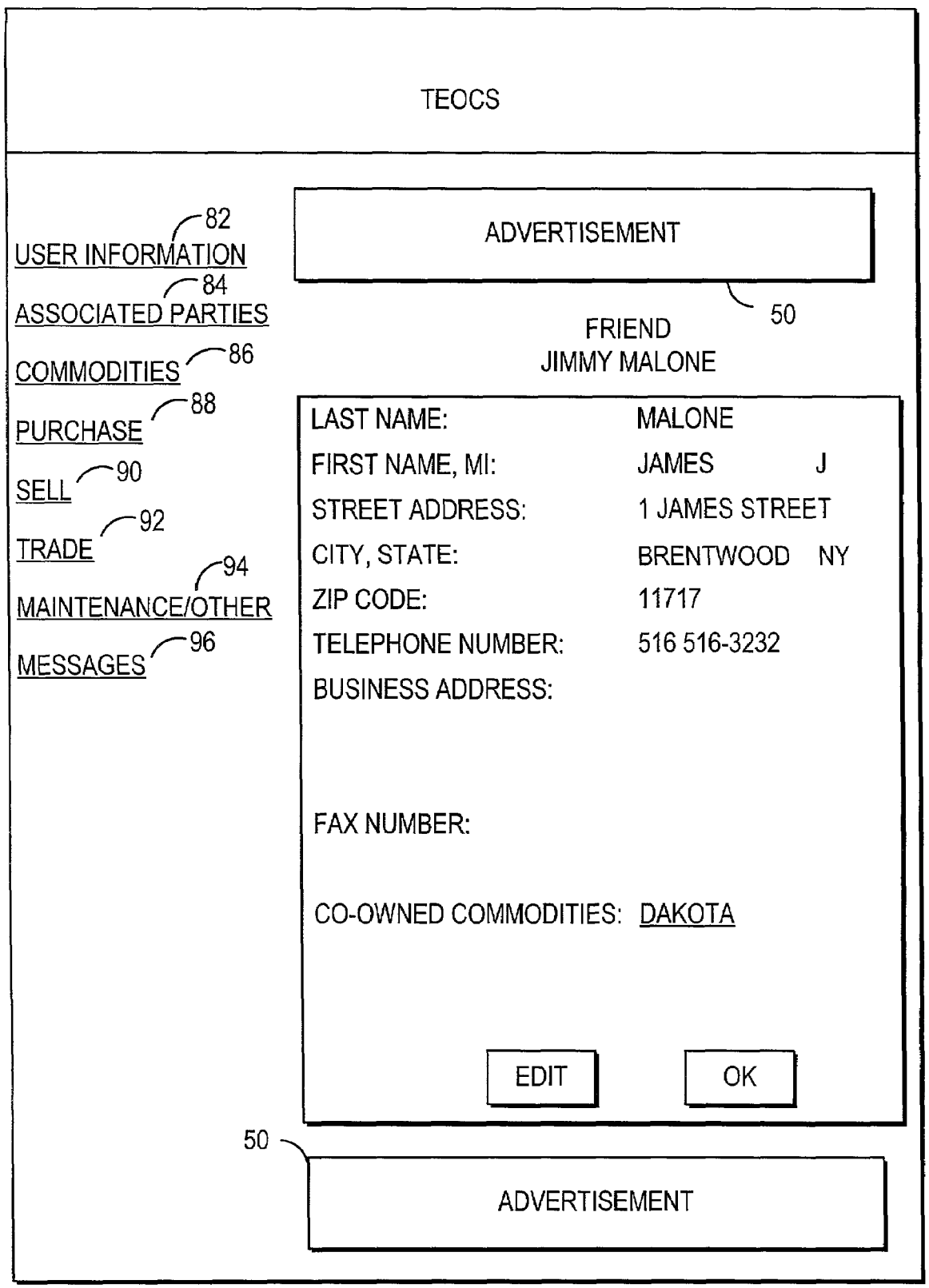
FIG. 23b shows an illustrative friend information page, in accordance with the present invention.

In response to a user selecting link 1720, the system may provide a friends page. An illustrative friends page 2300 is shown in FIG. 23*a*. Friends page 2300 may include, for example, a list of friends associated with the user that is organized or sorted in any suitable format. In the example of FIG. 23*a*, there are two friends associated with the user. In response to the user selecting a friend (e.g., by selecting a link associated with the friend), the system may provide a friend information page. Friend information pages, such as illustrative friend information page 2350 of FIG. 23*b*, may provide the user with an opportunity to view or edit information for a friend. The system may provide friend information page 2350 as a blank template with suitable interface elements to the user in response to the user indicating a desire to add a friend (e.g., by selecting link 2310 of FIG. 23*a*).

Friend information page 2350 may indicate, or provide users with opportunities to indicate, commodities that are co-owned by the user and the friend. The user may indicate a desire to view information about the co-owned commodity by, for example, selecting its link. In response, the system may provide a commodity information page, such as the illustrative commodity information page 3000 shown in FIG. 30*a*.

Figure 24A:
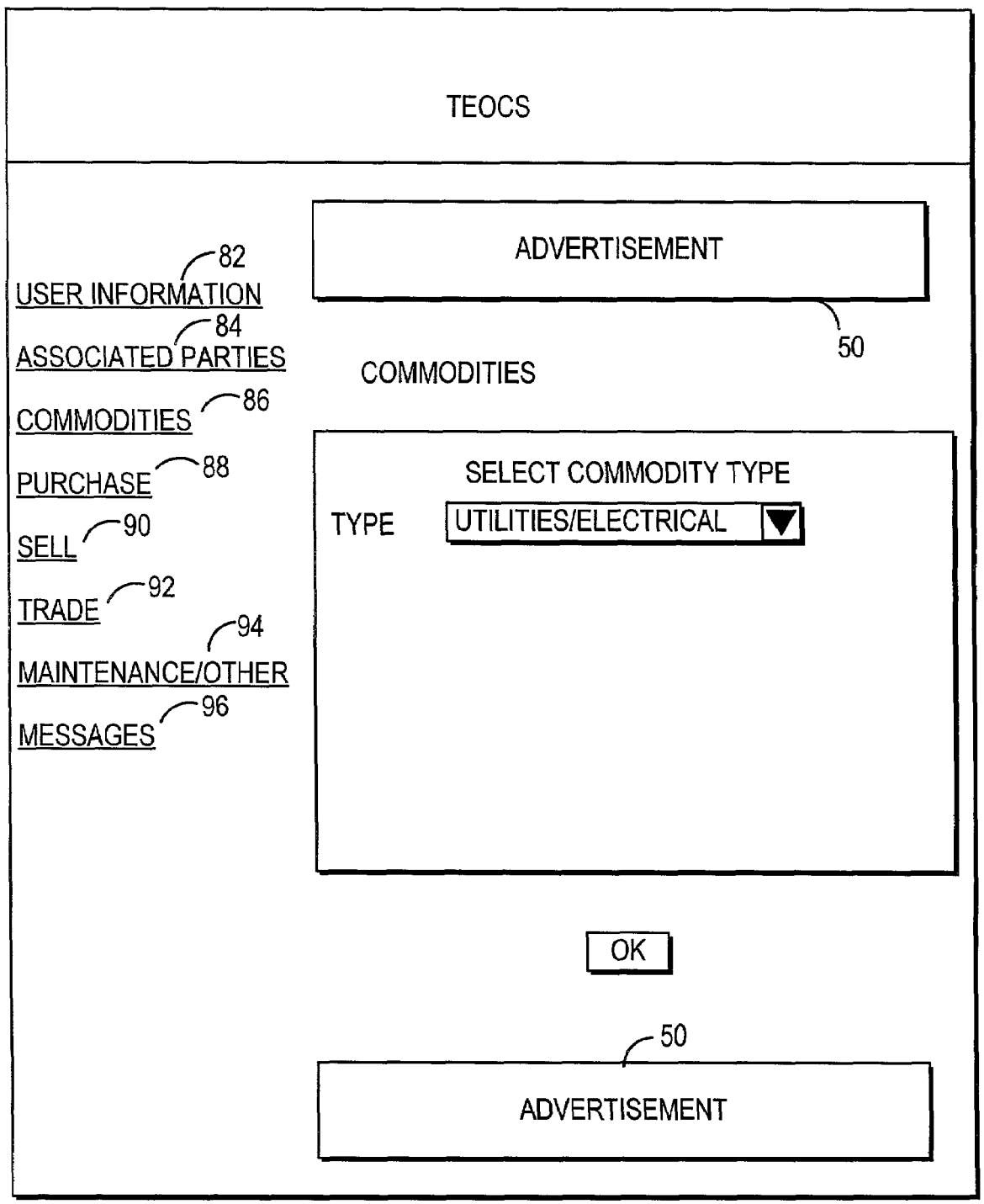
FIGS. 24a shows an illustrative commodities type selection page, in accordance with the present invention.
Figure 25A:
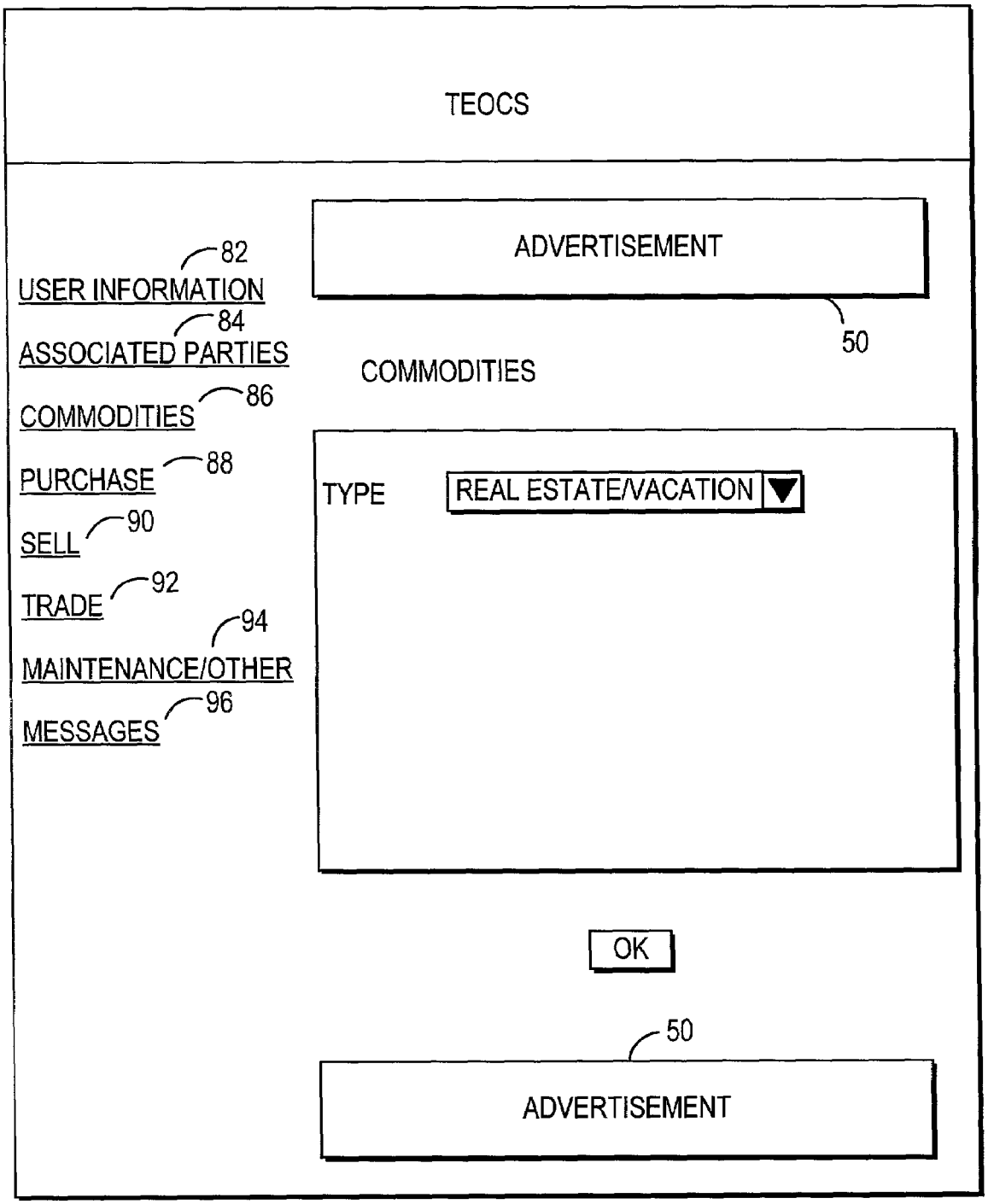
FIG. 25a shows an illustrative commodities type selection page, in accordance with the present invention.

Returning to FIG. 16*a*, the system may provide users with opportunities to enter information for commodities that the users acquired without using the system, and may allow the users to manage the commodities using the system. A user may indicate a desire to enter commodity information by, for example, selecting commodities link 86 from FIG. 16*a* or any page that includes link 86. In response, the system may provide, for example, a type selection page, such as illustrative type selection pages 2400 of FIGS. 24*a* and 25*a*. In the examples of FIGS. 24*a* and 25*a*, the user has chosen a commodity type of utilities/electrical and real estate/vacation, respectively. These are just two examples, as the system may provide users with opportunities to add commodities of any type as defined herein.

The type selection pages of FIGS. 24*a* and 25*a* include a drop-down list that prompts a user for a commodity type. From this type, the system may provide specialized pages within which the user may enter commodity information. This example of one type of specialization of pages is illustrated when comparing the illustrative pages of FIGS. 24*a*–24*c* for commodities of type utilities/electrical, and the illustrative pages of FIGS. 25*a*–25*c* for commodities of type real property/vacation. Specialization may not be used if it is not desired.

Figure 24B:
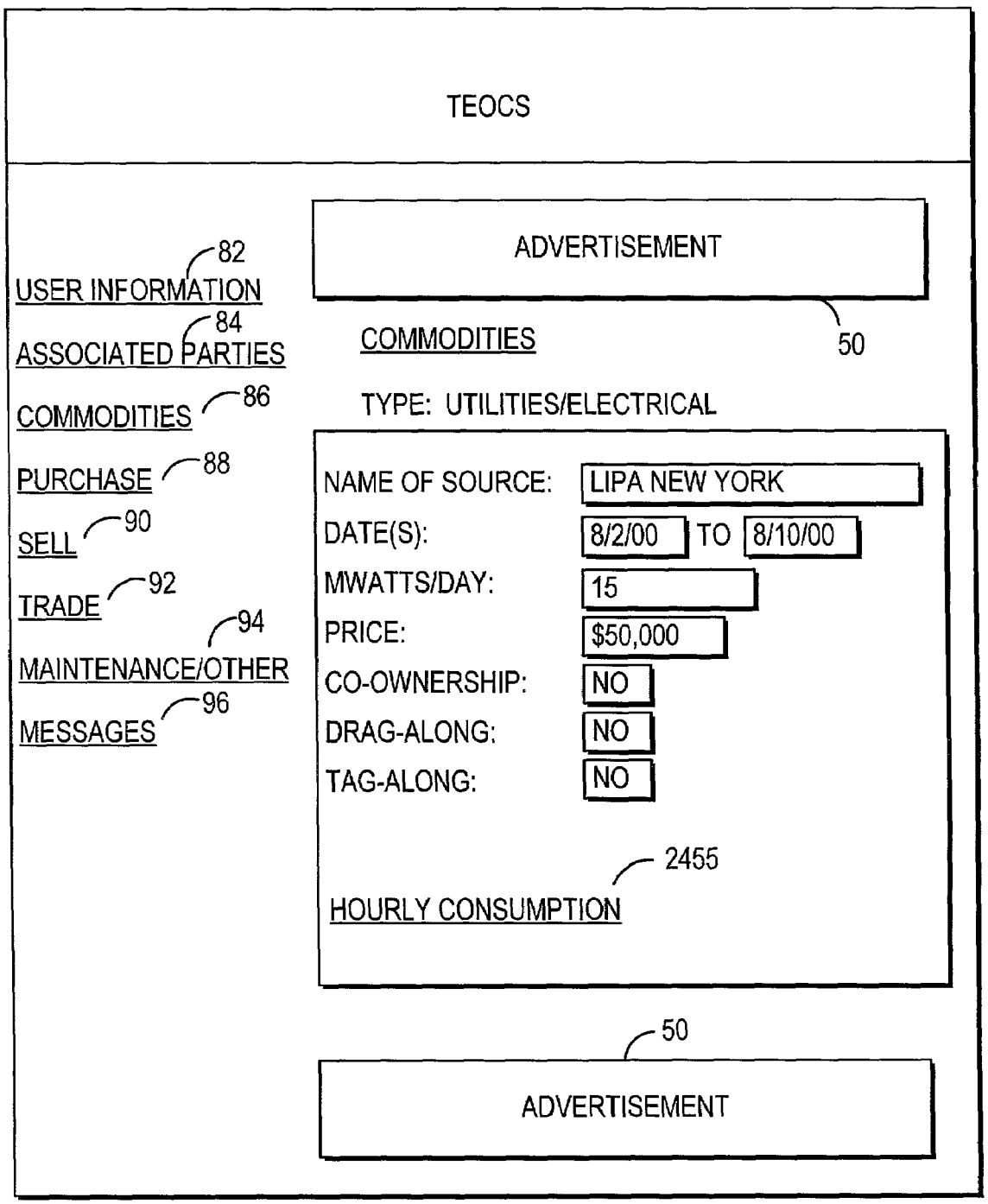
FIG. 24b shows an illustrative commodities information page for a commodity of the type indicated in FIG. 24a, in accordance with the present invention.

The system may, in response to a user selecting a commodity type of utilities/electrical as shown in FIG. 24*a*, provide a commodities information page. Commodities information pages may only provide interface elements for information relevant to the commodity type selected or otherwise indicated by the user. An illustrative commodities information page for commodities of type utilities/electrical is shown in FIG. 24*b*. In this example, the system may prompt the user for the name of the source of the electricity, the dates between which the user owns output from the source, the amount of output, the price paid, or any other suitable information. Commodities information pages may prompt for whether there are drag-along or tag-along rights associated with a commodity, and may provide users with opportunities to access additional pages for inputting information using interfaces designed especially for the selected commodity type. In this example, the system may provide users with an opportunity to define the hourly consumption of the user within each day of output that may have been used to obtain the commodity.

Figure 24C:
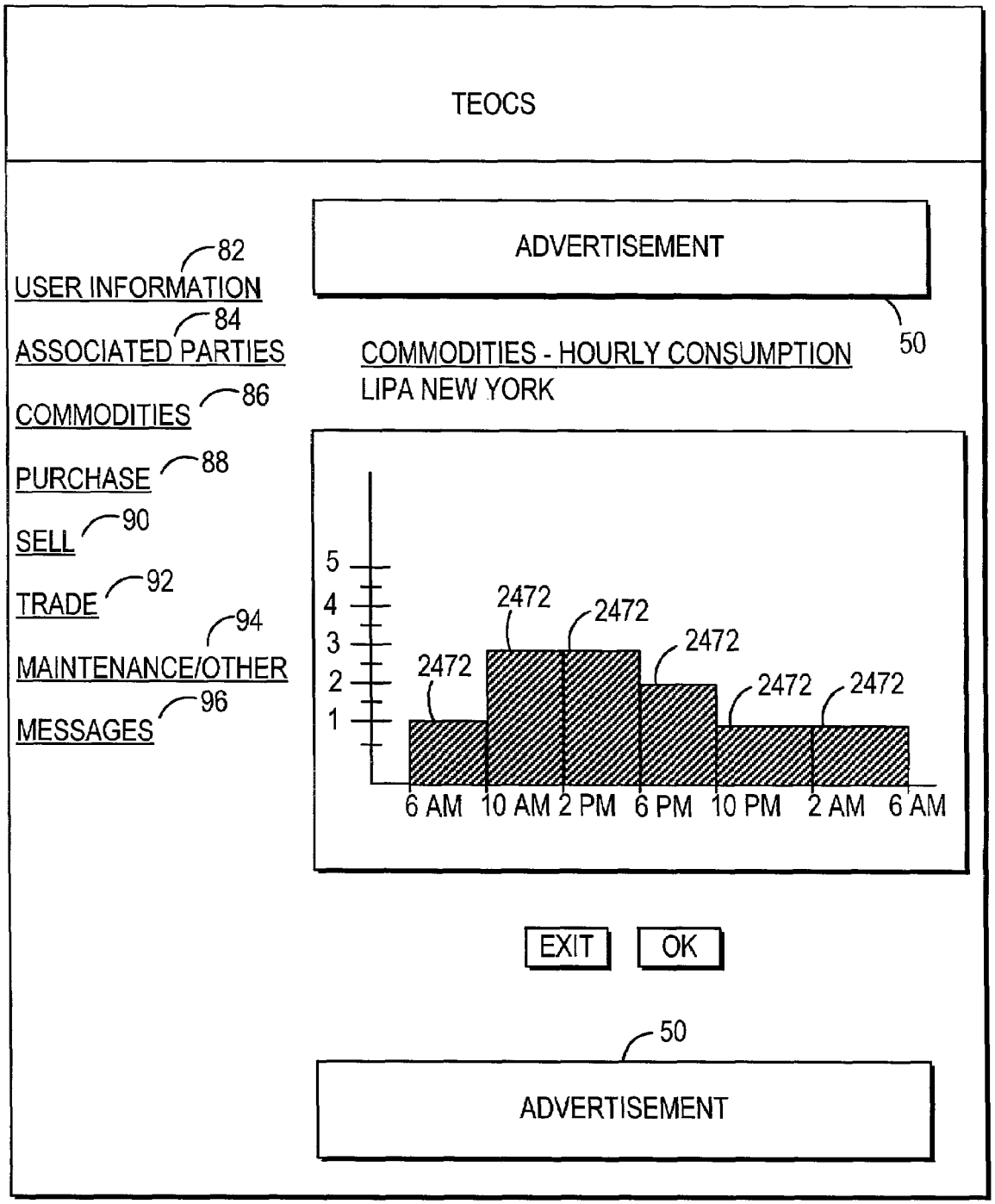
FIG. 24c shows an illustrative specialized hourly consumption page for providing a user with an opportunity to define utility requirements within given time periods, in accordance with the principles of the present invention.

In response to a user indicating a desire to define the user's hourly consumption (e.g., by selecting link 2455), the system may provide an hourly consumption page. An illustrative hourly consumption page 2470 is shown in FIG. 24*c*. In practice, it may be desirable to design interfaces in accordance with accustomed or widely accepted electronic or nonelectronic formats for defining commodities within an industry. For example, it may be desirable to design pages within the system to look like standardized forms. In this example, the user is provided with an interactive bar graph to define the user's hourly consumption. The user may select and move a bar 2472 to indicate the amount of output the user requires during a given time slot.

Figure 25B:
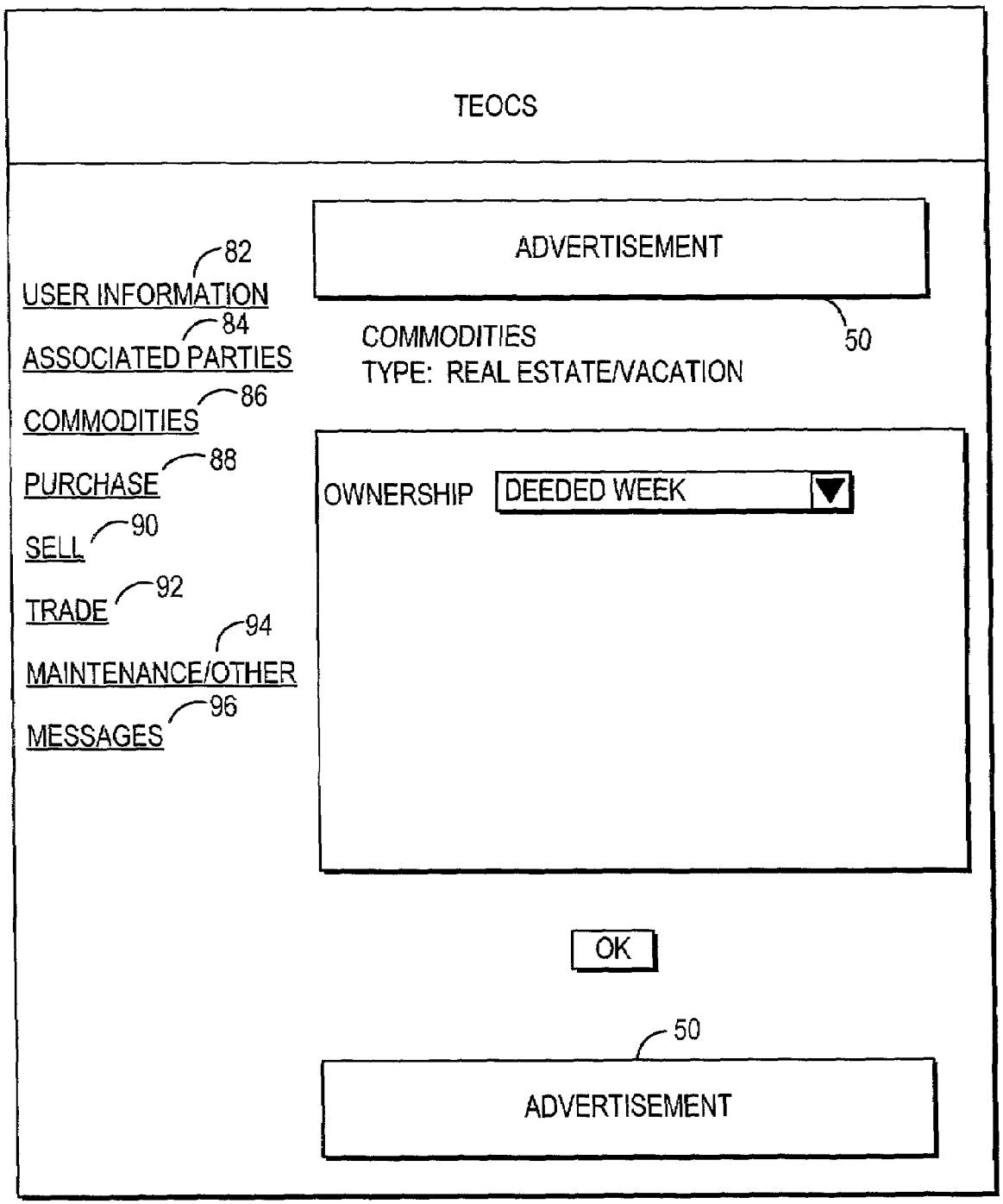
FIG. 25b shows an illustrative ownership selection page, in accordance with the present invention.

The system may, in response to a user selecting a commodity type of real estate/vacation as shown in FIG. 25*a*, provide illustrative ownership selection page 2550 of FIG. 25*b*. Ownership selection pages may be desirable when, as with vacation property, there may be a number of possible different forms of ownership for a type of commodity. The system may provide specialized pages based on the type of ownership. In the example of FIG. 25*b*, the user has selected a deeded-week form of ownership. In practice, it may be undesirable to provide specialized pages for commodities that do not have a number of types of possible ownership.

An illustrative commodities information page 2552 for deeded-week vacation properties is shown in FIG. 25*c*. The system may prompt the user to enter, for example, the name of the provider or manager of the property, its location, the week of ownership, the network of properties with which the property is associated (which may be provided using a predefined list of networks), the price paid, whether there are drag-along or tag-along rights, or any other suitable information. Commodities information pages or other pages for commodities in general, and in this example, may provide users with opportunities to generate or access a list of co-owners associated with a commodity, and to associate additional documents with a commodity.

Figure 26:
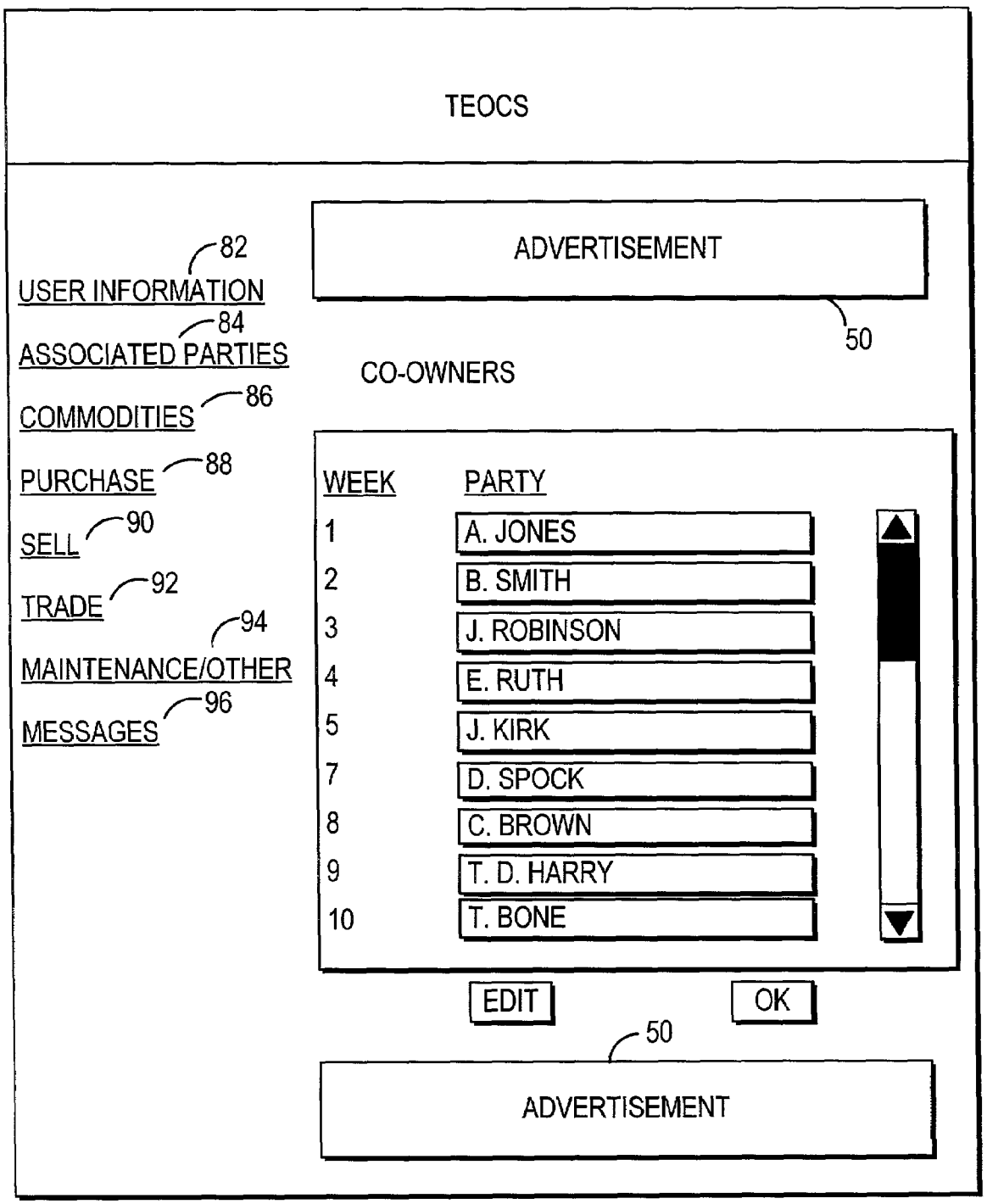
FIG. 26 shows an illustrative co-owners page that the system may provide in response to a user indicating a desire to generate or access a list of co-owners for a commodity, in accordance with the present invention.

In response to a user indicating a desire to generate or access a list of co-owners associated with a property (e.g., by selecting link 2570 of FIG. 25*c*), the system may provide a co-owners page. An illustrative co-owners page 2600 is shown in FIG. 26. The system may already have a list of co-owners associated with the property. Such a list may, for example, have been entered by another co-owner, have been generated by the system from the system information, or may have been electronically or otherwise provided to the system or provider of the system from the network of properties associated with the property. The system may provide the user with an opportunity to edit the list, or to accept the list. The system may notify the originator of the list that a user has edited the list. If the originator is a user of the system, the system may prompt the originator to indicate whether the originator wishes his or her list to be updated.

Figure 27A:
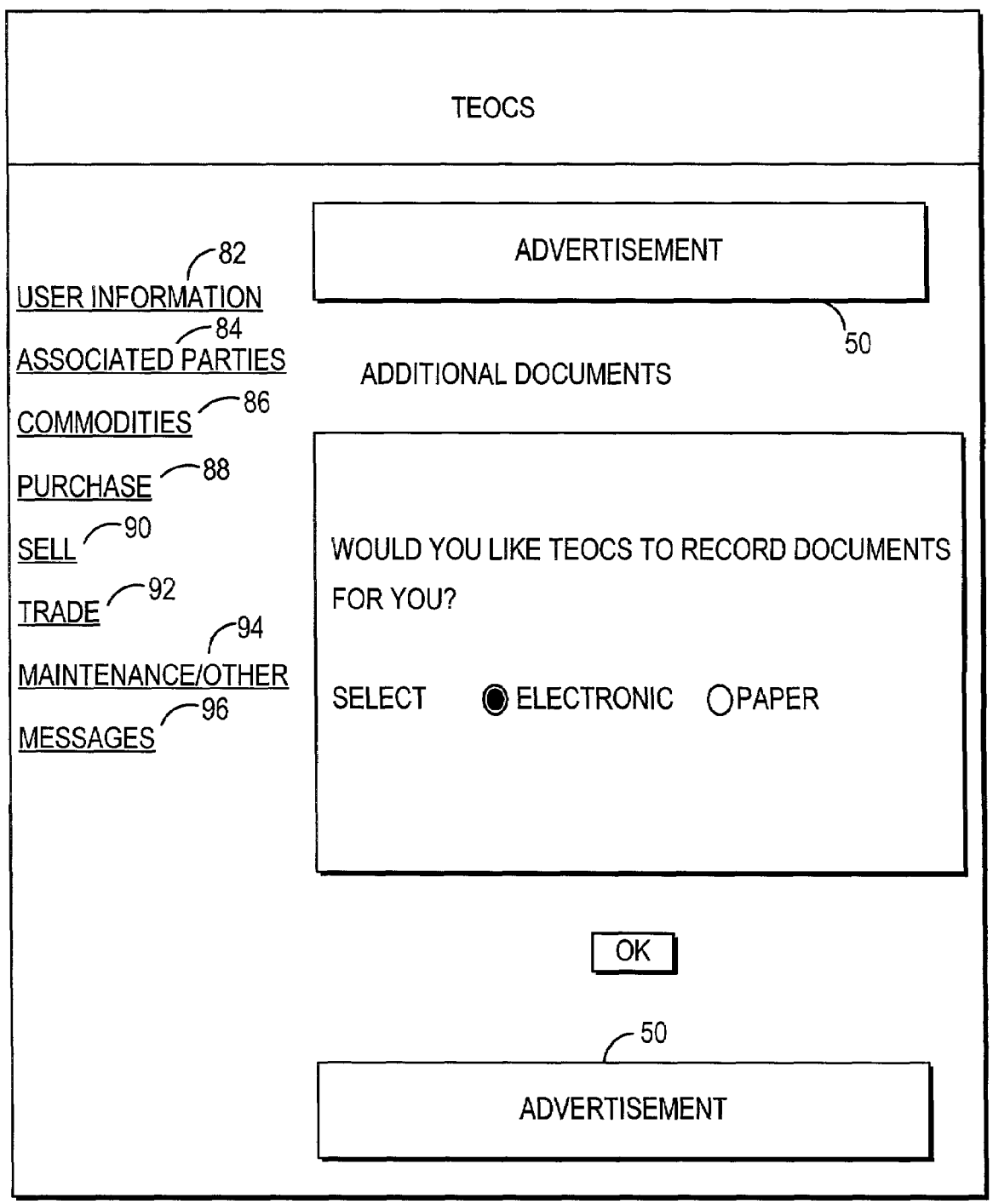
FIGS. 27a–27c show illustrative additional documents pages for providing a user with an opportunity to provide documents for a commodity, in accordance with the present invention.
Figure 27B:
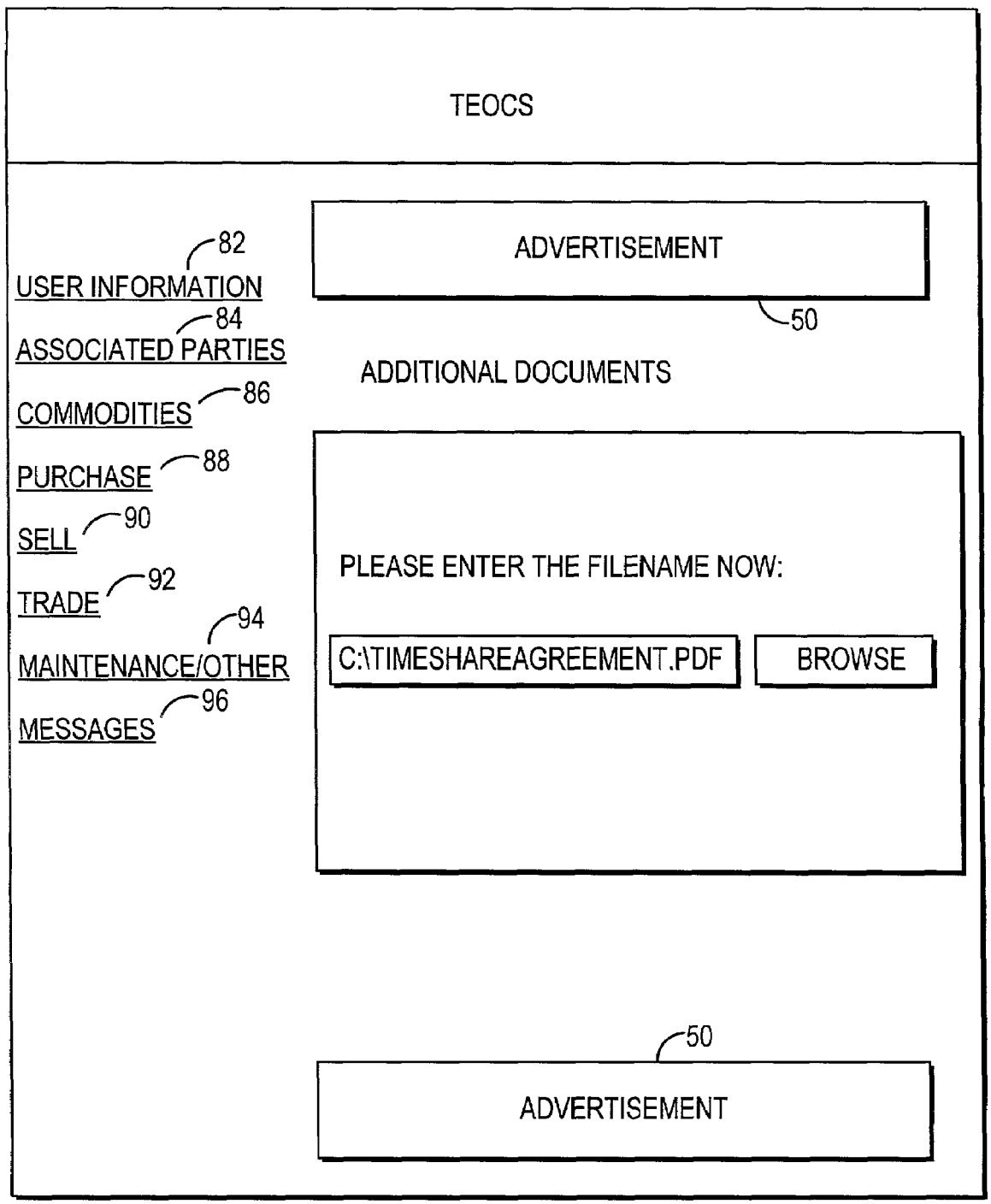

Returning to FIG. 25*c*, the system may provide users with opportunities to associate documents with commodities. In response to a user indicating a desire to associate documents with a vacation property by, for example, selecting link 2575, the system may provide an additional documents page. An illustrative additional, documents page 2700 is shown in FIG. 27*a*. As shown in FIG. 27*a*, the system may prompt the user to indicate whether the user wants to associate additional electronic or paper documents with a commodity. In response to a user indicating a desire to associate electronic documents, the system may prompt the user for a file name and path, or to browse for a file, as shown in FIG. 27*b*. The user may upload the electronic documents to the system and the system may store them electronically. The system may also OCR the documents and search them for information regarding ownership rights and other information if desired.

Figure 27C:
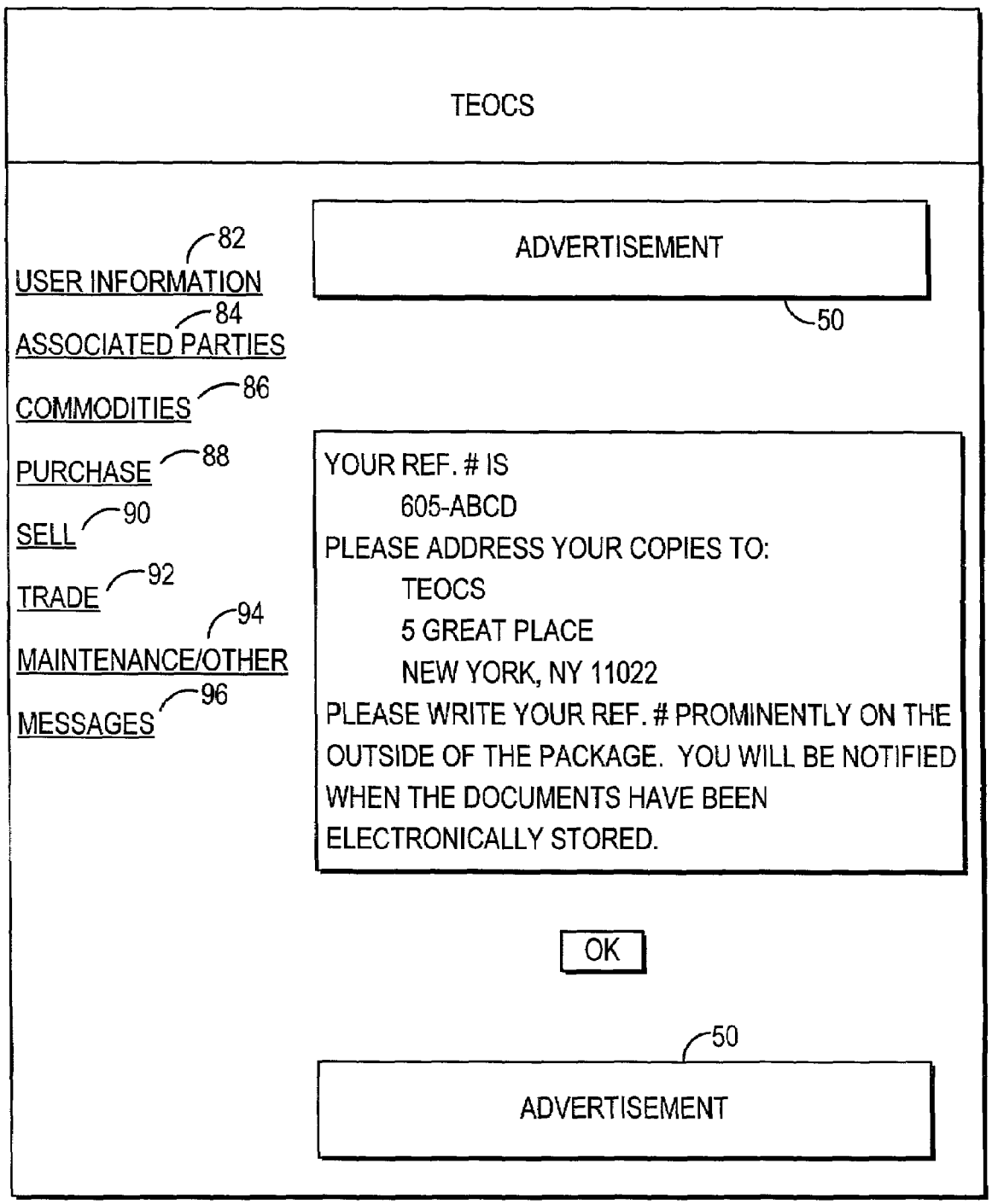

In response to a user indicating a desire to associate paper documents with a commodity, the system may provide the user with a reference number and shipping instructions as shown in FIG. 27*c*. Upon receiving the documents from the user, the system may scan in the documents, OCR them, and store them electronically. The system may also search the documents for information regarding ownership rights and other information if desired.

Returning to the illustrative portfolio page 1600 of FIG. 16*a*, the system may provide users with opportunities to view and edit commodity information for commodities that are in the users' portfolios. As shown in FIG. 16a, for example, the system may provide a summary of a user's commodities. The listed commodities may be commodities acquired through the system, or commodities that were not acquired by the user using the system and for which information may have been entered as illustrated by the examples shown in FIGS. 24a–24c, 25a–25c, 26, and 27a–27c. Commodities may be organized using any suitable order, and summaries of any suitable commodities information may be shown. If desired, the information and commodities shown in portfolio pages may be user configurable.

The value of properties listed in portfolio page 1600 or in any other page may be displayed based on any suitable value. The system may display, for example, the amount paid for a commodity as its value. In another suitable approach, the system may calculate or obtain the market value or price of a commodity when the system provides its value (i.e., initially or when the user or the system refreshes the screen). In still another suitable approach, the system may periodically or continuously display and update the market value of a commodity. Fair market value may be calculated by the system using any suitable approach. The system may, for example, track sales of commodities similar in type, duration, ownership, source, or any other suitable criteria, and calculate a fair market value. In another approach, the system may obtain the market value of a commodity from a third party system. The provider of a commodity (e.g., a utility, computer service, etc.), for example, may provide the current price it is asking for similar commodities. A combination of display and value determination approaches may be used if desired.

In the example shown in FIG. 16a, the user has five commodities. For the purposes of this example, assume that the first three listed commodities were acquired by the user using the system, and that the last two listed commodities were acquired by the user without the system. Also assume that commodity information has been entered for the last two listed commodities (e.g., as shown in FIGS. 24a–24c, 25a–25c, 26, and 27a–27c).

The system may also indicate to users when the users have received purchase or trade bids for their commodities. Portfolio page 1600 may include, for example, a bid indicator 1625 or 1627 for each commodity for which the system has matched a purchase request, and a trade indicator 1650 for each commodity for which the system has matched trade requests. Users may view purchase and trade requests by, for example, selecting indicators 1625, 1627, and 1650, respectively.

Users may indicate a desire to view additional information for a commodity by, for example, selecting its link. In response, the system may provide a commodities information page. The following five examples of commodities information pages are only illustrative. Commodities information pages may include any information suitable for the commodities for which commodity information is displayed. Any suitable graphical user interface element or combination of graphical user interface elements may be used to provide users with opportunities to access this information and perform other system features related to the commodities. The examples shown in FIGS. 28a–28d, 29a–29e, 30a–30e, 31a–31c, and 32 illustrate how the system may provide specialized pages based on the particular commodity a user selects, or the type of commodity selected.

Figure 28A:
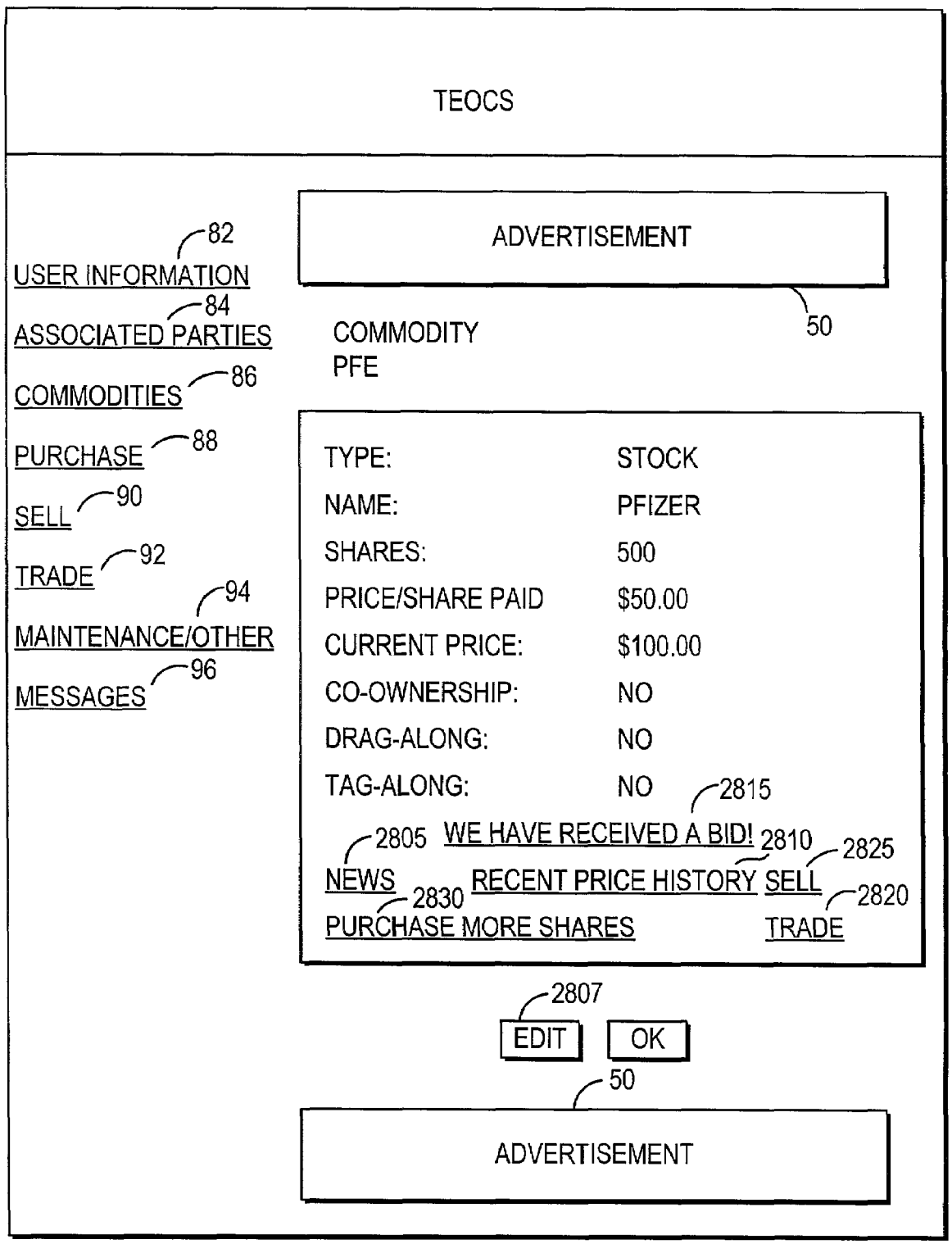
FIG. 28a shows an illustrative commodities information page for commodities of the type stock, in accordance with the present invention.
Figure 28B:
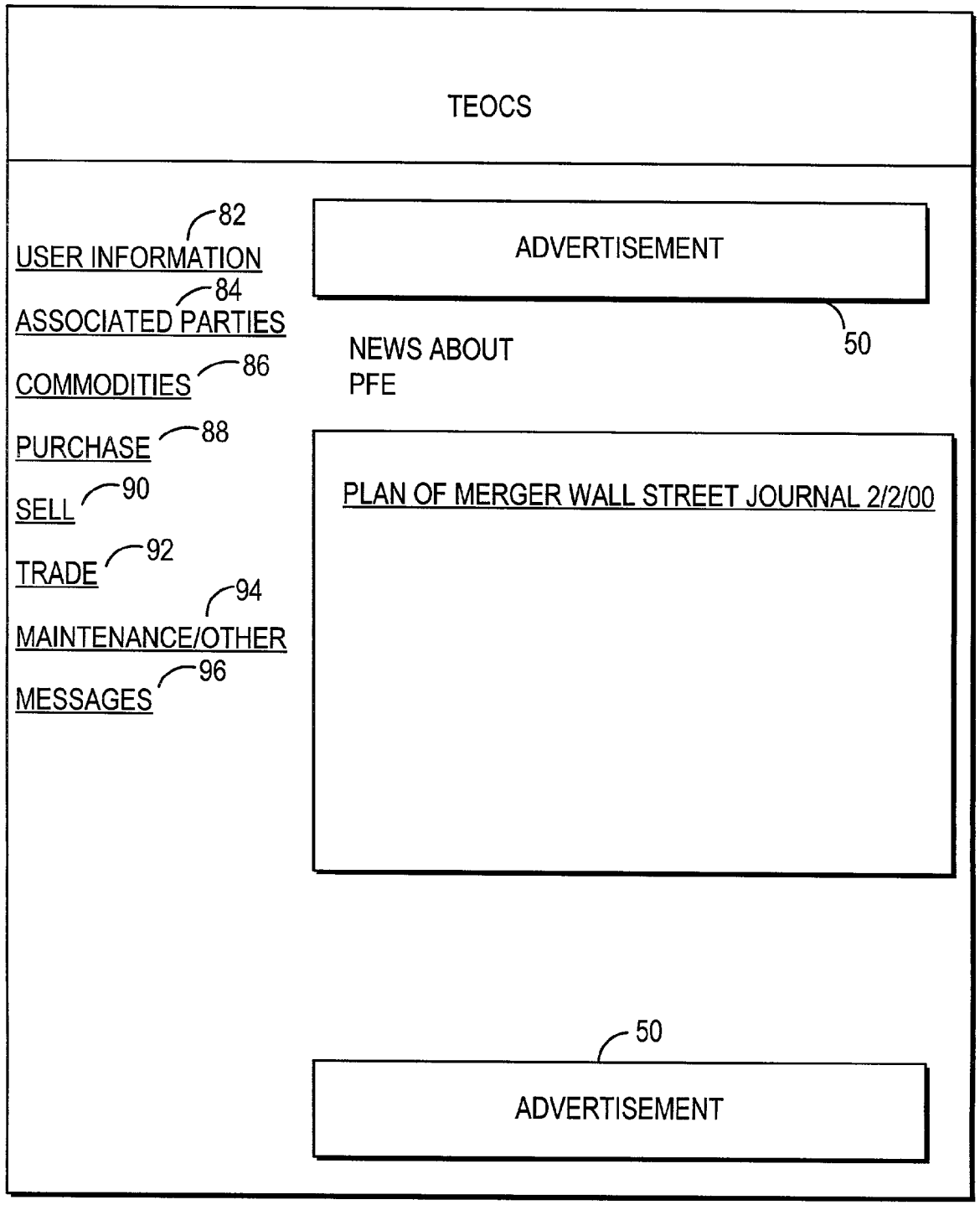
FIG. 28b shows an illustrative additional news page that the system may provide in response to a user indicating a desire to view additional news for a commodity, in accordance with the present invention.
Figure 28C:
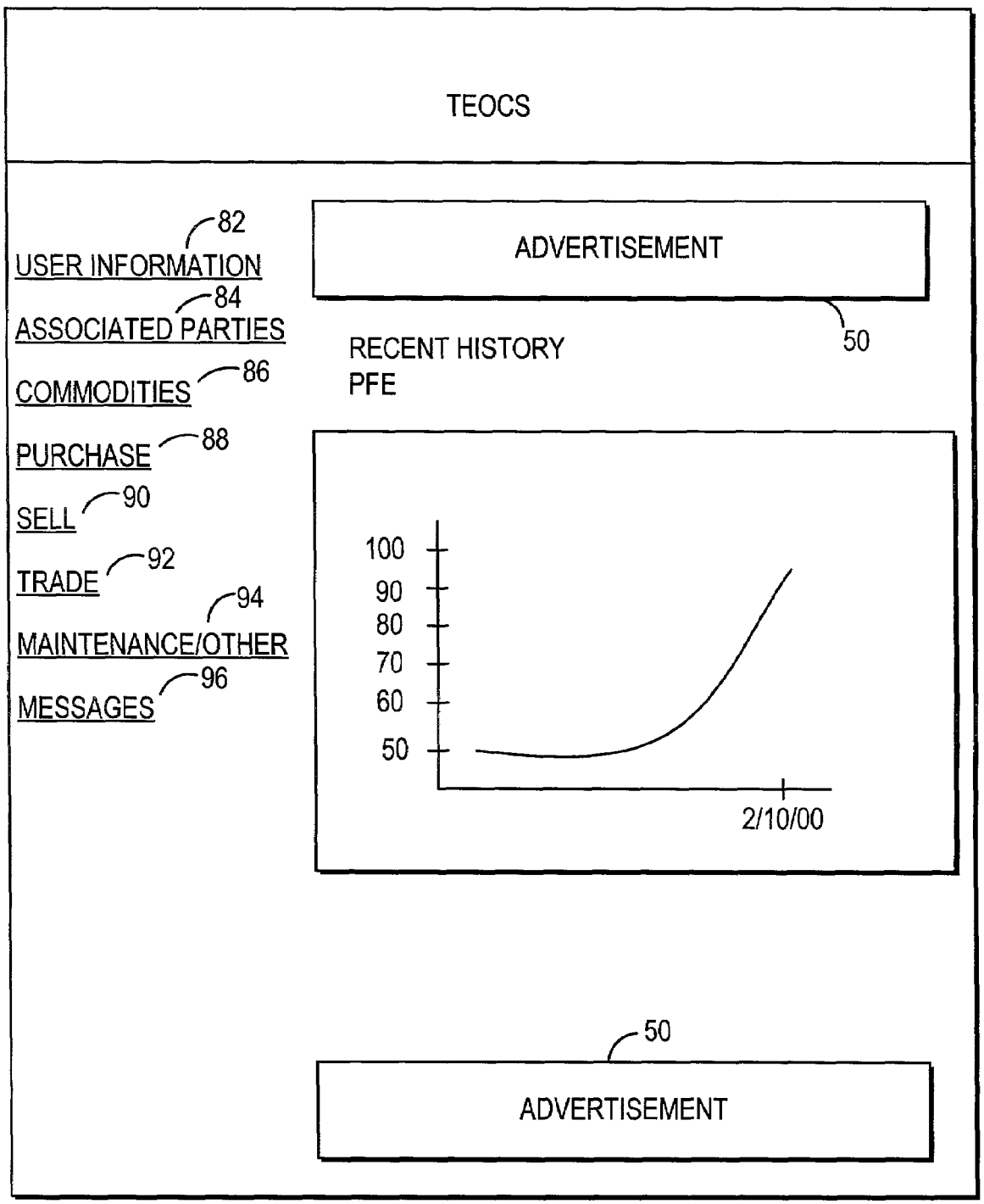
FIG. 28c shows an illustrative price history page that the system may provide in response to a user indicating a desire to view the recent price history for a commodity, in accordance with the present invention.
Figure 28D:
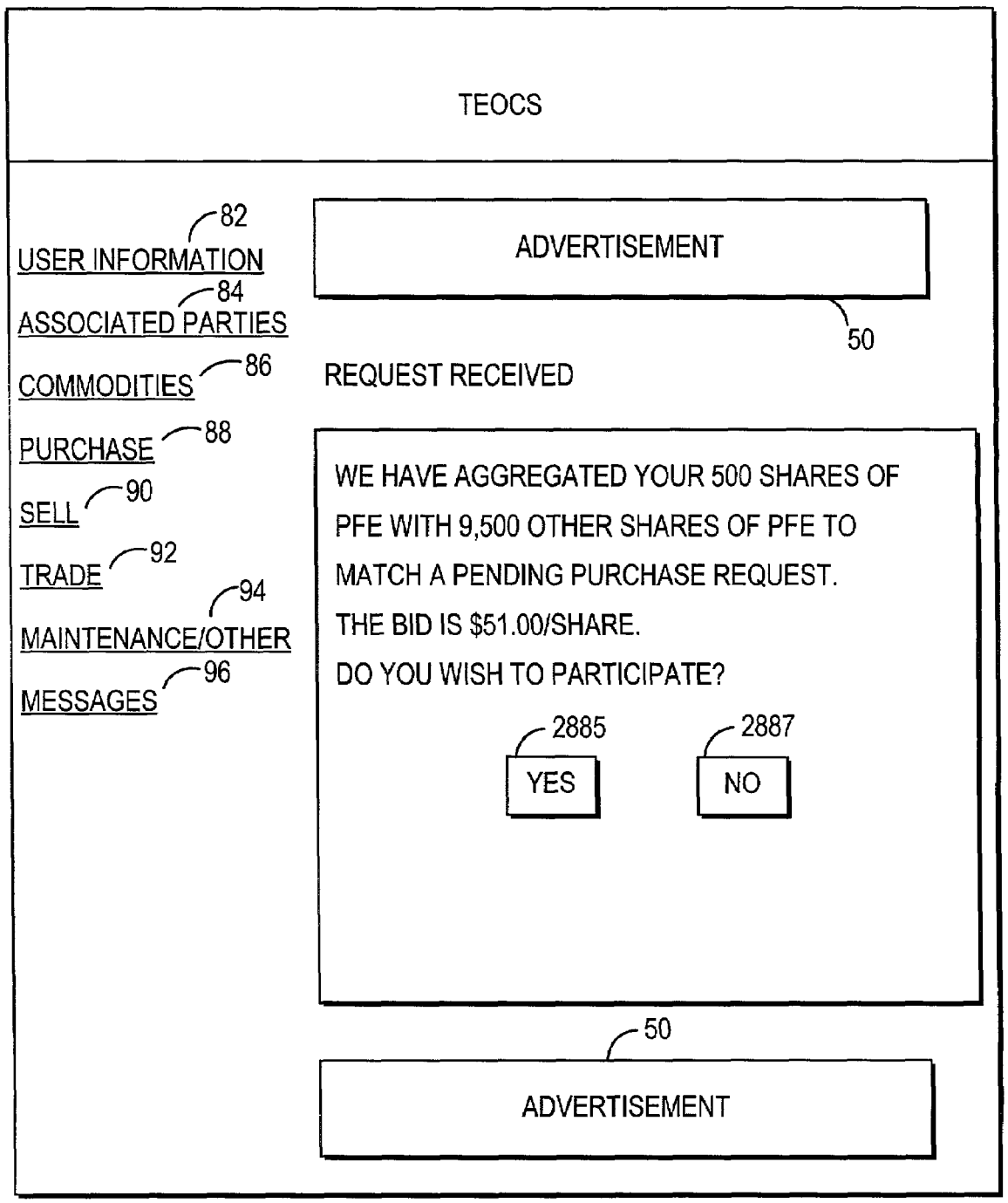
FIG. 28d shows an illustrative request received page that the system may provide in response to a user indicating a desire to view received requests for a commodity, in accordance with the present invention.

An illustrative commodities information page 2800 that the system may display in response to a user selecting the link for commodity PFE is shown in FIG. 28a. Commodities information page 2800 may display the type of commodity for which information is displayed. In this example, the type of commodity displayed is a stock. Other information related to stocks may be displayed, such as the full name of the stock, how many shares are owned, the price paid per-share, and the current market price. The current price may be determined and displayed using any suitable approach and frequency. Page 2800 may provide users with an opportunity to edit commodity information by, for example, selecting button 2807 and editing the information.

Page 2800 may also provide a user with an opportunity to access additional information and features related to the commodity. The user may, for example, access recent news about the stock, see its recent price history, sell all or some of the stock (discussed below), or trade the stock. If purchase or trade requests have been matched to the commodity, the system may provide the user with an opportunity to view the bids. Users may indicate a desire to, for example, view news about the stock by selecting link 2805. In response, the system may provide a news page, such as illustrative news page 2850 of FIG. 28b. Users may view articles by, for example, selecting their links. In this example, only one article for commodity PFE is available. Users may indicate a desire to, for example, view the recent price history of a stock by selecting link 2810 (FIG. 28a). In response, the system may provide a price history page, such as illustrative price history page 2875 of FIG. 28c. In this example, the price history is shown as a graph, but any suitable user interface element may be used.

Users may indicate a desire to view purchase or trade requests for the stock by, for example, selecting link 2815 (FIG. 28a). Link 2815 may not be displayed when there are no pending requests. In response to the user selecting link 2815, the system may display a request received page, such as illustrative request received page 2880 of FIG. 28d. The system may also provide request received page 2880 when, for example, the user selects indicator 1625 from page 1600 of FIG. 16a. In this example, the system has aggregated the user's shares to match a pending purchase request. The user may indicate a desire to accept or reject the pending request by, for example, selecting buttons 2885 or 2887, respectively.

Figure 29A:
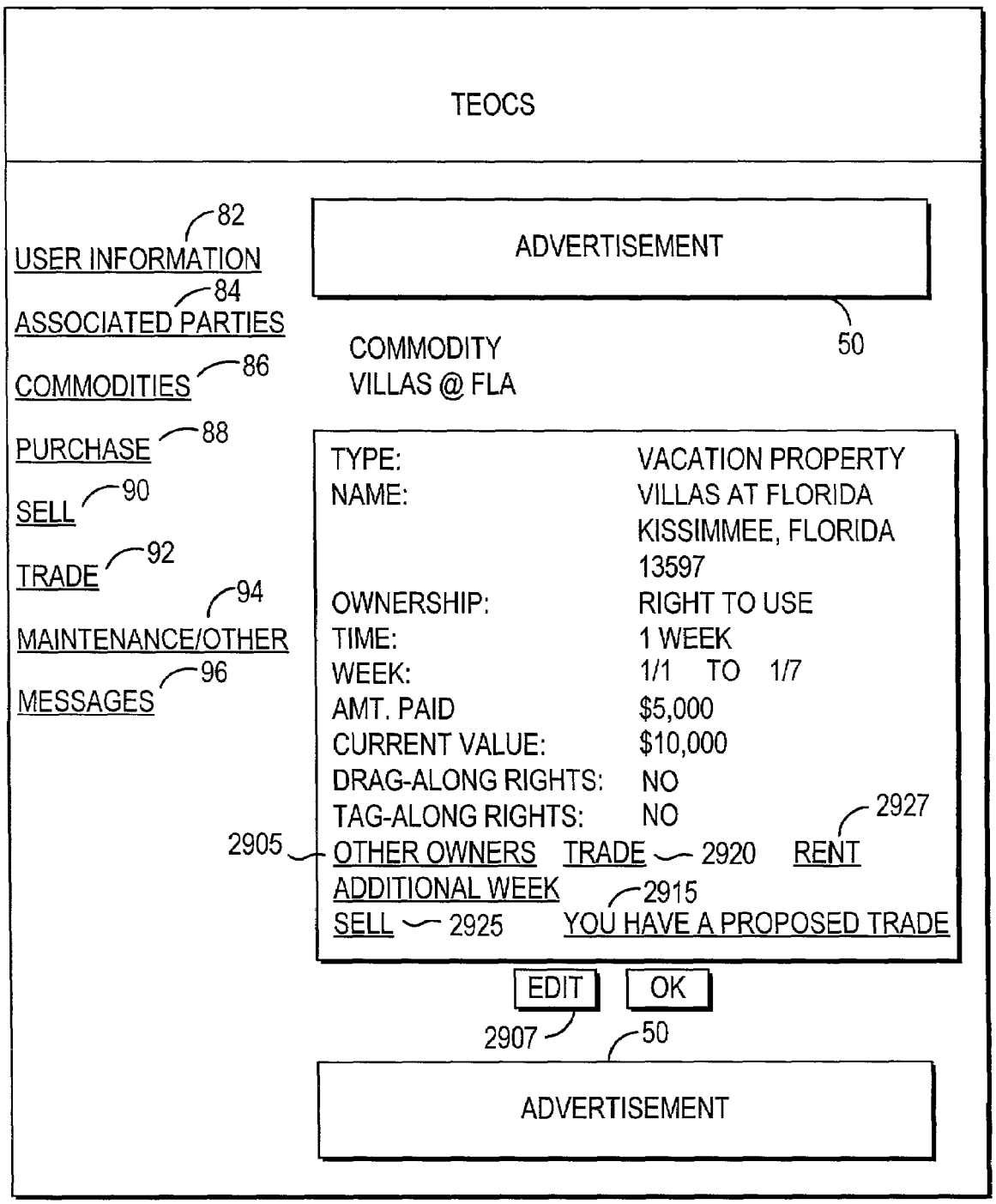
FIG. 29a shows an illustrative commodities information page for right-to-use vacation property, in accordance with the present invention.
Figure 29B:
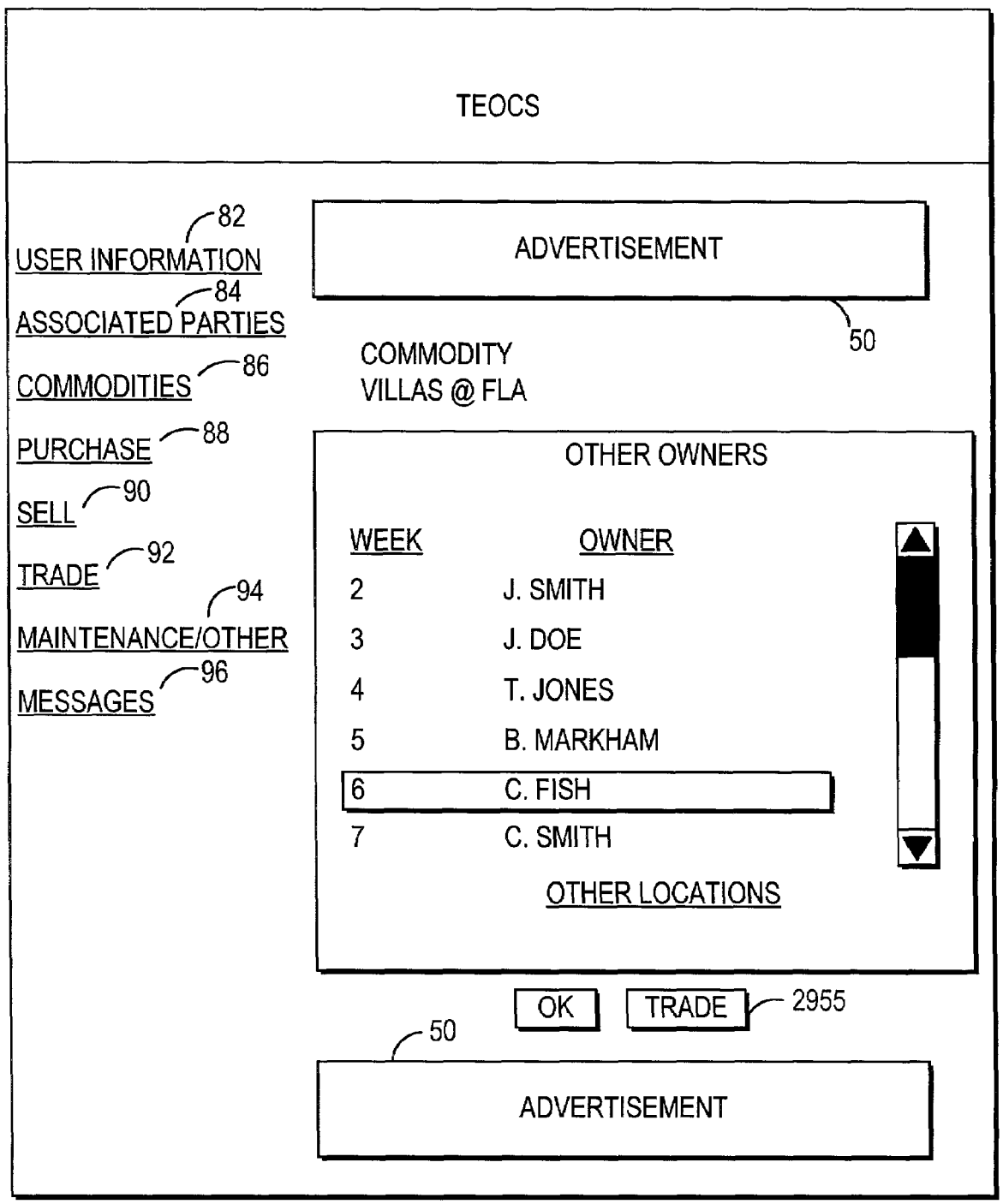
FIG. 29b shows an illustrative co-owners page that the system may provide in response to a user indicating a desire to view co-owners for a commodity, in accordance with the present invention.
Figure 29C:
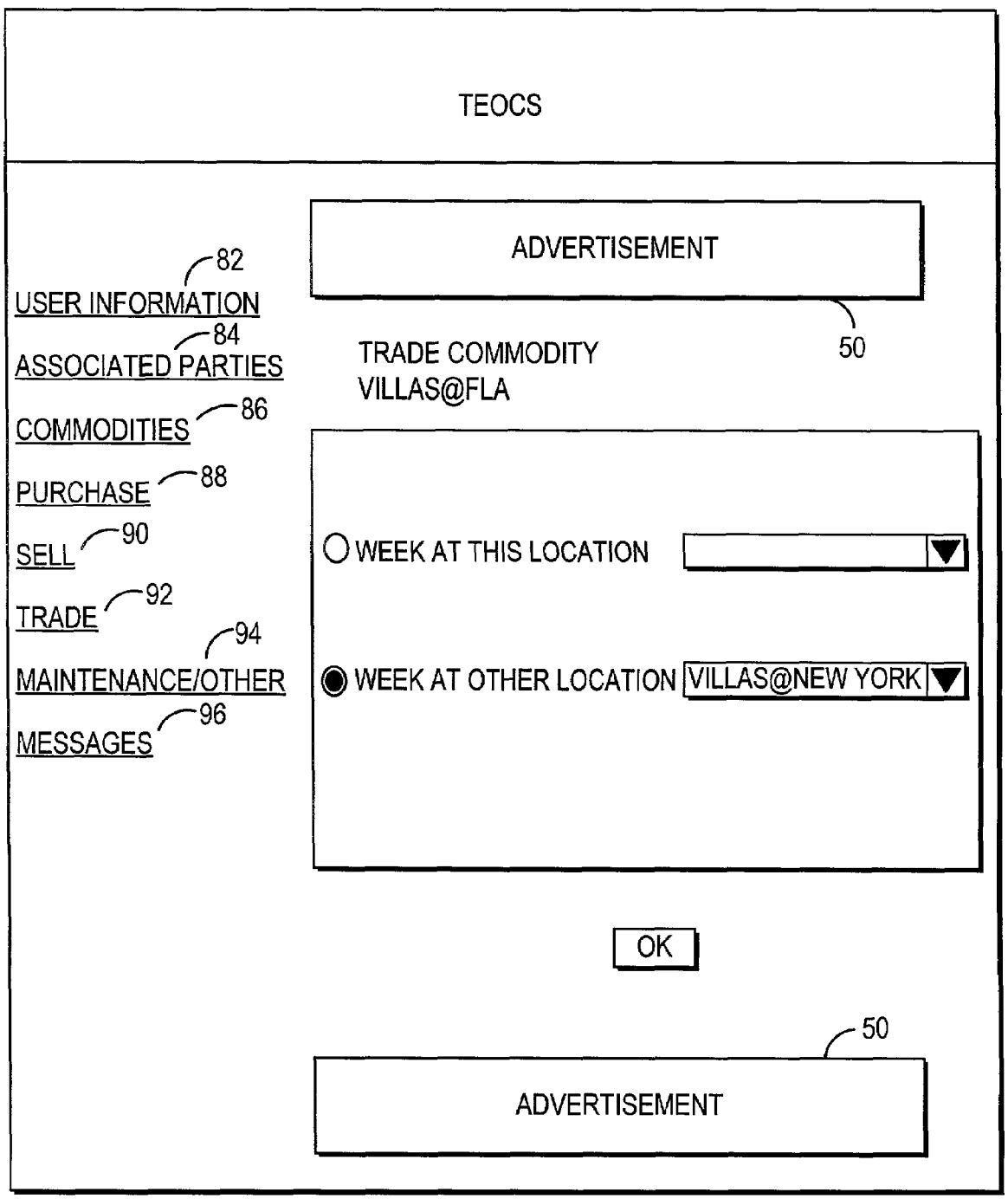
FIGS. 29c and 29d show pages that the system may provide in response to a user indicating a desire to trade a commodity, in accordance with the present invention.
Figure 29D:
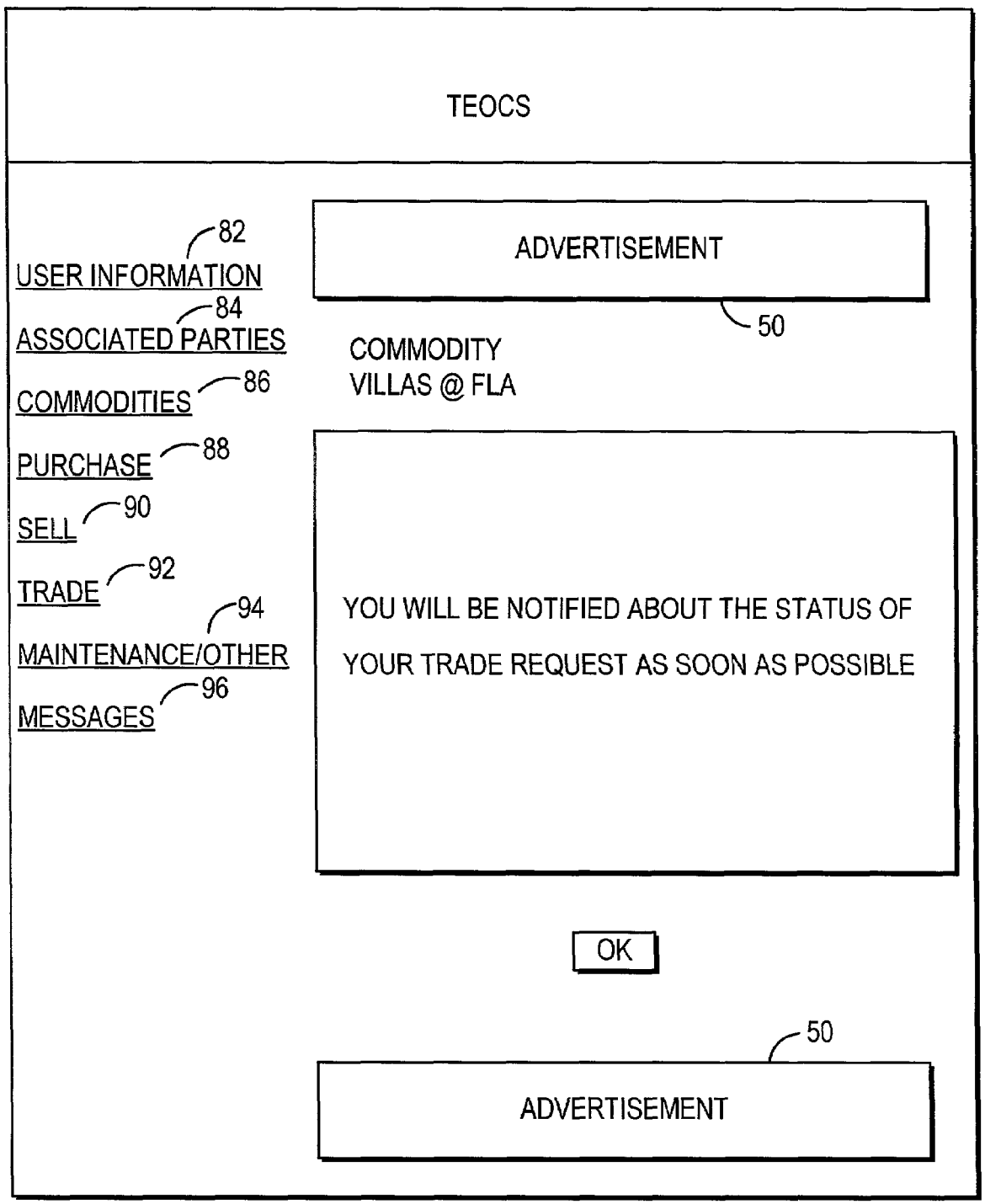
Figure 29E:
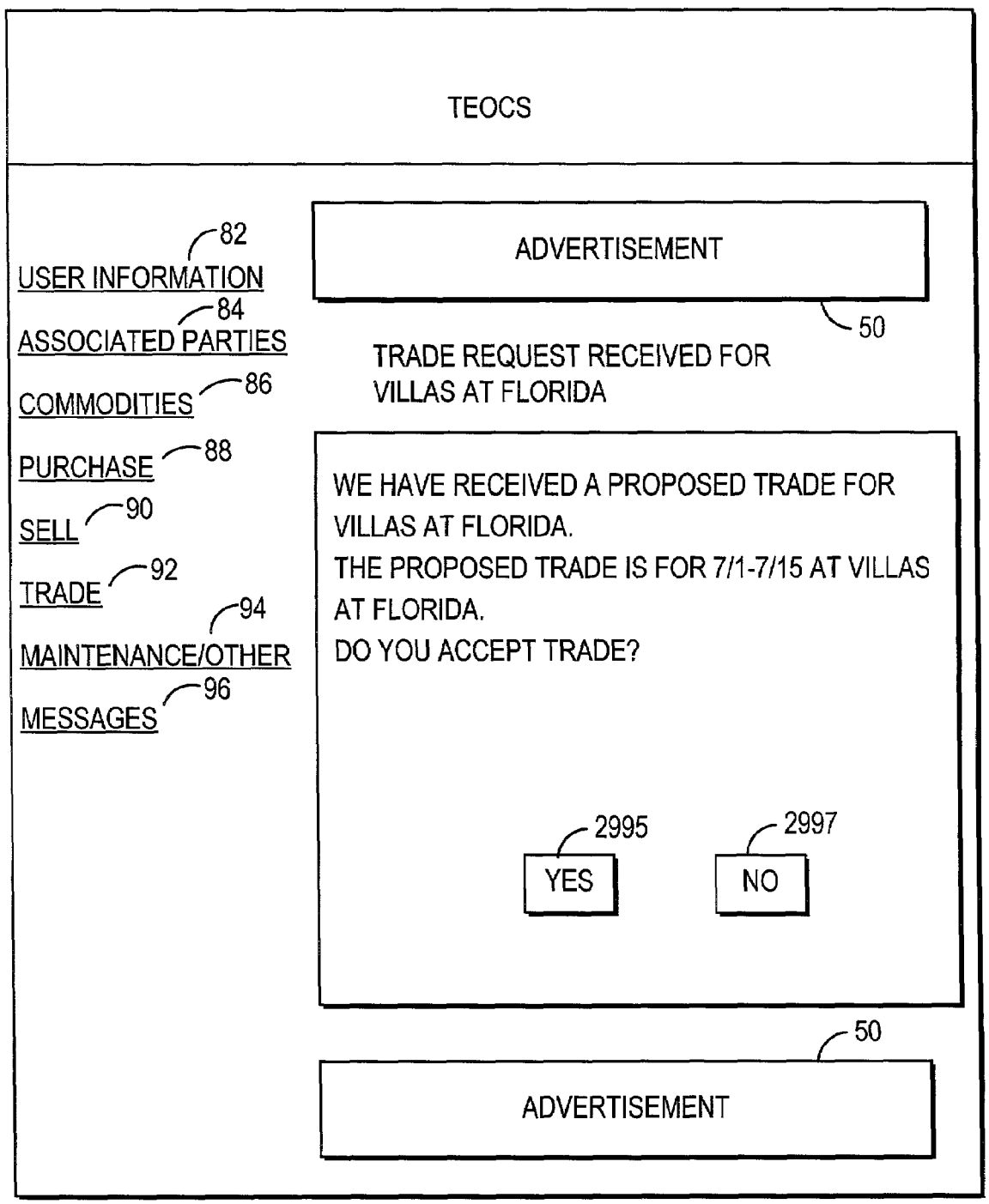
FIG. 29e shows an illustrative request received page that the system may provide in response to a user indicating a desire to view received requests for a commodity, in accordance with the present invention.

An illustrative commodities information page 2900 that the system may display in response to a user selecting the link for commodity Villas@fla from page 1600 of FIG. 16a is shown in FIG. 29a. Commodities information page 2900 may display the type of commodity for which information is displayed. In this example, the type of commodity displayed is vacation property. Other information related to vacation property may be displayed, such as the full name of the property, how it is owned or used by the user, the amount time for which it is owned or used, the time period during which it is owned or used, the amount paid, the current value, whether there are drag-along or tag-along rights, or any other suitable information. The current value may be determined and displayed using any suitable approach and frequency. Page 2900 may provide a user with an opportunity to edit commodity information by, for example, selecting button 2907 and editing the information.

Page 2900 may also provide a user with an opportunity to access additional information and features related to the commodity. The user may, for example, view co-owners, rent or buy additional time, sell the commodity, or trade the commodity. If purchase or trade requests have been received, the system may provide the user with an opportunity to view the requests. Users may indicate a desire to, for example, view co-owners by selecting link 2905. In response, the system may provide a co-owners page, such as illustrative co-owners page 2950 of FIG. 29b. Co-owners page 2950 may list the co-owners of the property for other weeks. In this example, the user has only a right to use the property. Co-owners may include other similar co-owners, or co-owners with other ownership rights (e.g., deeded weeks). Co-owners page 2950 may provide the user with an opportunity to view co-owners for other locations.

The system may provide the user with an opportunity to generate trade requests for other weeks by, for example, allowing the user to select a week and pressing button 2955. In response, the system may provide a trade request page, such as illustrative page 2975 of FIG. 29c. Page 2975 may also be provided in response to, for example, a user selecting link 2920 from page 2900 of FIG. 29a. In this example, a user may define a trade request by, for example, selecting a particular week at the current location or selecting a week at some other location. In response to a user defining a trade request, the system may indicate to the user that the user will be notified whether the trade request is accepted as shown, for example, in FIG. 29d.

Returning to the illustrative commodities information page of FIG. 29a, users may indicate a desire to view purchase or trade requests for the commodity by, for example, selecting link 2915. If desired, link 2915 may not be displayed when there are no requests. In response to the user selecting link 2915, the system may display a request received page, such as illustrative request received page 2990 of FIG. 29e. The system may also provide illustrative request received page 2990 in response to a user selecting indicator 1650 from page 1600 of FIG. 16a. In this example, the system has matched a trade request for two different weeks at the same location to the user's commodity. The user may indicate a desire to accept or reject the pending trade request by, for example, selecting buttons 2995 or 2997, respectively. In response to the user accepting the bid, the system may initiate the trade.

Figure 30A:
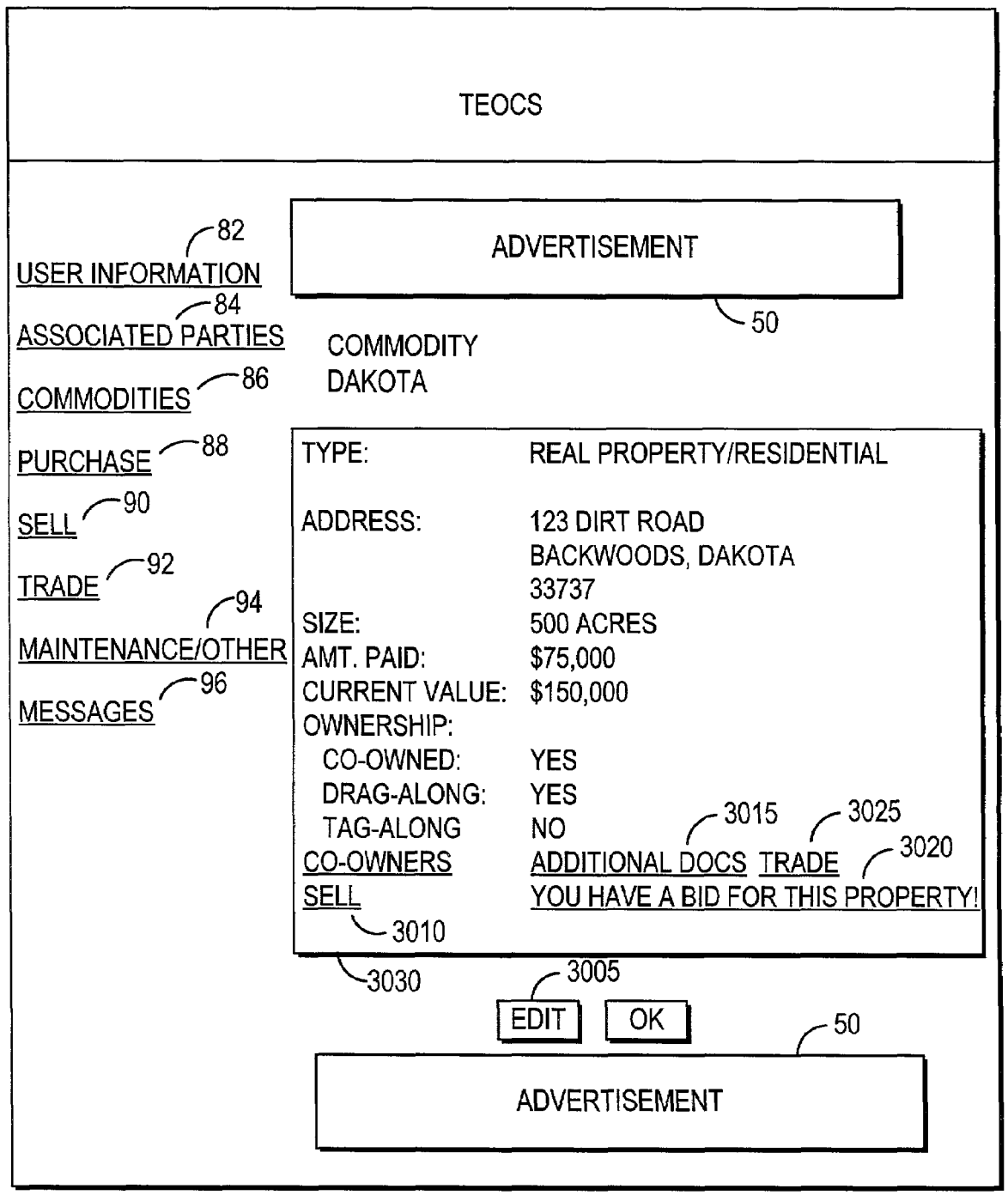
FIG. 30a shows an illustrative commodities information page for co-owned residential real property with drag-along rights, in accordance with the present invention.
Figure 30B:
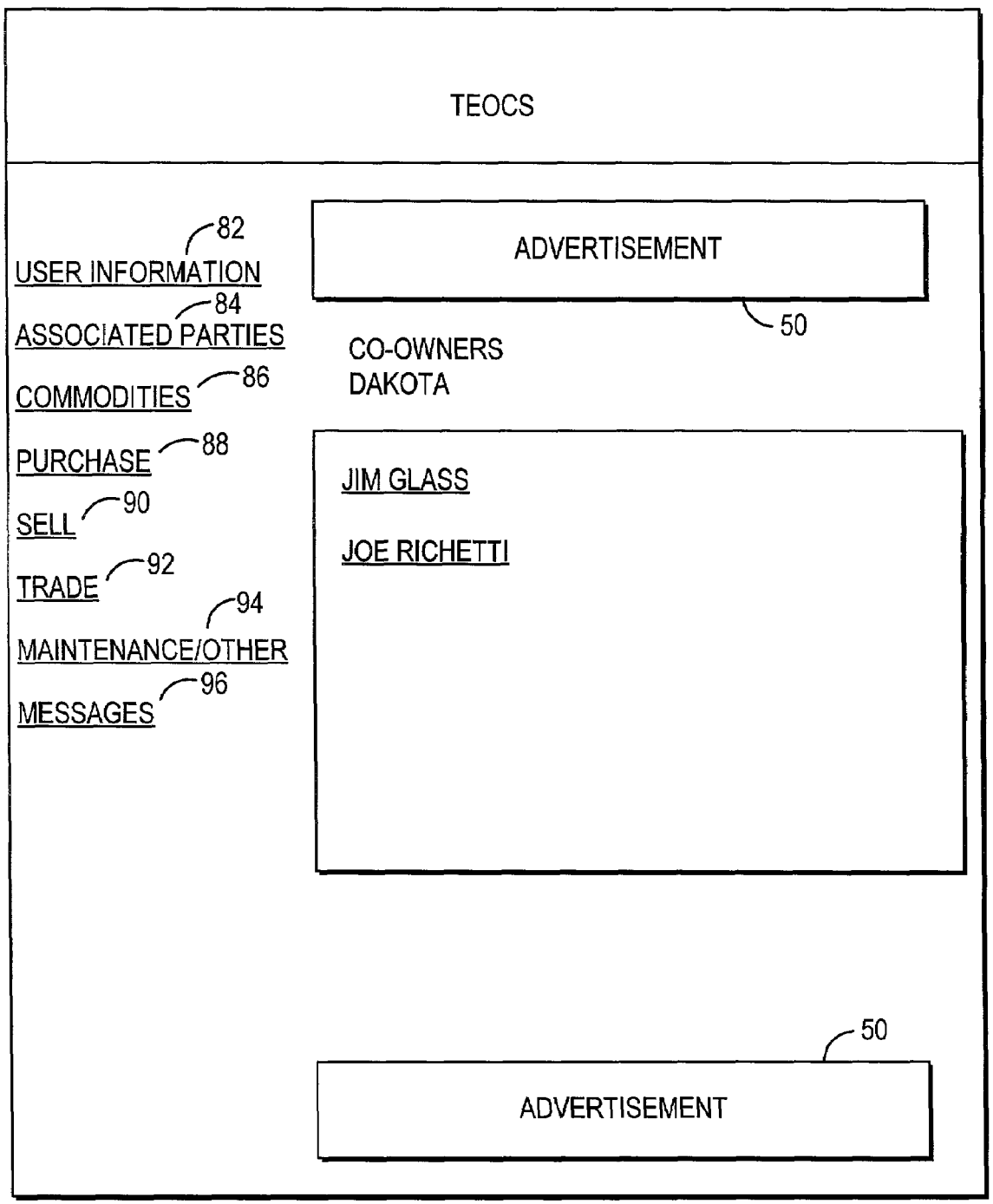
FIG. 30b shows an illustrative co-owners page that the system may provide in response to a user indicating a desire to view co-owners for a commodity, in accordance with the present invention.

An illustrative commodities information page 3000 that the system may display in response to a user selecting the link for commodity Dakota from page 1600 of FIG. 16a is shown in FIG. 30a. Commodities information page 3000 may display the type of commodity for which information is displayed. In this example, the type of commodity displayed is residential property. Other information related to residential property may be displayed, such as the full name of the property, its size, the amount paid, the current value, how it is owned or used by the user, whether there are drag-along or tag-along rights, or any other suitable information. The current value may be determined and displayed using any suitable approach and frequency. Page 3000 may provide users with an opportunity to edit commodity information by, for example, selecting button 3005 and editing the information.

Figure 30C:
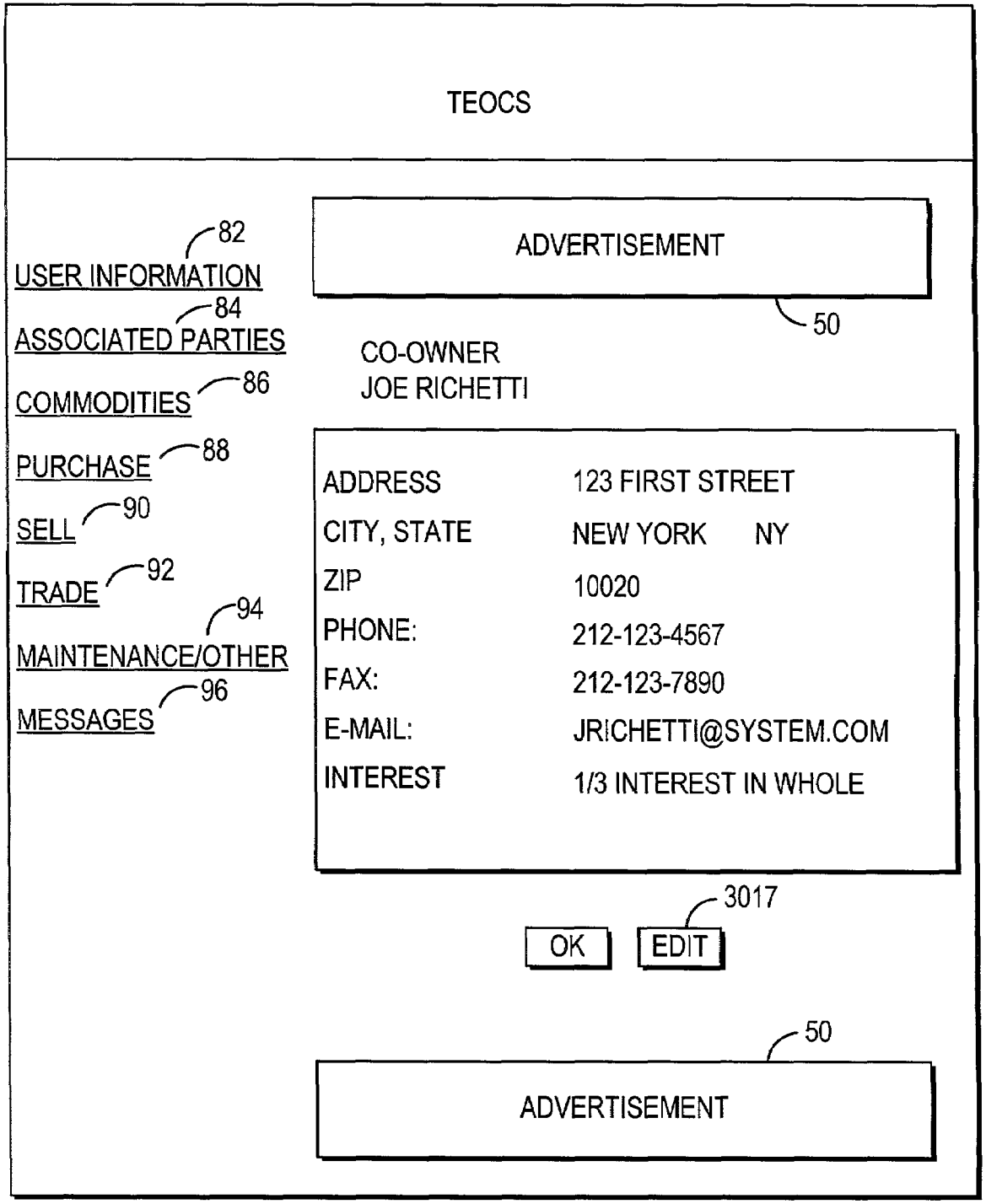
FIG. 30c shows an illustrative co-owner information page that the system may provide in response to a user indicating a desire to view information about a co-owner, in accordance with the present invention.
Figure 30D:
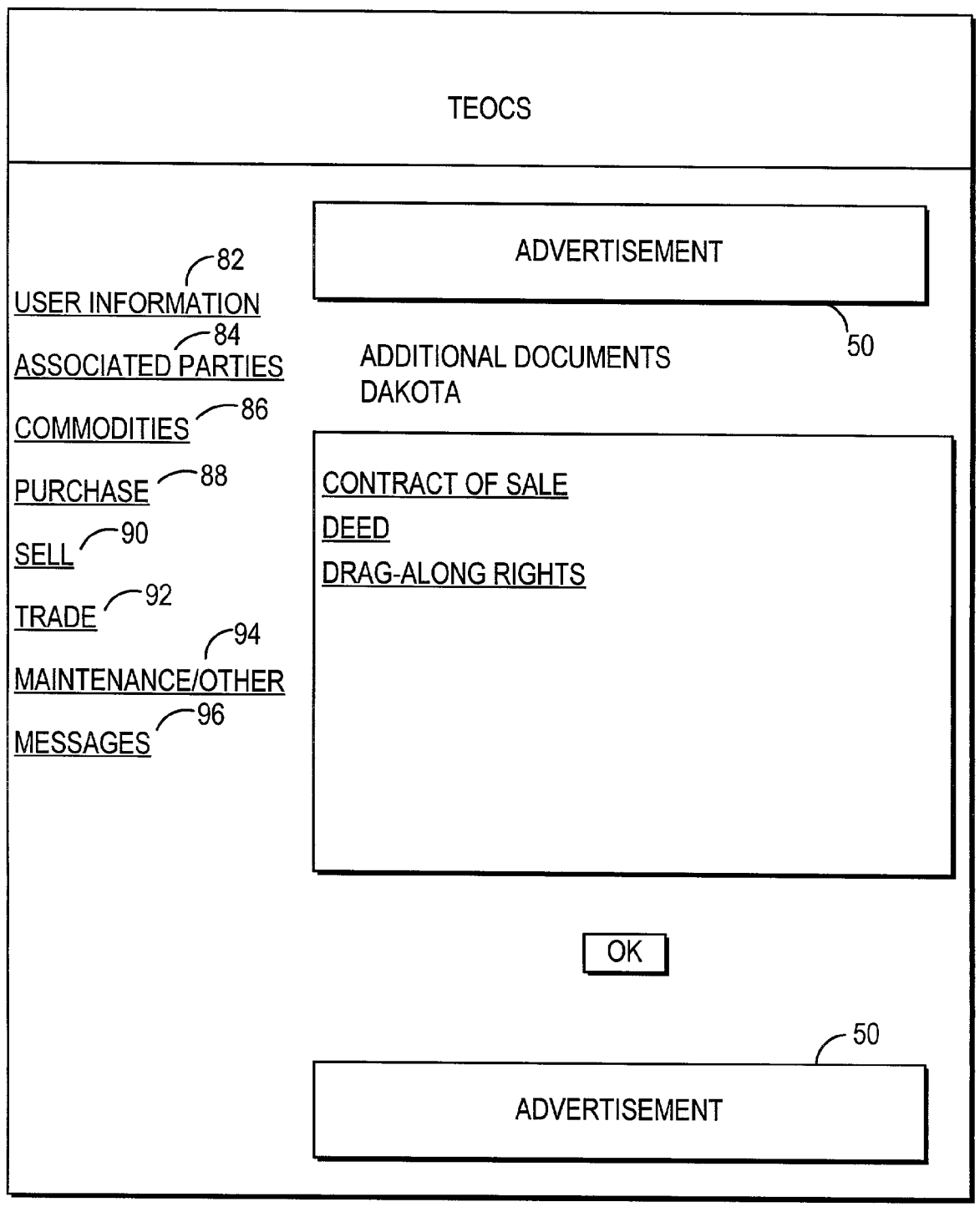
FIG. 30d shows a page that the system may provide in response to a user indicating a desire to view additional documents for a commodity, in accordance with the present invention.
Figure 30E:
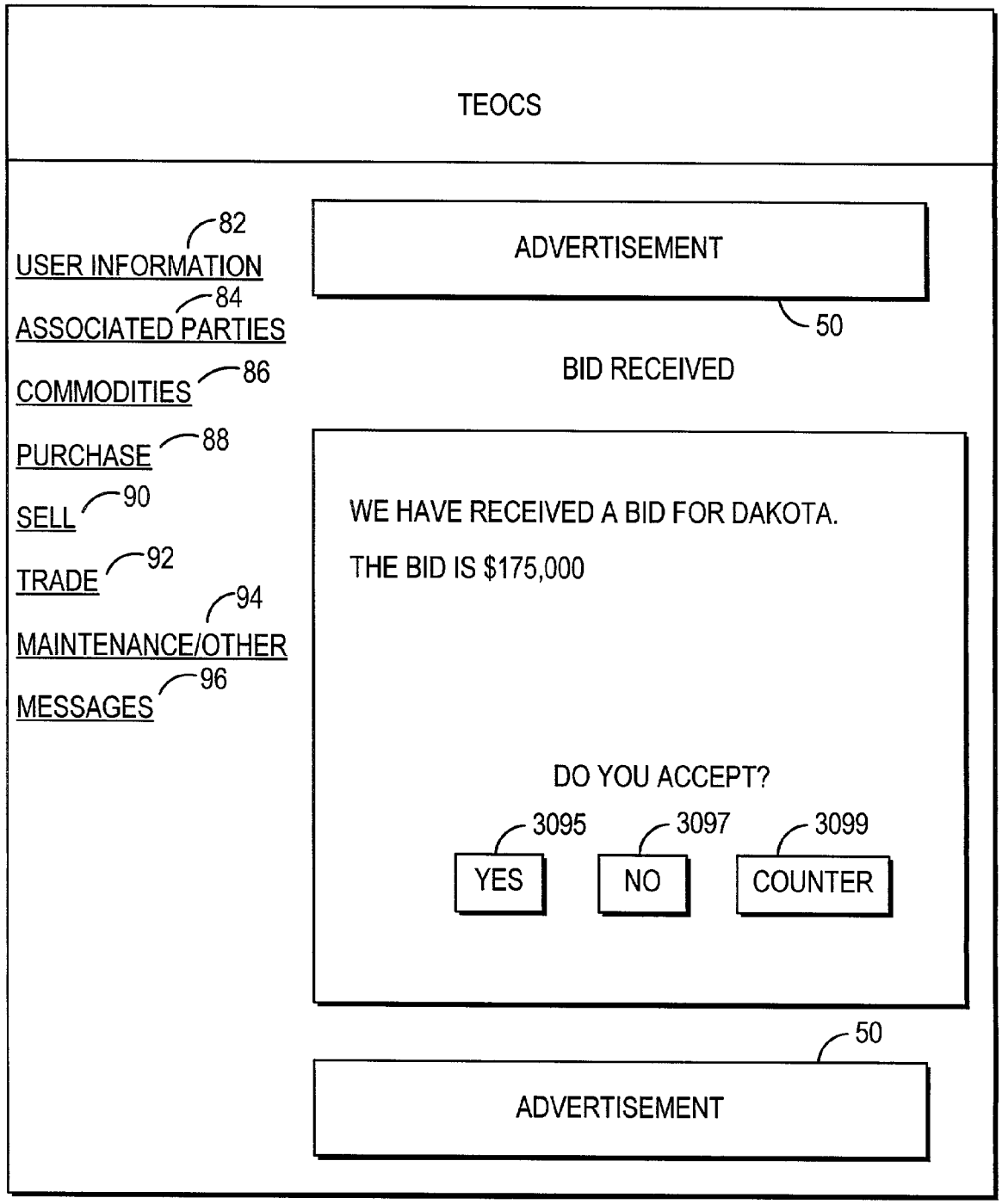
FIG. 30e shows an illustrative request received page that the system may provide in response to a user indicating a desire to view received requests for a commodity, in accordance with the present invention.

Page 3000 may also provide a user with an opportunity to access additional information and features related to the commodity. The user may, for example, view co-owners, view additional documents, sell the property, or trade the property. If purchase or trade bids have been received, the system may provide the user with an opportunity to view the bids. Users may indicate a desire to view co-owners by, for example, selecting link 3010. In response, the system may provide a co-owners page, such as illustrative co-owners page 3050 of FIG. 30b. Users may select a link for a co-owner to view information regarding the co-owner. In this example, assume the user has selected the link for Joe Richetti. The system may display additional information for the co-owner, and provide the user with an opportunity to edit the information, as shown in FIG. 30c (e.g., by pressing button 3017).

The system may provide a user with an opportunity to view additional documents related to a commodity. In this example, the user may indicate a desire to view additional documents by, for example, selecting link 3015 from page 3000 of FIG. 30a. In response, the system may provide an additional documents page, such as illustrative documents page 3070 of FIG. 30d. Documents page 3070 may list available documents and provide the user with an opportunity to view one or more documents. A user may indicate a desire to view a related document by, for example, selecting the document's link. In response, the system may provide the document for viewing by the user. In practice, the user's web browser may launch a viewer suitable for displaying the document (e.g., a Microsoft Word viewer, an Adobe Acrobat viewer, etc.). The system or the viewer may provide the user with an opportunity to print the related document.

Returning to the illustrative commodities information page 3000 of FIG. 30a, a user may indicate a desire to view purchase or trade requests for the commodity by, for example, selecting link 3020. If desired, link 3020 may not be displayed when there are no bids. In response to the user selecting link 3020, the system may display a bid received page, such as illustrative bid received page 3070 of FIG. 30e. The system may also provide illustrative bid received page 3070 in response to a user selecting indicator 1627 from page 1600 of FIG. 16a. In this example, the system has matched a purchase request for Dakota. The user may indicate a desire to accept or reject the pending purchase request by, for example, selecting buttons 3095 or 3097, respectively. The user may make a counter offer by, for example, pressing button 3099. If desired, the power plant itself may be a commodity. A user could have a fractional ownership interest in either or both. In response to the user accepting the bid, the system may initiate the transfer of ownership from the user to the bidder or bidders.

Figure 31A:
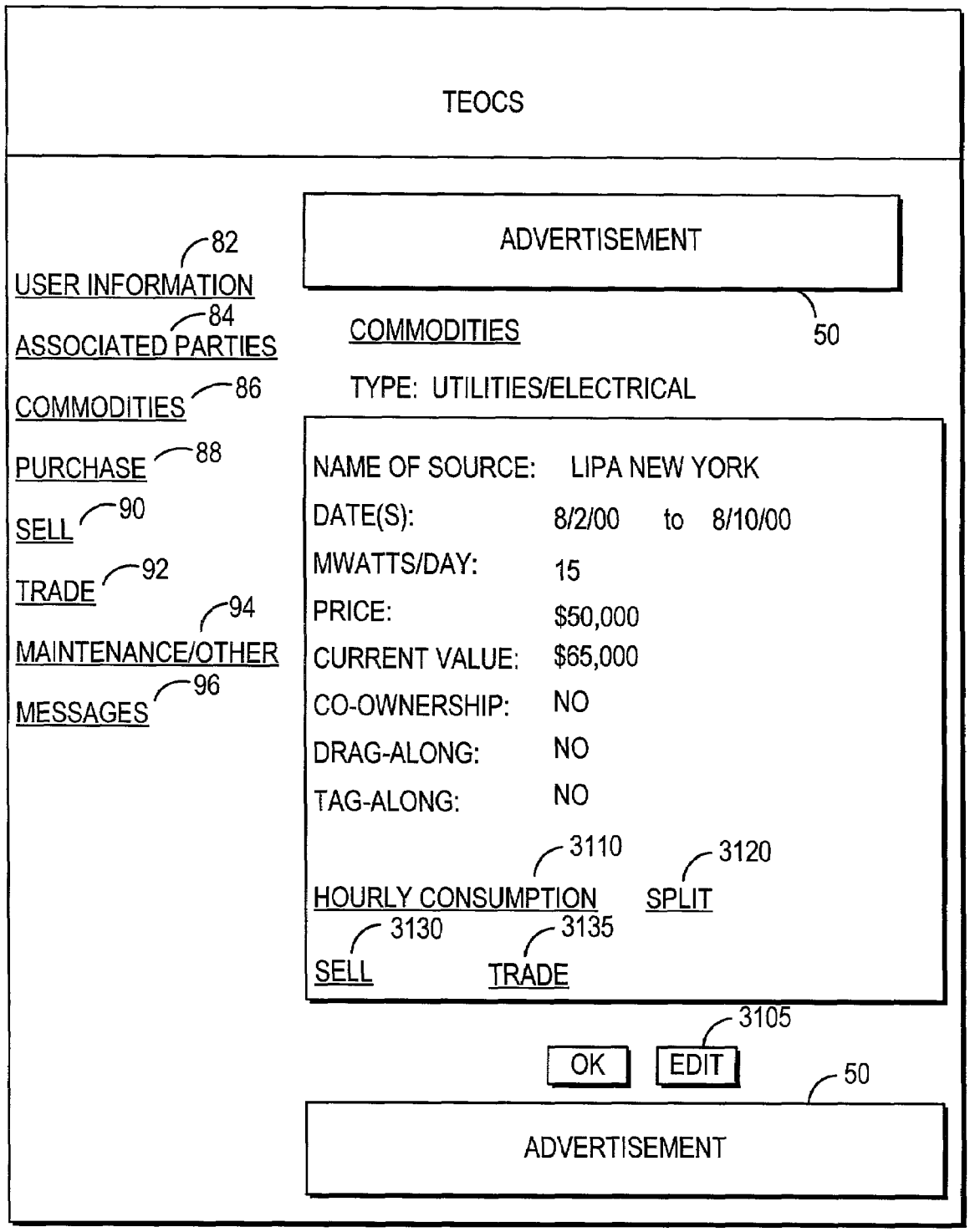
FIG. 31a shows an illustrative commodities information page for commodities of the type utilities/electrical, in accordance with the present invention.

An illustrative commodities information page 3100 that the system may display in response to a user selecting the link for commodity LIPA from page 1600 of FIG. 16a is shown in FIG. 31a. In this example, commodity information may have been obtained or generated when the user acquired the commodity using the system. Commodities information page 3100 may display the type of commodity for which information is displayed. In this example, the type of commodity displayed is utilities/electrical. That is, the commodity is the output of a power plant. Other information related to the utility may be displayed, such as the dates between which the user owns output from the source, the amount of output, the price paid, current value, whether there are drag-along or tag-along rights associated with a commodity, or any other suitable information. The current value may be determined and displayed using any suitable approach and frequency. Page 3100 may provide users with an opportunity to edit commodity information by, for example, selecting edit button 3105 and editing the information.

Page 3100 may also provide a user with an opportunity to access additional information and features related to the commodity. The user may, for example, view and edit the hourly consumption of the user within each day of output. If purchase or trade bids have been received, the system may provide the user with an opportunity to view the bids. Users may indicate a desire to view hourly consumption by, for example, selecting link 3110. In response, the system may provide an hourly consumption page, such as illustrative hourly consumption page 2470 of FIG. 24c.

Figure 31B:
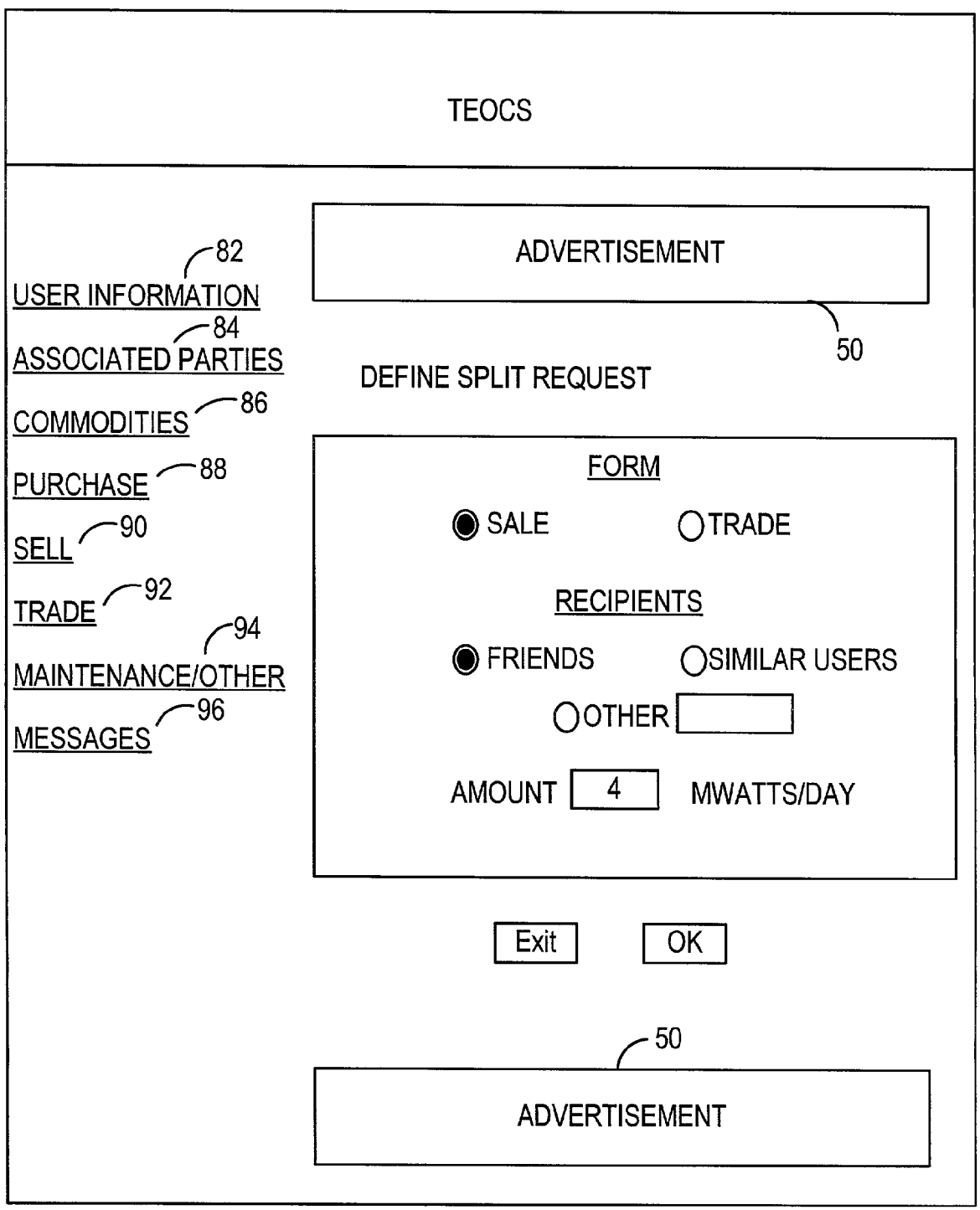
FIGS. 31b and 31c show illustrative pages that the system may provide in response to a user indicating a desire to split a commodity, in accordance with the present invention.
Figure 31C:
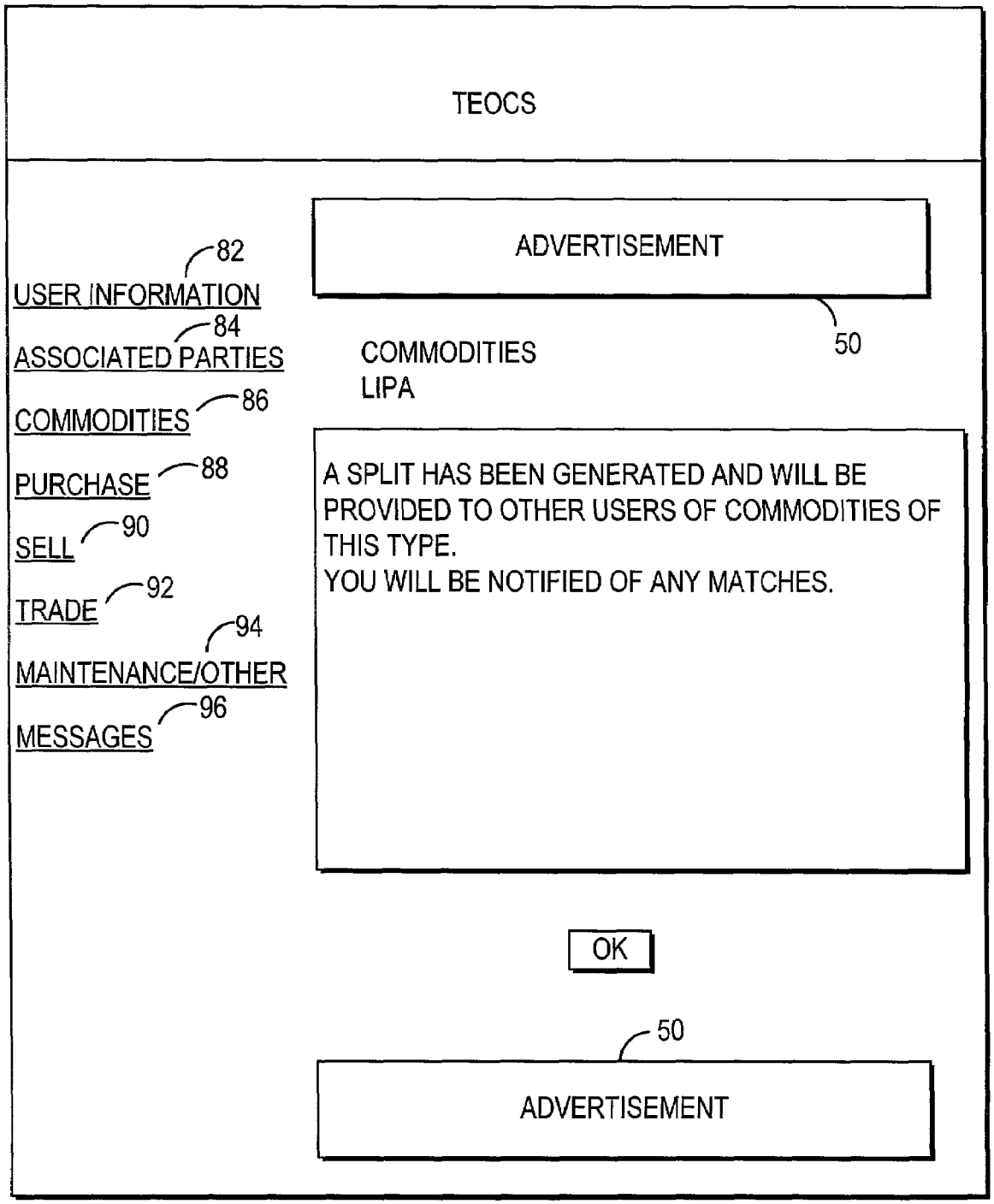

This example illustrates another feature of the system that may be provided within any commodity information page or other page. The system may provide users with an opportunity to split off their commodities. Users may desire to split off their commodities when, for example, the user has purchased an amount of the commodity that the user cannot exhaust. A split request may be issued to other users, other users of the same commodity, friends, or any other suitable set of users or non-users, and may indicate that the user wishes to sell or trade off some amount of an unused commodity. Users may indicate a desire to split off a commodity by, for example, selecting link 3120. In response, the system may provide a split page that provides the user with an opportunity to define a split request. An illustrative split page 3150 is shown in FIG. 31*b*. The system may provide the user with an opportunity to designate recipients of the request, the form of the request (i.e., sale or trade), and any other suitable information. In response to the user defining the split request, the system may indicate to the user that the user will be notified whether the split request has been accepted or countered as shown, for example, in page 3175 of FIG. 31*c*. In response to a split request being accepted or a counter bid received and accepted, the system may initiate the transfer of ownership or trade of the split-off amount of the commodity.

Figure 32:
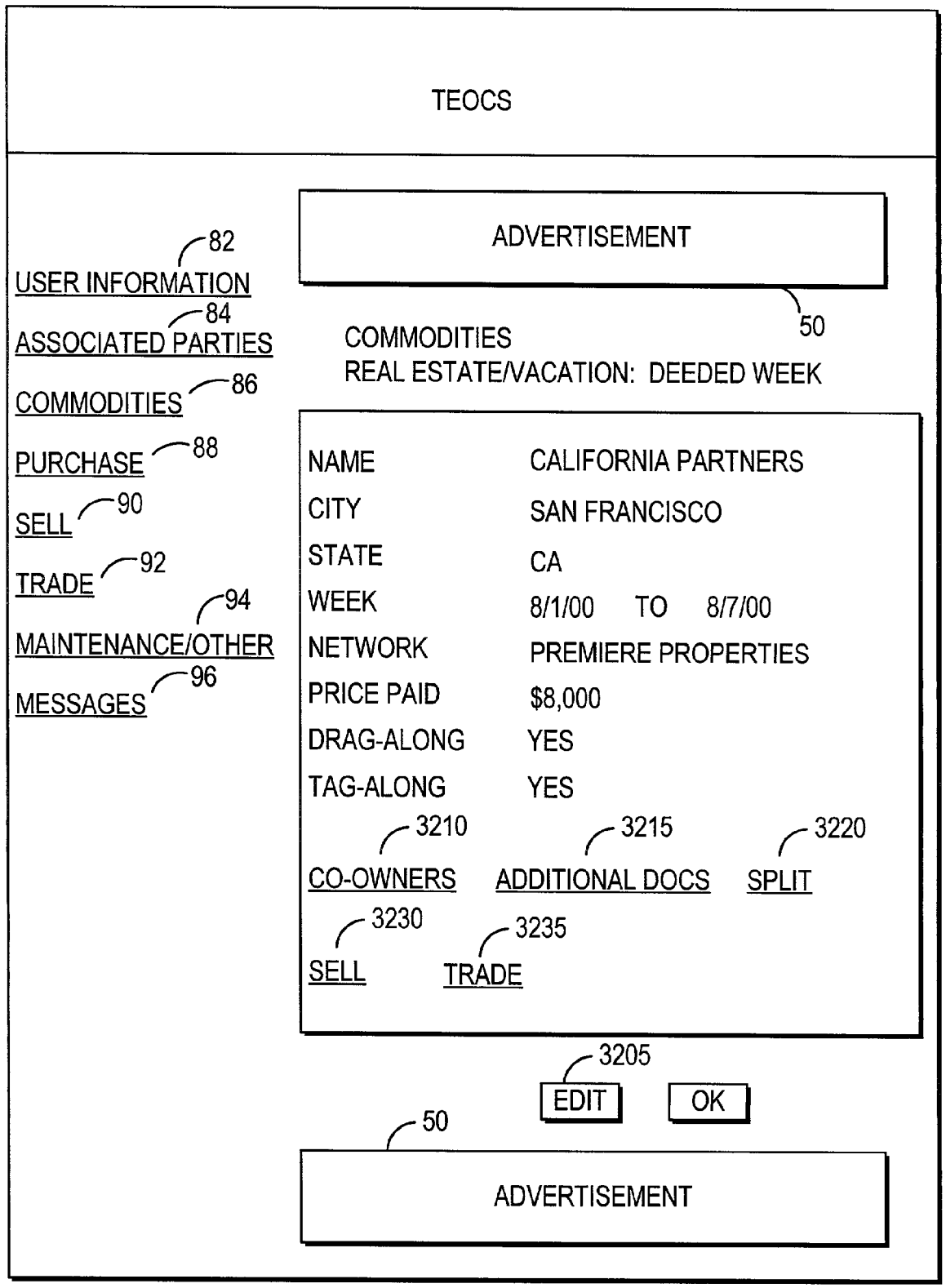
FIG. 32 shows an illustrative commodities information page for deeded-week vacation property with drag-along and tag-along rights, in accordance with the present invention.

An illustrative commodities information page 3200 that the system may display in response to a user selecting the link for commodity California Partners from page 1600 of FIG. 16*a* is shown in FIG. 32. In this example, commodity information may have been obtained or generated when the user acquired the commodity using the system. Commodities information page 3200 may display the type of commodity for which information is displayed. In this example, the type of commodity displayed is vacation property with a deeded week form of ownership. Other information related to the vacation property may be displayed, such as the week of ownership, the network in which the property is managed, the price paid, the current value, whether there are drag-along or tag-along rights, or any other suitable information. The current value may be determined and displayed using any suitable approach and frequency. Page 3200 may provide the user with an opportunity to edit commodity information by, for example, selecting edit button 3205 and editing the information.

Page 3200 may also provide a user with an opportunity to access additional information and features related to the commodity. The user may, for example, view and edit co-owner information, or view or add additional related documents. In response to a user selecting link 3210, for example, the system may provide a co-owner page, such as illustrative page 2600 of FIG. 26. In this example, there are no additional documents for the user to select. The user may add documents by, for example, selecting link 3215. If purchase or trade requests have been received, the system may provide the user with an opportunity to view the requests. In this example, no requests have been received for commodity California Partners. The system may also provide users with an opportunity to split off some of the property by offering other users or nonusers the opportunity to buy-in to the property (e.g., by selecting link 3220).

Returning to FIG. 16*a*, the system may also provide users with opportunities to purchase commodities. Users may indicate a desire to purchase commodities by, for example, selecting link 88 from page 1600 or any page that includes link 88. The system may also provide users with links to purchase commodities from within other pages. Illustrative page 2800 of FIG. 28*a*, for example, illustrates how the system may provide users with an opportunity to purchase more of a type of commodity that the user already owns (e.g., by selecting link 2830). In response to the user indicating a desire to purchase commodities, the system may provide the user with an opportunity to select a commodity type as shown, for example, in page 3300 of FIG. 33*a*. In response to a user selecting a commodity type, the system may provide a specialized purchase page. In an alternative approach, the system may provide a specialized purchase page, or other suitable purchase page, directly in response to a user indicating a desire to purchase a commodity (e.g., by selecting a link 2830 of page 2800, or via some other link or suitable interface element).

For some types of commodities it may be desirable to provide additional pages to aid the user in selecting commodities the user wishes to purchase. It may be desirable, for example, to provide a source page of sources of a selected commodity type, such as illustrative source page 3350 shown in FIG. 33*b*. Source pages may list available sources and the current market price of the commodities they provide, or any other suitable information. The current market price may be determined and displayed using any suitable approach and frequency. Users may indicate a desire to generate purchase requests for a single source by, for example, selecting that source's link. Users may indicate a desire to generate purchase requests for all sources by, for example, selecting link 3355. In still another suitable approach, the system may provide a suitable interface element to allow the user to select a subset of sources (e.g., check boxes, text fields, etc.).

Figure 33A:
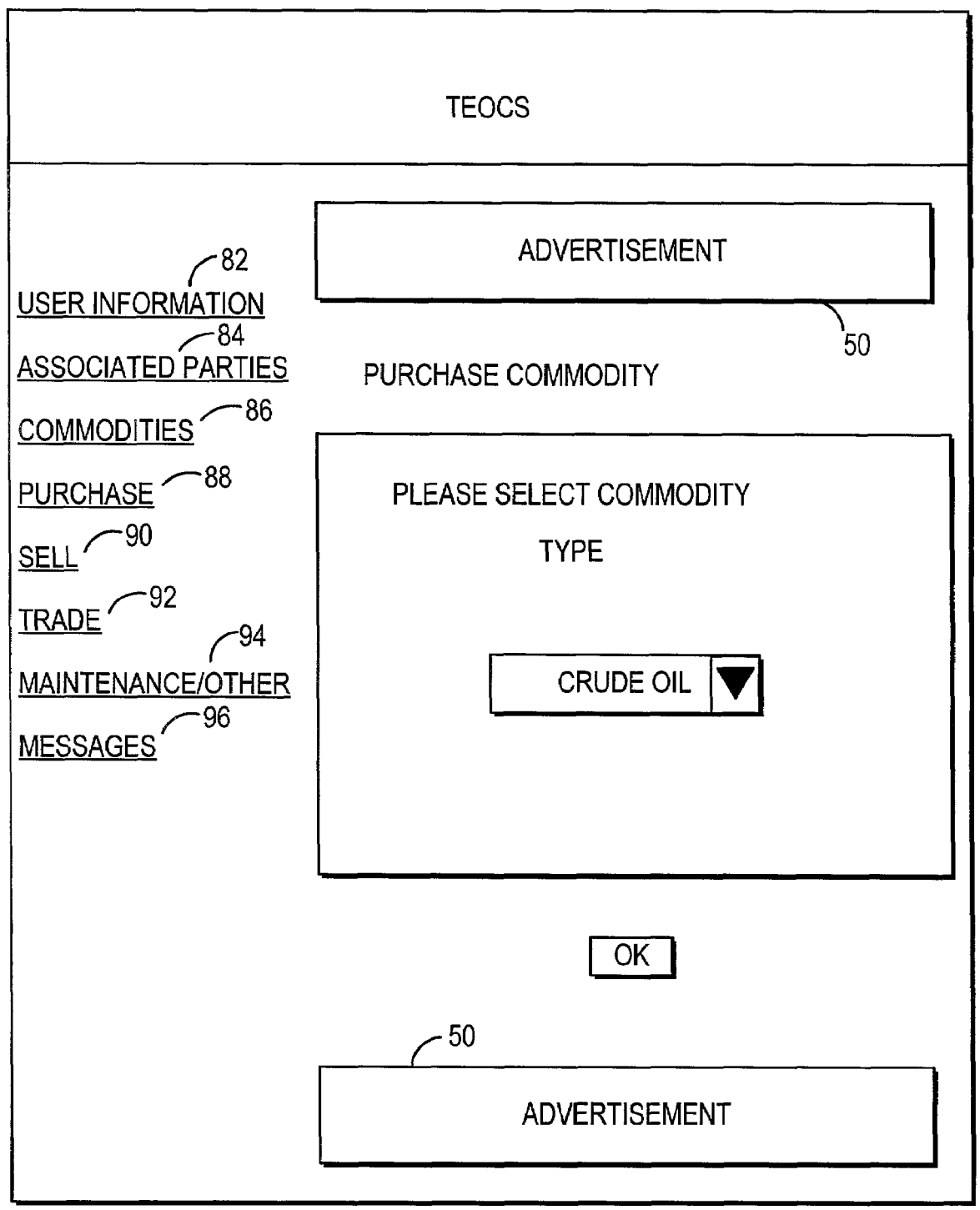
FIGS. 33a–33e show illustrative pages that the system may provide in response to a user indicating a desire to purchase a commodity, such as crude oil, in accordance with the present invention.
Figure 33B:
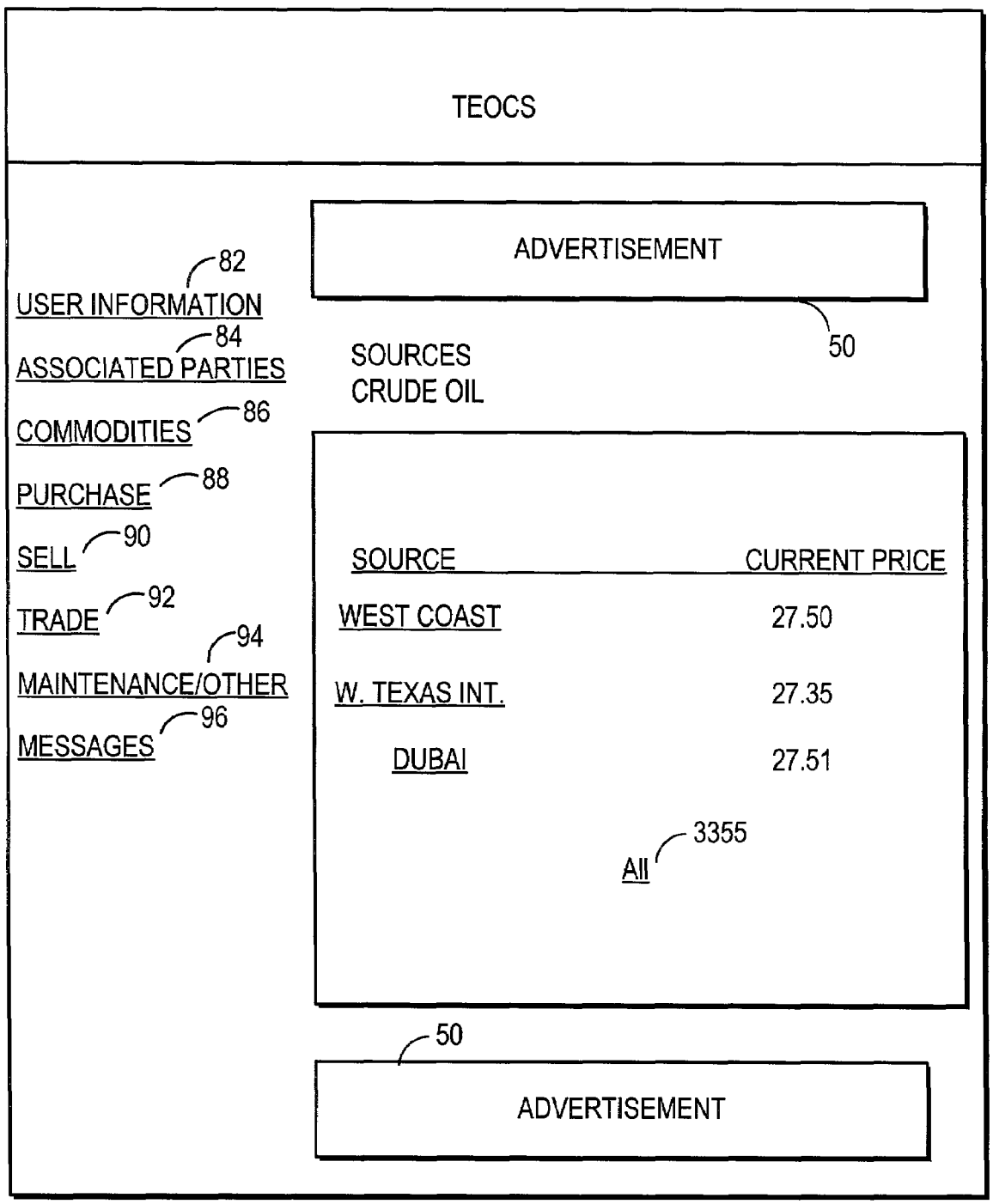
Figure 33C:
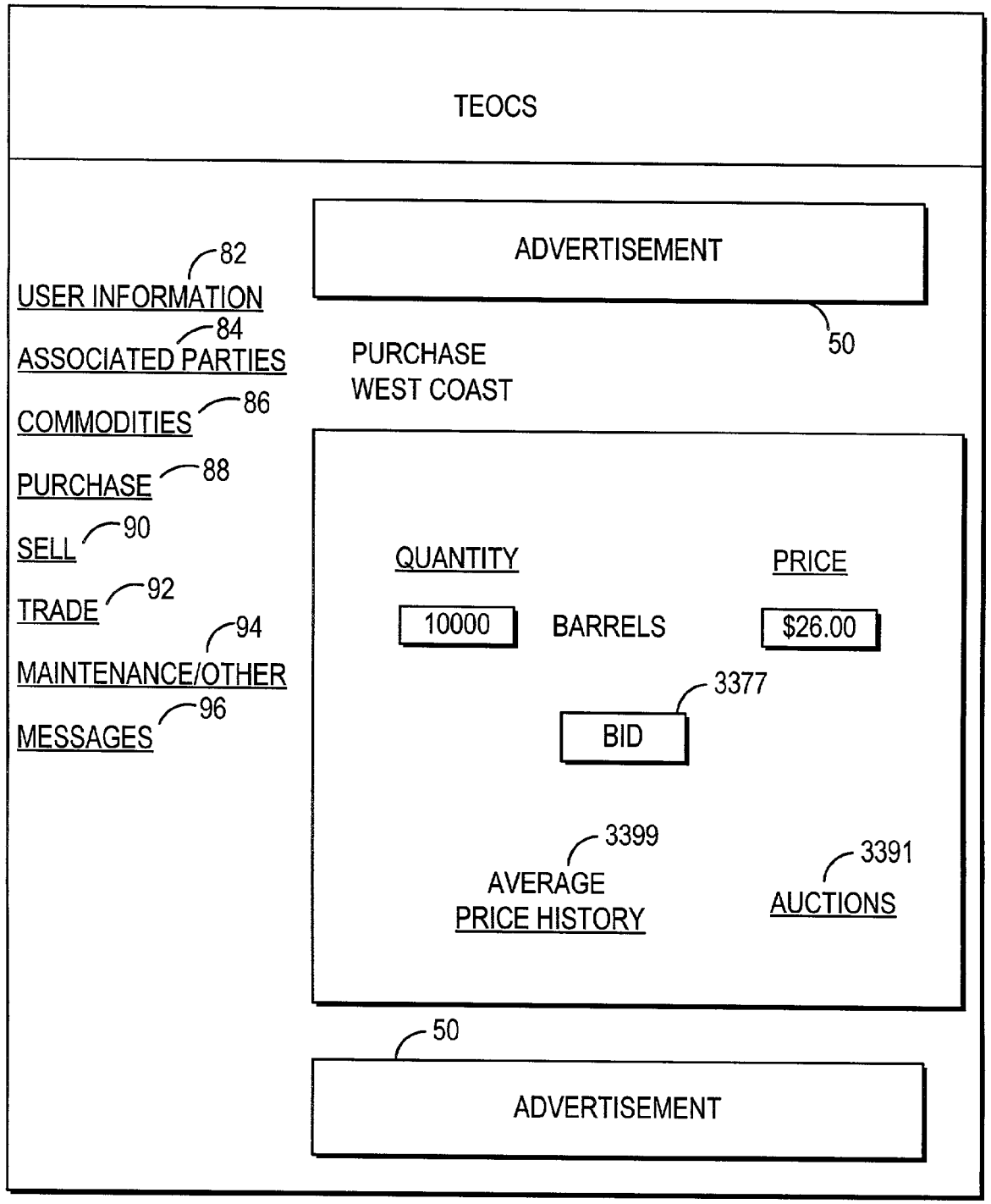
Figure 33D:
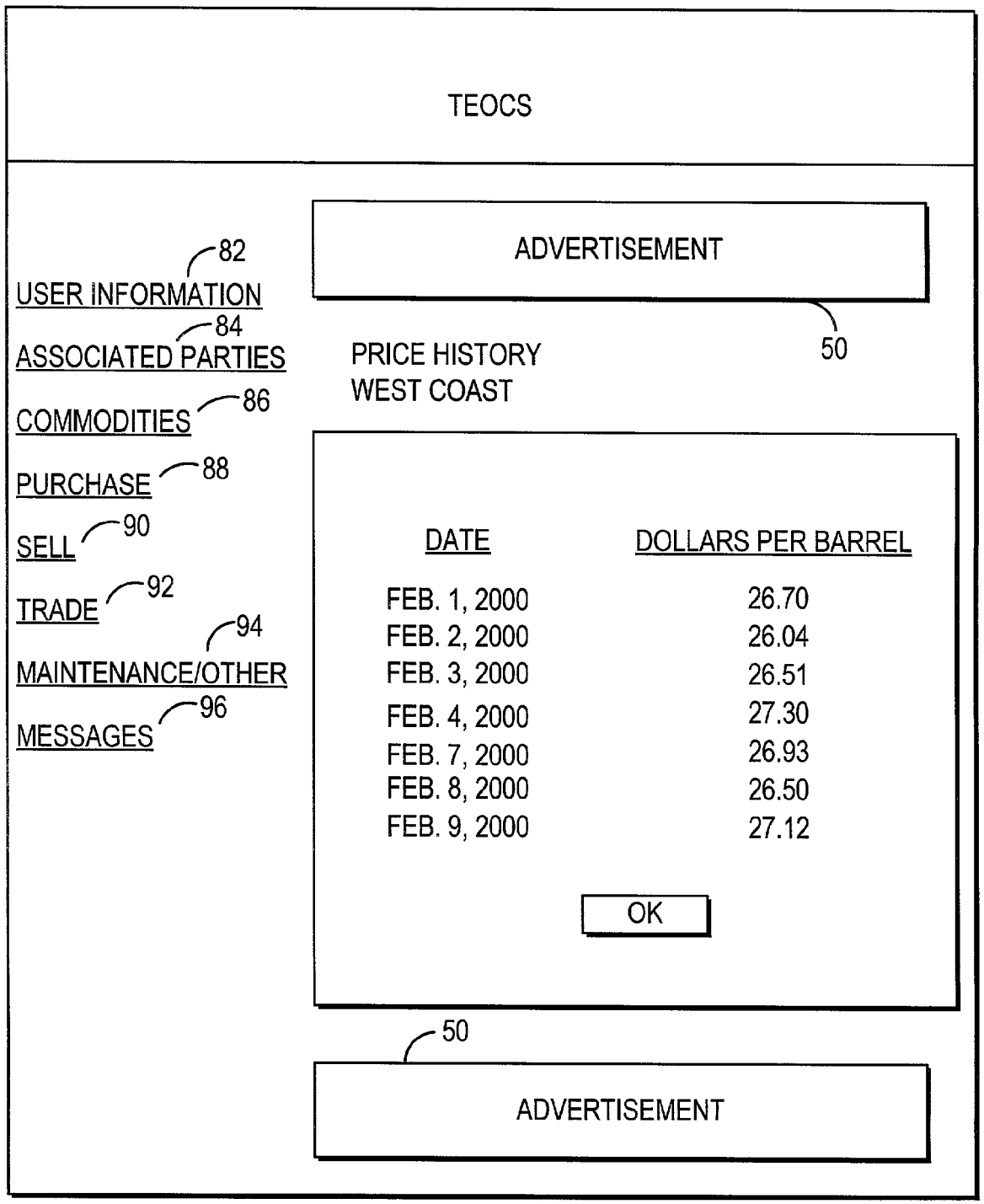
Figure 33E:
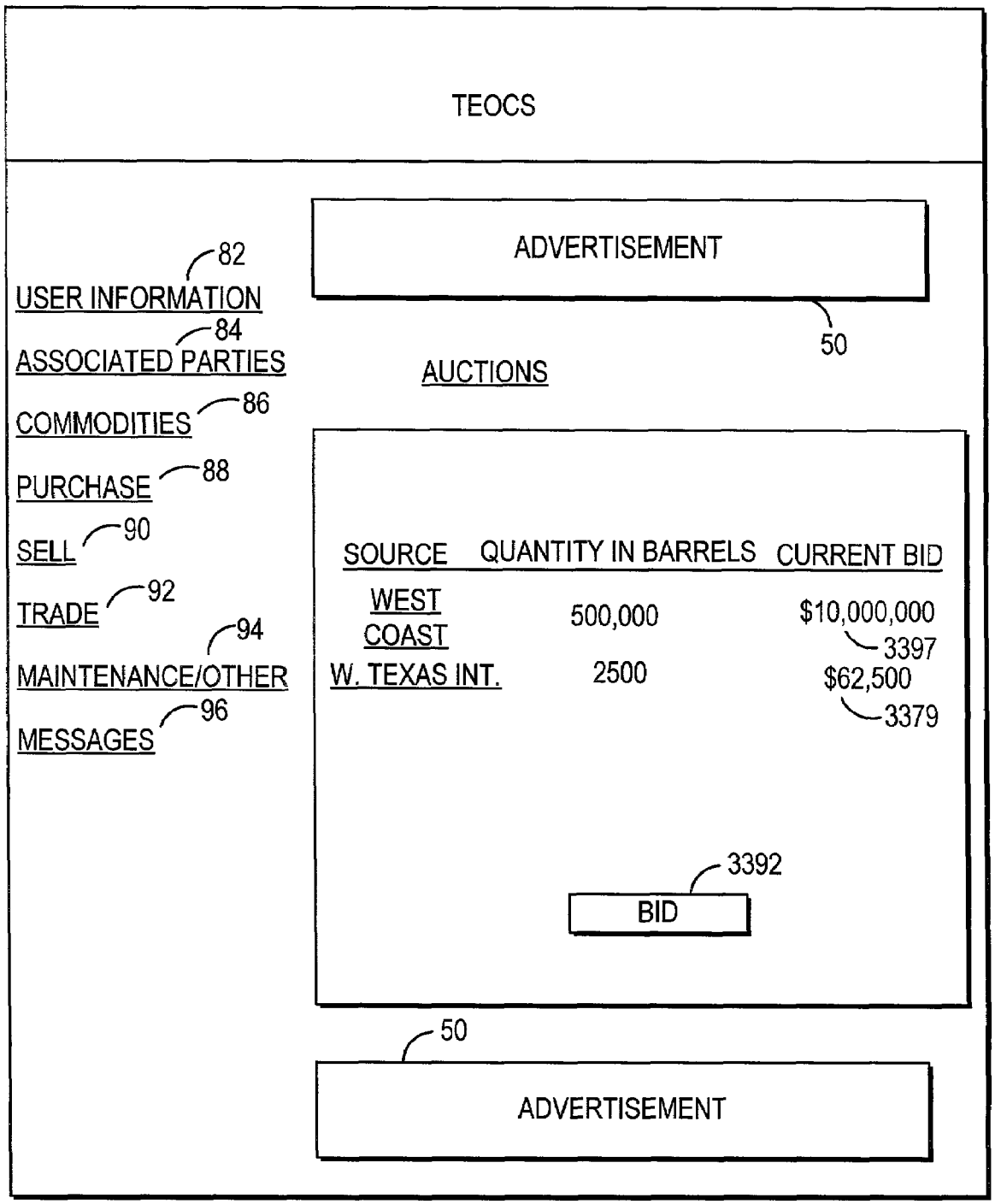

FIG. 33*c* illustrates an illustrative purchase page 3375 that the system may display in response to, for example, the user selecting a source. In this example, the user has selected source West Coast. The system may prompt the user for a quantity and a bid. The user may indicate that the user has defined a bid by, for example, pressing button 3377. The system may allow users to place market bids by, for example, not inputting a price. Users may also indicate a desire to purchase all available amounts of a commodity by, for example, leaving the quantity field blank. Both fields may be left blank by the user to indicate a desire to purchase all available amounts of a commodity at the current market price.

Purchase pages may provide users with opportunities to access other information or features related to a commodity. In this example, page 3375 provides users with an opportunity to view the average price history for the source. In response to a user selecting link 3399, the system may provide a price history page, such as illustrative page 3390 of FIG. 33*d*. The system may also provide users with opportunities to participate in auctions for commodities. Users may indicate a desire to participate in pending auctions by, for example, selecting link 3391 from FIG. 33*c*. In response, the system may provide an auction page, such as illustrative auction page 3395 of FIG. 33*e*.

Auction pages may display current auctions for commodities of the selected source, or all sources. Illustrative page 3395, for example, displays two current auctions. The user may participate in an auction and make a bid by, for example, selecting a link for an auction. In response the system may provide a page into which the user may input a bid. The user may initiate an auction by, for example, selecting button 3392 and placing a bid for a quantity of a commodity not shown, or for a commodity from a different source. The system may aggregate new bids to match a current bid if desired.

Figure 34A:
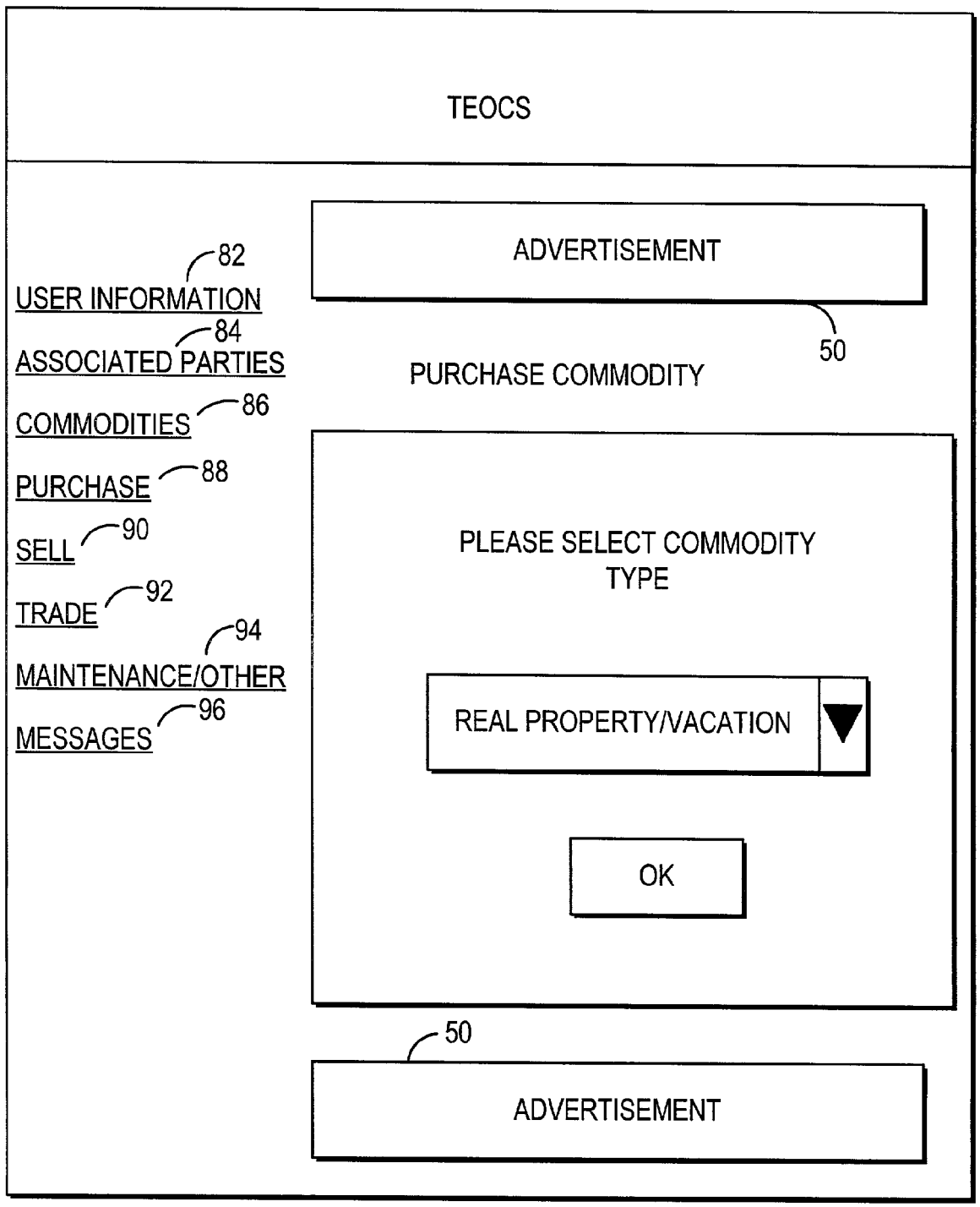
FIGS. 34a–34d show illustrative pages that the system may provide in response to a user indicating a desire to purchase a commodity, such as vacation property, in accordance with the present invention.
Figure 34B:
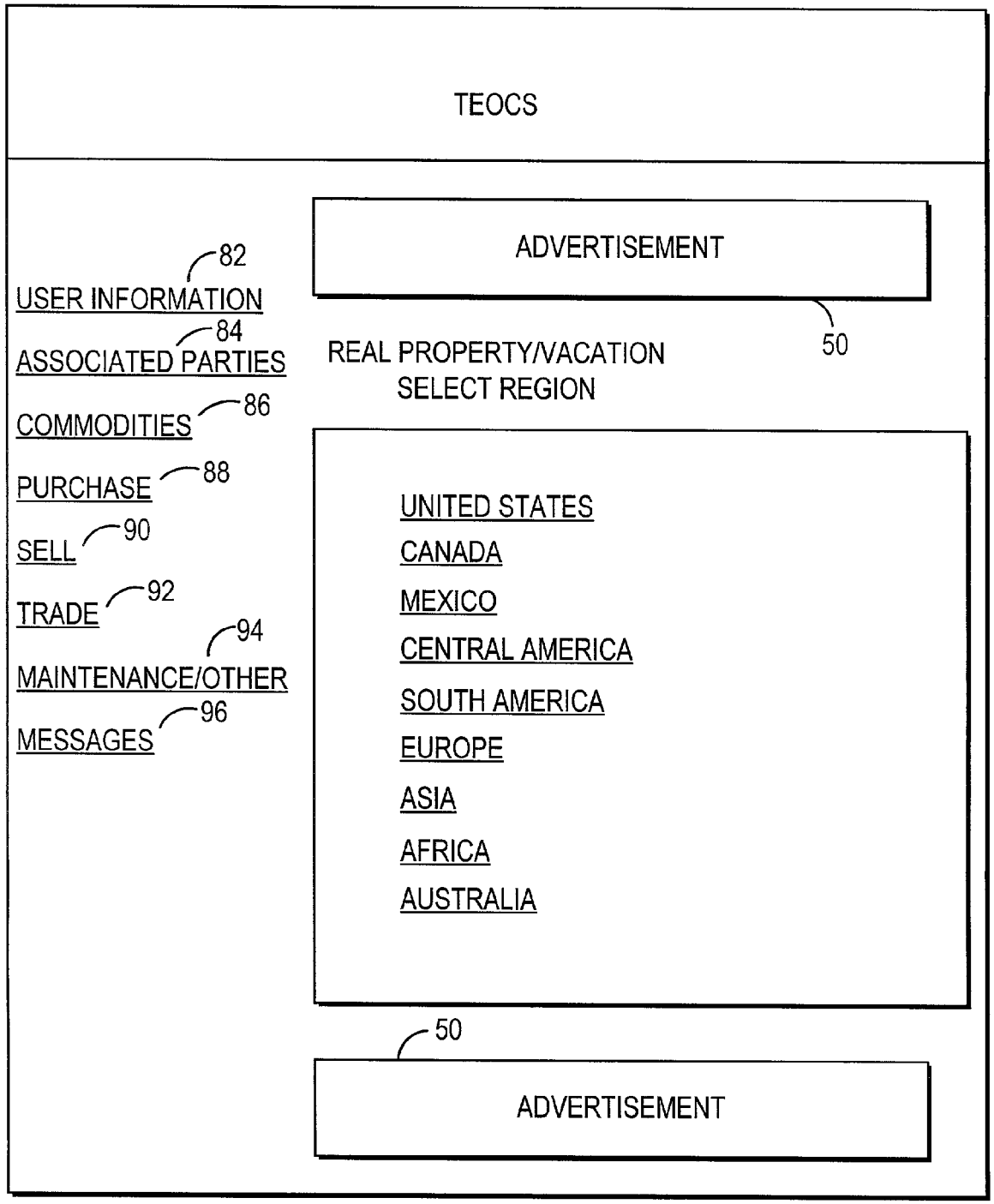
Figure 34C:
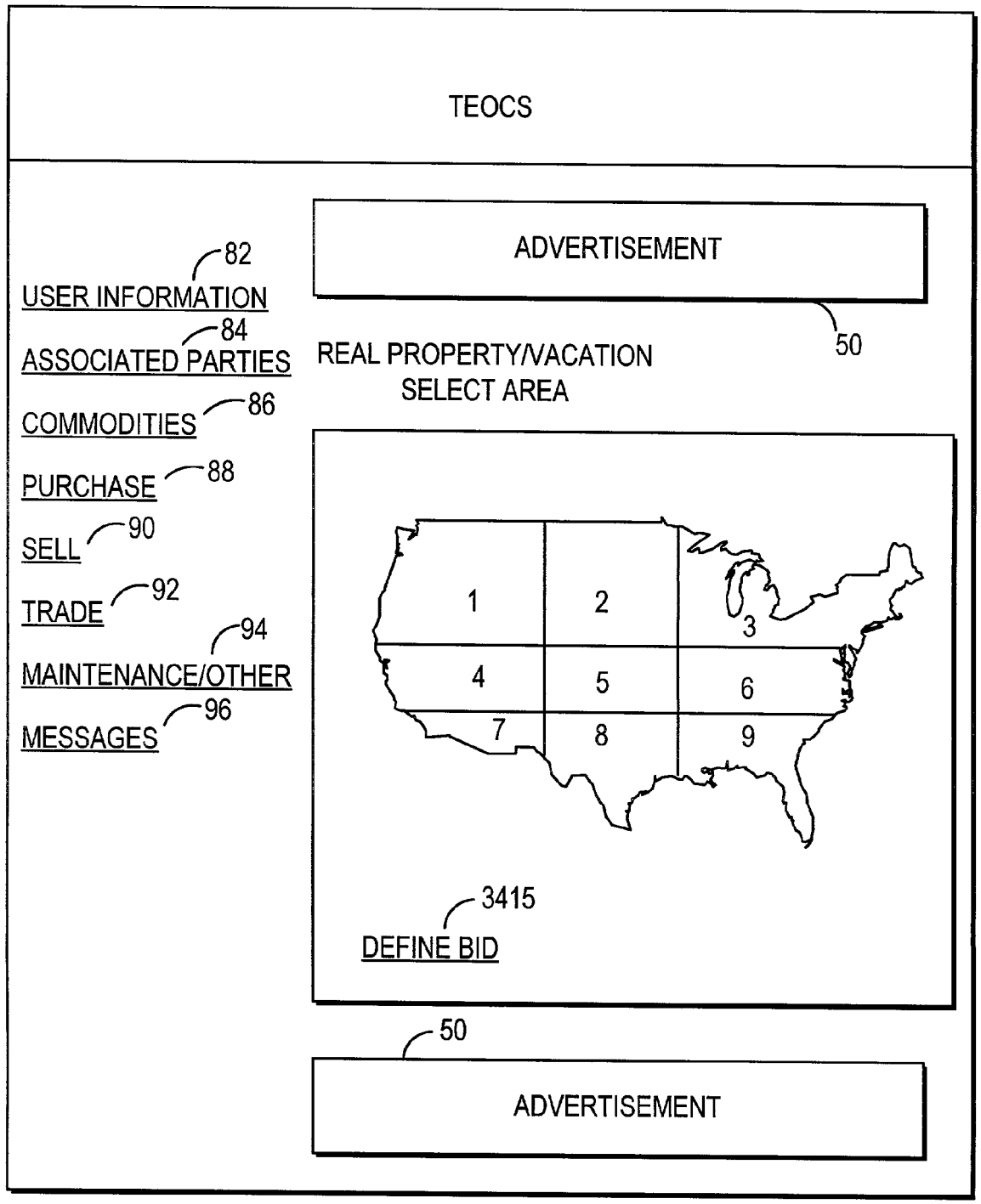

FIGS. 34a–34d illustrate another example of specialized pages for providing users with opportunities to purchase real property and, in particular, vacation property. As shown in FIG. 34a, the user has selected commodity type real property/vacation within page 3400. In response, the system may provide additional pages to aid the user in defining a purchase request. As shown in page 3405 of FIG. 34b, for example, the system may provide the user with an opportunity to indicate a country, region, or continent. In response, the system may, for example, provide a graphical representation of the selected country, region, or continent, as shown in page 3410 of FIG. 34c. The user may indicate a more specific region from which the user may purchase property by, for example, selecting a region. Alternatively, the user may indicate a desire to define a bid for all or a subset of regions by, for example, selecting link 3415.

Figure 34D:
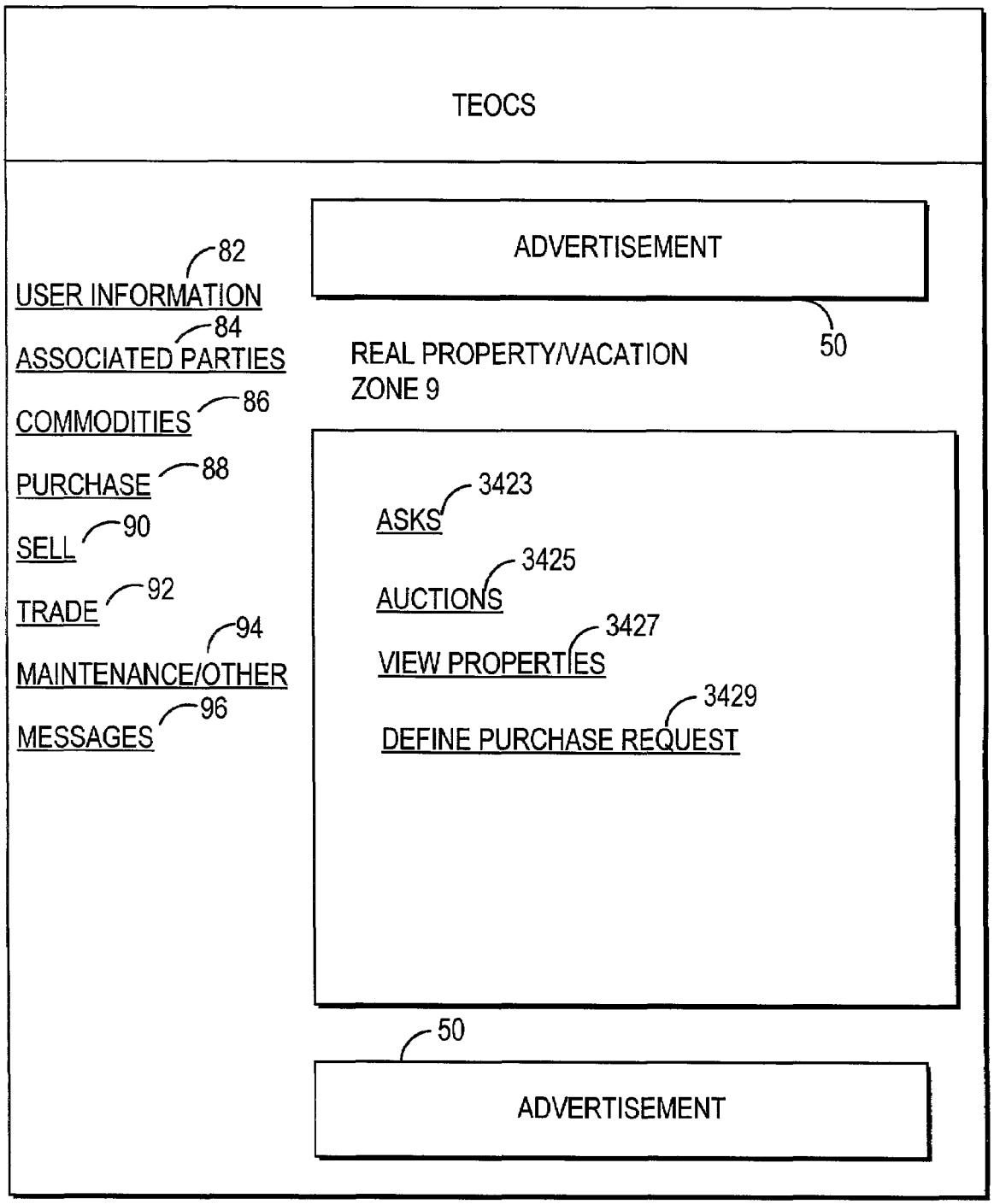

In response to a user selecting a region from page 3410, the system may provide a purchase request page. The system may also provide purchase request pages in response to a user indicating a desire to purchase commodities in other ways (e.g., by selecting link 2830 from FIG. 28a). Purchase request pages may provide the user with opportunities to view current asks, participate in or initiate auctions, view specific properties that the user may place a bid for, define a bid to include a class of commodities, or to generate a purchase request using any other suitable approach. FIG. 34d shows illustrative purchase request page 3420.

Figure 35A:
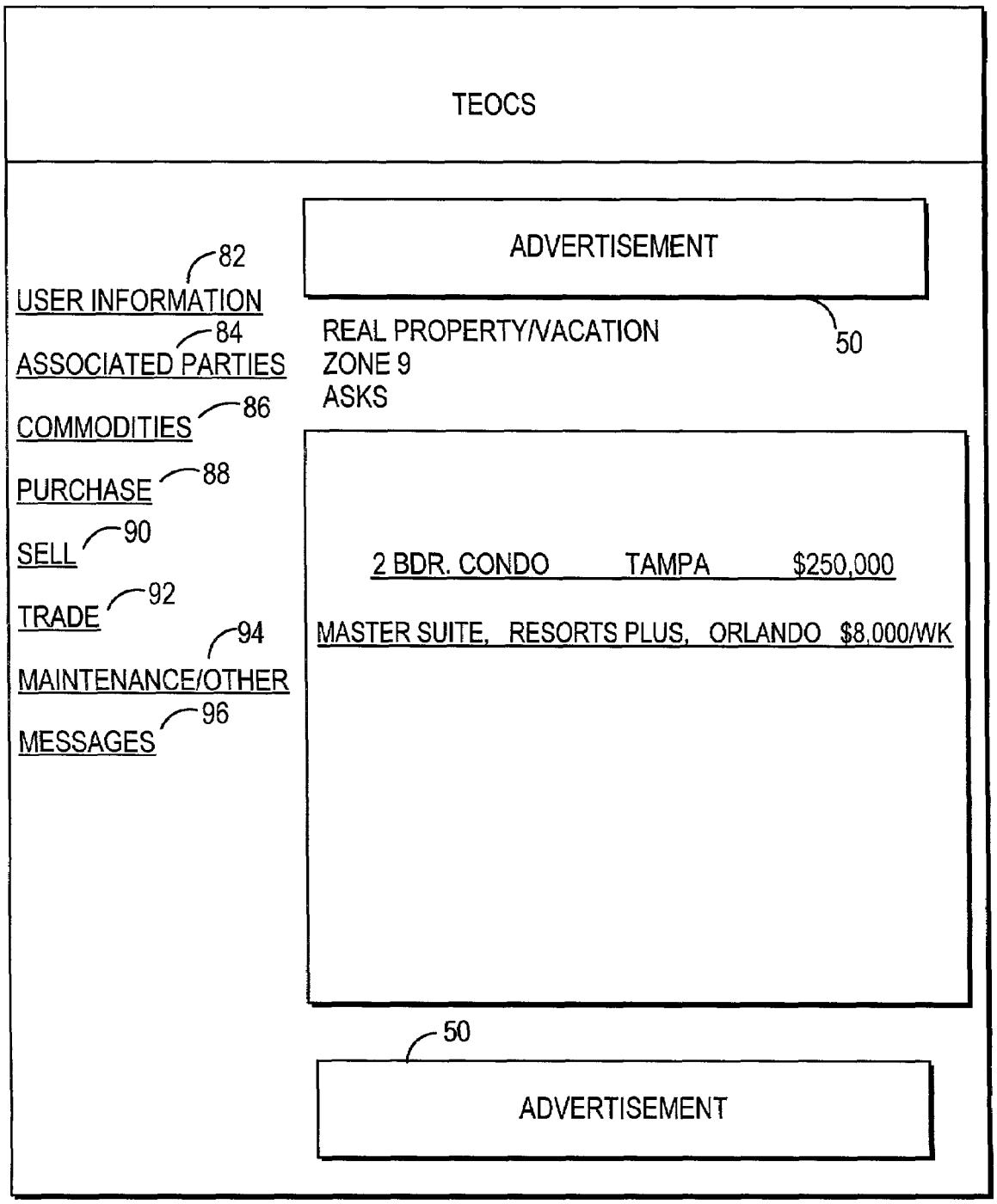
FIGS. 35a–35d show illustrative pages that the system may provide in response to a user indicating a desire to view and meet or counter asks for commodities, in accordance with the present invention.

Users may indicate a desire to view current asks by, for example, selecting link 3423. In response, the system may display an asks page. Asks pages may list current sales requests for all commodities, for the subset of all commodities in which the user has indicated an interest (in this example for all vacation property in zone 9 in the United States), or for any other suitable subset of commodities. FIG. 35a shows an illustrative asks page 3500 for all vacation properties in zone 9 in the United States. In this example, there are only two pending asks, or sales requests. A user may indicate a desire to view information about a commodity by selecting its link. In response, the system may provide an ask/bid page, such as illustrative ask/bid page 3525 shown in FIG. 35b. In this example, the user has selected the ask for a commodity provided by Resorts Plus. Ask/bid pages may provide the user with information about the commodity and its current ask, and may provide the user with an opportunity to meet the ask or provide a counter-offer. A user may meet a bid by, for example, pressing button 3527. In response, the system may initiate the transfer of ownership of the commodity. In response to a user indicating a desire to enter a counter-offer (e.g., by pressing button 3529), the system may provide a counter page, such as illustrative counter page 3550 shown in FIG. 35c. In response to the user entering a counter offer, the system may indicate to the user that the user will be notified of whether the counter is accepted, as shown in page 3575 of FIG. 35d.

Figure 35B:
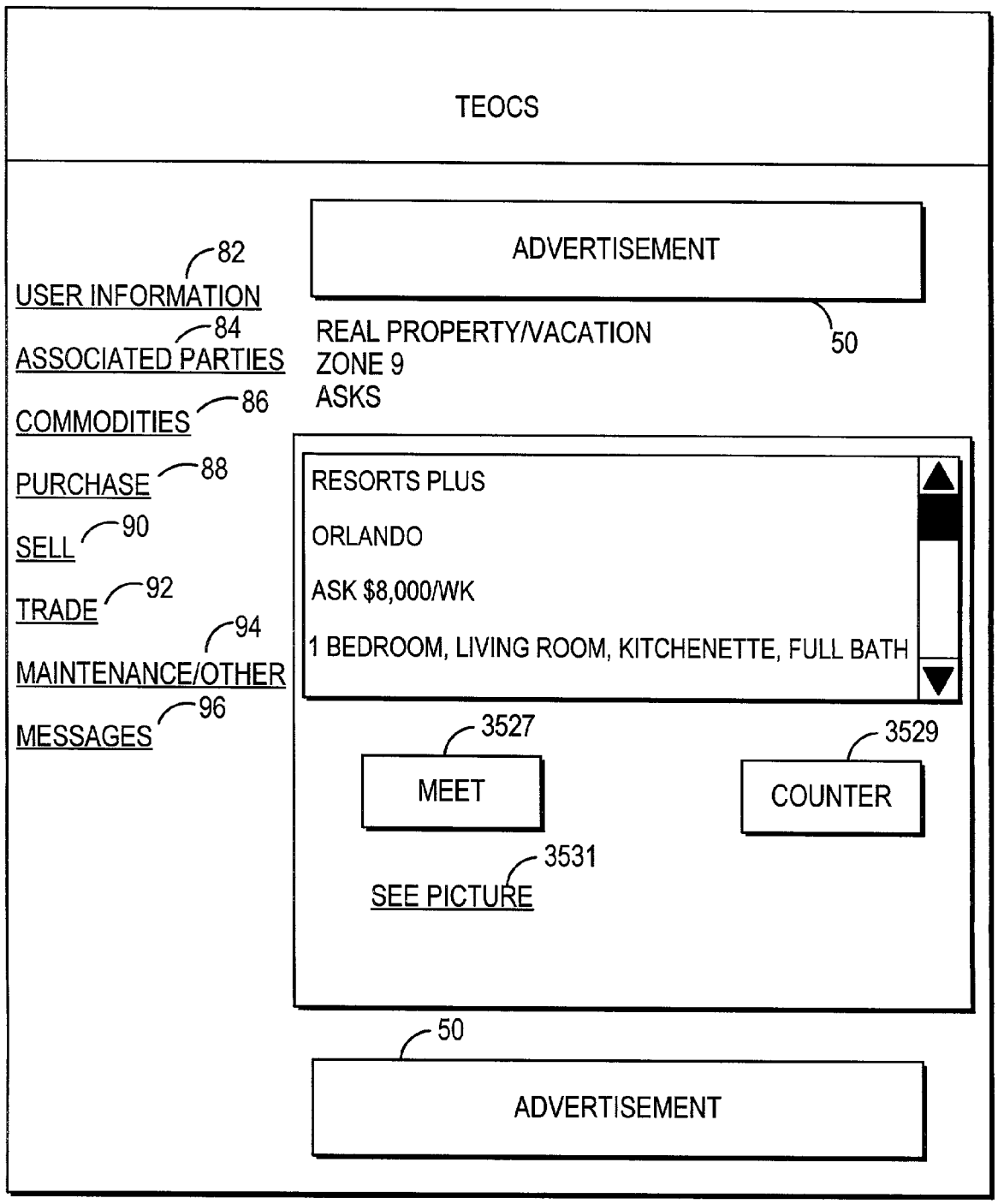
Figure 35C:
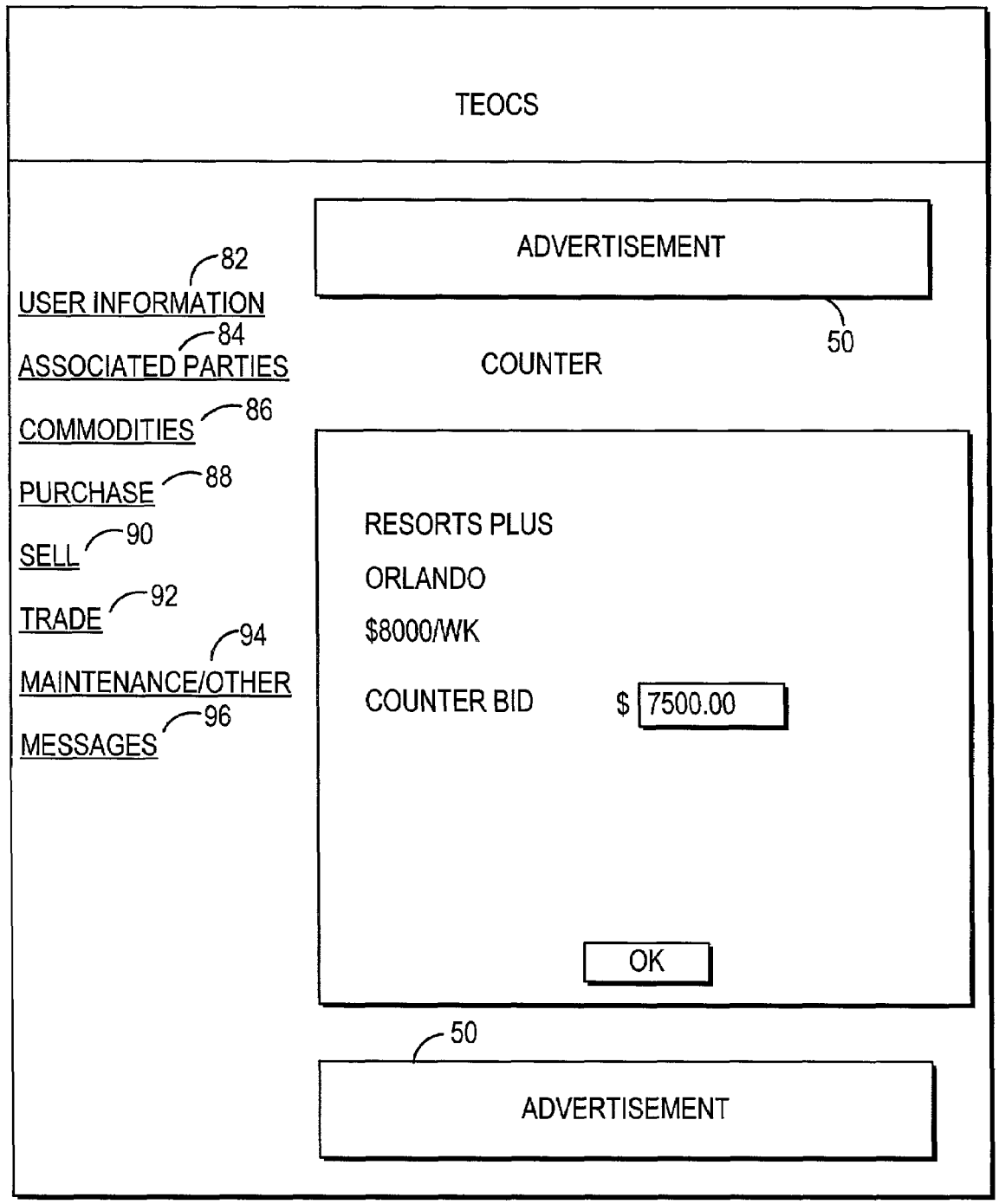
Figure 35D:
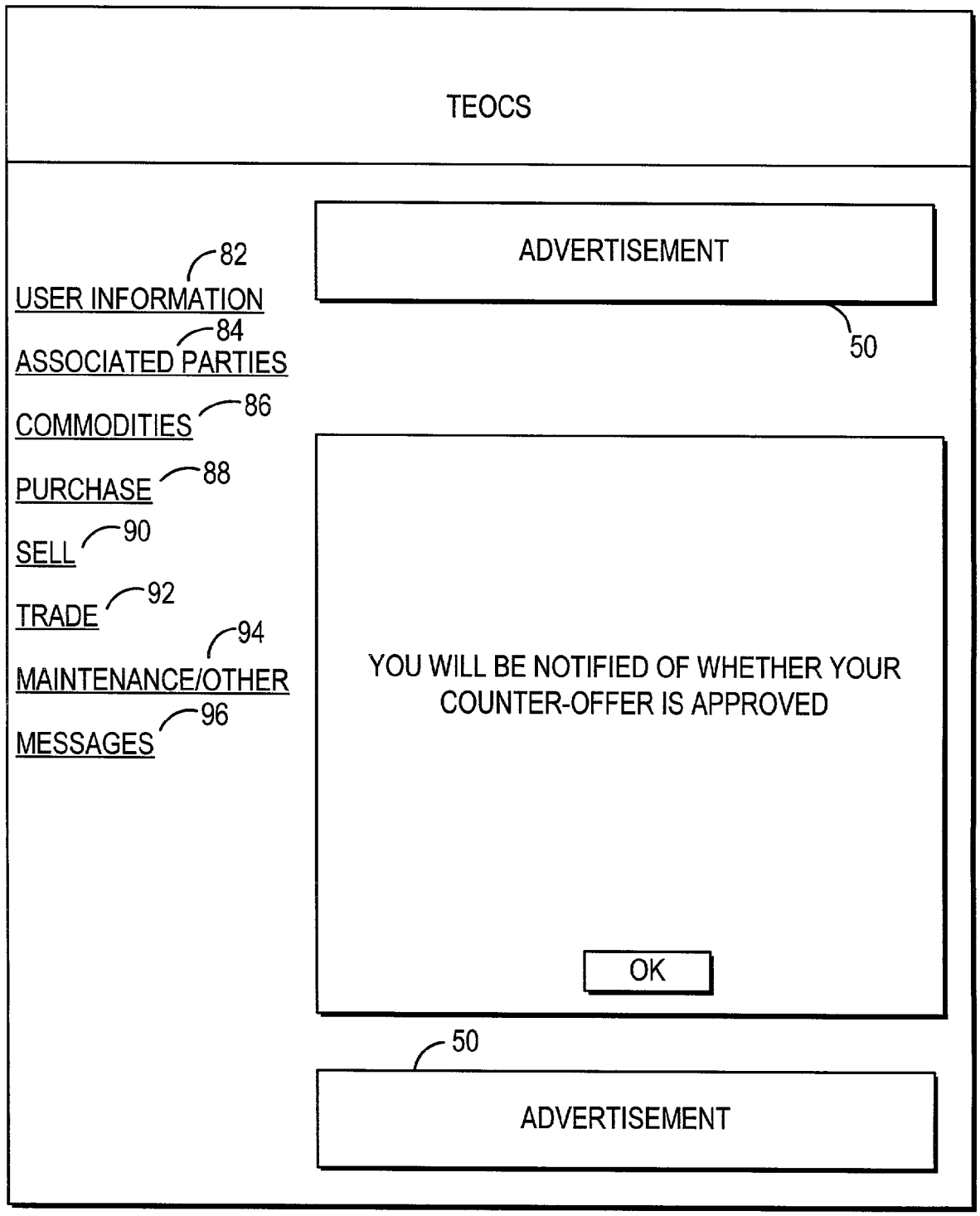

The system may also provide users with opportunities to view pictures of offered commodities. Users may indicate a desire to view a picture or video of an offered property by, for example, selecting link 3531 of page 3525 (FIG. 35b). In response, the system may provide a suitable graphic or video image or file for display.

Users may indicate a desire to participate in auctions for commodities by, for example, selecting link 3425 of page 3420 (FIG. 34d). In response, the system may provide an auctions page. Auctions pages may display the current pending auctions for all commodities, for the subset of all commodities in which the user has indicated an interest (in this example all vacation properties in zone 9 in the United States), or for any other suitable subset of commodities. In the illustrative auctions page 3600 of FIG. 36a, the user has selected to view auctions for vacation property in zone 9 of the United States. In this example, there is only one pending auction. The user may indicate a desire to view information regarding the auctioned commodity by, for example, selecting the associated link. In response the system may provide an auction information page, such as illustrative information page 3625 of FIG. 36b.

Auction information page 3625 may list information for an auctioned vacation property, such as the name, location, available week, opening bid or ask, and current bid. The system may update the current bid each time a bid is placed, allowing the user to wait and see if additional bids are placed before bidding. The user may indicate a desire to enter a bid by, for example, pressing button 3650. In response, the system may provide a bid page, such as illustrative bid page 3635 of FIG. 36c. Bid pages, such as page 3635, may allow users to enter a bid. Bid pages may also provide users with an opportunity to split the bid with someone else, a further illustrative use of the split feature of the present invention. In response to the user selecting link 3640, for example, the system may provide a split page.

Figure 36A:
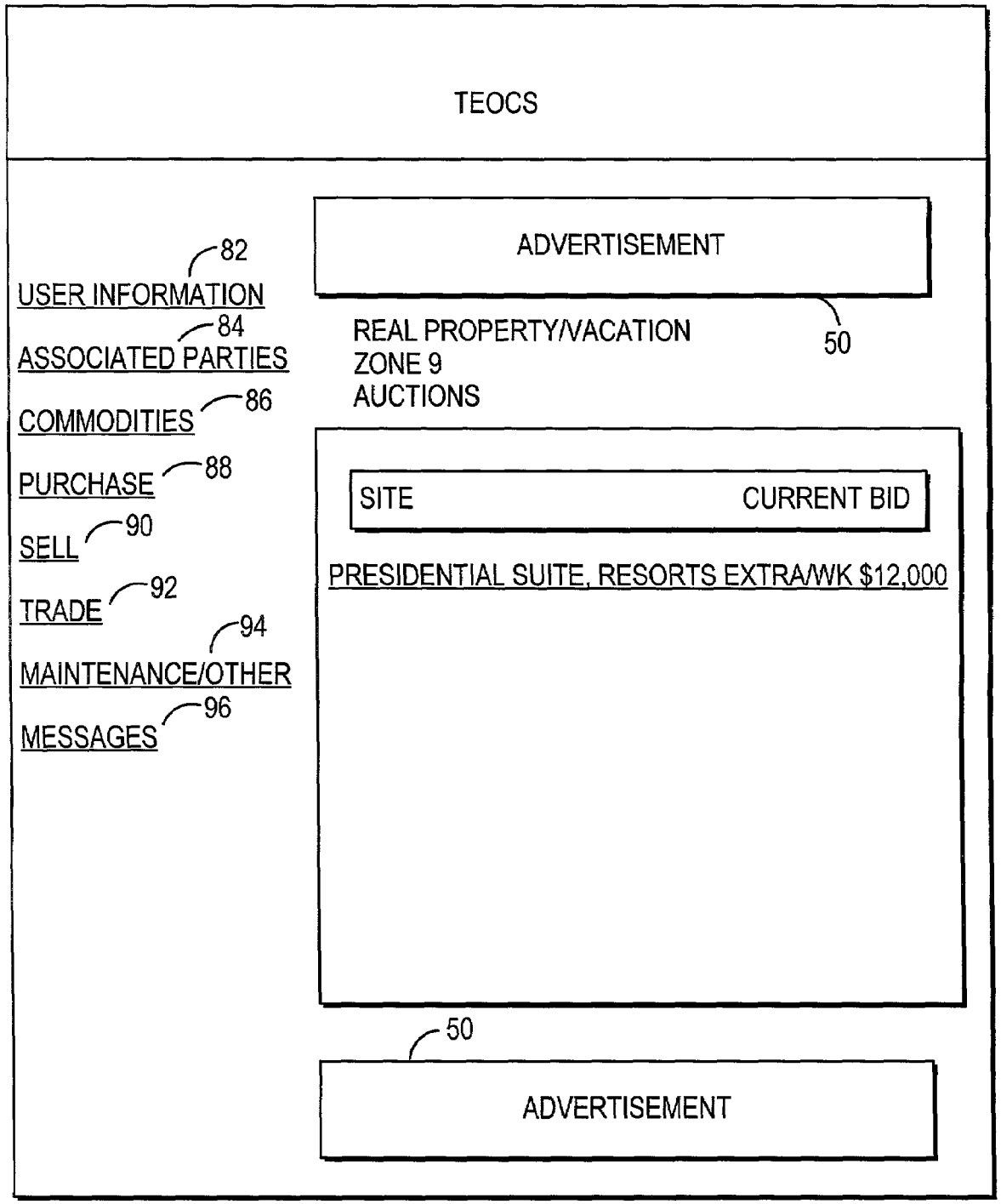
FIGS. 36a–36c show illustrative pages that the system may provide in response to a user indicating a desire to participate in auctions for commodities, in accordance with the present invention.
Figure 36B:
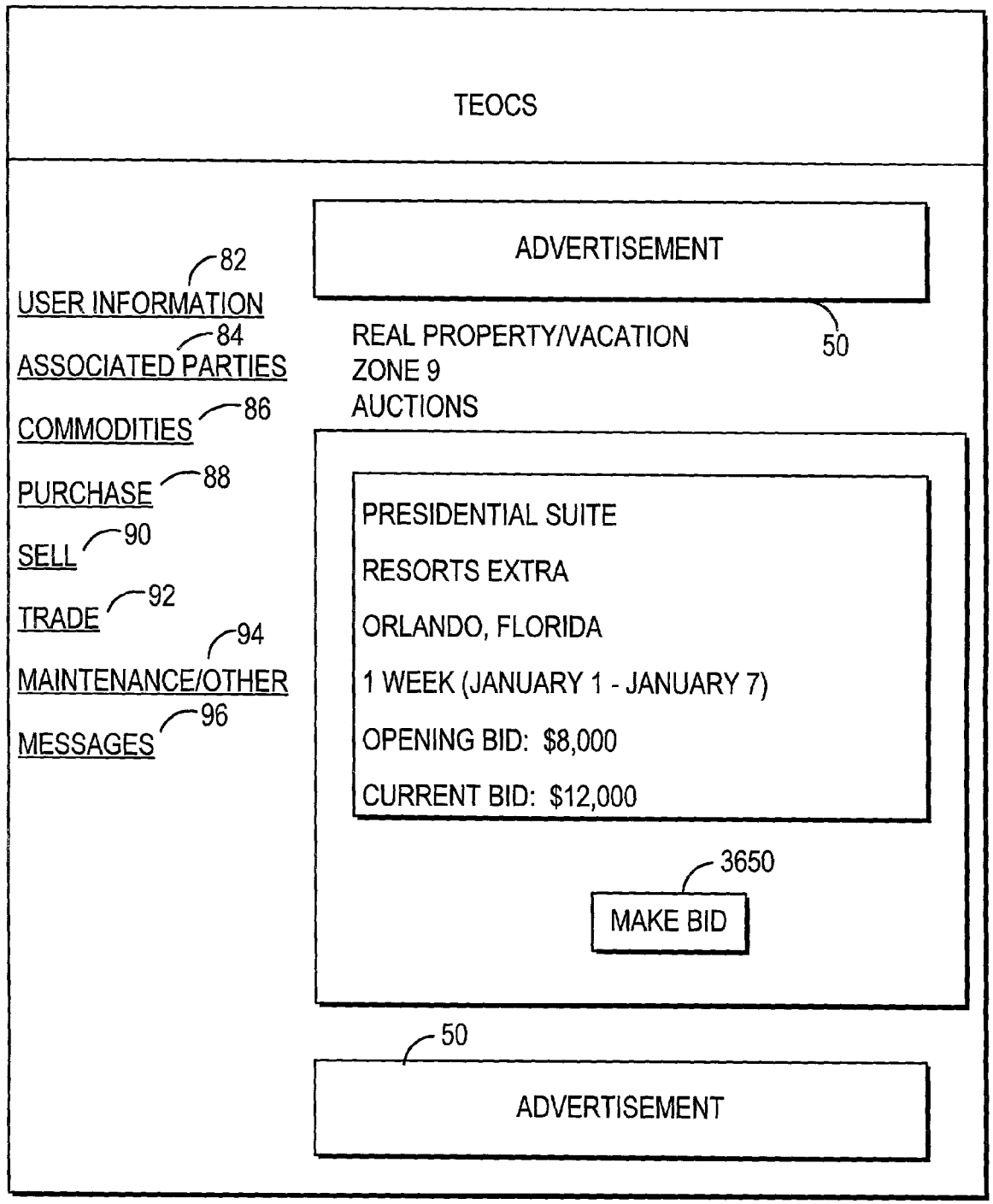
Figure 36C:
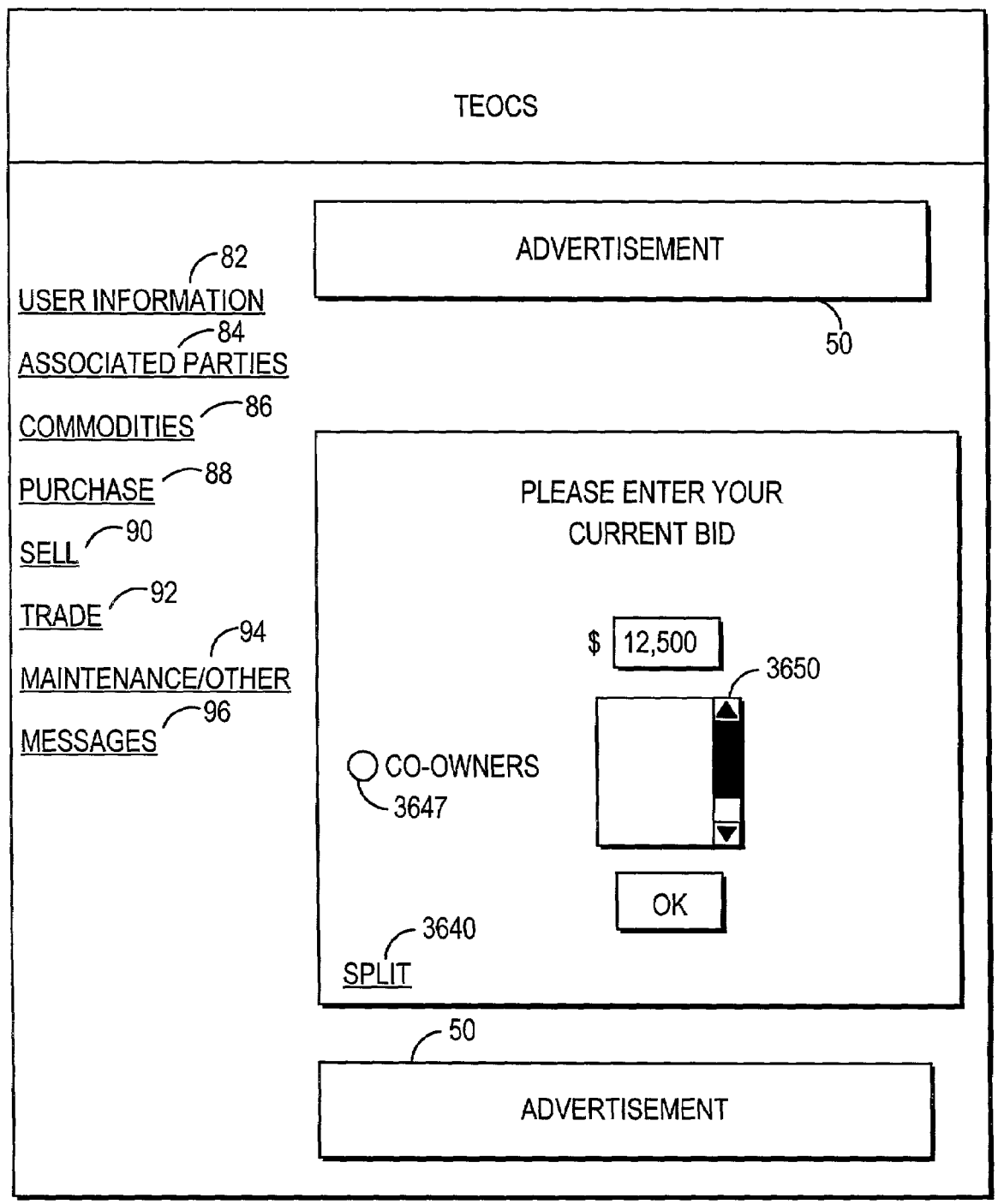
Figure 36D:
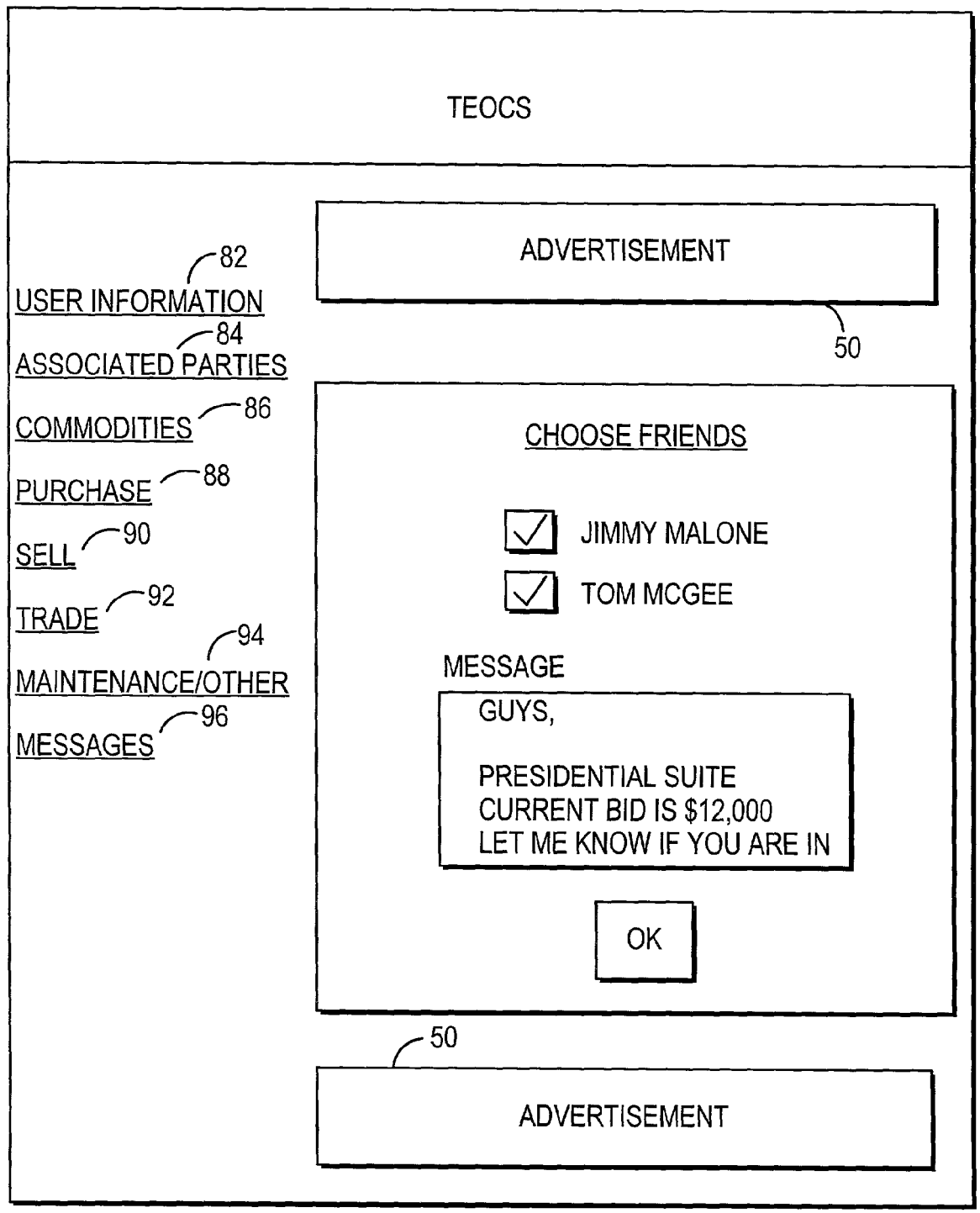
FIG. 36d shows an illustrative page that the system may provide in response to a user indicating a desire to provide friends an opportunity to join in a purchase, in accordance with the present invention.

An illustrative split page is shown in FIG. 36d (a first illustrative split page for splitting off ownership was shown previously in FIG. 31b). Unlike split 3150 page of FIG. 31b, page 3645 may provide the user with an opportunity to choose one or more specific friends or other users or non-users that the user may wish or need to share the current opportunity with. In response to the user generating a split request by, for example, filling in page 3645, the system may provide a message to the friends (or other users or non-users) by, for example, system messages, e-mail, or regular mail, prompting them for a response. Unlike page 3150 of FIG. 31b, page 3645 provides the user with an opportunity to define a message. If desired a combination of the approaches shown in FIGS. 31b and 36d may be used. For example, page 3150 of FIG. 31b may be modified to provide a user with an opportunity to define a message. Any other suitable approach may also be used. The user may place a bid on behalf of all parties participating in a split by, for example, selecting radio button 3647 of page 3635 of FIG. 36c and entering the participants' names in scrollable text-box 3650.

Figure 37A:
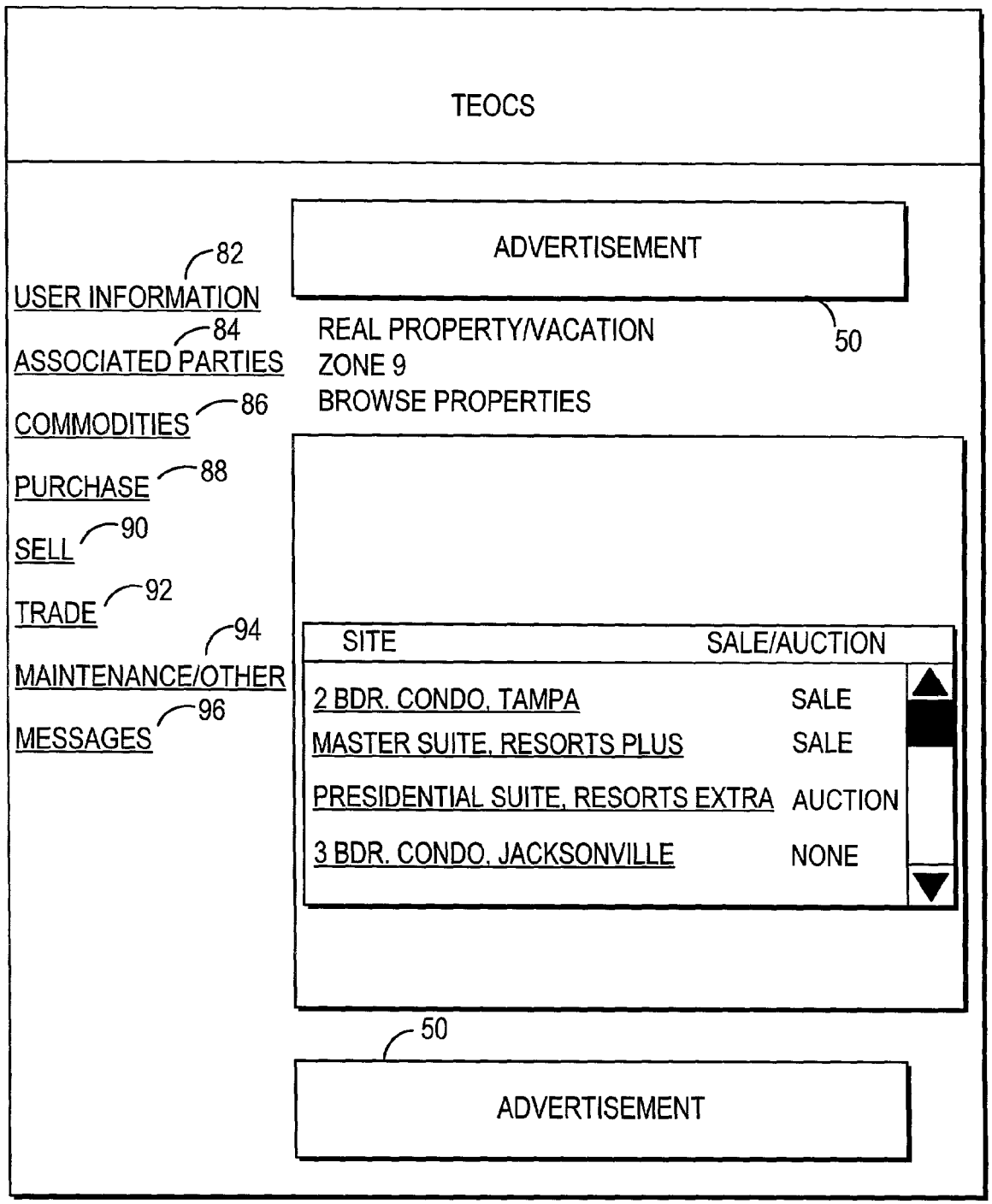
FIGS. 37a–37c show illustrative pages that provide a user with an opportunity to browse properties and define bids in accordance with the present invention.

The system may allow a user to define purchase requests by, for example, browsing commodities within the system, selecting a commodity for which the user wishes to define a purchase request, and defining a purchase request. Users may indicate a desire to browse commodities by, for example, selecting link 3427 of FIG. 34d. In response, the system may provide a browse page in which commodities are listed and provided to the user for selection. An illustrative browse page 3700 is shown in FIG. 37a. In this example, the user has indicated a desire to browse vacation properties in zone 9 of the United States. Browse page 3700 lists properties and their current sale or auction status. As illustrated in FIG. 37a, there are two commodities that are currently offered for sale, one property for which an auction is pending, and additional properties that are currently not offered for sale or auction. The user may indicate a desire to view additional information for a commodity by, for example, selecting its link. In response, the system may provide a commodities information page, such as illustrative commodities information page 3725 of FIG. 37b.

Commodities information page 3725 may include information about the commodity, as well as provide the user with opportunities to view pictures or videos of the commodity, make a bid for the commodity, or generate a split request. A user may indicate a desire to view pictures or videos for a commodity by, for example, selecting link 3727. In response, the system may provide a suitable graphic or video image or file for display.

The user may indicate a desire to make a bid for a commodity by, for example, selecting link 3729. In response, the system may provide the user with an opportunity to define a bid for the selected commodity. An illustrative page for providing a user with an opportunity to define a bid for a selected commodity is shown on page 3733 of FIG. 37*c*. As shown, the user may indicate whether the user wishes to buy or rent the property, the rental term (if applicable), and the bid price.

Figure 37B:
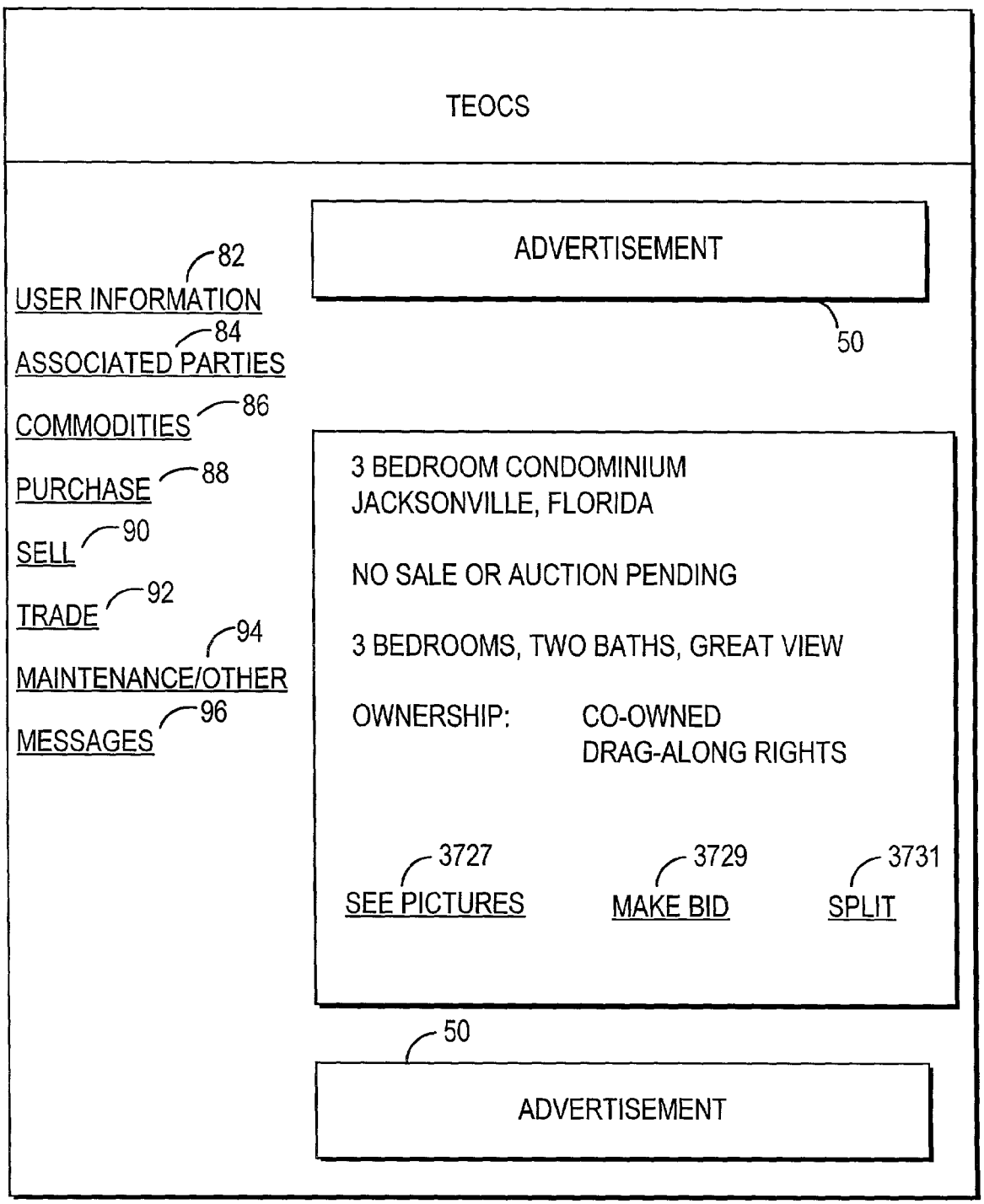
Figure 37C:
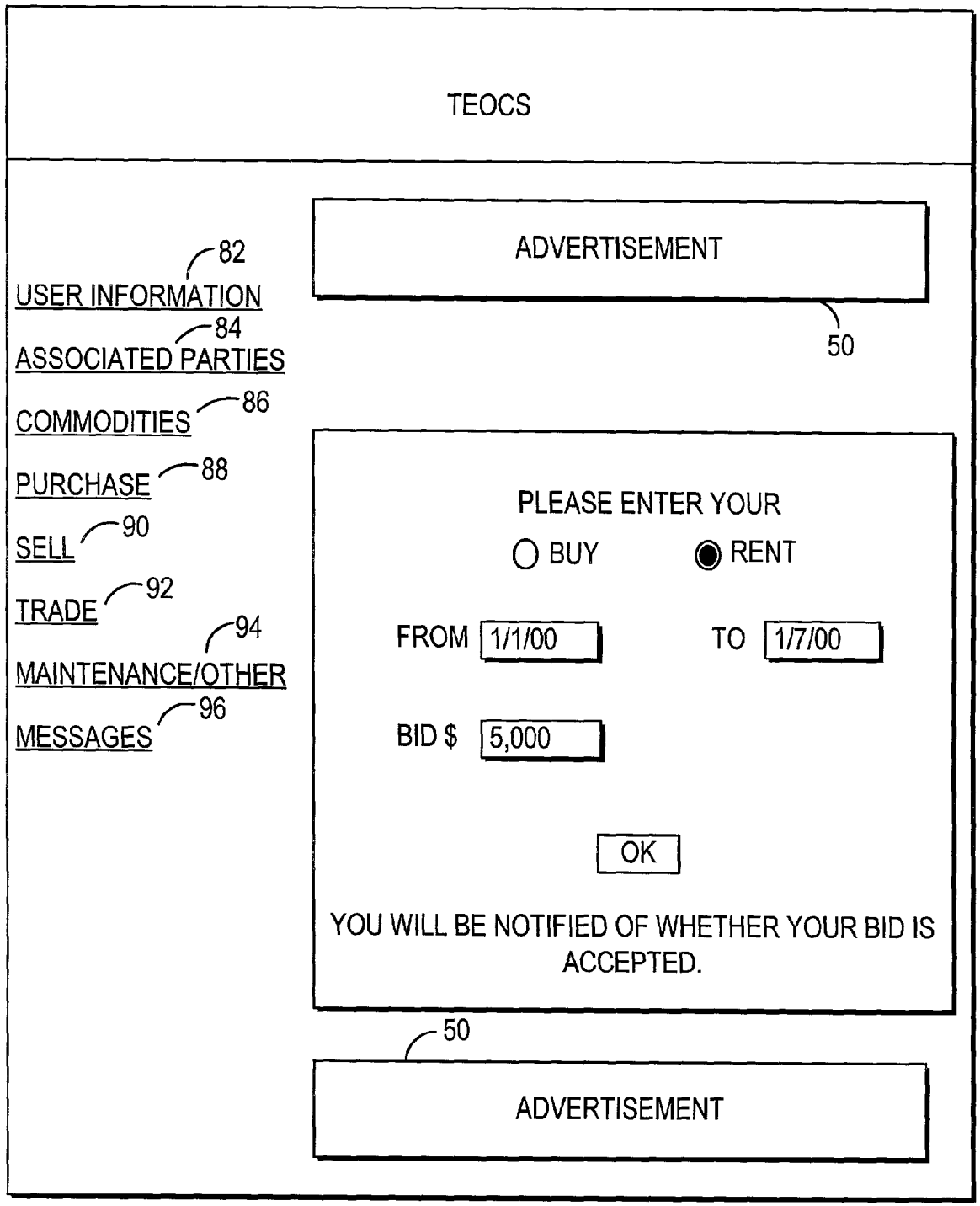

The user may indicate a desire to generate a split request by, for example, selecting link 3731 of FIG. 37*b*. In response, the system may provide the user with an opportunity to define a split as described, for example, in connection with FIG. 31*b* or 36*d*.

Figure 38A:
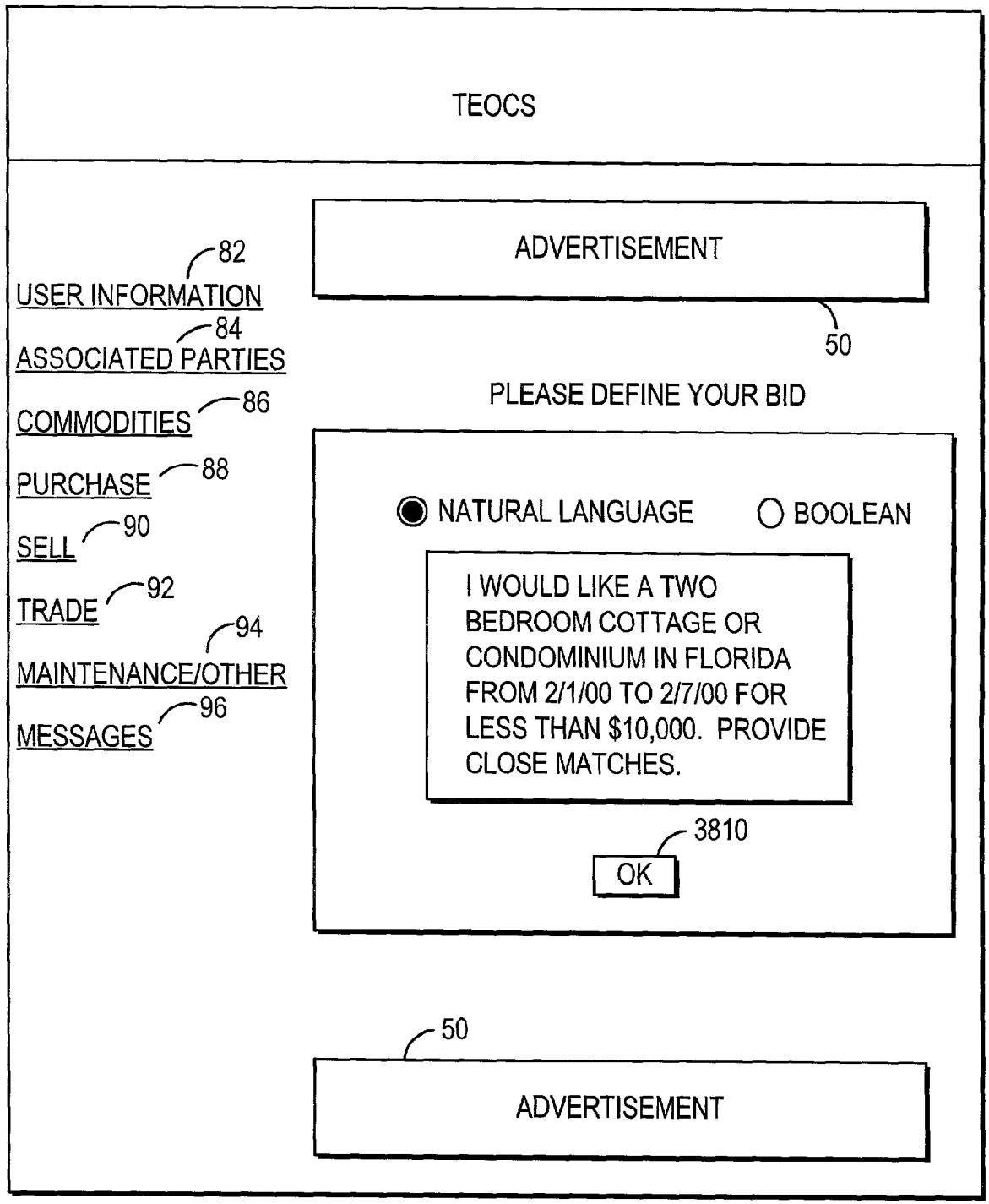
FIGS. 38a and 38b show illustrative pages for providing users with opportunities to define bids and view matched properties, in accordance with the present invention.

The system may provide a user with an opportunity to define purchase requests using, for example, natural language or boolean expressions. A user may indicate a desire to define a bid by, for example, selecting link 3429 of FIG. 34*d*. In response, the system may provide a define purchase request page. A define purchase request page may provide the user with an opportunity to define a request for specific unique or fungible commodity, or for a class of commodities, depending on how the user formulates the user's expression. An illustrative define purchase request page 3800 is shown in FIG. 38*a*. As shown in FIG. 38*a*, the system may provide the user with an opportunity to indicate the type of expression the user will define, and to define the expression. FIG. 38*a* illustrates the use of radio buttons and a text-box to provide these opportunities, but any suitable combination of user interface elements may be used. FIG. 38*a* also illustrates how the system may provide a user with an opportunity to indicate that the user wishes to receive close matches. The user may indicate that the user is finished defining an expression by, for example, pressing button 3810.

Figure 38B:
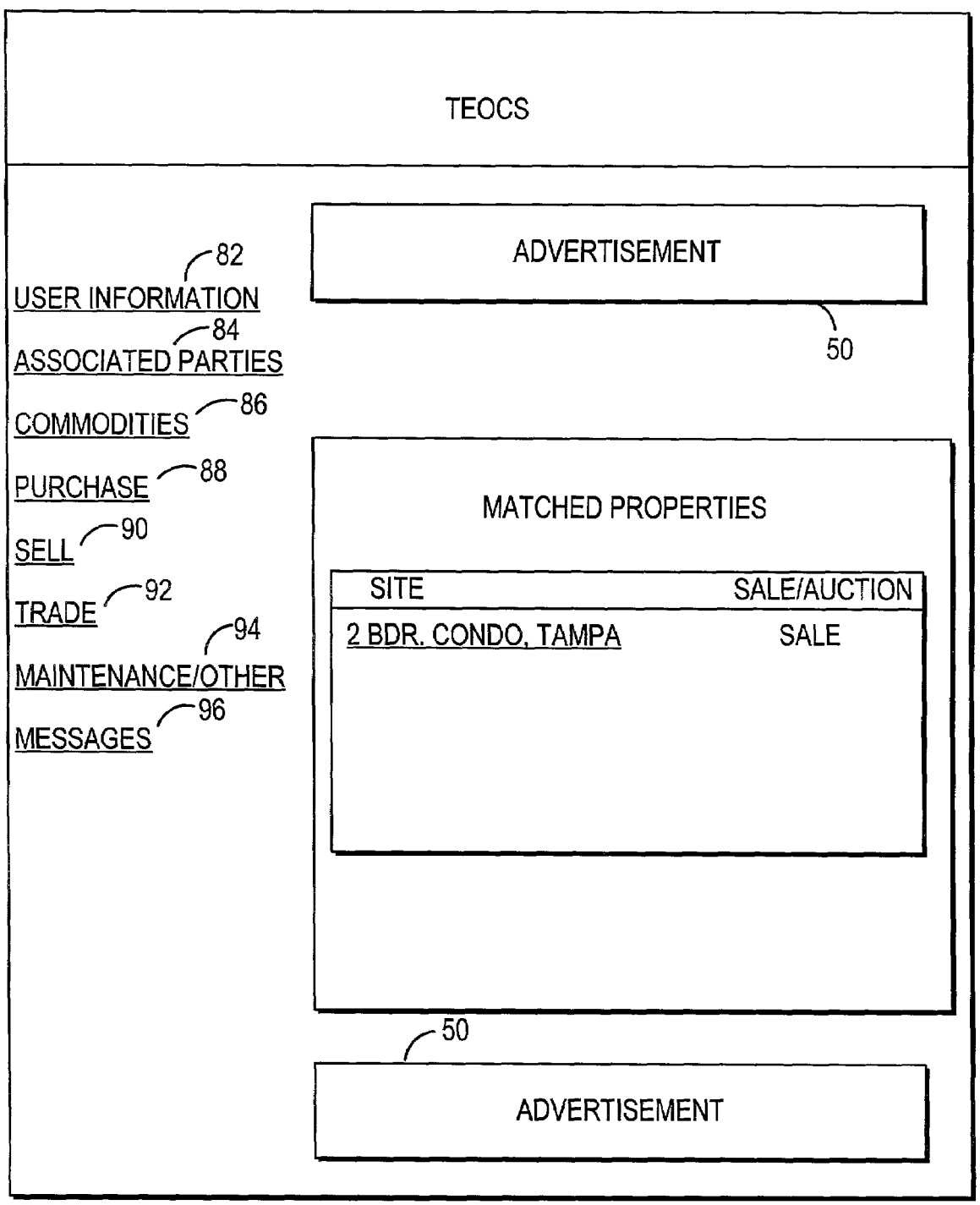

In response to the user defining an expression, the system may search for commodities, in this example vacation properties, that match the expression. The system may present the found commodities in a matched commodities page, such as illustrative matched commodities page 3825 of FIG. 38*b*. In the example of FIG. 38*b*, only one property was found that matched the expression. The user may indicate a desire to access additional information about the commodity by, for example, selecting a link associated with the commodity. In response, the system may provide a commodities information page, such as illustrative commodities information page 3725 of FIG. 37*b*. The system may provide the user with an opportunity to make a bid or split as shown in FIG. 37*b* or, because this commodity is for sale, the system may provide the user with an opportunity to purchase the property at the asking price.

Returning to FIG. 16*a*, the system may provide users with opportunities to sell commodities. A user may indicate a desire to sell a commodity or commodities by, for example, selecting link 90 from page 1600 or any other page that contains link 90, selecting a link from a commodities information screen (e.g., link 2825 of FIG. 28*a*, link 2925 of FIG. 29*a*, link 3030 of FIG. 30*a*, link 3130 of FIG. 31*a*, and link 3230 of FIG. 32*a*), or using any other suitable approach. In response to a user selecting link 90, for example, the system may prompt a user to indicate the commodity that the user wishes to sell, as shown in page 3900 of FIG. 39. In response to the user selecting a commodity, the system may provide a sell commodity page.

Figure 40A:
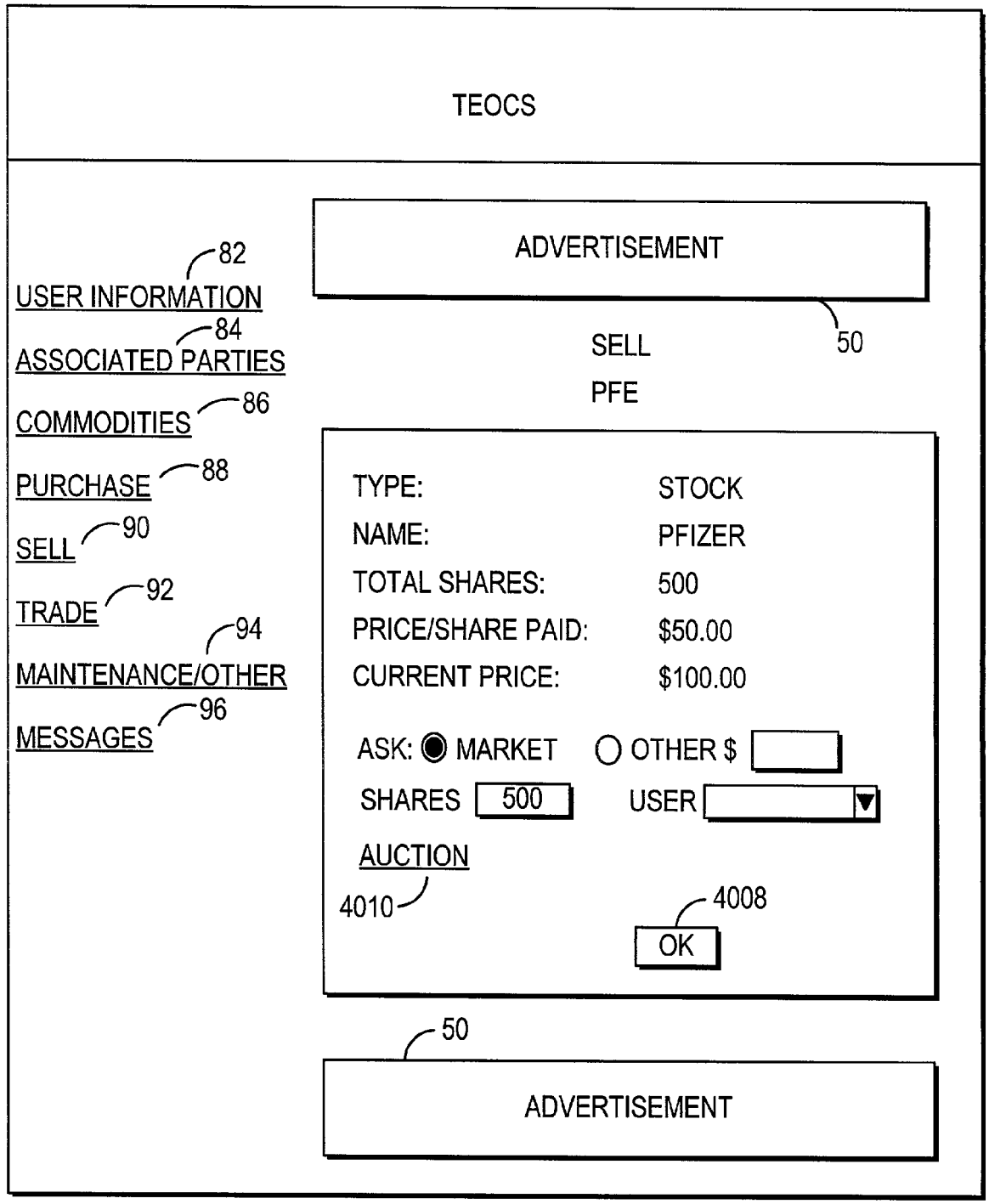
FIGS. 40a and 40b show illustrative pages that the system may provide to a user with an opportunity to sell and auction stocks in accordance with the present invention.

An illustrative sell commodity page 4000 that the system may provide in response to the user indicating a desire to sell commodity PFE is shown in FIG. 40*a*. Sell commodity page 4000 may display, for example, the type of commodity (in this example a stock), its name, the total amount of shares owned, the price originally paid for each share, the current price, whether there are drag-along or tag-along rights, or any other suitable information. The current price may be determined and displayed using any suitable approach and frequency. Sell commodity page 4000 may also provide the user with an opportunity to specify a price for the commodity. The user may, for example, specify that the shares be sold at the current market price or at some other asking price. The user may also specify the number of shares (i.e., all or a portion of the user's total holdings of the commodity) the user wishes to sell. The user may also specify a purchasing user or purchasing users to whom the selling user wishes to sell the commodity. When the user finishes defining the sales request (e.g., by pressing button 4008), the system may generate the sales request and attempt to match it with pending purchase requests if a purchasing user or users are not specified. In this example, the commodity is not co-owned. If the commodity were co-owned, the system may notify the other co-owners of the pending sales request. If there were drag-along rights, the system may provide the co-owners with an opportunity to purchase the commodity before other non-co-owners.

Figure 40B:
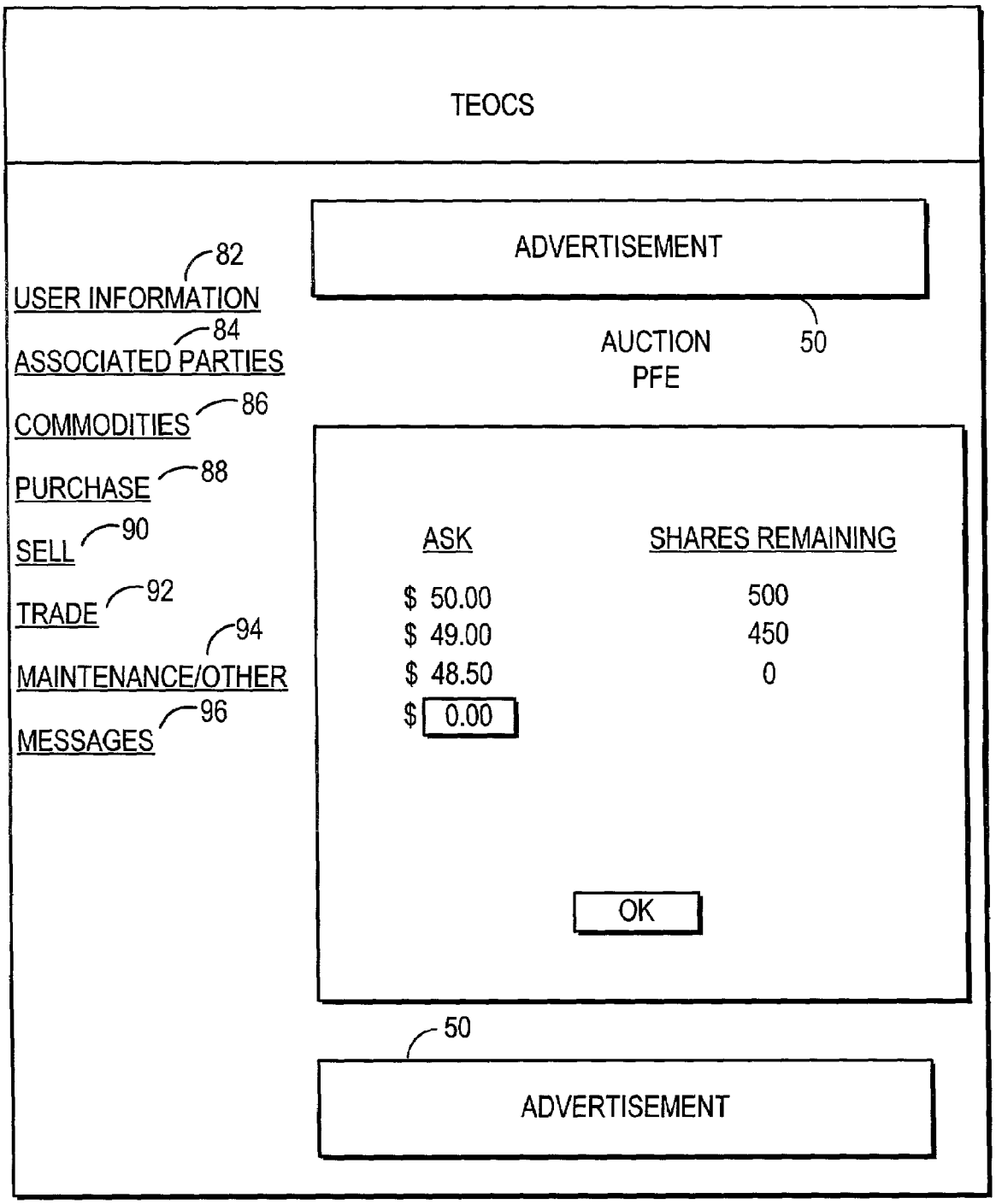

The user may indicate a desire to auction the commodity, or a portion of the commodity, by, for example, selecting link 4010. In response, the system may provide an auction page. An illustrative auction page 4025 is shown in FIG. 40*b*. In this example, a Dutch auction is used. The seller offers all of the shares at the market price, and keeps lowering the price until all of the shares are sold. Any suitable open or closed auction approach may be used to sell a commodity. In this example, the commodity is not co-owned. If the commodity were co-owned, the system may notify the other co-owners of the pending auction request. If there were drag-along rights, the system may provide the co-owners with a private auction to offer them the opportunity to purchase the commodity.

Figure 41A:
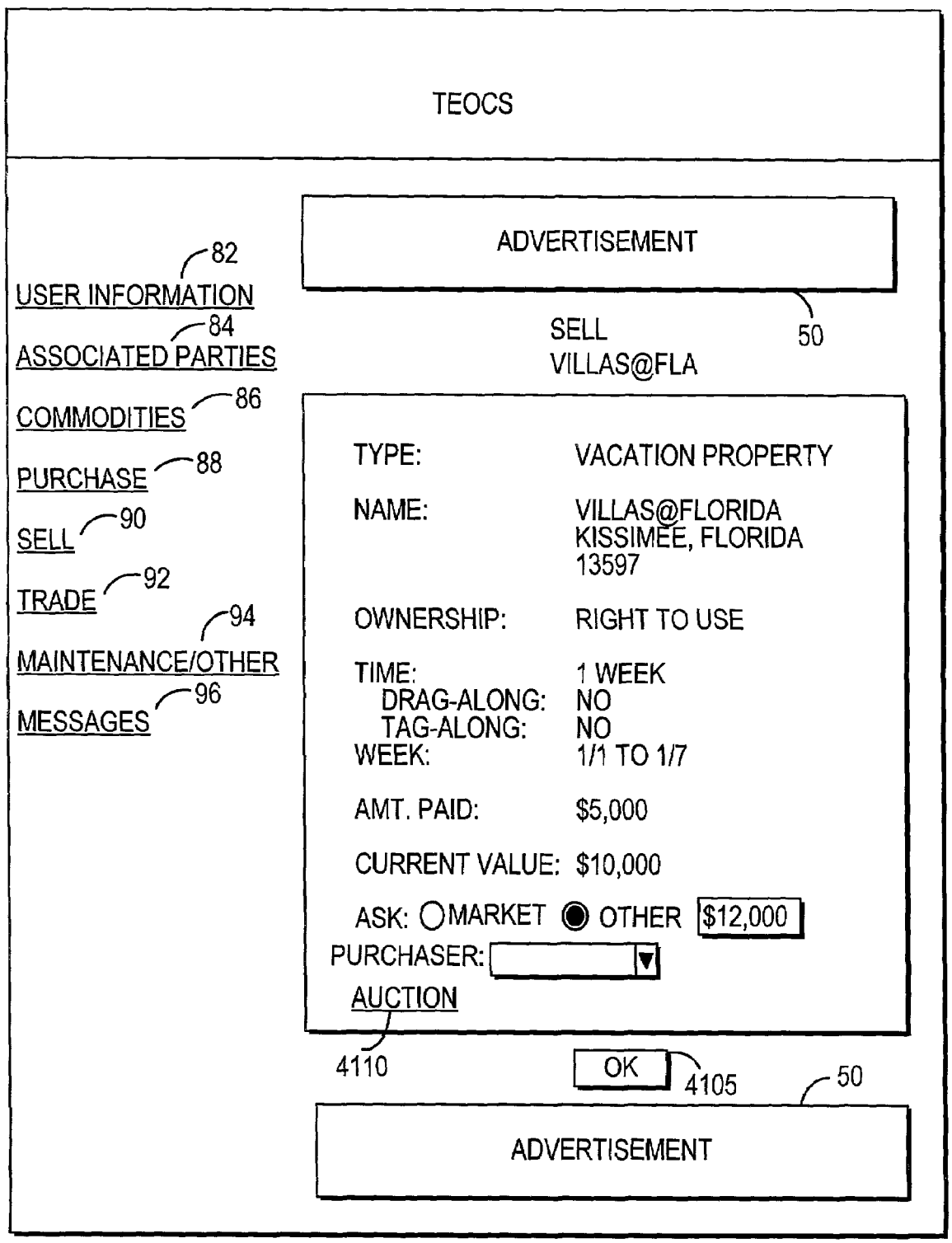
FIGS. 41a and 41b show illustrative pages that the system may provide to provide a user with an opportunity to sell and auction right-to-use type vacation property in accordance with the present invention.

An illustrative sell commodity page 4100 that the system may provide in response to the user indicating a desire to sell commodity Villas@fla is shown in FIG. 41*a*. Sell commodity page 4100 may display, for example, the type of commodity (in this example vacation property), its name, the type of ownership, the term of ownership (if applicable), the time period during which the commodity is owned, the amount paid, the current value, whether there are drag-along or tag-along rights, or any other suitable information. The current value may be determined and displayed using any suitable approach and frequency. Sell commodity page 4100 may also provide the user with an opportunity to specify a price for the commodity. The user may, for example, specify that the property be sold at the current market price or at some other asking price. The user may also specify a purchasing user or purchasing users to whom the selling user wishes to sell the commodity. When the user finishes defining the sales request (e.g., by pressing button 4105), the system may generate the sales request and attempt to match it with pending purchase requests if a purchasing user is not specified. In this example, the seller has only a right to use. The system may notify the other co-owners, the manager of the property, or the real owner of the property, of the pending sales request, and provide them an opportunity to purchase the commodity before other non-co-owners.

Figure 41B:
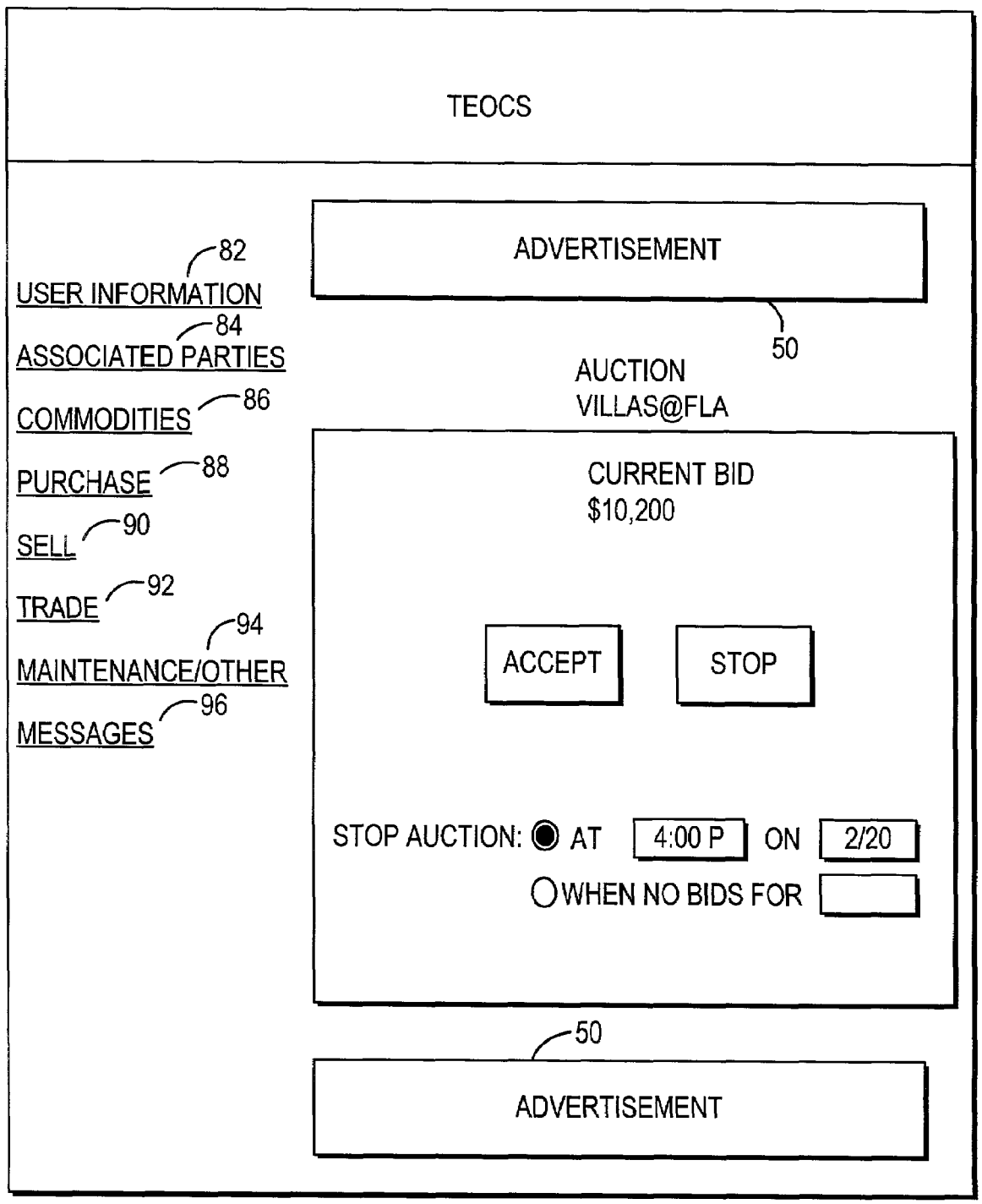

The user may indicate a desire to auction the commodity, or a portion of the commodity, by, for example, selecting link 4110. In response, the system may provide an auction page. An illustrative auction page 4125 is shown in FIG. 41*b*. In this example, an English auction is provided. The seller has offered the property at the current market price, and bidders keep bidding higher until the highest bid is reached, until the user accepts an offer, or until the user stops the auction, at a time specified by the user, or when no bids are received for a user-specified or system-specified period of time. Any suitable open or closed auction approach may be used to sell a commodity. In this example, the seller has only a right to use. The system may notify the other co-owners, the manager of the property, or the real owner of the property, of the pending auction request, and provide them an opportunity to purchase the commodity before other non-co-owners.

An illustrative sell commodity page 4200 that the system may provide in response to the user indicating a desire to sell commodity Dakota is shown in FIG. 42*a*. Sell commodity page 4200 may display, for example, the type of commodity (in this example residential property), its name, size, the amount paid, the current value, the type of ownership, whether there are drag-along or tag-along rights, or any other suitable information. The current price may be determined and displayed using any suitable approach and frequency. Sell commodity page 4200 may also indicate to the user whether there is a pending request for the commodity. The user may review the request by, for example, selecting link 4210. In response the system may provide a request information page, such as illustrative request information page 4575 of FIG. 45*c*.

Sell commodity pages such as sell commodity page 4200 may also provide the user with an opportunity to specify a price for a commodity. The user may, for example, specify that the property be sold at the current market price or at some other asking price. The user may also specify a purchasing user or purchasing users to whom the selling user wishes to sell the commodity. When the user finishes defining the sales request (e.g., by pressing button 4205), the system may generate the sales request and attempt to match it with pending purchase requests if a purchasing user or users are not specified. In this example, the seller has only a right to use. The system may notify the other co-owners, the manager of the property, or the real owner of the property, of the pending sales request, and provide them an opportunity to purchase the commodity before other non-co-owners. By providing the user with an opportunity to sell the user's right to use, the system effectively puts the user into direct ownership of the property. The system may also put the user or a purchaser into direct ownership by, for example, providing for the sale of the property as a deeded-week property.

Figure 42B:
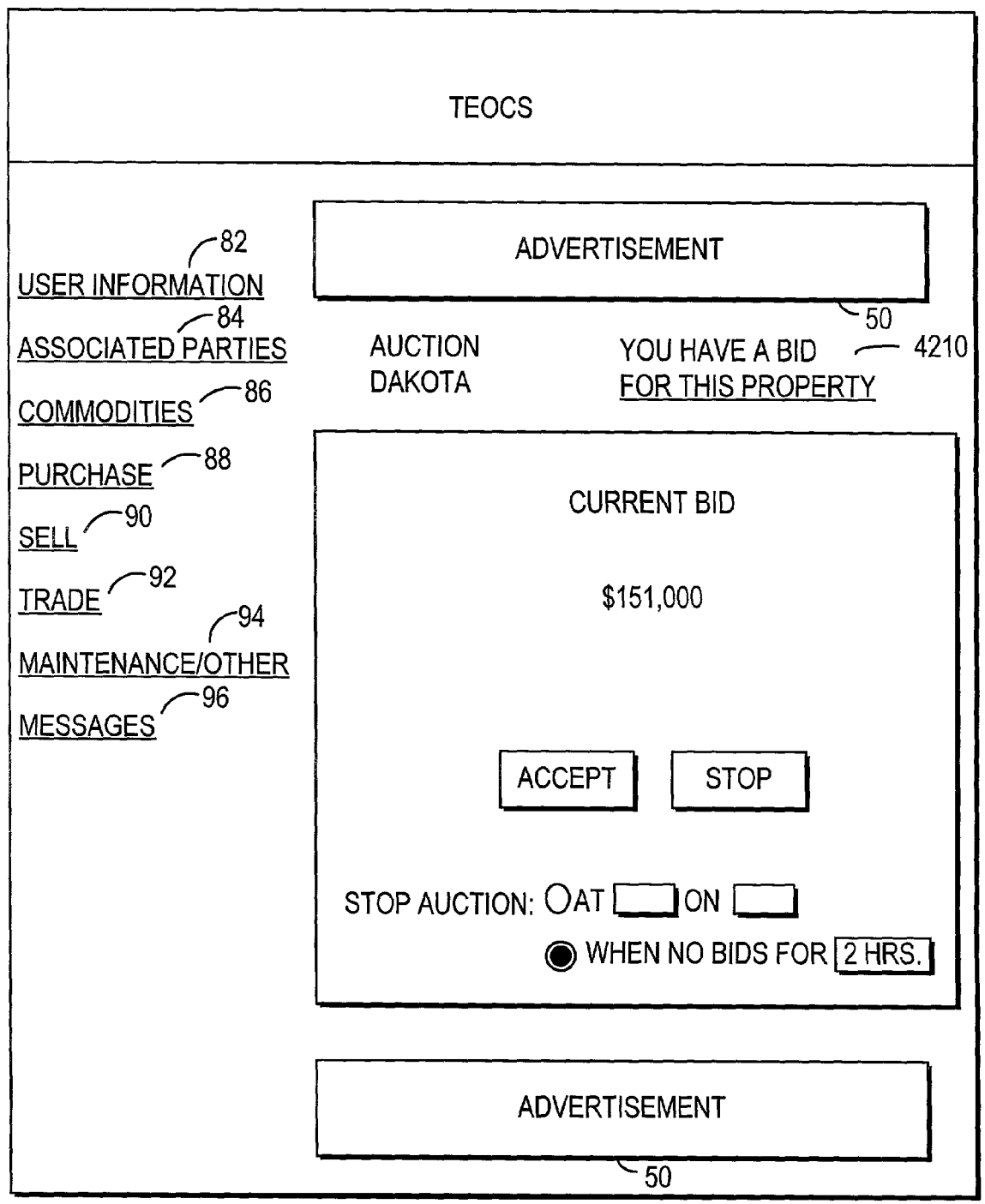

The user may indicate a desire to auction the commodity, or a portion of the commodity, by, for example, selecting link 4212. In response, the system may provide an auction page. An illustrative auction page 4225 is shown in FIG. 42*b*. In this example, an English auction is used. The seller has offered the property at the current market price, and bidders keep bidding higher until the highest bid is reached, until the user accepts an offer, or until the user stops the auction, at a time specified by the user, or when no bids are received for a user-specified or system-specified period of time. Any suitable open or closed auction approach may be used to sell a commodity. In this example, the seller has only a right to use. The system may notify the other co-owners, the manager of the property, or the real owner of the property, of the pending auction request, and may provide them an opportunity to purchase the commodity before other non-co-owners.

An illustrative sell commodity page 4300 that the system may provide in response to the user indicating a desire to sell commodity LIPA is shown in FIG. 43*a*. Sell commodity page 4300 may display, for example, the type of commodity (in this example utilities/electrical), its name, the amount paid, the output purchased, the current value, the type of ownership, whether there are drag-along or tag-along rights, or any other suitable information. The current price may be determined and displayed using any suitable approach and frequency. Sell commodity page 4300 may also provide the user with an opportunity to specify a price for the commodity. The user may, for example, specify that the commodity be sold at the current market price or at some other asking price. The user may also specify a purchasing user or purchasing users to whom the selling user wishes to sell the commodity. When the user finishes defining the sales request (e.g., by pressing button 4305), the system may generate the sales request and attempt to match it with pending purchase requests if a purchasing user or users are not specified. In this example, the commodity is not co-owned.

Figure 43B:
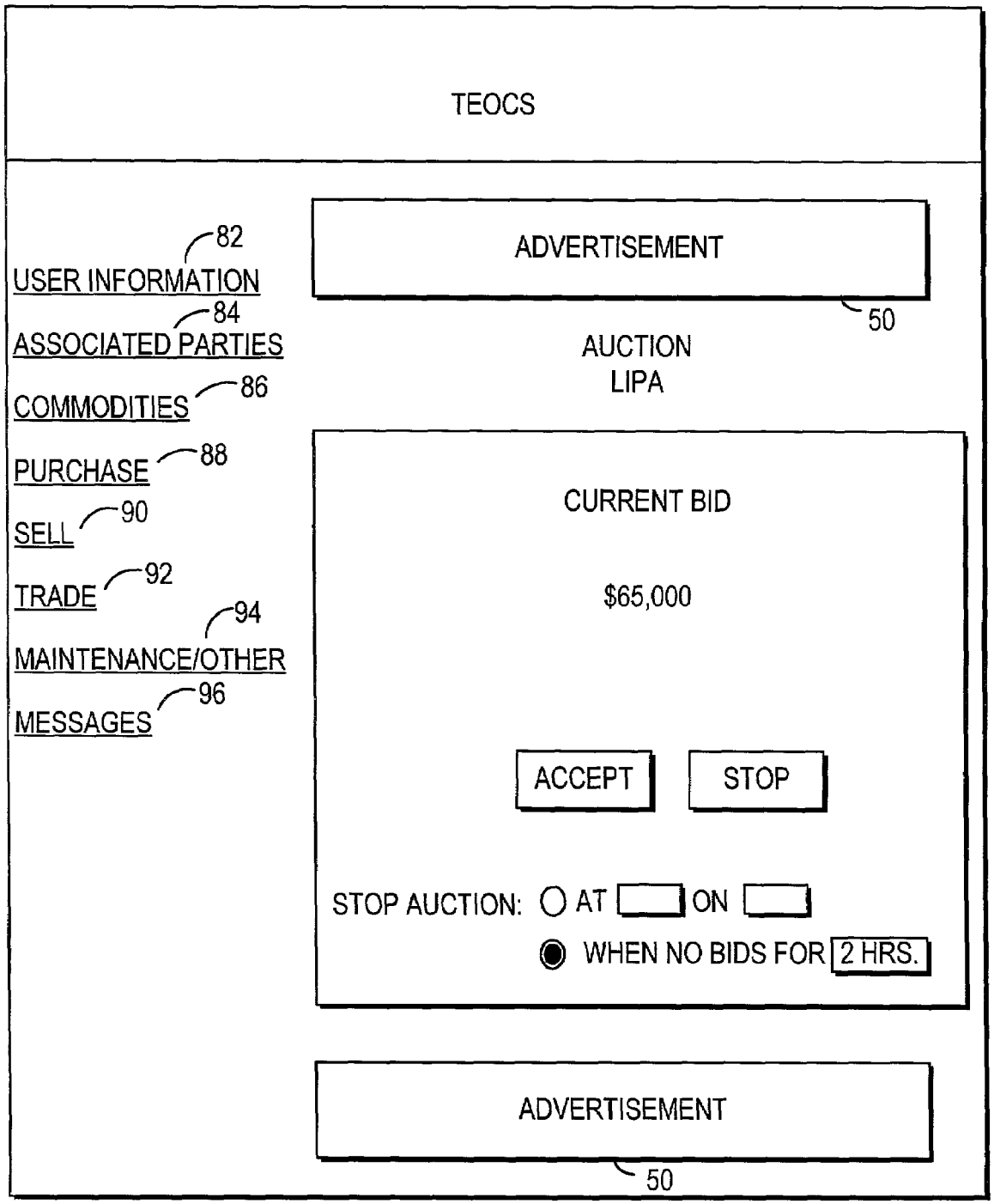

The user may indicate a desire to auction the commodity, or a portion of the commodity, by, for example, selecting link 4310. In response, the system may provide an auction page. An illustrative auction page 4325 is shown in FIG. 43*b*. The seller has offered the commodity at the price paid, and bidders keep bidding higher until the highest bid is reached, until the user accepts an offer, or until the user stops the auction, at a time specified by the user, or when no bids are received for a user-specified or system-specified period of time. Any suitable open or closed auction approach may be used to sell a commodity. In this example, the commodity is not co-owned.

Figure 44B:
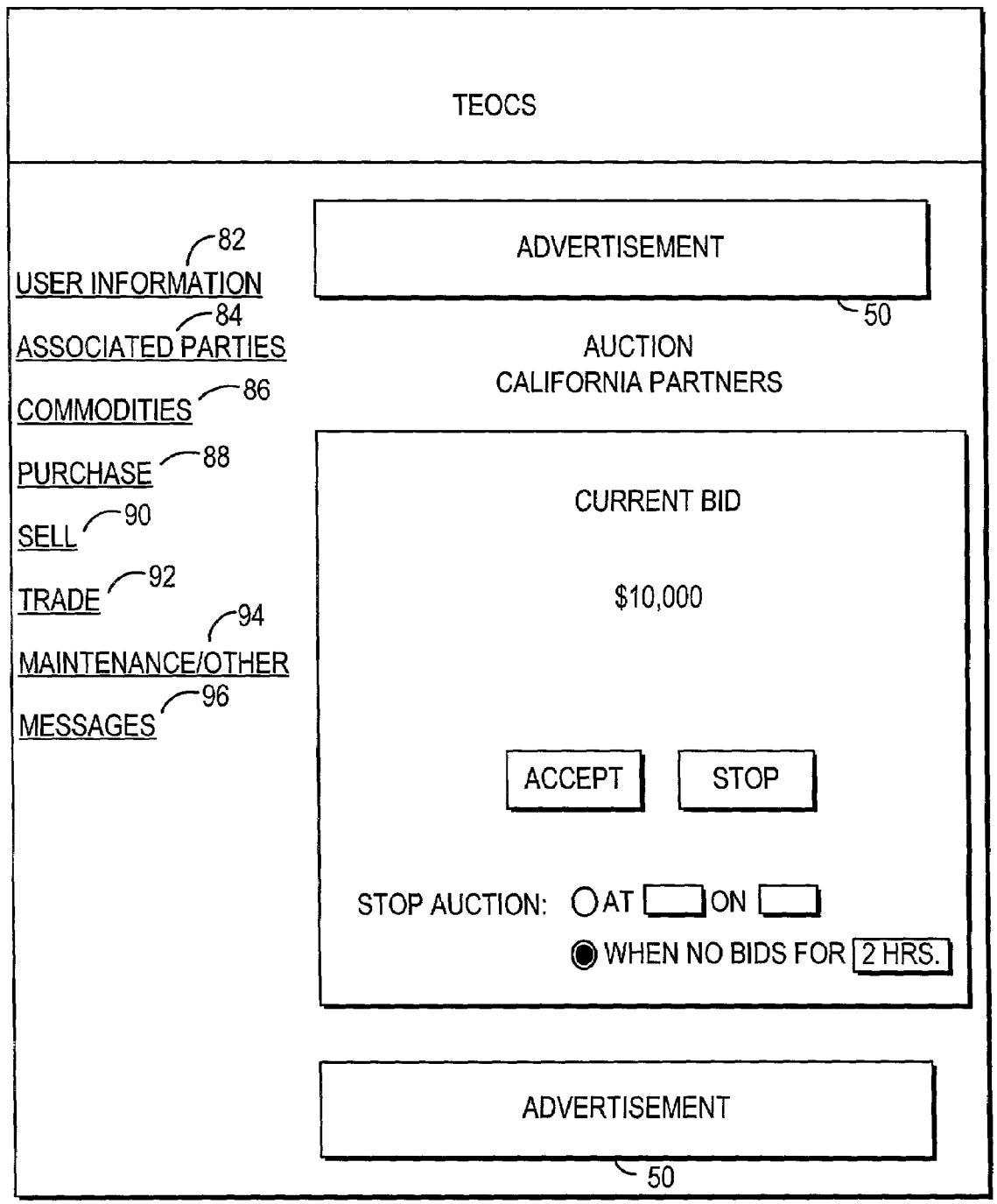

An illustrative sell commodity page 4400 that the system may provide in response to the user indicating a desire to sell commodity California Partners is shown in FIG. 44*a*. Sell commodity page 4400 may display, for example, the type of commodity (in this example vacation property), its name, the amount paid, the current value, the type of ownership (in this example deeded week), whether there are drag-along or tag-along rights, or any other suitable information. The current price may be determined and displayed using any suitable approach and frequency. Sell commodity page 4400 may also provide the user with an opportunity to specify a price for the commodity. The user may, for example, specify that the property be sold at the current market price or at some other asking price. The user may also specify a purchasing user or purchasing users to whom the selling user wishes to sell the commodity. When the user finishes defining the sales request (e.g., by pressing button 4405), the system may generate the sales request and attempt to match it with pending purchase requests if a purchasing user is not specified. In this example, the property is owned by deeded-week. Thus, there may be co-owners of the user's property for other weeks. In this example, the user has drag-along rights. Accordingly, the user may drag the co-owners of the property along in the sale. The system may notify the co-owners and provide them with an opportunity to purchase the property.

The user may indicate a desire to auction the commodity, or a portion of the commodity, by, for example, selecting link 4410. In response, the system may provide an auction page. An illustrative auction page 4425 is shown in FIG.

44*b*. In this example, an English auction is provided. The seller has offered the commodity at the price paid, and bidders keep bidding higher until the highest bid is reached, until the user accepts an offer or until the user stops the auction, at a time specified by the user, or when no bids are received for a user-specified or system-specified period of time. Any suitable open or closed auction approach may be used to sell a commodity. In this example, the commodity is co-owned with drag-along rights. The system may notify the co-owners and provide them with an opportunity to purchase the property at the highest bid.

Figure 39:
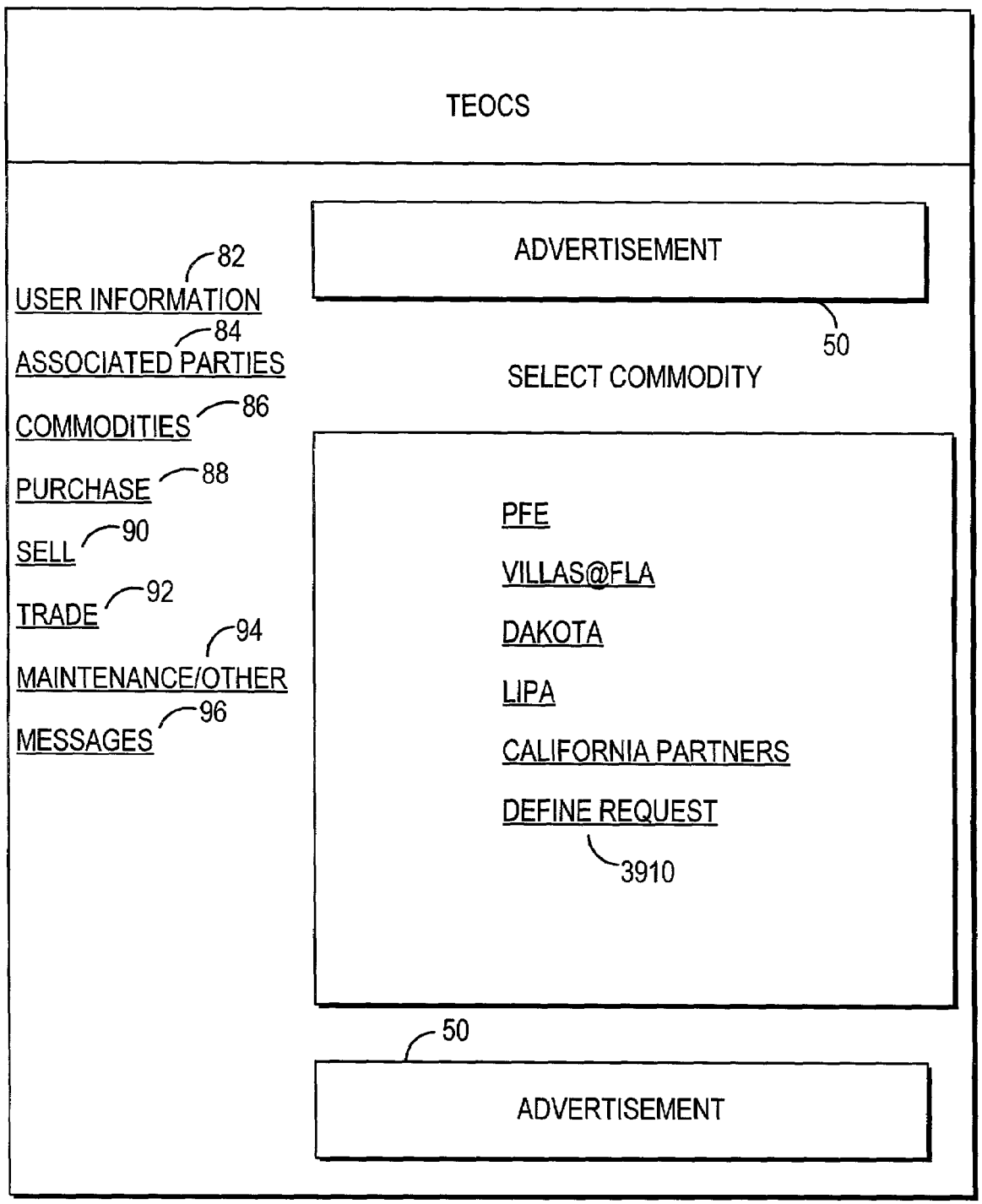
FIG. 39 shows an illustrative select commodity page that the system may provide in response to a user indicating a desire to sell commodities, in accordance with the present invention.
Figure 45A:
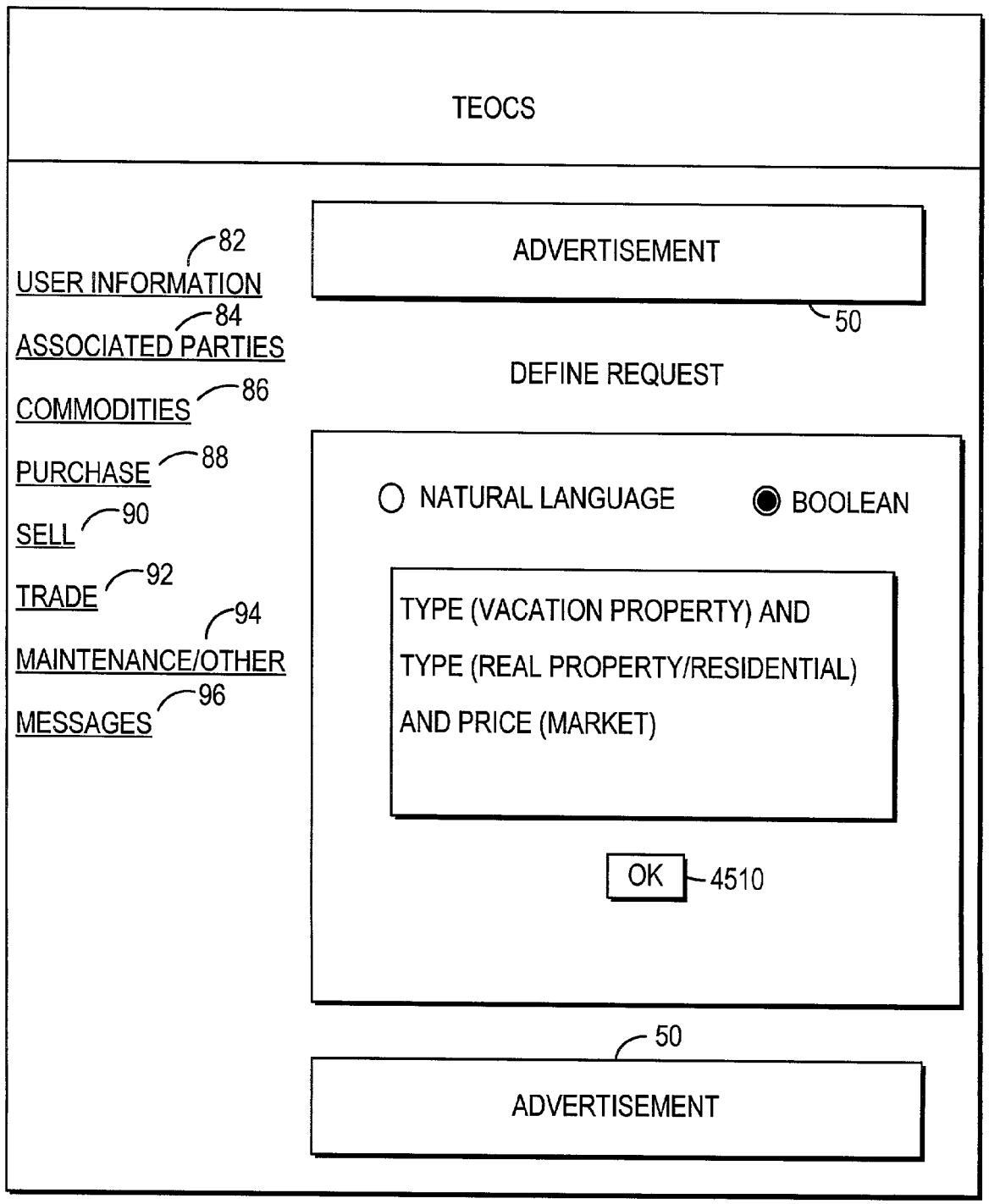
FIGS. 45a–45c show illustrative pages that the system may provide to a user with an opportunity to define sales requests using expressions, in accordance with the present invention.

A user may indicate a desire to define a sales request by, for example, selecting link 3910 of FIG. 39. In response, the system may provide a define sales request page. A define sales request page may provide the user with an opportunity to define a request for a specific unique or fungible commodity, or for a class of commodities, depending on how the user formulates the user's expression. An illustrative define sales request page 4500 is shown in FIG. 45*a*. As shown in FIG. 45*a*, the system may provide the user with an opportunity to indicate the type of expression the user will define, and to define the expression. FIG. 45*a* illustrates the use of radio buttons and a text-box to provide these opportunities, but any suitable combination of user interface elements may be used. The system may, for example, provide the user with a list of key words (e.g., type, price, etc.) to choose from when defining a boolean expression. The user may indicate that the user is finished defining an expression by, for example, pressing button 4510. In this example, the user's only commodity that satisfies the expression is Dakota.

Figure 45B:
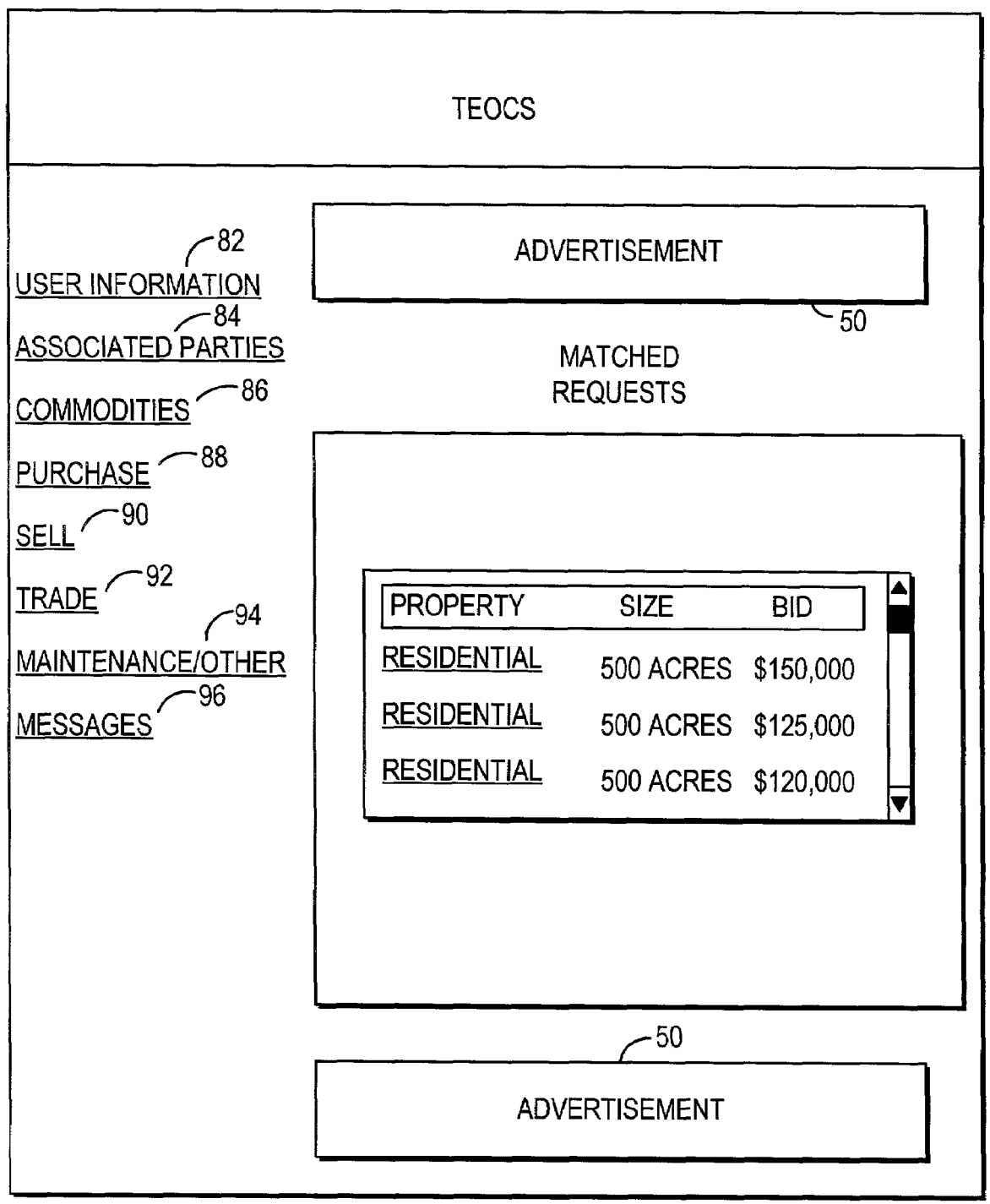
Figure 45C:
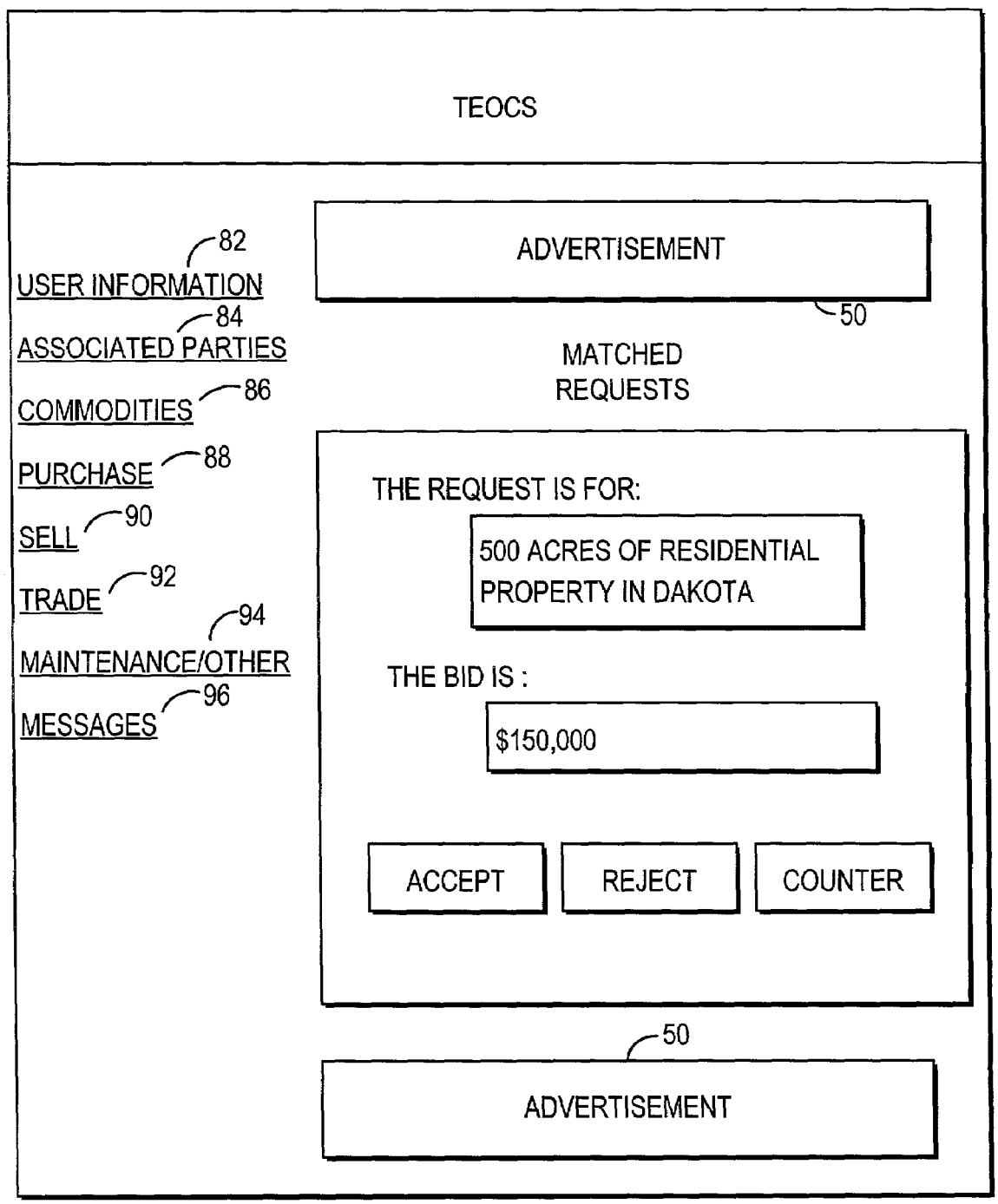
Figure 46:
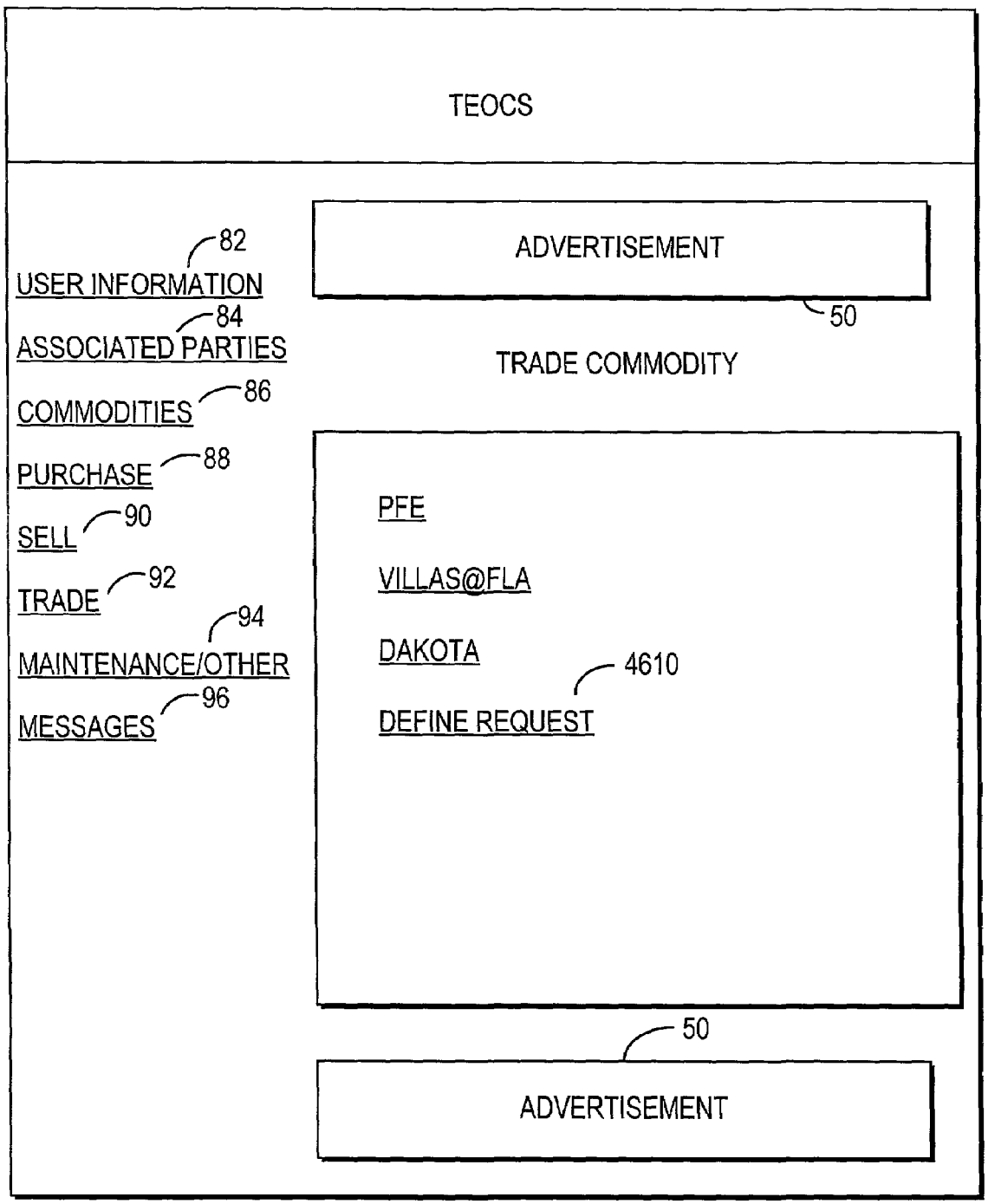
FIG. 46 shows an illustrative commodity selection page that the system may provide in response to a user indicating a desire to trade a commodity, in accordance with the present invention.

In response to the user defining an expression, the system may search for purchase requests that match the expression. The system may present the matched requests in a matched requests page, such as illustrative matched requests page 4550 of FIG. 45*b*. In the example of FIG. 45*b*, only one request was found that matched the expression exactly. The other requests matched in type but not in price. The user may indicate a desire to access additional information about a request by, for example, selecting a link associated with the request. In response, the system may provide a request information page, such as illustrative request information page 4575 of FIG. 45*c*. In this example, the purchasing user has defined his request as a natural language expression for a class of commodities. Request information page 4575 may provide the user with an opportunity to accept the request, reject the request, or provide a counter-offer.

Returning to FIG. 16*a*, the system may also provide users with opportunities to trade commodities. In response to a user indicating a desire to trade commodities by, for example, selecting link 92 from page 16*a* or any page that includes link 92, the system may provide a commodity selection page, such as illustrative commodity selection page 4600 of FIG. 46. The user may indicate a desire to trade a particular commodity by, for example, selecting a link associated with the commodity. Users may also indicate a desire to trade a commodity by, for example, selecting link 2820 of FIG. 28*a*, link 2920 of FIG. 29*a*, link 3025 of FIG. 30*a*, link 3135 of FIG. 31*a*, or link 3235 of FIG. 32.

Figure 47A:
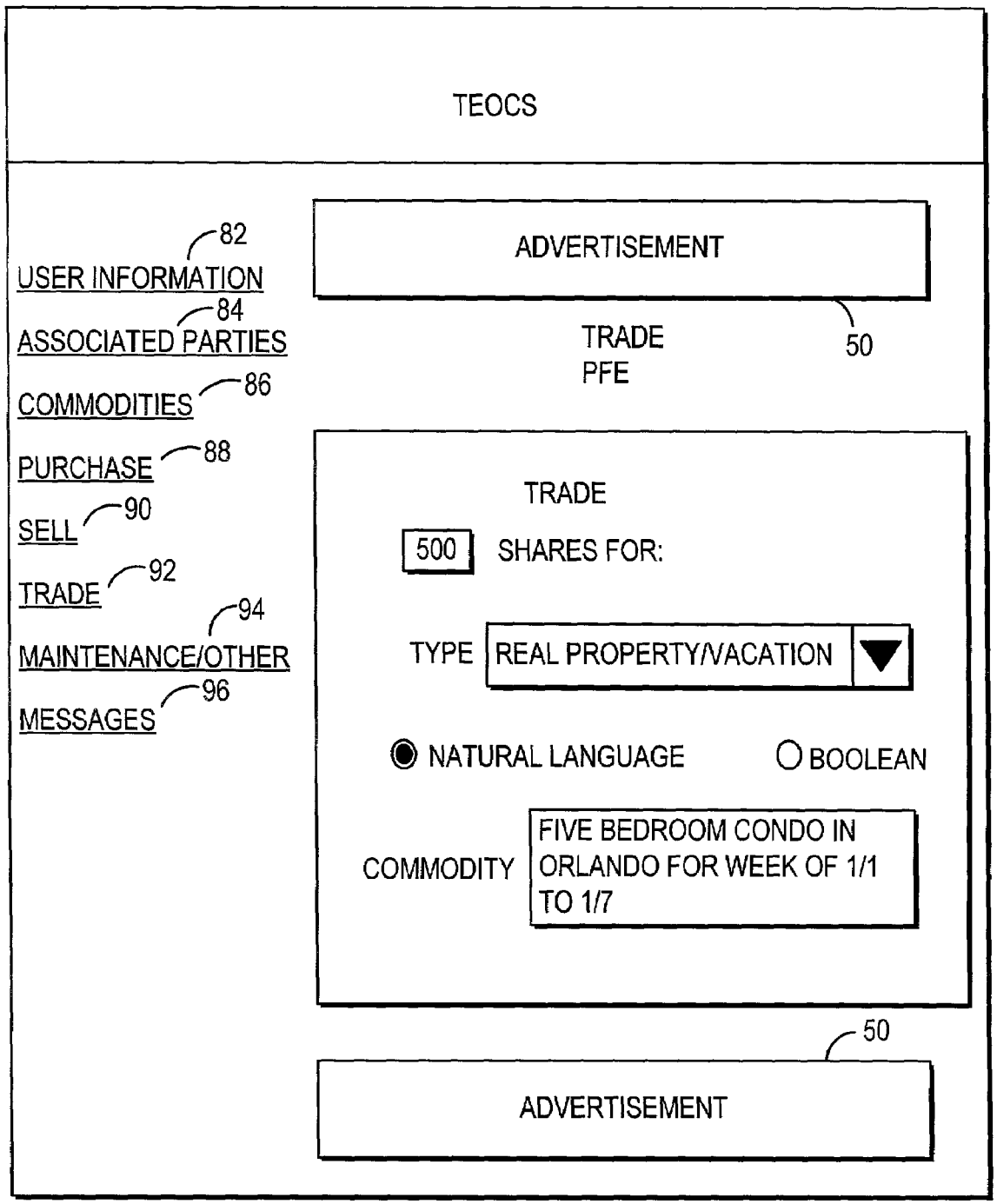
FIGS. 47a–47k show illustrative pages that the system may provide to provide users with opportunities to trade illustrative types of commodities, in accordance with the present invention.
Figure 47B:
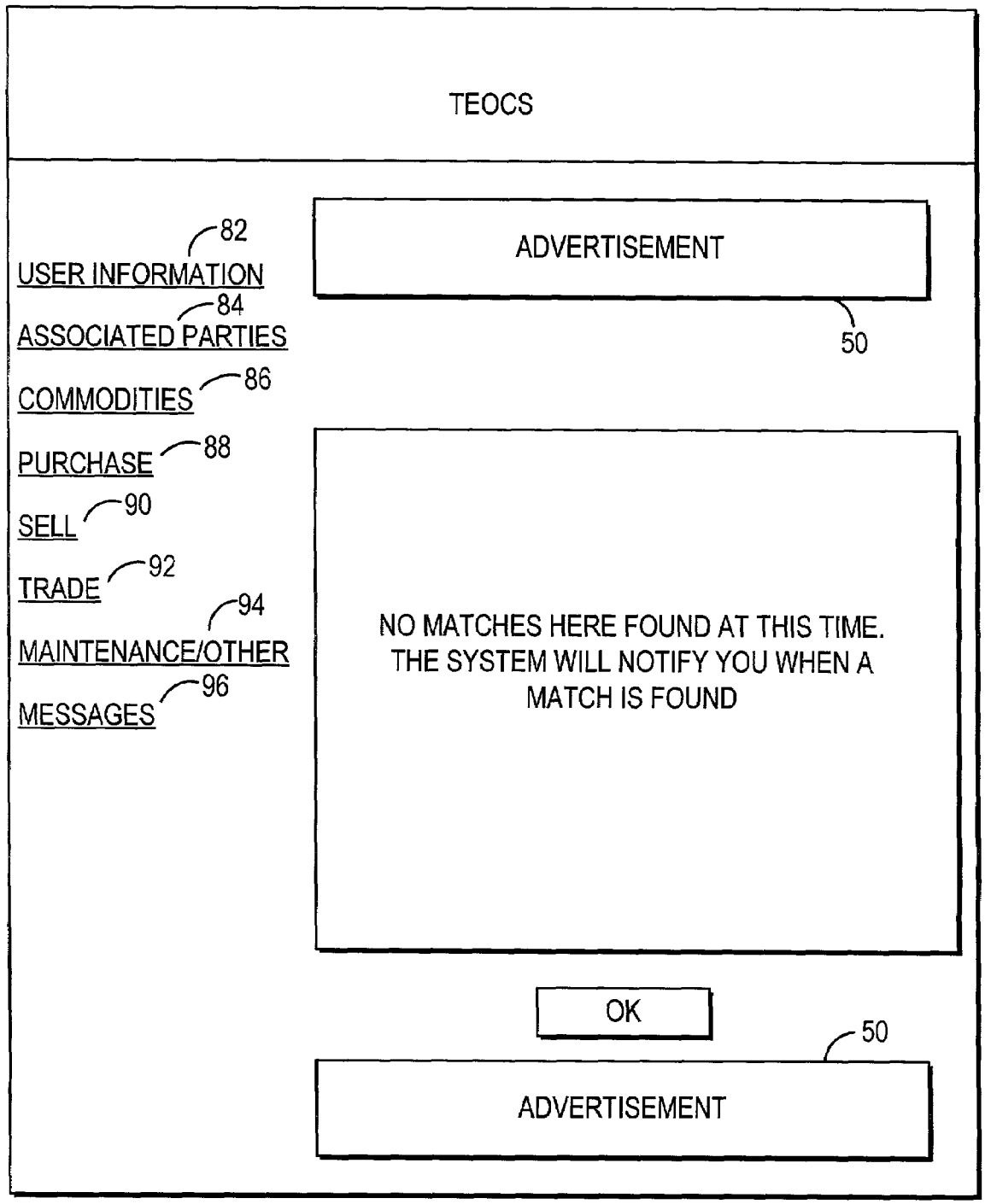

In response to a user indicating a desire to trade a particular commodity, the system may provide a trade request page. Page 4700 of FIG. 47*a* illustrates a trade request page that the system may provide when, for example, the user indicates a desire to trade commodity PFE. The system may provide the user with an opportunity to select a type of commodity for which the user wishes to trade commodity PFE. In this example the user has selected commodities of type real property/vacation. The system may also provide the user with an opportunity to indicate a particular property, or to define a class of properties, either of which may be accomplished by, for example, defining an expression. In an alternative approach, the system may provide the user with an opportunity to indicate a particular commodity or class of commodities without first selecting a type. Once the user has indicated a commodity type, particular property, or a class of properties, the system may attempt to match the trade request. In this example, the system has found no matches. The system may indicate to the user that no matches were found and that the system will notify the user when a match is found as shown, for example, in page 4710 of FIG. 47*b*.

Figure 47C:
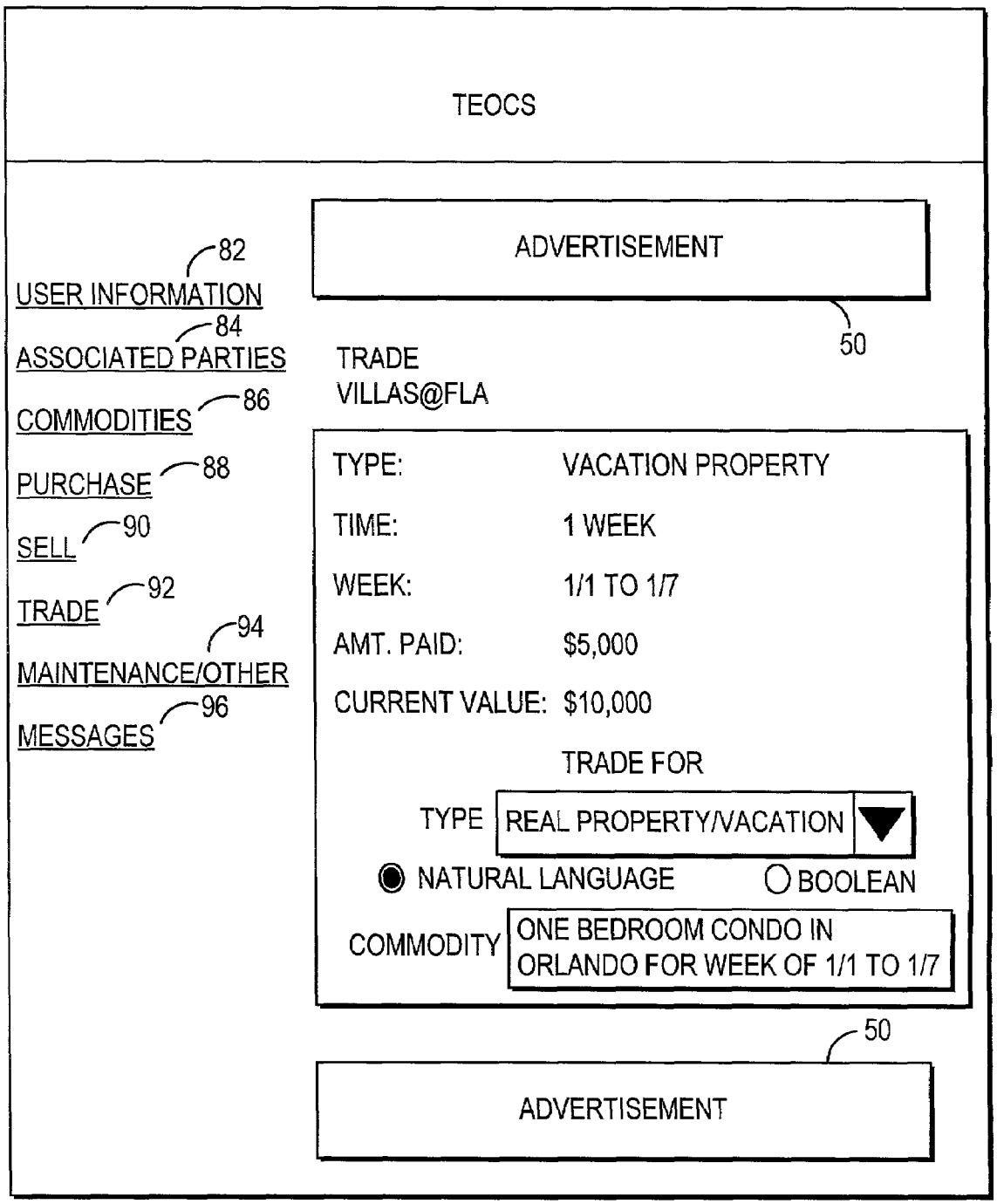
Figure 47D:
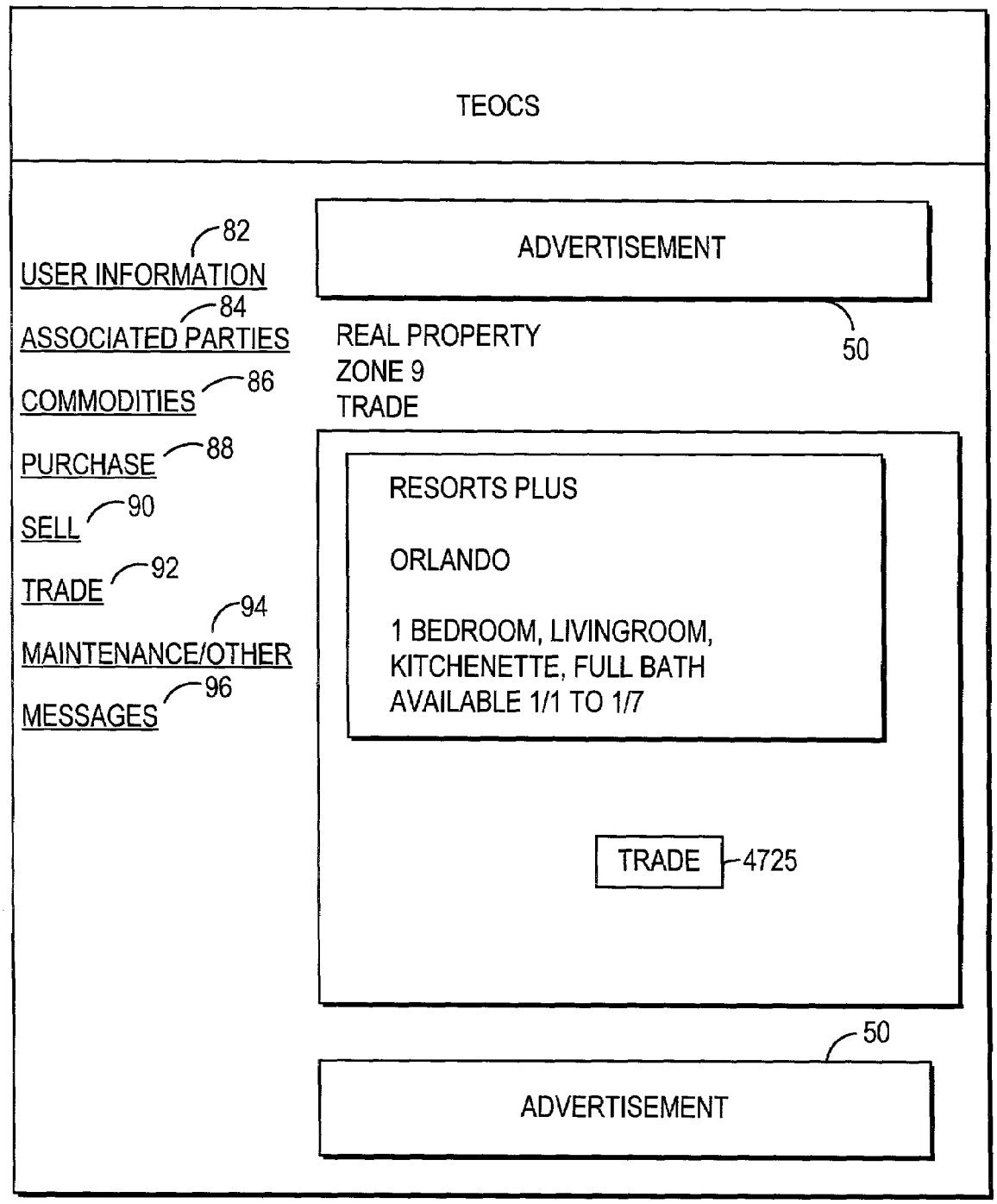

FIG. 47*c* illustrates a trade request page 4720 that the system may provide when, for example, the user indicates a desire to trade commodity Villas@fla. The system may provide the user with an opportunity to select a type of commodity for which the user wishes to trade commodity Villas@fla. In this example the user has selected commodities of type real property/vacation. The system may provide the user with an opportunity to indicate a particular property, or to define a class of properties, either of which may be accomplished by, for example, defining an expression. In an alternative approach, the system may provide the user with an opportunity to indicate a particular commodity or class of commodities without first selecting a type. Once the user has indicated a particular property, or a class of properties, the system may attempt to match the trade request. In this example, the system has found a match as shown in page 4730 of FIG. 47*d*. The system may provide the user with an opportunity to trade commodities by, for example, pressing button 4725. The system may respond by initiating the trade. When either of the traded commodities are co-owned, the system may notify the co-owners of the trade. When either commodity is co-owned subject to drag-along or tag-along rights, the system may provide the co-owners with opportunities to participate in the trade. Users may obtain additional information by, for example, selecting a link associated with the matched commodity.

Figure 47E:
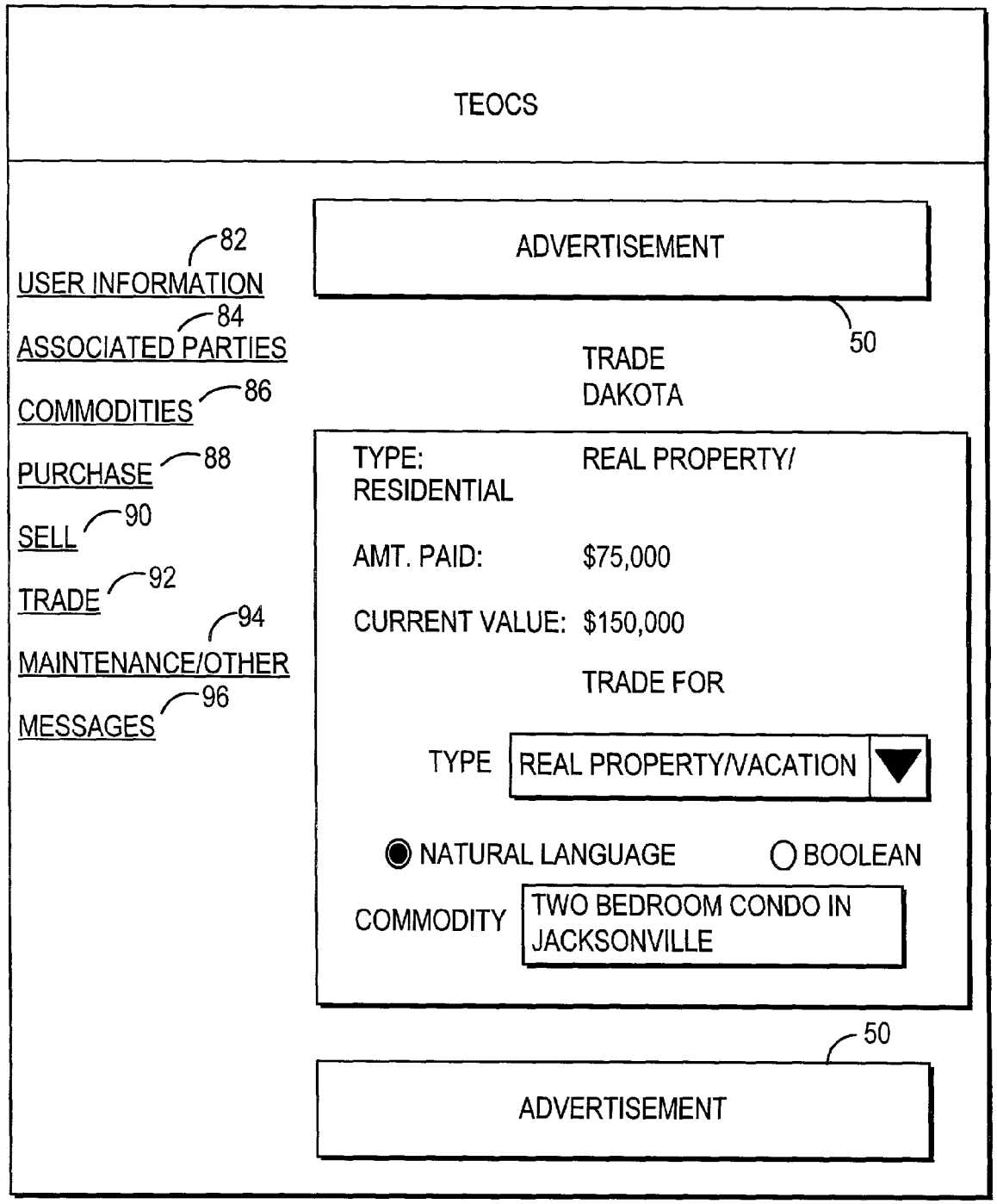
Figure 47F:
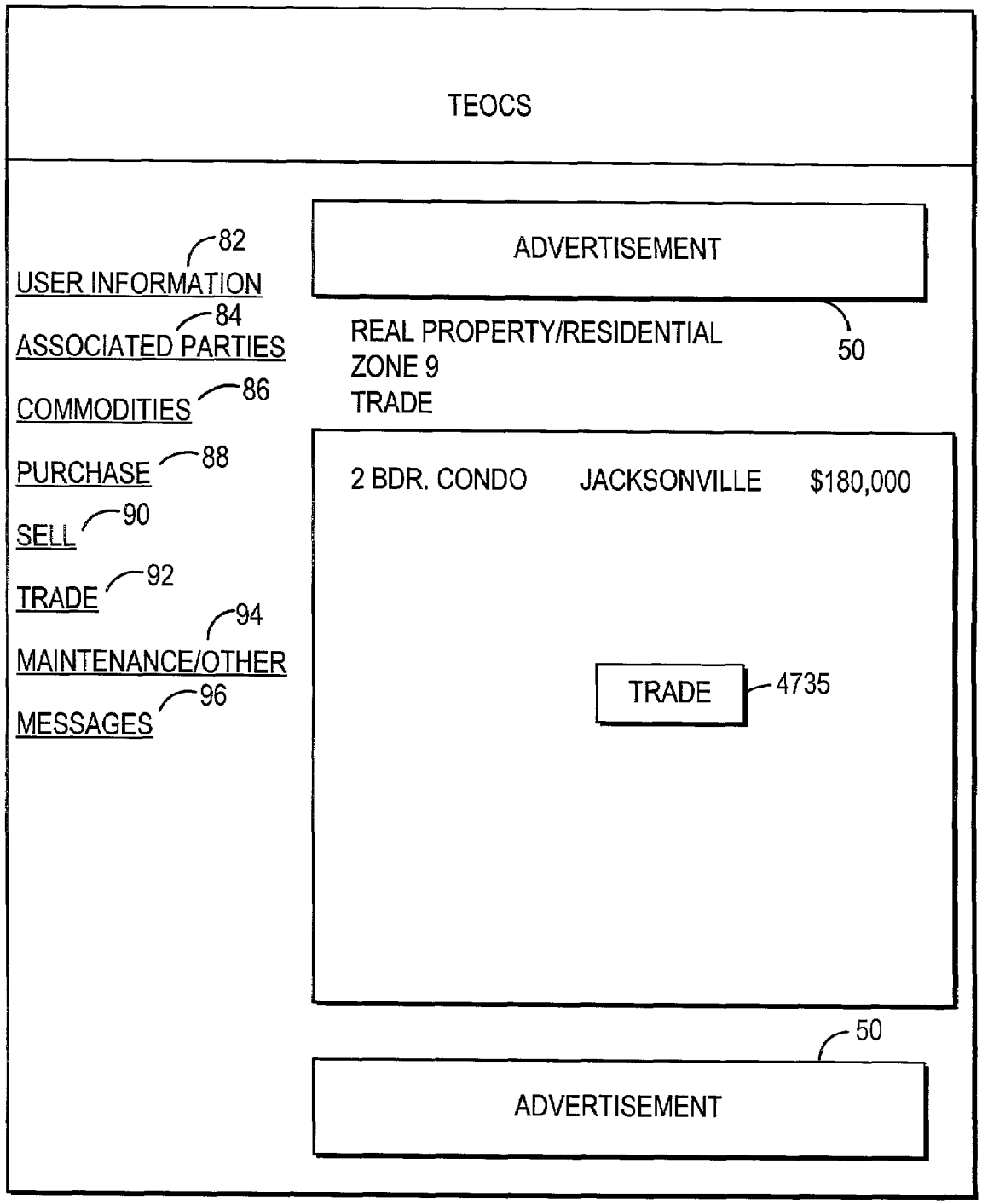

FIG. 47*e* shows an illustrative trade request page 4740 that the system may provide when, for example, the user indicates a desire to trade commodity Dakota. The system may provide the user with an opportunity to select a type of commodity for which the user wishes to trade commodity Dakota. In an alternative approach, the system may provide the user with an opportunity to indicate a particular commodity or class of commodities without first selecting a type. In this example the user has selected commodities of type real property/residential. The system may provide the user with an opportunity to indicate a particular property, or to define a class of properties, either of which may be performed by defining an expression. Once the user has indicated a particular property, or a class of properties, the system may attempt to match the trade request. In this example, the system has found a match as shown in page 4750 of FIG. 47*f*. The system may provide the user with an opportunity to trade commodities by, for example, pressing button 4735. The system may respond by initiating the trade. When either of the traded commodities are co-owned, the system may notify the co-owners of the trade. When either commodity is co-owned subject to drag-along rights, the system may provide the co-owners with opportunities to participate in the trade. Users may obtain additional information by, for example, selecting a link associated with the matched commodity.

Figure 47G:
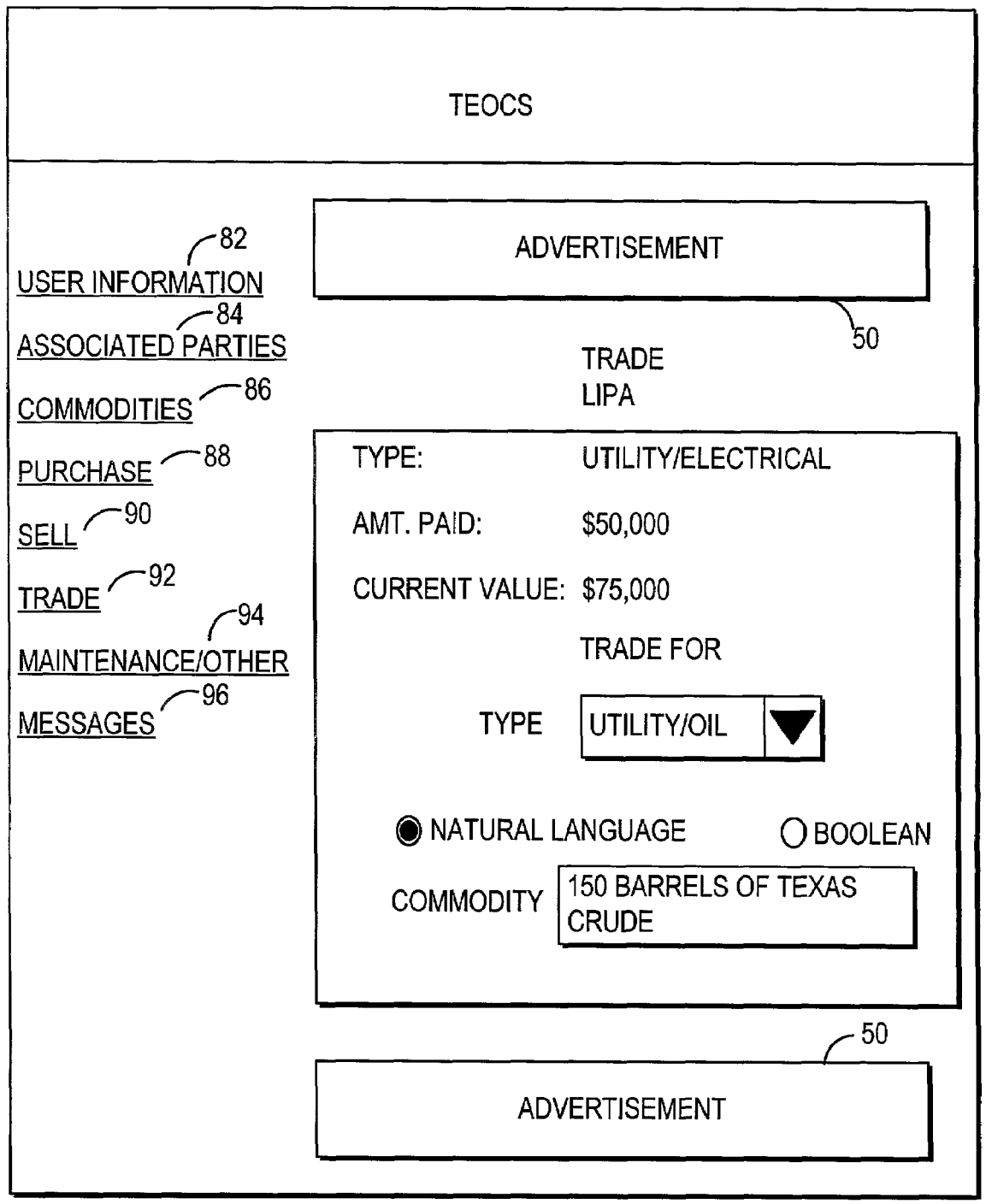
Figure 47H:
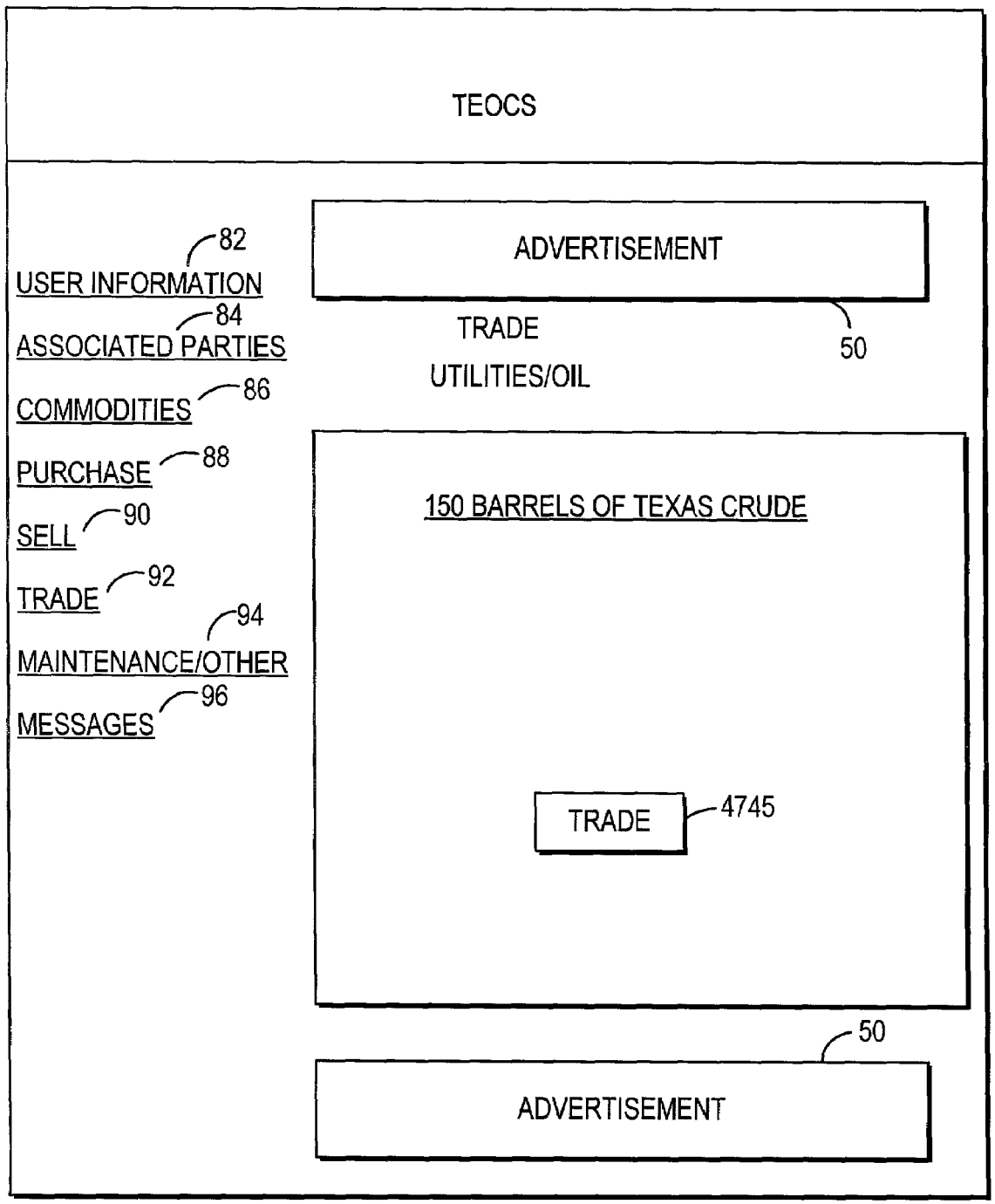

FIG. 47*g* illustrates a trade request page 4760 that the system may provide when, for example, the user indicates a desire to trade commodity LIPA. The system may provide the user with an opportunity to select a type of commodity for which the user wishes to trade. In this example the user has selected commodities of type utilities/oil. The system may provide the user with an opportunity to indicate a particular commodity, or to define a class of commodities, within the selected type if desired. In an alternative approach, the system may provide the user with an opportunity to indicate a particular commodity, or to define a class of commodities, without first selecting a type. Any suitable approach may be used.

Once the user has indicated a particular property, or a class of properties, the system may attempt to match the trade request. In this example, the system has found a match as shown on page 4770 of FIG. 47*h*. The system may provide the user with an opportunity to trade commodities by, for example, pressing button 4745. The system may respond by initiating the trade. When either of the traded commodities are co-owned, the system may notify the co-owners of the trade. When either commodity is co-owned subject to drag-along rights, the system may provide the co-owners with opportunities to participate in the trade. Neither of the commodities in this example are co-owned.

Figure 47I:
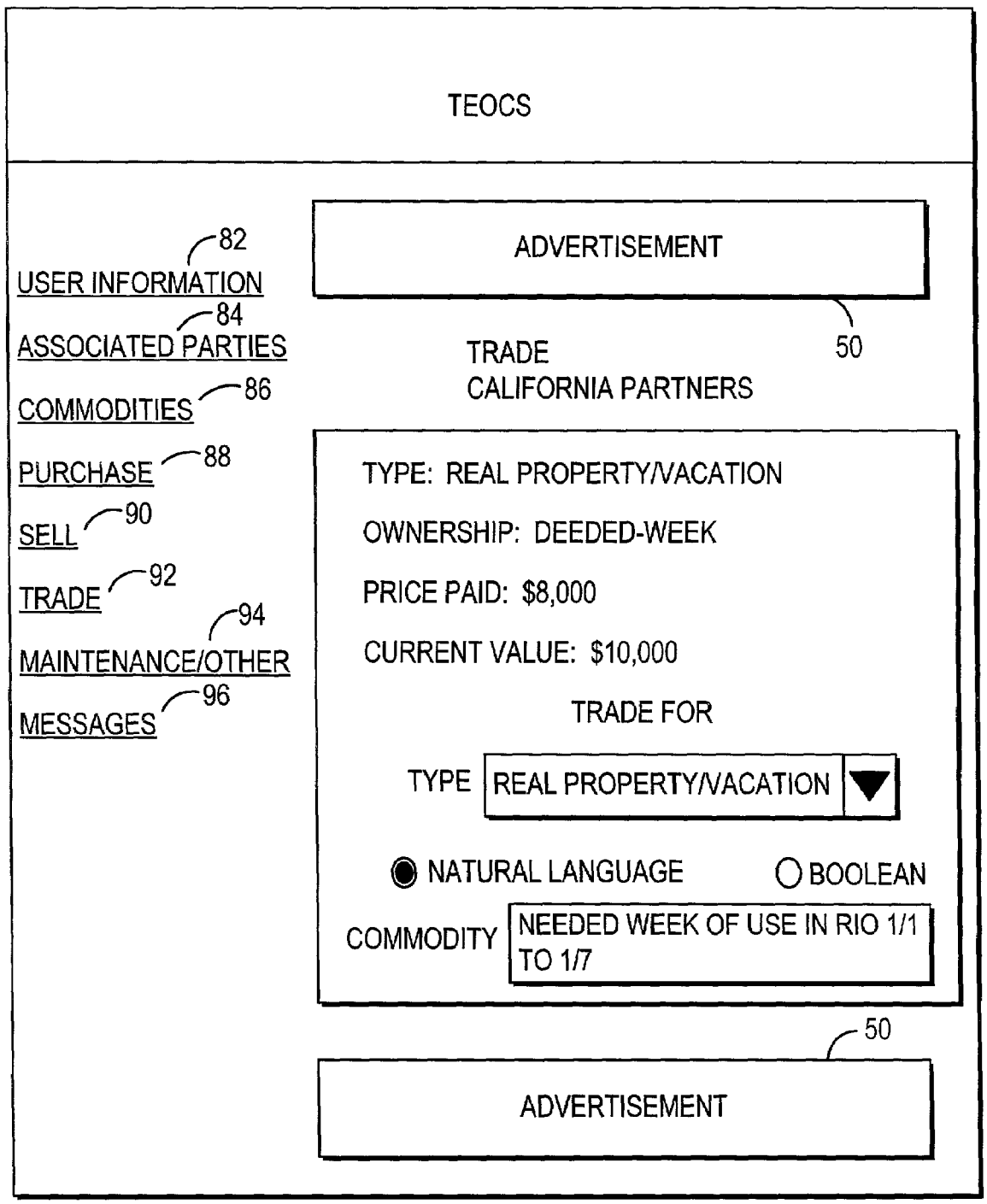
Figure 47J:
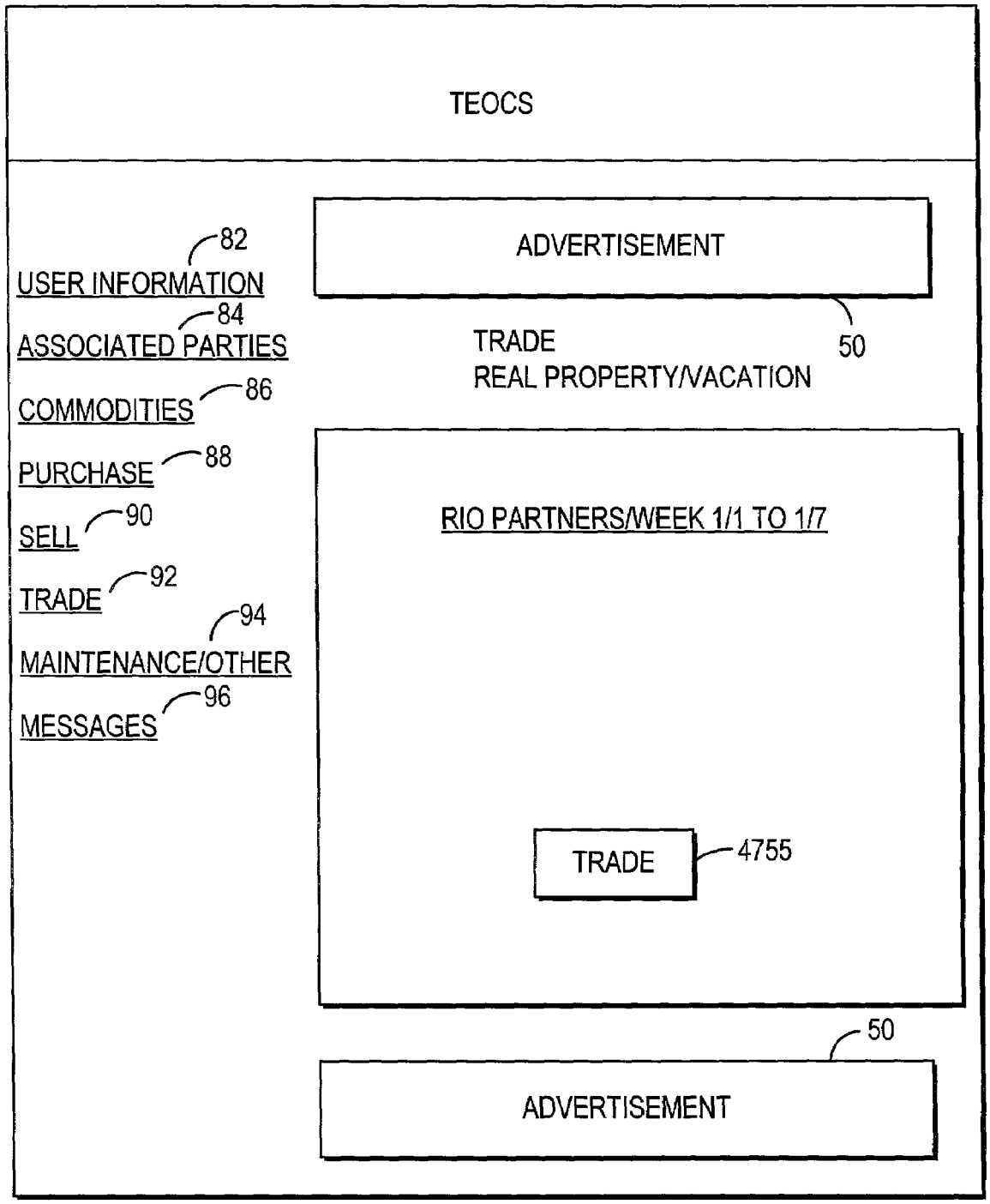
Figure 47K:
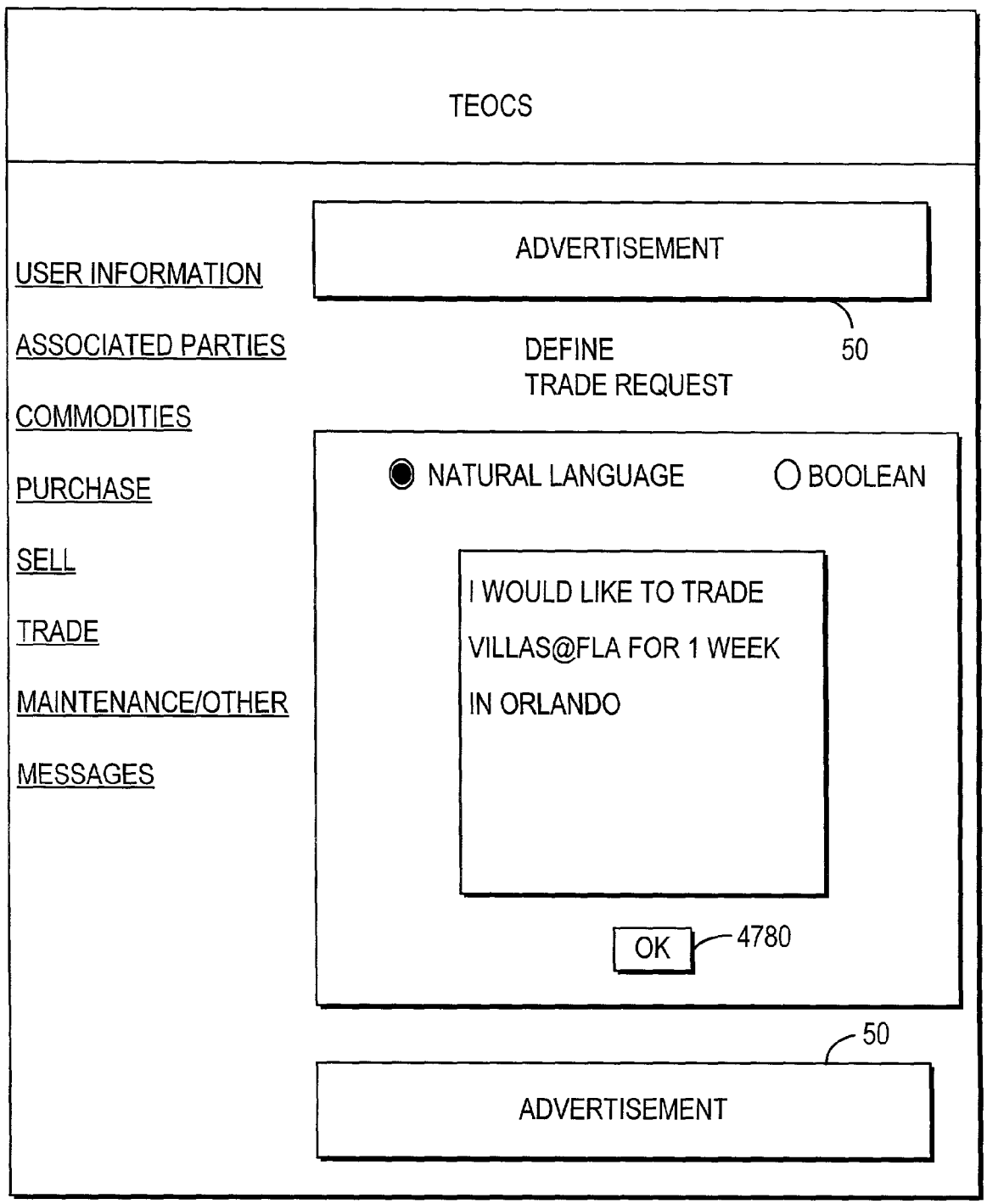

FIG. 47*i* illustrates a trade request page 4780 that the system may provide when, for example, the user indicates a desire to trade commodity California Partners. The system may provide the user with an opportunity to select a type of commodity for which the user wishes to trade commodity California Partners. In this example the user has selected commodities of type real property/vacation. The system may provide the user with an opportunity to indicate a particular commodity, or to define a class of commodities, within the selected type if desired. In an alternative approach, the system may provide the user with an opportunity to indicate a particular commodity, or to define a class of commodities, without selecting a type. Any suitable approach may be used.

Once the user has indicated a particular property, or a class of properties, the system may attempt to match the trade request. In this example, the system has found a match as shown on page 4790 of FIG. 47*j*. The system may provide the user with an opportunity to trade commodities by, for example, pressing button 4755. The system may respond by initiating the trade. When either of the traded commodities are co-owned, the system may notify the co-owners of the trade. When either commodity is co-owned subject to drag-along rights, the system may provide the co-owners with an opportunity to participate in the trade. Users may obtain additional information by, for example, selecting a link associated with the matched commodity.

The system may also provide a user with an opportunity to define trade requests using, for example, natural language or boolean expressions. In the illustrative define request page 4795 of FIG. 47*k*, for example, the user has indicated that the user wishes to define a trade request as a natural language expression. In response to the user indicating that the user has finished the expression (e.g., by pressing button 4780), the system may attempt to find trade requests of other users that match the expression. When matches are found the system may, for example, provide the user with an opportunity to select a request to trade with or to reject all requests.

Figure 48A:
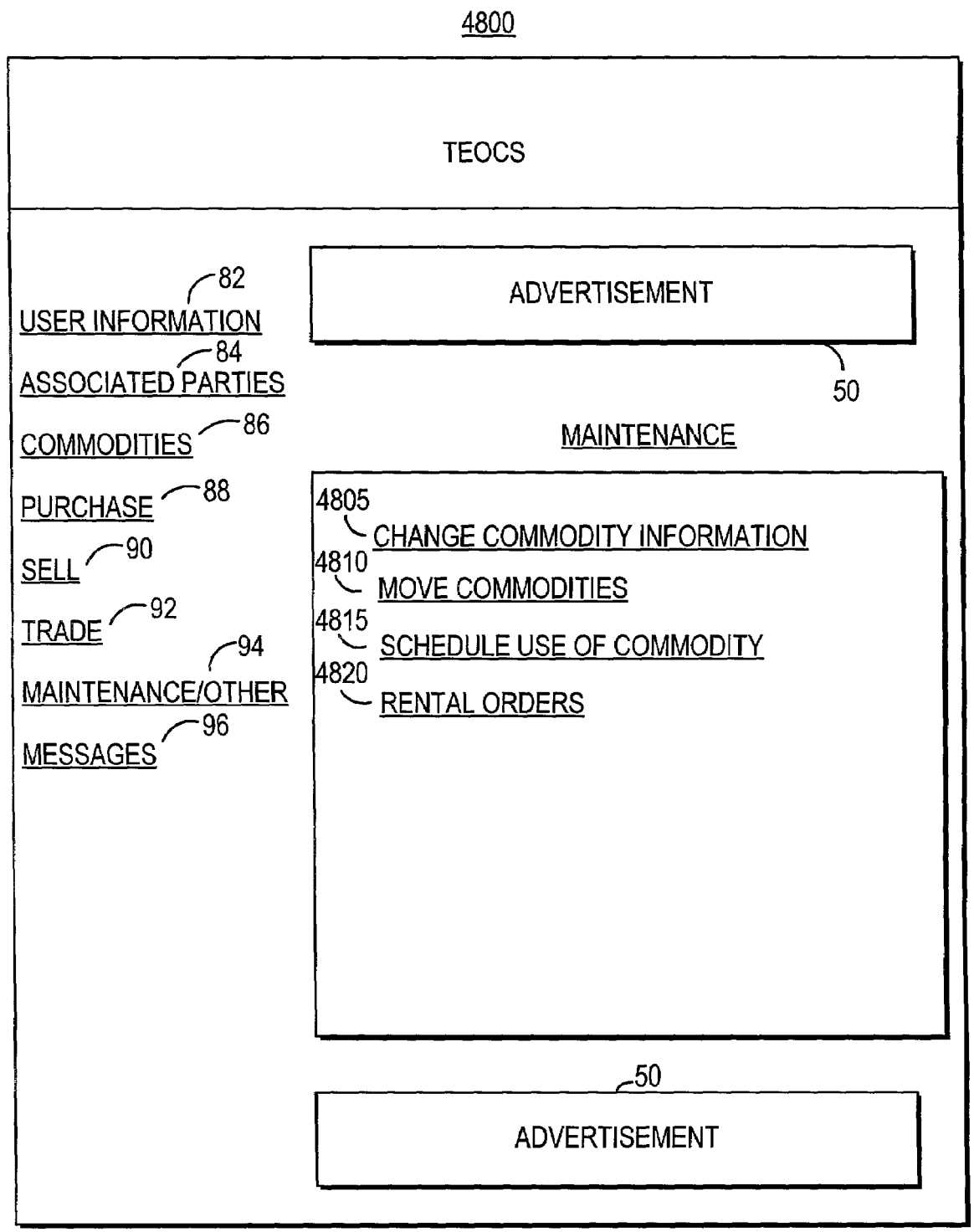
FIGS. 48a–48f show illustrative pages that the system may provide to provide users with opportunities to perform illustrative maintenance functions, in accordance with the present invention.
Figure 48B:
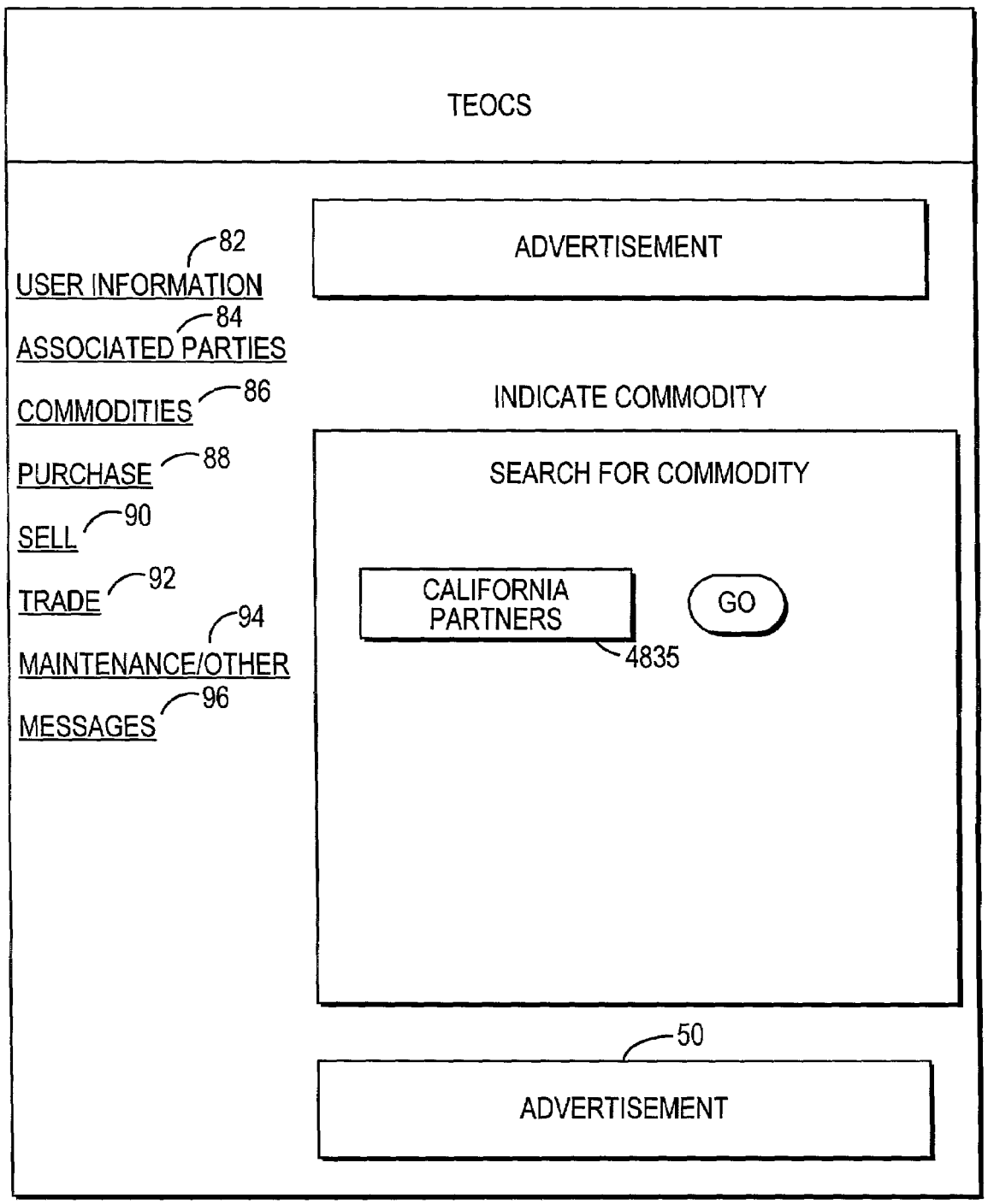

The system may also provide users with an opportunity to perform maintenance functions, such as perform maintenance schedule changes, perform maintenance fee changes, change conditions of membership in an ownership network, indicate changes in liquidity, or any other suitable function. The system may, for example, provide co-owners with opportunities to schedule their uses of a commodity, or to move commodities across networks of commodities. The system may provide users with opportunities to place orders for renting other owners' commodities or other co-owners' shares in commodities (e.g., temporal use rights). Any other suitable maintenance action may be provided. Users may indicate a desire to perform maintenance functions by, for example, selecting link 94 from within any page that provides the link. In response, the system may provide a maintenance page, such as illustrative maintenance page 4800 of FIG. 48*a*. A user may indicate a desire to access a maintenance function by, for example, selecting a link associated with the function. FIG. 48*b* shows an illustrative page 4825 that the system may provide in response to a user selecting links 4805, 4810, 4815, or 4820. Page 4825 provides the user with an opportunity to indicate the property for which the user wishes to change additional commodity information. The chosen user interface element in page 4825 is text box 4835. The user may enter one or more words that the system may search on to find a particular commodity. After finding the commodity, the system may provide the user with an opportunity to change the associated information.

Figure 48C:
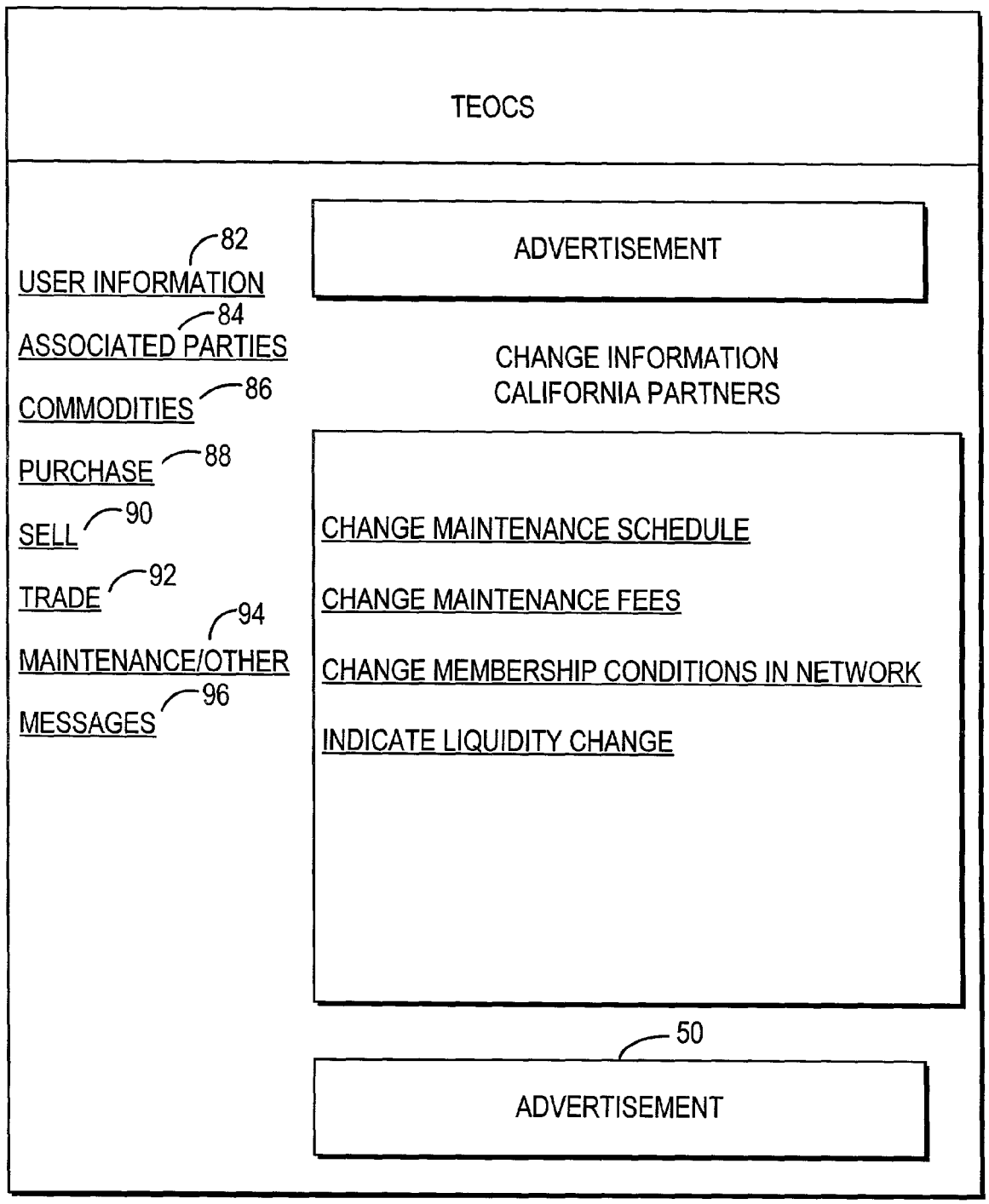

An illustrative page 4830 that the system may provide in response to a user selecting link 4805 and identifying a commodity is shown in FIG. 48*c*. The user may indicate a desire to change additional commodity information by, for example, selecting a link associated with a type of information. In response, the system may provide a page or pages with interface elements suitable for allowing the user to change the indicated information. In response to a user changing additional commodity information, the system may notify the owner (if the user is not the owner of the commodity) or co-owners of the property of the change in information.

Figure 48D:
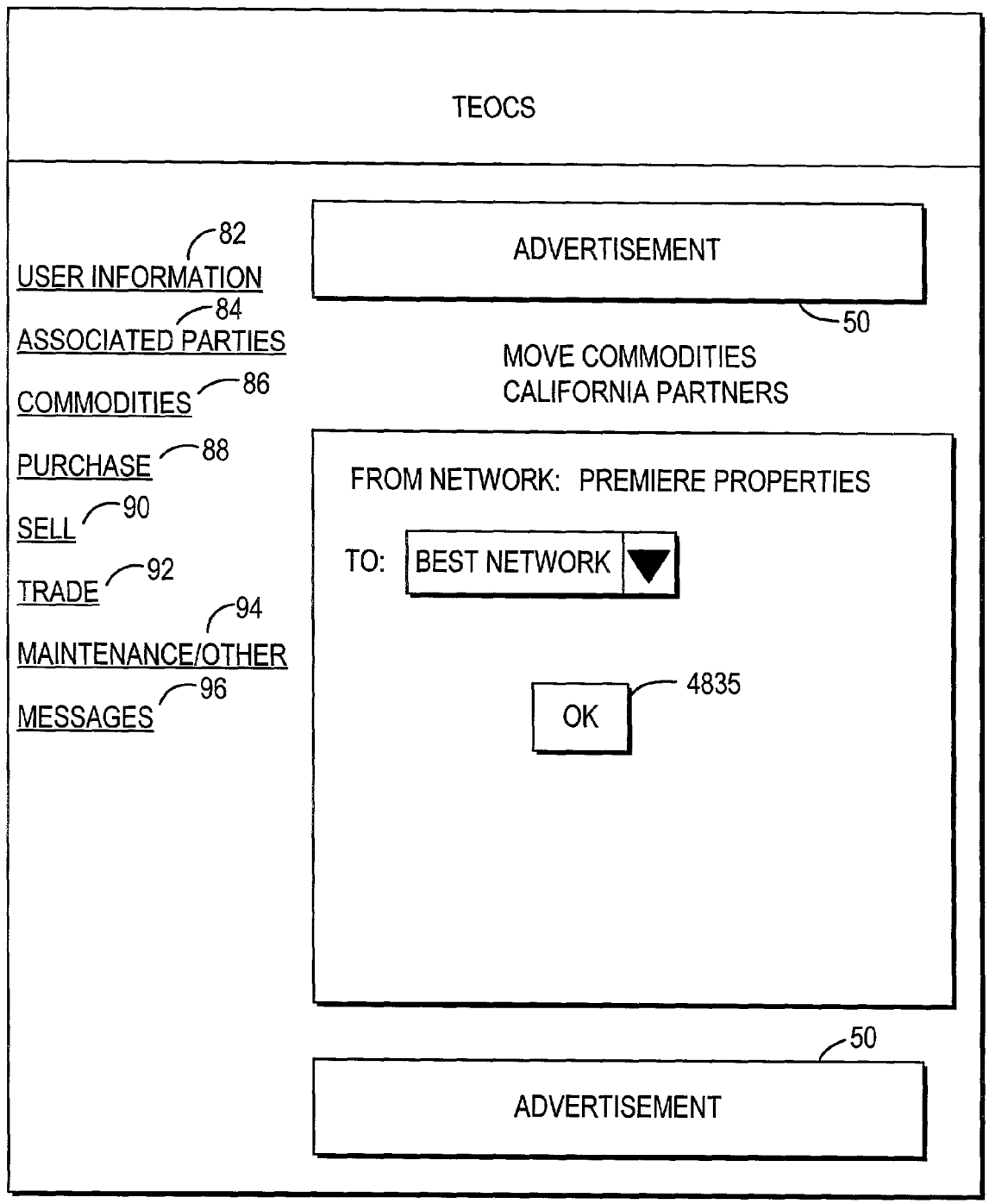

FIG. 48*d* shows an illustrative page 4840 that the system may provide in response to a user indicating a desire to move commodities across networks by, for example, selecting link 4810 (FIG. 48*a*) and identifying a commodity. In this example, the user has selected commodity California Partners. The system may provide the user with an opportunity to identify a destination network. In response to the user identifying a network, the system may transfer the commodity to the destination network.

Figure 48E:
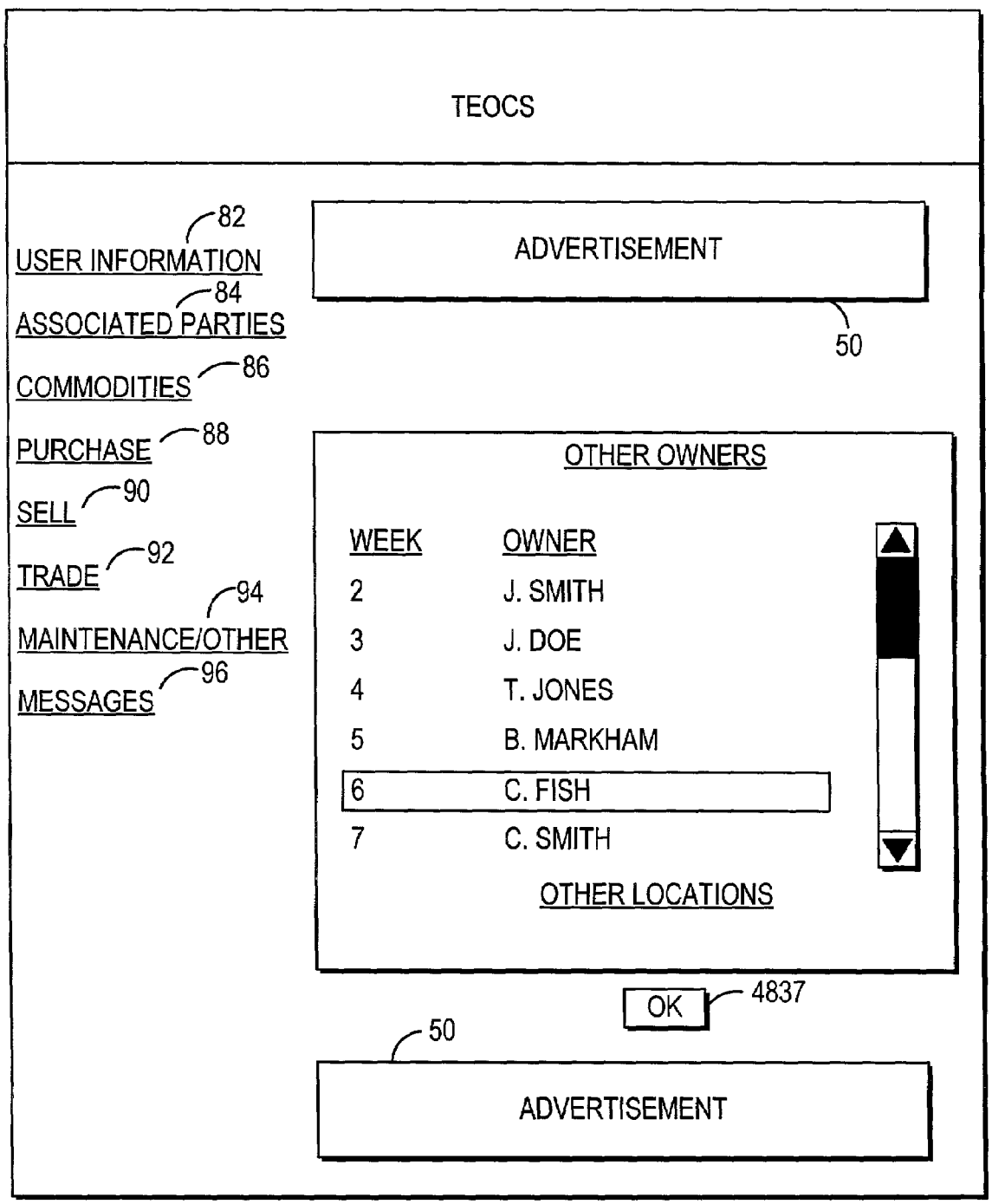

FIG. 48*e* shows an illustrative page 4850 that the system may provide in response to the user indicating a desire to schedule uses of a commodity by, for example, selecting link 4815 (FIG. 48*a*) and identifying a commodity. Scheduling uses of a commodity may be useful for any type of commodity that has time-based ownership or use rights (e.g., deeded-weeks, right to use, rentals, computer processing, utility output, etc.). The system may allow the user to select co-owners and change their weeks, or to select weeks and edit co-owners. Any other suitable approach may be used. The user may indicate that the user is finished by, for example, pressing button 4835. In response, the system may update the commodity information of the commodity. The system may update the user information for the co-owners if they are users. The system may also notify the co-owners of the change in the use schedule.

Figure 48F:
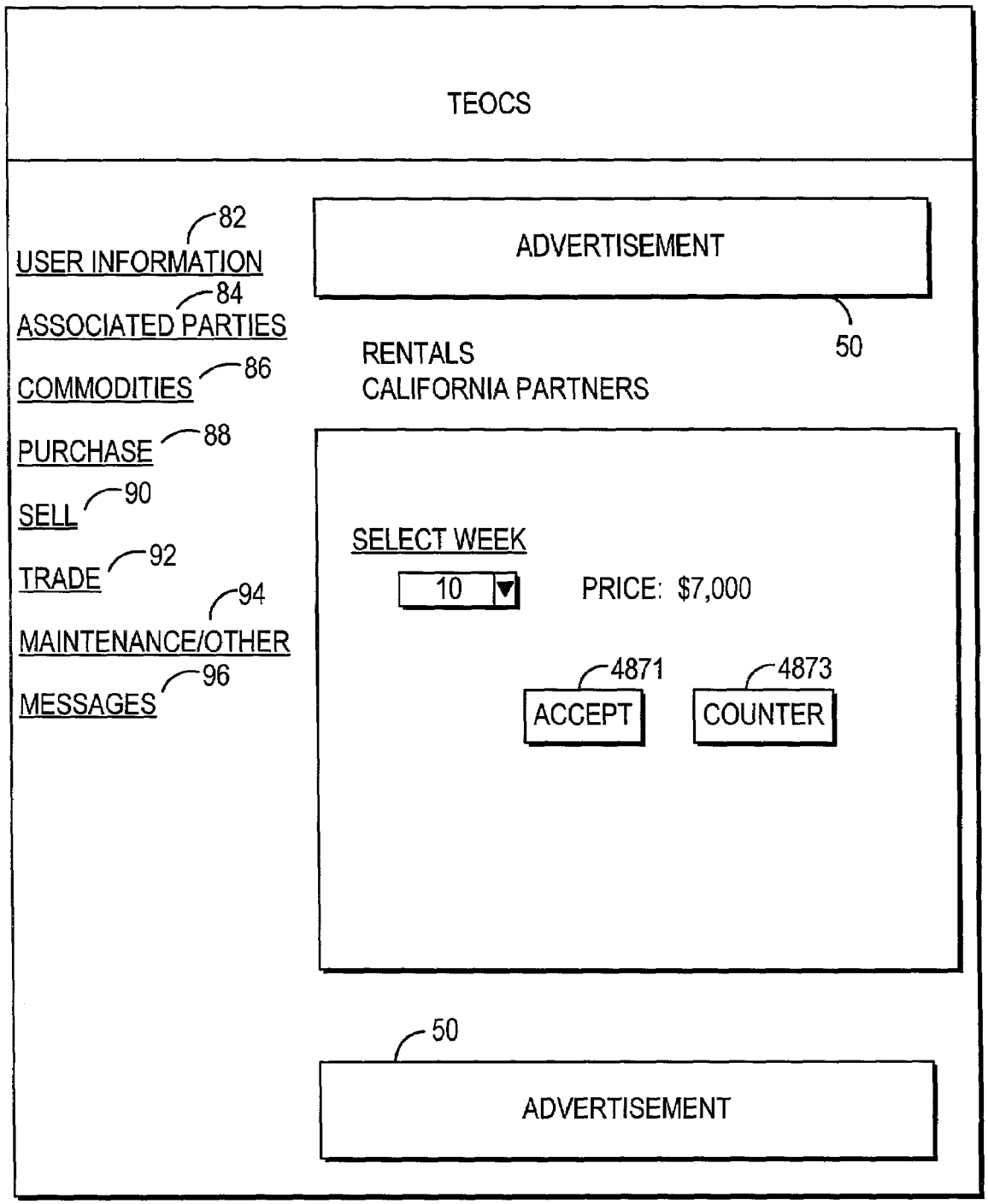

FIG. 48*f* shows an illustrative page 4860 that the system may provide in response to a user indicating a desire to place rental orders by, for example, selecting link 4820 (FIG. 48*a*) and identifying a commodity. Rental orders may be placed, for example, for any co-owned or wholly owned commodity that a user wishes to use for a period of time but not purchase. The system may not need, with some types of commodities, to initiate a transfer of ownership as a result of a rental request. Users may, for example, select a week. The system may display the asking price for that week of a commodity. If no asking price is set, the system may allow the user to enter a bid. When an asking price is set, the user may indicate that the user accepts the price by, for example, pressing button 4871. The user may enter a counter-offer by, for example, pressing button 4873. The system may notify the owner of the property of the counter-offer and provide the owner with an opportunity to, for example, accept or reject the offer.

Figure 49:
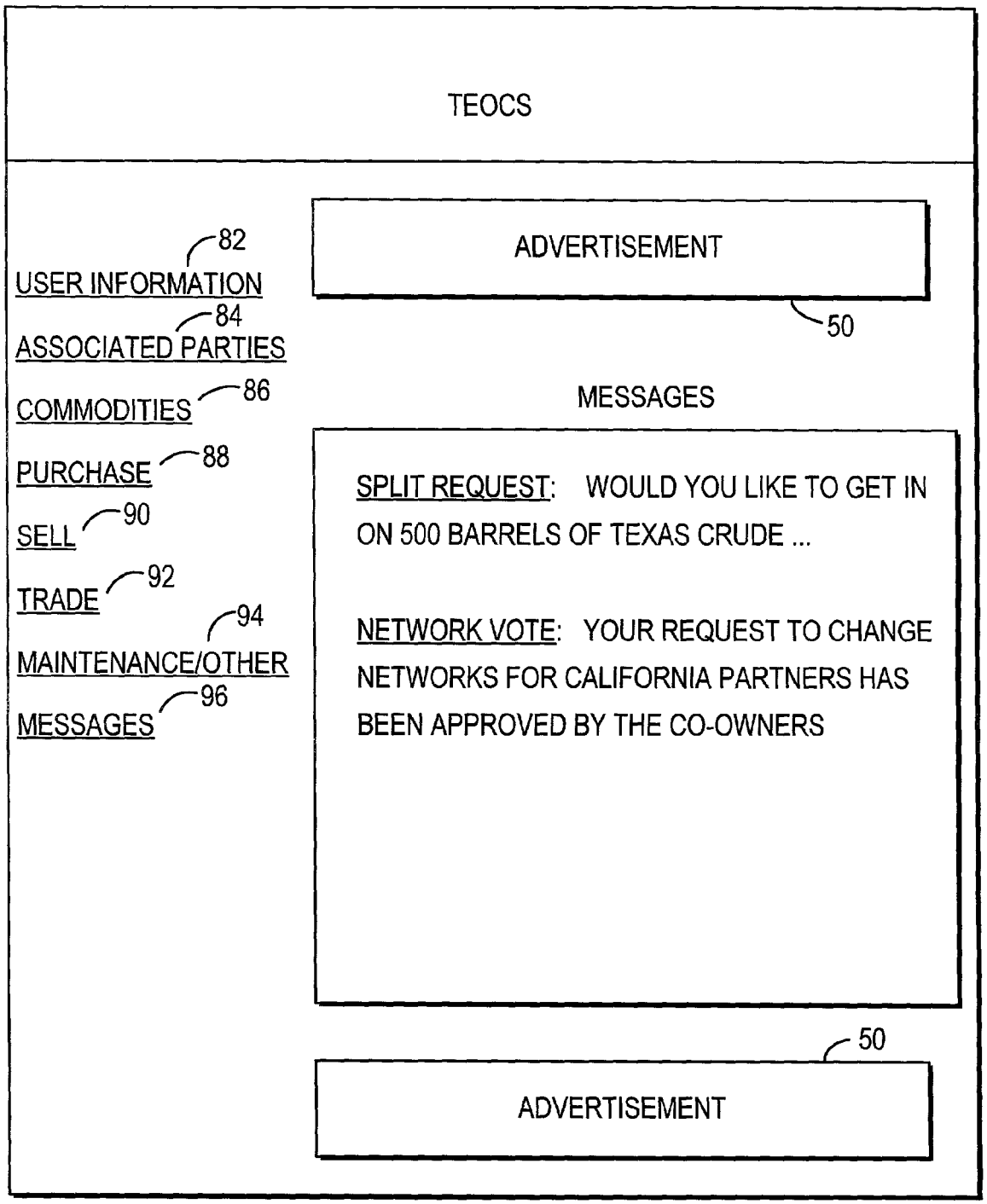
FIG. 49 shows an illustrative message page with illustrative messages, in accordance with the present invention.

The system may also provide a user with an opportunity to read messages provided to the user by the system. The user may indicate a desire to access messages by, for example, selecting link 96 from any page that includes the link. In response, the system may provide a system message page that shows the user the messages waiting for the user. FIG. 49 shows an illustrative system message page 4900. In the example of FIG. 49, the user has two system messages. The first message is a split request sent to the user from another user. The second message is a message indicating that a request to change networks for a commodity was approved by other co-owners of a commodity. Users may select a link associated with a message to view the entire message and, if desired, respond to the message.

Thus, an enhanced promotional channel is provided. One skilled in the art will appreciate that the present invention can be practiced by other than the described embodiments, which are presented for purposes of illustration and not of limitation, and the present invention is limited only by the claims which follow.

What is claimed is:

1. A method for initiating the transfer of ownership interests in co-owned commodities comprising:
    electronically associating with a computer a plurality of co-owners of a commodity with the commodity, wherein each of the plurality of co-owners is allowed to participate in transferring at least partial ownership of the commodity;
    allowing at least one user of an access device to define a transfer request for transferring at least partial ownership of the commodity co-owned by the plurality of co-owners;
    notifying at least one co-owner of the plurality of co-owners of the request so that the at least one co-owner can participate in transferring at least partial ownership of that commodity, wherein the at least parital ownership that can be transferred is owned by the at least one co-owner;
    allowing the at least one co-owner of the plurality of co-owners to participate in transferring at least partial ownership of the commodity; and
    electronically initiating over a computer network the transfer of at least partial ownership of the commodity according to the request for each co-owner of the plurality of co-owners participating in the transfer.

2. The method defined in claim 1 wherein:
    the at least one user is a non-co-owner of the commodity;
    the request is a purchase request;
    allowing the at least one co-owner of the plurality of co-owners to participate in transferring at least partial ownership of the commodity comprises allowing the at least one co-owner to sell the at least one co-owner's ownership interest in the commodity; and
    electronically initiating the transfer of at least partial ownership of the commodity comprises electronically initiating the sale of the ownership interest of each co-owner participating in the transfer to the at least one user.

3. The method defined in claim 1 wherein:
    the at least one user is a non-co-owner of the commodity;
    the request is a trade request including an identified commodity;
    allowing the at least one co-owner to participate in transferring at least partial ownership of the commodity comprises allowing the at least one co-owner to trade the at least one co-owner's ownership interest in the commodity; and
    electronically initiating the transfer of at least partial ownership of the commodity comprises electronically initiating the trade of the ownership interest of each co-owner participating in the transfer for at least partial ownership in the identified commodity.

4. The method defined in claim 1 wherein:
    the at least one user is a co-owner of the commodity having an ownership interest in the commodity;
    the request is a sale request;
    allowing the at least one co-owner to participate in transferring at least partial ownership of the commodity comprises allowing the at least one co-owner to purchase the at least one user's ownership interest in the commodity; and
    electronically initiating the transfer of at least partial ownership of the commodity comprises electronically initiating the sale of the ownership interest of the at least one user to each co-owner participating in the transfer.

5. The method defined in claim 1 wherein:
    the at least one user is a co-owner of the commodity;
    the request is a trade request including an identified commodity;
    allowing at least one co-owner to participate in transferring at least partial ownership comprises allowing the at least one co-owner to trade the at least one co-owner's ownership interest in the commodity; and
    electronically initiating the transfer of at least partial ownership of the commodity comprises electronically initiating the trade of the ownership interest of each co-owner participating in the transfer for at least partial ownership in the identified commodity.

6. The method defined in claim 1 wherein the request is a purchase request including a price for the commodity.

7. The method defined in claim 6 wherein the price comprises an ask price, a market order, or a limit order.

8. The method defined in claim 1 wherein the request is a sale request including a price for the commodity.

9. The method defined in claim 8 wherein the price comprises a bid price, a market order, or a limit order.

10. The method defined in claim 1 wherein:
    the at least one user is a non-co-owner of the commodity;
    the request is a purchase request;
    allowing the at least one co-owner of the plurality of co-owners to participate in the transfer comprises allowing a given co-owner of the plurality of co-owners to sell the given co-owner's ownership interest in the commodity and drag-along the remaining co-owners of the plurality of co-owners; and
    electronically initiating the transfer of at least partial ownership of the commodity comprises electronically initiating the purchase of the ownership interest of the given co-owner and the remaining co-owners of the plurality of co-owners.

11. The method defined in claim 1 wherein:

the at least one user is a non-co-owner of the commodity;

the request is a purchase request;

allowing the at least one co-owner of the plurality of co-owners to participate in the transfer comprises allowing each of the co-owners to tag-along with the sale of a given co-owner's ownership interest; and electronically initiating the transfer of at least partial ownership of the commodity comprises electronically initiating the purchase of the ownership interest of the given co-owner and the remaining co-owners of the plurality of co-owners.

12. The method defined in claim 1 wherein:

the at least one user is a co-owner of the commodity;

the request is a sale request;

allowing the at least one co-owner of the plurality of co-owners to participate in the transfer comprises allowing the at least one user to sell the at least one user's ownership interest in the commodity and drag-along the remaining co-owners of the plurality of co-owners; and electronically initiating the transfer of at least partial ownership of the commodity comprises electronically initiating the sale of the ownership interest of the at least one user and the remaining co-owners of the plurality of co-owners.

13. The method defined in claim 1 wherein:

the at least one user is a co-owner of the commodity;

the request is a sale request; allowing the at least one co-owner of the plurality of co-owners to participate in the transfer comprises allowing each of the co-owners to tag-along with the sale of the at least one user's ownership interest; and electronically initiating the transfer of at least partial ownership of the commodity comprises electronically initiating the sale of the ownership interest of the given co-owner and the remaining co-owners of the plurality of co-owners.

14. The method defined in claim 1 wherein:

the at least one user is a non-co-owner of the commodity;

the request is a trade request including an identified commodity;

allowing the at least one co-owner of the plurality of co-owners to participate in the transfer comprises allowing a given co-owner of the plurality of co-owners to trade the given co-owner's ownership interest in the commodity and drag-along the remaining co-owners of the plurality of co-owners; and electronically initiating the transfer of at least partial ownership of the commodity comprises electronically initiating the trade of the ownership interest of each co-owner of the plurality of co-owners for at least partial ownership in the identified commodity.

15. The method defined in claim 1 wherein:

the at least one user is a non-co-owner of the commodity;

the request is a trade request including an identified commodity;

allowing the at least one co-owner of the plurality of co-owners to participate in the transfer comprises allowing each of the co-owners to tag-along with the trade of a given co-owner's ownership interest for at least partial ownership in the identified commodity; and electronically initiating the transfer of at least partial ownership of the commodity comprises initiating the trade of the ownership interest of the given co-owner and the remaining co-owners of the plurality of co-owners for at least partial ownership interest in the identified commodity.

16. The method defined in claim 1 wherein:

the at least one user is a co-owner of the commodity;

the request is a trade request including an identified commodity;

allowing the at least one co-owner of the plurality of co-owners to participate in the transfer comprises allowing the at least one user to trade the at least one user's ownership interest in the commodity and drag-along the remaining co-owners of the plurality of co-owners for at least partial ownership in the identified commodity; and electronically initiating the transfer of at least partial ownership of the commodity comprises electronically initiating the trade of the ownership interest of the at least one user and the remaining co-owners of the plurality of co-owners for at least partial ownership interest in the identified commodity.

17. The method defined in claim 1 wherein:

the at least one user is a co-owner of the commodity;

the request is a trade request including an identified commodity;

allowing the at least one co-owner of the plurality of co-owners to participate in the transfer comprises allowing each of the co-owners to tag-along with the trade of the at least one user's ownership interest for at least partial ownership in the identified commodity; and electronically initiating the transfer of at least partial ownership of the commodity comprises electronically initiating the trade of the ownership interest of the given co-owner and the remaining co-owners of the plurality of co-owners for at least partial ownership interest in the identified commodity.

18. The method defined in claim 1 wherein allowing the at least one co-owner of the plurality of co-owners to participate in transferring at least partial ownership of the commodity comprises allowing the at least one co-owner to veto transferring at least partial ownership of the commodity to the at least one user.

19. The method defined in claim 1 wherein:

the at least one co-owner of the plurality of co-owners has a right of first refusal; and allowing the at least one co-owner of the plurality of co-owners to participate in transferring at least partial ownership of the commodity comprises allowing the at least one co-owner to exercise the right of first refusal.

20. The method defined in claim 1 wherein:

the at least one co-owner of the plurality of co-owners has a right of first offer; and allowing the at least one co-owner of the plurality of co-owners to participate in transferring at least partial ownership of the commodity comprises allowing the at least one co-owner to exercise the right of first offer.

21. The method defined in claim 1 wherein allowing the at least one user to define the request comprises allowing the at least one user to define a class of commodities to which the commodity belongs.

22. The method defined in claim 1 wherein providing the at least one user with an opportunity to electronically define the request comprises:

prompting the at least one user for a commodity type; and providing a specialized interface to the at least one user based on the commodity type.

23. The method defined in claim 1 further comprising matching the request defined by the at least one user with a second transfer request, defined by at least one other user, for transferring at least partial ownership of a commodity co-owned by a plurality of co-owners.

24. The method defined in claim 23 wherein matching the request and second request comprises directly matching the request and the second request.

25. The method defined in claim 23 wherein matching the request and the second request comprises constructing aggregated matches.

26. The method defined in claim 25 wherein constructing aggregated matches comprises:
allowing the at least one user to indicate a quantity of the commodity to transfer, wherein the commodity is of a particular commodity type;
searching a database for ownership interests in commodities of the commodity type; and
aggregating ownership interests in the commodities of the commodity type found in the database until the quantity of the commodities is found.

27. The method defined in claim 25 wherein constructing aggregated matches comprises:
searching a database for a request of a quantity of the commodity to transfer, wherein the commodity is of a particular commodity type;
searching a database for ownership interests in commodities of the commodity type when the at least one user does not own the quantity of the commodity to transfer; and
aggregating ownership interests in the commodities of the commodity type found in the database with the at least one user's ownership of the commodity until the quantity of the commodities is found.

28. The method defined in claim 23 wherein matching the request and the second request comprises matching the request and the second request by auction.

29. The method defined in claim 1 wherein the method further comprises determining each co-owner of the plurality of co-owners of the commodity.

30. The method defined in claim 29 further comprising:
determining whether each of the co-owners of the plurality of co-owners have drag-along or tag-along rights; and
notifying each co-owner of each co-owners drag-along or tag-along rights.

31. The method defined in claim 1 further comprising:
determining whether a third party is necessary for the transfer of ownership of the commodity; and
selecting a third party for the transfer.

32. The method defined in claim 1 further comprising allowing a user to select a third party for the transfer.

33. The method defined in claim 1 further comprising generating transfer documents for transferring ownership interests in the commodity.

34. The method defined in claim 33 wherein the transfer documents are electronic documents and the method further comprises allowing at least one co-owner of the plurality of co-owners to electronically sign the documents.

35. The method defined in claim 33 wherein the transfer documents are printed documents and the method further comprises:
providing the printed documents to at least one co-owner; and
obtaining the printed documents from at least one co-owner of the plurality of co-owners.

36. The method defined in claim 1 further comprising:
allowing the at least one user to indicate a desire to participate in an auction for the commodity;
allowing the at least one user to define an auction request; and
allowing the at least one user to participate in the auction as defined in the auction request.

37. The method defined in claim 36 wherein allowing the at least one user to define an auction request comprises allowing the at least one user to indicate the commodity.

38. The method defined in claim 36 wherein allowing the at least one user to define an auction request comprises allowing the at least one user to define a class of commodities.

39. The method defined in claim 36 wherein allowing the at least one user to define an auction request comprises allowing the at least one user to indicate a particular auction.

40. The method defined in claim 1 further comprising providing for the electronic exchange of remuneration for the transfer.

41. The method defined in claim 1 further comprising electronically recording the transfer.

42. The method defined in claim 1 wherein notifying co-owners of the commodity of the request comprises notifying the co-owners via e-mail.

43. A system for initiating the transfer of ownership interests in co-owned commodities comprising:
means for electronically associating each of a plurality of co-owners of a commodity with the commodity, wherein each of the plurality of co-owners is allowed to participate in transferring at least partial ownership of the commodity;
means for allowing at least one user to define a transfer request for transferring at least partial ownership of the commodity co-owned by the plurality of co-owners;
means for notifying at least one co-owner of the plurality of co-owners of the request so that the at least one co-owner can participate in transferring at least partial ownership of that commodity, wherein the at least parital ownership that can be transferred is owned by the at least one co-owner;
means for allowing the at least one co-owner of the plurality of co-owners to participate in transferring at least partial ownership of the commodity; and
means for electronically initiating the transfer of at least partial ownership of the commodity according to the request for each co-owner of the plurality of co-owners participating in the transfer.

44. The system defined in claim 43 wherein:
the at least one user is a non-co-owner of the commodity;
the request is a purchase request;
the means for allowing the at least one co-owner to participate in transferring at least partial ownership of the commodity comprises means for allowing the at least one co-owner to sell the at least one co-owner's ownership interest in the commodity; and
the means for electronically initiating the transfer of at least partial ownership of the commodity comprises means for electronically initiating the sale of the ownership interest of each co-owner participating in the transfer to the at least one user.

45. The system defined in claim 43 wherein:
the at least one user is a non-co-owner of the commodity;
the request is a trade request including an identified commodity;
the means for allowing the at least one co-owner to participate in transferring at least partial ownership of the commodity comprises means for allowing the at least one co-owner to trade the at least one co-owner's ownership interest in the commodity; and the means for electronically initiating the transfer of at least partial ownership of the commodity comprises means for electronically initiating the trade of the ownership interest of each co-owner participating in the transfer for at least partial ownership in the identified commodity.

46. The system defined in claim 43 wherein:

the at least one user is a co-owner of the commodity having an ownership interest in the commodity;

the request is a sale request;

the means for allowing the at least one co-owner to participate in transferring at least partial ownership of the commodity comprises means for allowing the at least one co-owner to purchase the at least one user's ownership interest in the commodity; and the means for electronically initiating the transfer of at least partial ownership of the commodity comprises means for electronically initiating the sale of the ownership interest of the at least one user to each co-owner participating in the transfer.

47. The system defined in claim 43 wherein:

the at least one user is a co-owner of the commodity;

the request is a trade request including an identified commodity;

the means for allowing the at least one co-owner to participate in transferring at least partial ownership comprises means for allowing the at least one co-owner to trade the at least one co-owner's ownership interest in the commodity; and the means for electronically initiating the transfer of at least partial ownership of the commodity comprises the means for electronically initiating the trade of the ownership interest of each co-owner participating in the transfer for at least partial ownership in the identified commodity.

48. The system defined in claim 43 wherein the request is a purchase request including a price for the commodity.

49. The system defined in claim 48 wherein the price comprises an ask price, a market order, or a limit order.

50. The system defined in claim 43 wherein the request is a sale request including a price for the commodity.

51. The system defined in claim 50 wherein the price comprises a bid price, a market order, or a limit order.

52. The system defined in claim 43 wherein:

the at least one user is a non-co-owner of the commodity;

the request is a purchase request;

the means for allowing the at least one co-owner of the plurality of co-owners to participate in the transfer comprises means for allowing a given co-owner of the plurality of co-owners with an opportunity to sell the given co-owner's ownership interest in the commodity and drag-along the remaining co-owners of the plurality of co-owners; and the means for electronically initiating the transfer of at least partial ownership of the commodity comprises means for electronically initiating the purchase of the ownership interest of the given co-owner and the remaining co-owners of the plurality of co-owners.

53. The system defined in claim 43 wherein:

the at least one user is a non-co-owner of the commodity;

the request is a purchase request;

the means for allowing the at least one co-owner of the plurality of co-owners to participate in the transfer comprises means for allowing each of the co-owners to tag-along with the sale of a given co-owner's ownership interest; and the means for electronically initiating the transfer of at least partial ownership of the commodity comprises means for electronically initiating the purchase of the ownership interest of the given co-owner and the remaining co-owners of the plurality of co-owners.

54. The system defined in claim 43 wherein:

the at least one user is a co-owner of the commodity;

the request is a sale request;

the means for allowing the at least one co-owner of the plurality of co-owners to participate in the transfer comprises means for allowing the at least one user to sell the at least one user's ownership interest in the commodity and drag-along the remaining co-owners of the plurality of co-owners; and the means for electronically initiating the transfer of at least partial ownership of the commodity comprises means for electronically initiating the sale of the ownership interest of the at least one user and the remaining co-owners of the plurality of co-owners.

55. The system defined in claim 43 wherein:

the at least one user is a co-owner of the commodity;

the request is a sale request;

the means for allowing the at least one co-owner of the plurality of co-owners to participate in the transfer comprises means for allowing each of the co-owners to tag-along with the sale of the at least one user's ownership interest; and the means for electronically initiating the transfer of at least partial ownership of the commodity comprises the means for electronically initiating the sale of the ownership interest of the given co-owner and the remaining co-owners of the plurality of co-owners.

56. The system defined in claim 43 wherein:

the at least one user is a non-co-owner of the commodity;

the request is a trade request including an identified commodity;

the means for allowing the at least one co-owner of the plurality of co-owners to participate in the transfer comprises means for allowing a given co-owner of the plurality of co-owners to trade the given co-owner's ownership interest in the commodity and drag-along the remaining co-owners of the plurality of co-owners; and the means for electronically initiating the transfer of at least partial ownership of the commodity comprises means for electronically initiating the trade of the ownership interest of each co-owner of the plurality of co-owners for at least partial ownership in the identified commodity.

57. The system defined in claim 43 wherein:

the at least one user is a non-co-owner of the commodity;

the request is a trade request including an identified commodity;

the means for allowing the at least one co-owner of the plurality of co-owners to participate in the transfer comprises means for allowing each of the co-owners to tag-along with the trade of a given co-owner's ownership interest for at least partial ownership in the identified commodity; and the means for electronically initiating the transfer of at least partial ownership of the commodity comprises means for initiating the trade of the ownership interest of the given co-owner and the remaining co-owners of the plurality of co-owners for at least partial ownership interest in the identified commodity.

58. The system defined in claim 43 wherein:
the at least one user is a co-owner of the commodity;
the request is a trade request including an identified commodity;
the means for allowing the at least one co-owner of the plurality of co-owners to participate in the transfer comprises means for allowing the at least one user to trade the at least one user's ownership interest in the commodity and drag-along the remaining co-owners of the plurality of co-owners for at least partial ownership in the identified commodity; and
the means for electronically initiating the transfer of at least partial ownership of the commodity comprises means for electronically initiating the trade of the ownership interest of the at least one user and the remaining co-owners of the plurality of co-owners for at least partial ownership interest in the identified commodity.

59. The system defined in claim 43 wherein:
the at least one user is a co-owner of the commodity;
the request is a trade request including an identified commodity;
the means for allowing the at least one co-owner of the plurality of co-owners to participate in the transfer comprises means for allowing each of the co-owners to tag-along with the trade of the at least one user's ownership interest for at least partial ownership in the identified commodity; and
the means for electronically initiating the transfer of at least partial ownership of the commodity comprises means for electronically initiating the trade of the ownership interest of the given co-owner and the remaining co-owners of the plurality of co-owners for at least partial ownership interest in the identified commodity.

60. The system defined in claim 43 wherein the means for allowing the at least one co-owner of the plurality of co-owners to participate in transferring at least partial ownership of the commodity comprises means for allowing the at least one co-owner to veto transferring at least partial ownership of the commodity to the at least one user.

61. The system defined in claim 43 wherein:
the at least one co-owner of the plurality of co-owners has a right of first refusal; and the means for allowing the at least one co-owner of the plurality of co-owners to participate in transferring at least partial ownership of the commodity comprises means for providing the at least one co-owner with an opportunity to exercise the right of first refusal.

62. The system defined in claim 43 wherein:
the at least one co-owner of the plurality of co-owners has a right of first offer; and
the means for allowing the at least one co-owner of the plurality of co-owners to participate in transferring at least partial ownership of the commodity comprises means for allowing the at least one co-owner to exercise the right of first offer.

63. The system defined in claim 43 wherein the means for allowing the at least one user to define the request comprises means for allowing the at least one user to define a class of commodities to which the commodity belongs.

64. The system defined in claim 43 wherein the means for providing the at least one user with an opportunity to electronically define the request comprises:
means for prompting the at least one user for a commodity type; and
means for providing a specialized interface to the at least one user based on the commodity type.

65. The system defined in claim 43 further comprising means for matching the request defined by the at least one user with a second transfer request, defined by at least one other user, for transferring at least partial ownership of a commodity co-owned by a plurality of co-owners.

66. The system defined in claim 65 wherein the means for matching the request and second request comprises means for directly matching the request and the second request.

67. The system defined in claim 65 wherein the means for matching the request and the second request comprises means for constructing aggregated matches.

68. The system defined in claim 67 wherein the means for constructing aggregated matches comprises:
means for allowing the at least one user to indicate a quantity of the commodity to transfer, wherein the commodity is of a particular commodity type;
means for searching a database for ownership interests in commodities of the commodity type; and
means for aggregating ownership interests in the commodities of the commodity type found in the database until the quantity of the commodities is found.

69. The system defined in claim 67 wherein the means for constructing aggregated matches comprises:
means for searching a database for a request of a quantity of the commodity to transfer, wherein the commodity is of a particular commodity type;
means for searching a database for ownership interests in commodities of the commodity type when the at least one user does not own the quantity of the commodity to transfer; and
means for aggregating ownership interests in the commodities of the commodity type found in the database with the at least one user's ownership of the commodity until the quantity of the commodities is found.

70. The system defined in claim 65 wherein the means for matching the request and the second request comprises means for matching the request and the second request by auction.

71. The system defined in claim 43 wherein the system further comprises means for determining each co-owner of the plurality of co-owners of the commodity.

72. The system defined in claim 71 further comprising:
means for determining whether each of the co-owners of the plurality of co-owners have drag-along or tag-along rights; and
means for notifying each co-owner of each co-owners drag-along or tag-along rights.

73. The system defined in claim 43 further comprising:
means for determining whether a third party is necessary for the transfer of ownership of the commodity; and
means for selecting a third party for the transfer.

74. The system defined in claim 43 further comprising means for allowing a user to select a third party for the transfer.

75. The system defined in claim 43 further comprising means for generating transfer documents for transferring ownership interests in the commodity.

76. The system defined in claim 75 wherein the transfer documents are electronic documents and the system further comprises means for allowing at least one co-owner of the plurality of co-owners to electronically sign the documents.

77. The system defined in claim 75 wherein the transfer documents are printed documents and the system further comprises:

means for providing the printed documents to at least one co-owner; and means for obtaining the printed documents from at least one co-owner of the plurality of co-owners.

78. The system defined in claim 43 further comprising:

means for allowing the at least one user to indicate a desire to participate in an auction for the commodity;

means for providing the at least one user with an opportunity to define an auction request; and means for providing the at least one user with an opportunity to participate in the auction as defined in the auction request.

79. The system defined in claim 78 wherein the means for allowing the at least one user to define an auction request comprises means for allowing the at least one user to indicate the commodity.

80. The system defined in claim 78 wherein the means for allowing the at least one user to define an auction request comprises means for allowing the at least one user to define a class of commodities.

81. The system defined in claim 78 wherein the means for allowing the at least one user to define an auction request comprises means for allowing the at least one user to indicate a particular auction.

82. The system defined in claim 43 further comprising means for providing for the electronic exchange of remuneration for the transfer.

83. The system defined in claim 43 further comprising means for electronically recording the transfer.

84. The system defined in claim 43 wherein the means for notifying co-owners of the commodity of the request comprises means for notifying the co-owners via e-mail.

85. A system for initiating the transfer of ownership interests in co-owned commodities comprising:

at least one database for electronically associating each of a plurality of co-owners of a commodity with the commodity, wherein each of the plurality of co-owners of the commodity is allowed to participate in transferring at least partial ownership of the commodity;

at least one access device configured to allow a user associated with the access device to define a transfer request for transferring at least partial ownership of the commodity co-owned by the plurality of co-owners;

a server configured to receive the transfer request from the at least one access device and notify at least one co-owner of the plurality of co-owners of the request;

at least one access device associated with each co-owner of the plurality of co-owners configured to receive the notification from the server so that the at least one co-owner can participate in transferring at least partial ownership of that commodity and allow a co-owner of the plurality of co-owners associated with the access device to participate in transferring at least partial ownership of the commodity, wherein the at least parital ownership that can be transferred is owned by the co-owner; and wherein the server is further configured to initiate the transfer of at least partial ownership of the commodity according to the request for each co-owner of the plurality of co-owners participating in the transfer.

86. The system defined in claim 85 wherein:

the at least one user is a non-co-owner of the commodity;

the request is a purchase request;

the at least one access device of each co-owner is further configured to allow each co-owner to sell the at least one co-owner's ownership interest in the commodity; and the server is further configured to electronically initiate the sale of the ownership interest of each co-owner participating in the transfer to the at least one user.

87. The system defined in claim 85 wherein:

the at least one user is a non-co-owner of the commodity;

the request is a trade request including an identified commodity;

the at least one access device of each co-owner is further configured to allow each co-owner to trade the at least one co-owner's ownership interest in the commodity; and the server is further configured to electronically initiate the trade of the ownership interest of each co-owner participating in the transfer for at least partial ownership in the identified commodity.

88. The system defined in claim 85 wherein:

the at least one user is a co-owner of the commodity having an ownership interest in the commodity;

the request is a sale request;

the at least one access device of each co-owner is further configured to allow each co-owner to purchase the at least one user's ownership interest in the commodity; and the server is further configured to electronically initiate the sale of the ownership interest of the at least one user to each co-owner participating in the transfer.

89. The system defined in claim 85 wherein:

the at least one user is a co-owner of the commodity;

the request is a trade request including an identified commodity;

the at least one access device of each co-owner is further configured to allow each co-owner to trade the at least one co-owner's ownership interest in the commodity; and the server is further configured to electronically initiate the trade of the ownership interest of each co-owner participating in the transfer for at least partial ownership in the identified commodity.

90. The system defined in claim 85 wherein the request is a purchase request including a price for the commodity.

91. The system defined in claim 90 wherein the price comprises an ask price, a market order, or a limit order.

92. The system defined in claim 85 wherein the request is a sale request including a price for the commodity.

93. The system defined in claim 92 wherein the price comprises a bid price, a market order, or a limit order.

94. The system defined in claim 85 wherein:

the at least one user is a non-co-owner of the commodity;

the request is a purchase request;

the at least one access device of each co-owner is further configured to allow each co-owner to sell the given co-owner's ownership interest in the commodity and drag-along the remaining co-owners of the plurality of co-owners; and the server is further configured to electronically initiate the purchase of the ownership interest of the given co-owner and the remaining co-owners of the plurality of co-owners.

95. The system defined in claim 85 wherein:

the at least one user is a non-co-owner of the commodity;

the request is a purchase request;

the at least one access device of each co-owner is further configured to allow each co-owner to tag-along with the sale of a given co-owner's ownership interest; and the server is further configured to electronically initiate the purchase of the ownership interest of the given co-owner and the remaining co-owners of the plurality of co-owners.

96. The system defined in claim 85 wherein:

the at least one user is a co-owner of the commodity;

the request is a sale request;

the at least one access device associated with a user is further configured to allow the user associated with the at least one access device to sell the at least one user's ownership interest in the commodity and drag-along the remaining co-owners of the plurality of co-owners; and the server is further configured to electronically initiate the sale of the ownership interest of the at least one user and the remaining co-owners of the plurality of co-owners.

97. The system defined in claim 85 wherein:

the at least one user is a co-owner of the commodity;

the request is a sale request;

the at least one access device of each co-owner is further configured to allow each co-owner to tag-along with the sale of the at least one user's ownership interest; and the server is further configured to electronically initiate the sale of the ownership interest of the given co-owner and the remaining co-owners of the plurality of co-owners.

98. The system defined in claim 85 wherein:

the at least one user is a non-co-owner of the commodity;

the request is a trade request including an identified commodity;

the at least one access device of each co-owner is further configured to allow a given co-owner of the plurality of co-owners to trade the given co-owner's ownership interest in the commodity and drag-along the remaining co-owners of the plurality of co-owners; and the server is further configured to electronically initiate the trade of the ownership interest of each co-owner of the plurality of co-owners for at least partial ownership in the identified commodity.

99. The system defined in claim 85 wherein:

the at least one user is a non-co-owner of the commodity;

the request is a trade request including an identified commodity;

the at least one access device of each co-owner is further configured to allow each of the co-owners to tag-along with the trade of a given co-owner's ownership interest for at least partial ownership in the identified commodity; and the server is further configured to initiate the trade of the ownership interest of the given co-owner and the remaining co-owners of the plurality of co-owners for at least partial ownership interest in the identified commodity.

100. The system defined in claim 85 wherein:

the at least one user is a co-owner of the commodity;

the request is a trade request including an identified commodity;

the at least one access device associated with a user is further configured to allow the user associated with the at least one access device to trade the at least one user's ownership interest in the commodity and drag-along the remaining co-owners of the plurality of co-owners for at least partial ownership in the identified commodity; and the server is further configured to electronically initiate the trade of the ownership interest of the at least one user and the remaining co-owners of the plurality of co-owners for at least partial ownership interest in the identified commodity.

101. The system defined in claim 85 wherein:

the at least one user is a co-owner of the commodity;

the request is a trade request including an identified commodity;

the at least one access device of each co-owner is further configured to allow each of the co-owners to tag-along with the trade of the at least one user's ownership interest for at least partial ownership in the identified commodity; and the server is further configured to electronically initiate the trade of the ownership interest of the given co-owner and the remaining co-owners of the plurality of co-owners for at least partial ownership interest in the identified commodity.

102. The system defined in claim 85 wherein the at least one access device of each co-owner is further configured to allow each co-owner to veto transferring at least partial ownership of the commodity to the user.

103. The system defined in claim 85 wherein:

the at least one co-owner of the plurality of co-owners has a right of first refusal; and the at least one access device of each co-owner is further configured to allow each co-owner to exercise the right of first refusal.

104. The system defined in claim 85 wherein:

the at least one co-owner of the plurality of co-owners has a right of first offer; and the at least one access device of each co-owner is further configured to allow each co-owner to exercise the right of first offer.

105. The system defined in claim 85 wherein the at least one access device associated with a user is further configured to allow the user associated with the access device to define a class of commodities to which the commodity belongs.

106. The system defined in claim 85 wherein the at least one access device associated with a user is further configured to:

prompt the at least one user for a commodity type; and provide a specialized interface to the user associated with the at least one access device, based on the commodity type.

107. The system defined in claim 85 wherein the server is further configured to match the request defined by a user associated with the at least one access device Image Page 51 with a second transfer request, defined by a different user associated with a different at least one user access device, for transferring at least partial ownership of a commodity co-owned by a plurality of co-owners.

108. The system defined in claim 107 wherein the server is further configured to directly match the request and the second request.

109. The system defined in claim 107 wherein the server is further configured to construct aggregated matches.

110. The system defined in claim 109 wherein:

the at least one access device is further configured to allow the user associated with the at least one access device to indicate a quantity of the commodity to transfer, wherein the commodity is of a particular commodity type; and the server is further configured to:
- search a database for ownership interests in commodities of the commodity type; and
- aggregate ownership interests in the commodities of the commodity type found in the database until the quantity of the commodities is found.

111. The system defined in claim 109 wherein the server is further configured to:
- search a database for a request of a quantity of the commodity to transfer, wherein the commodity is of a particular commodity type;
- search a database for ownership interests in commodities of the commodity type when a user does not own the quantity of the commodity to transfer; and
- aggregate ownership interests in the commodities of the commodity type found in the database with the at least one user's ownership of the commodity until the quantity of the commodities is found.

112. The system defined in claim 107 wherein the server is further configured to match the request and the second request by auction.

113. The system defined in claim 85 wherein the server is further configured to determine each co-owner of the plurality of co-owners of the commodity.

114. The system defined in claim 113 wherein the server is further configured to:
- determine whether each of the co-owners of the plurality of co-owners have drag-along or tag-along rights; and
- notify each co-owner of each co-owners drag-along or tag-along rights.

115. The system defined in claim 85 wherein the server is further configured to:
- determine whether a third party is necessary for the transfer of ownership of the commodity; and
- select a third party for the transfer.

116. The system defined in claim 85 wherein the at least one access device is further configured to allow the user associated with the at least one access device to select a third party for the transfer.

117. The system defined in claim 85 further comprising a transfer documents system configured to generate transfer documents for transferring ownership interests in the commodity.

118. The system defined in claim 117 wherein the transfer documents are electronic documents and the at least one access device of each co-owner is further configured to allow each of the co-owners to electronically sign the documents.

119. The system defined in claim 117 wherein the transfer documents are printed documents and the transfer documents system is further configured to:
- provide the printed documents to at least one co-owner; and
- obtain the printed documents from at least one co-owner of the plurality of co-owners.

120. The system defined in claim 85 wherein the at least one access device is further configured to allow the user associated with the at least one access device to:
- indicate a desire to participate in an auction for the commodity;
- define an auction request; and participate in the auction as defined in the auction request.

121. The system defined in claim 120 wherein the at least one access device is further configured to allow the user associated with the at least one access device to indicate the commodity.

122. The system defined in claim 120 wherein the at least one access device is further configured to allow the user associated with the at least one access device to define a class of commodities.

123. The system defined in claim 120 wherein the at least one access device is further configured to allow the user associated with the at least one access device to indicate a particular auction.

124. The system defined in claim 85 further comprising an electronic commerce server configured to provide for the electronic exchange of remuneration for the transfer.

125. The system defined in claim 85 further comprising a recordation system configured to electronically record the transfer.

126. The system defined in claim 85 wherein the server is further configured to notifying the co-owners via e-mail.

* * * * *